United States Patent
Kanemaru et al.

(10) Patent No.: US 9,094,668 B2
(45) Date of Patent: Jul. 28, 2015

(54) DIGITAL CONTENT RECEIVING APPARATUS, DIGITAL CONTENT RECEIVING METHOD AND DIGITAL CONTENT RECEIVING/TRANSMITTING METHOD

(71) Applicant: Hitachi Consumer Electronics Co., Ltd., Tokyo (JP)

(72) Inventors: Takashi Kanemaru, Yokohama (JP); Sadao Tsuruga, Yokohama (JP); Satoshi Otsuka, Yokohama (JP)

(73) Assignee: Hitachi Maxell, Ltd., Osaka (JP)

( * ) Notice: Subject to any disclaimer, the term of this patent is extended or adjusted under 35 U.S.C. 154(b) by 16 days.

(21) Appl. No.: 14/023,319

(22) Filed: Sep. 10, 2013

(65) Prior Publication Data

US 2014/0016909 A1    Jan. 16, 2014

Related U.S. Application Data

(63) Continuation of application No. 13/327,224, filed on Dec. 15, 2011, now abandoned.

(30) Foreign Application Priority Data

Feb. 4, 2011    (JP) .................................. 2011-022253

(51) Int. Cl.
*H04N 13/00* (2006.01)
*H04N 13/04* (2006.01)
(Continued)

(52) U.S. Cl.
CPC ............ *H04N 13/007* (2013.01); *G11B 27/005* (2013.01); *G11B 27/031* (2013.01); *G11B 27/105* (2013.01); *G11B 27/3027* (2013.01); *G11B 27/327* (2013.01); *H04N 5/775* (2013.01); *H04N 5/783* (2013.01); *H04N 9/8042* (2013.01);
(Continued)

(58) Field of Classification Search
USPC ............ 386/239, 280, 326, 335, 353; 348/42, 348/44, 51, 53, 565
See application file for complete search history.

(56) References Cited

U.S. PATENT DOCUMENTS

| | | | |
|---|---|---|---|
| 2005/0244050 A1* | 11/2005 | Nomura et al. | 382/154 |
| 2007/0016846 A1* | 1/2007 | Ryu | 715/500.1 |

(Continued)

FOREIGN PATENT DOCUMENTS

| | | |
|---|---|---|
| JP | 2003-009033 A | 1/2003 |
| JP | 2005-110121 A | 4/2005 |

(Continued)

OTHER PUBLICATIONS

Notice of Reasons of Rejection Japanese Patent Application No. 2011-022253 dated Feb. 18, 2014 with English language summary.

*Primary Examiner* — Daquan Zhao

(74) *Attorney, Agent, or Firm* — McDermott Will & Emery LLP

(57) ABSTRACT

A recording/reproducing apparatus, for recording/reproducing video content comprises a recording/reproducing portion, which is configured to record the video content into a recording medium, and to reproduce the video content recorded in the recording medium, wherein determination is made if video content to be reproduced at high-speed includes video content or not, which can be displayed in 3D, when reproducing the video content recorded in the recording medium at the high-speed, and upon basis of that determination, a method of high-speed reproduction is changed.

12 Claims, 80 Drawing Sheets

(51) Int. Cl.

| | |
|---|---|
| *H04N 21/433* | (2011.01) |
| *H04N 21/4402* | (2011.01) |
| *H04N 21/81* | (2011.01) |
| *H04N 5/775* | (2006.01) |
| *H04N 5/783* | (2006.01) |
| *H04N 9/804* | (2006.01) |
| *H04N 9/82* | (2006.01) |
| *G11B 27/031* | (2006.01) |
| *G11B 27/10* | (2006.01) |
| *G11B 27/30* | (2006.01) |
| *G11B 27/32* | (2006.01) |
| *H04N 9/80* | (2006.01) |
| *G11B 27/00* | (2006.01) |
| *H04N 5/93* | (2006.01) |
| *H04N 5/84* | (2006.01) |
| *H04N 5/89* | (2006.01) |

(52) U.S. Cl.
CPC ......... *H04N 9/8211* (2013.01); *H04N 13/0048* (2013.01); *H04N 13/0055* (2013.01); *H04N 13/0066* (2013.01); *H04N 21/4334* (2013.01); *H04N 21/440281* (2013.01); *H04N 21/816* (2013.01)

(56) References Cited

U.S. PATENT DOCUMENTS

| | | | | |
|---|---|---|---|---|
| 2007/0194858 | A1* | 8/2007 | Song et al. | 333/2 |
| 2010/0074594 | A1* | 3/2010 | Nakamura et al. | 386/92 |
| 2010/0092148 | A1* | 4/2010 | Ogawa et al. | 386/44 |
| 2010/0150523 | A1* | 6/2010 | Okubo et al. | 386/68 |
| 2010/0215343 | A1* | 8/2010 | Ikeda et al. | 386/95 |
| 2011/0116771 | A1* | 5/2011 | Ota et al. | 386/343 |
| 2012/0069015 | A1* | 3/2012 | Han et al. | 345/419 |
| 2012/0075420 | A1* | 3/2012 | Cho et al. | 348/43 |
| 2012/0210229 | A1* | 8/2012 | Bryant et al. | 715/723 |
| 2013/0014015 | A1* | 1/2013 | Lambourne | 715/716 |
| 2013/0034835 | A1* | 2/2013 | Min | 434/169 |
| 2013/0215240 | A1* | 8/2013 | Tsuruga et al. | 348/51 |

FOREIGN PATENT DOCUMENTS

| | | |
|---|---|---|
| JP | 2009-124719 A | 6/2009 |
| JP | 2010-171991 A | 8/2010 |

\* cited by examiner

FIG. 3

ASSIGNMENT OF STREAM FORMAT TYPE

| STREAM FORMAT TYPE | MEANING |
|---|---|
| 0x00 | NO-DEFINITION |
| 0x01 | ISO/IEC 11172-2 VIDEO (MPEG1 VIDEO) |
| 0x02 | BASE VIEW-BIT STREAM (MAIN VIEWPOINT) OF H.262 (MPEG) METHOD WHEN TRANSMITTING ITU-T RECOMMENDATION H.262 \| ISO/IEC 13818-2 VIDEO OR ISO/IEC 11172-2 LIMIT PARAMETER STREAM OR MULTI-VIEWPOINTS OF 3D VIDEO ON SEPARATE STREAMS |
| 0x03 | ISO/IEC 11172-3 AUDIO |
| 0x04 | ISO/IEC 13818-3 AUDIO |
| 0x05 | ITU-T RECOMMENDATION H.222.0 \| ISO/IEC 13818-1 PRIVATE SECTION |
| 0x06 | ITU-T RECOMMENDATION H.222.0 \| ISO/IEC 13818-1 PES PACKET RECEIVING PRIVATE DATA |
| 0x07 | ISO/IEC 13522 MHEG |
| 0x08 | ITU-T RECOMMENDATION H.222.0 \| ISO/IEC 13818-1 ATTACHMENT A DSM-CC |
| 0x09 | ITU-T RECOMMENDATION H.222.1 |
| 0x0A | ISO/IEC 13818-6 (TYPE A) |
| 0x0B | ISO/IEC 13818-6 (TYPE B) |
| 0x0C | ISO/IEC 13818-6 (TYPE C) |
| 0x0D | ISO/IEC 13818-6 (TYPE D) (DATA CAROUSEL) |
| 0x0E | DATA TYPE DEFINED BY ITU-T RECOMMENDATION H.222.0 \| ISO/IEC 13818-1 OTHER THAN ABOVE RECOMMENDATION |
| 0x0F | ISO/IEC 13818-7 AUDIO (ADTS TRANSPORT STRUCTURE) (MPEG2 AAC) |
| 0x10 | ISO/IEC 14496-2 VIDEO |
| 0x11 | ISO/IEC 14496-3 AUDIO (LATM TRANSPORT STRUCTURE DEFINED BY ISO/IEC 14496-3/AMD 1) |
| 0x12 | ISO/IEC 14496-1 SL PACKETIZED STREAM OR FLEX MAX STREAM TO BE TRANSMITTED ON PES PACKET |

| | |
|---|---|
| 0x13 | ISO/IEC 14496-1 SL PACKETIZED STREAM OR FLEX MAX STREAM TO BE TRANSMITTED BY ISO/IEC 14496 SECTION |
| 0x14 | ISO/IEC 13818-6 SYNC DOWNLOAD PROTOCOL |
| 0x15 | METADATA TO BE TRANSMITTED BY PES PACKET |
| 0x16 | METADATA TO BE TRANSMITTED BY METADATA SECTION |
| 0x17 | METADATA TO BE TRANSMITTED BY ISO/IEC 13818-6 DATA CAROUSEL |
| 0x18 | METADATA TO BE TRANSMITTED BY ISO/IEC 13818-6 OBJECT CAROUSEL |
| 0x19 | METADATA TO BE TRANSMITTED BY ISO/IEC 13818-6 SYNC DOWNLOAD PROTOCOL |
| 0x1A | IPMP STREAM (MPEG-2 IPMP DEFINED BY ISO/IEC 13818-11) |
| 0x1B | BASE VIEW SUB-BIT STREAM (MAIN VIEWPOINT) OF AVC VIDEO STREAM DEFINED BY ITU-T RECOMMENDATION H.264.0 \| ISO/IEC 14496-10 OR MULTI-VIEWPOINTS ENCODED (EXAMPLE:H.264/MVC) STREAM |
| 0x1C | ISO/IEC 14496-3 AUDIO (USING NO ADDITIONAL TRANSPORT STRUCTURE, SUCH AS, DST, ALS, SLS, ETC.) |
| 0x1D | ISO/IEC 14496-17 TEXT |
| 0x1E | AUXILIARY VIDEO STREAM DEFINED BY ISO/IEC 23002-3 |
| 0x1F | SCALABLE VIDEO ENCODED (EXAMPLE: H.264/SVC) STREAM |
| 0x20 | SUB-BIT STREAM (OTHER VIEWPOINT) OF MULTI-VIEWPOINTS ENCODED (EXAMPLE:H.264/MVC) STREAM |
| 0x21 | BIT STREAM OF OTHER VIEWPOINT OF H.262 (MPEG2) METHOD WHEN TRANSMITTING 3D VIDEO OF MULTI-VIEWPOINTS ON SEPARATE STREAMS |
| 0x22 | OTHER VIEWPOINT BIT STREAM OF AVC STREAM METHOD DEFINED BY ITU-T RECOMMENDATION H.264 \| ISO/IEC 14496-10 VIDEO WHEN TRANSMITTING MULTI-VIEWPOINTS OF 3D VIDEO ON SEPARATE STREAMS |
| 0x23 - 0x7E | NO-DEFINITION |
| 0x7F | IPMP STREAM |
| 0x80 - 0xFF | USER AREA |

FIG. 4

COMPONENT DESCRIPTOR

| DATA STRUCTURE | NUMBER OF BITS | BIT LINE DESCRIPTION |
|---|---|---|
| component_descriptor () { | | |
|     descriptor_tag | 8 | uimsbf |
|     descriptor_length | 8 | uimsbf |
|     reserved_future_use | 4 | bslbf |
|     stream_content | 4 | uimsbf |
|     component_type | 8 | uimsbf |
|     component_tag | 8 | uimsbf |
|     ISO_639_language_code | 24 | bslbf |
|     for (i=0;i<N;i++){ | | |
|         text_char | 8 | uimsbf |
|     } | | |
| } | | |

FIG. 5A
COMPONENT CONTENT AND COMPONENT TYPE

| COMPONENT CONTENT | COMPONENT TYPE | DESCRIPTION |
|---|---|---|
| 0x00 | 0x00 - 0xFF | RESERVED FOR FUTURE USE |
| 0x01 | 0x00 | RESERVED FOR FUTURE USE |
| 0x01 | 0x01 | VIDEO 480i (525i), ASPECT RATIO 4:3 |
| 0x01 | 0x02 | VIDEO 480i (525i), ASPECT RATIO 16:9 HAVE PAN VECTOR |
| 0x01 | 0x03 | VIDEO 480i (525i), ASPECT RATIO 16:9 NO PAN VECTOR |
| 0x01 | 0x04 | VIDEO 480i (525i), ASPECT RATIO > 16:9 |
| 0x01 | 0x05 - 0x90 | RESERVED FOR FUTURE USE |
| 0x01 | 0x91 | VIDEO 2160p, ASPECT RATIO 4:3 |
| 0x01 | 0x92 | VIDEO 2160p, ASPECT RATIO 16:9 HAVE PAN VECTOR |
| 0x01 | 0x93 | VIDEO 2160p, ASPECT RATIO 16:9 NO PAN VECTOR |
| 0x01 | 0x94 | VIDEO 2160p, ASPECT RATIO > 16:9 |
| 0x01 | 0x95 - 0xA0 | RESERVED FOR FUTURE USE |
| 0x01 | 0xA1 | VIDEO 480p (525p), ASPECT RATIO 4:3 |
| 0x01 | 0xA2 | VIDEO 480p (525p), ASPECT RATIO 16:9 HAVE PAN VECTOR |
| 0x01 | 0xA3 | VIDEO 480p (525p), ASPECT RATIO 16:9 NO PAN VECTOR |
| 0x01 | 0xA4 | VIDEO 480p (525p), ASPECT RATIO > 16:9 |
| 0x01 | 0xA5 - 0xB0 | RESERVED FOR FUTURE USE |
| 0x01 | 0xB1 | VIDEO 1080i (1125i), ASPECT RATIO 4:3 |
| 0x01 | 0xB2 | VIDEO 1080i (1125i), ASPECT RATIO 16:9 HAVE PAN VECTOR |
| 0x01 | 0xB3 | VIDEO 1080i (1125i), ASPECT RATIO 16:9 NO PAN VECTOR |
| 0x01 | 0xB4 | VIDEO 1080i (1125i), ASPECT RATIO > 16:9 |
| 0x01 | 0xB5 - 0xC0 | RESERVED FOR FUTURE USE |

| 0x01 | 0xC1 | VIDEO 720p (750p), ASPECT RATIO 4:3 |
|---|---|---|
| 0x01 | 0xC2 | VIDEO 720p (750p), ASPECT RATIO 16:9 HAVE PAN VECTOR |
| 0x01 | 0xC3 | VIDEO 720p (750p), ASPECT RATIO 16:9 NO PAN VECTOR |
| 0x01 | 0xC4 | VIDEO 720p (750p), ASPECT RATIO > 16:9 |
| 0x01 | 0xC5 - 0xD0 | RESERVED FOR FUTURE USE |
| 0x01 | 0xD1 | VIDEO 240p, ASPECT RATIO 4:3 |
| 0x01 | 0xD2 | VIDEO 240p, ASPECT RATIO 16:9 HAVE PAN VECTOR |
| 0x01 | 0xD3 | VIDEO 240p, ASPECT RATIO 16:9 NO PAN VECTOR |
| 0x01 | 0xD4 | VIDEO 240p, ASPECT RATIO > 16:9 |
| 0x01 | 0xD5 - 0xE0 | RESERVED FOR FUTURE USE |
| 0x01 | 0xE1 | VIDEO 1080p (1125p), ASPECT RATIO 4:3 |
| 0x01 | 0xE2 | VIDEO 1080p (1125p), ASPECT RATIO 16:9 HAVE PAN VECTOR |
| 0x01 | 0xE3 | VIDEO 1080p (1125p), ASPECT RATIO 16:9 NO PAN VECTOR |
| 0x01 | 0xE4 | VIDEO 1080p (1125p), ASPECT RATIO > 16:9 |
| 0x01 | 0xE5 - 0xFF | RESERVED FOR FUTURE USE |

FIG. 5B
COMPONENT CONTENT AND COMPONENT TYPE

| COMPONENT CONTENT | COMPONENT TYPE | DESCRIPTION |
|---|---|---|
| 0x05 | 0x00 | RESERVED FOR FUTURE USE |
| 0x05 | 0x01 | H.264\|MPEG-4 AVC, VIDEO 480i (525i), ASPECT RATIO 4:3 |
| 0x05 | 0x02 | H.264\|MPEG-4 AVC, VIDEO 480i (525i), ASPECT RATIO 16:9 HAVE PAN VECTOR |
| 0x05 | 0x03 | H.264\|MPEG-4 AVC, VIDEO 480i (525i), ASPECT RATIO 16:9 NO PAN VECTOR |
| 0x05 | 0x04 | H.264\|MPEG-4 AVC, VIDEO 480i (525i), ASPECT RATIO > 16:9 |
| 0x05 | 0x05 - 0x90 | RESERVED FOR FUTURE USE |
| 0x05 | 0x91 | H.264\|MPEG-4 AVC, VIDEO 2160p, ASPECT RATIO 4:3 |
| 0x05 | 0x92 | H.264\|MPEG-4 AVC, VIDEO 2160p, ASPECT RATIO 16:9 HAVE PAN VECTOR |
| 0x05 | 0x93 | H.264\|MPEG-4 AVC, VIDEO 2160p, ASPECT RATIO 16:9 NO PAN VECTOR |
| 0x05 | 0x94 | H.264\|MPEG-4 AVC, VIDEO 2160p, ASPECT RATIO > 16:9 |
| 0x05 | 0x95 - 0xA0 | RESERVED FOR FUTURE USE |
| 0x05 | 0xA1 | H.264\|MPEG-4 AVC, VIDEO 480p (525p), ASPECT RATIO 4:3 |
| 0x05 | 0xA2 | H.264\|MPEG-4 AVC, VIDEO 480p (525p), ASPECT RATIO 16:9 HAVE PAN VECTOR |
| 0x05 | 0xA3 | H.264\|MPEG-4 AVC, VIDEO 480p (525p), ASPECT RATIO 16:9 NO PAN VECTOR |
| 0x05 | 0xA4 | H.264\|MPEG-4 AVC, VIDEO 480p (525p), ASPECT RATIO > 16:9 |
| 0x05 | 0xA5 - 0xB0 | RESERVED FOR FUTURE USE |
| 0x05 | 0xB1 | H.264\|MPEG-4 AVC, VIDEO 1080i (1125i), ASPECT RATIO 4:3 |
| 0x05 | 0xB2 | H.264\|MPEG-4 AVC, VIDEO 1080i (1125i), ASPECT RATIO 16:9 HAVE PAN VECTOR |
| 0x05 | 0xB3 | H.264\|MPEG-4 AVC, VIDEO 1080i (1125i), ASPECT RATIO 16:9 NO PAN VECTOR |
| 0x05 | 0xB4 | H.264\|MPEG-4 AVC, VIDEO 1080i (1125i), ASPECT RATIO > 16:9 |
| 0x05 | 0xB5 - 0xC0 | RESERVED FOR FUTURE USE |

| 0x05 | 0xC1 | H.264\|MPEG-4 AVC, VIDEO 720p (750p), ASPECT RATIO 4:3 |
|---|---|---|
| 0x05 | 0xC2 | H.264\|MPEG-4 AVC, VIDEO 720p (750p), ASPECT RATIO 16:9 HAVE PAN VECTOR |
| 0x05 | 0xC3 | H.264\|MPEG-4 AVC, VIDEO 720p (750p), ASPECT RATIO 16:9 NO PAN VECTOR |
| 0x05 | 0xC4 | H.264\|MPEG-4 AVC, VIDEO 720p (750p), ASPECT RATIO > 16:9 |
| 0x05 | 0xC5 - 0xD0 | RESERVED FOR FUTURE USE |
| 0x05 | 0xD1 | H.264\|MPEG-4 AVC, VIDEO 240p, ASPECT RATIO 4:3 |
| 0x05 | 0xD2 | H.264\|MPEG-4 AVC, VIDEO 240p, ASPECT RATIO 16:9 HAVE PAN VECTOR |
| 0x05 | 0xD3 | H.264\|MPEG-4 AVC, VIDEO 240p, ASPECT RATIO 16:9 NO PAN VECTOR |
| 0x05 | 0xD4 | H.264\|MPEG-4 AVC, VIDEO 240p, ASPECT RATIO > 16:9 |
| 0x05 | 0xD5 - 0xE0 | RESERVED FOR FUTURE USE |
| 0x05 | 0xE1 | H.264\|MPEG-4 AVC, VIDEO 1080p (1125p), ASPECT RATIO 4:3 |
| 0x05 | 0xE2 | H.264\|MPEG-4 AVC, VIDEO 1080p (1125p), ASPECT RATIO 16:9 HAVE PAN VECTOR |
| 0x05 | 0xE3 | H.264\|MPEG-4 AVC, VIDEO 1080p (1125p), ASPECT RATIO 16:9 NO PAN VECTOR |
| 0x05 | 0xE4 | H.264\|MPEG-4 AVC, VIDEO 1080p (1125p), ASPECT RATIO > 16:9 |
| 0x05 | 0xE5 - 0xFF | RESERVED FOR FUTURE USE |

FIG. 5C
COMPONENT CONTENT AND COMPONENT TYPE

| COMPONENT CONTENT | COMPONENT TYPE | DESCRIPTION |
|---|---|---|
| 0x06 | 0x00 | RESERVED FOR FUTURE USE |
| 0x06 | 0x01 | MULTI-VIEWPOINTS VIDEO ENCODING, VIDEO 480i (525i), ASPECT RATIO 4:3 |
| 0x06 | 0x02 | MULTI-VIEWPOINTS VIDEO ENCODING, VIDEO 480i (525i), ASPECT RATIO 16:9 HAVE PAN VECTOR |
| 0x06 | 0x03 | MULTI-VIEWPOINTS VIDEO ENCODING, VIDEO 480i (525i), ASPECT RATIO 16:9 NO PAN VECTOR |
| 0x06 | 0x04 | MULTI-VIEWPOINTS VIDEO ENCODING, VIDEO 480i (525i), ASPECT RATIO > 16:9 |
| 0x06 | 0x05 - 0x90 | RESERVED FOR FUTURE USE |
| 0x06 | 0x91 | MULTI-VIEWPOINTS VIDEO ENCODING, VIDEO 2160p, ASPECT RATIO 4:3 |
| 0x06 | 0x92 | MULTI-VIEWPOINTS VIDEO ENCODING, VIDEO 2160p, ASPECT RATIO 16:9 HAVE PAN VECTOR |
| 0x06 | 0x93 | MULTI-VIEWPOINTS VIDEO ENCODING, VIDEO 2160p, ASPECT RATIO 16:9 NO PAN VECTOR |
| 0x06 | 0x94 | MULTI-VIEWPOINTS VIDEO ENCODING, VIDEO 2160p, ASPECT RATIO > 16:9 |
| 0x06 | 0x95 - 0xA0 | RESERVED FOR FUTURE USE |
| 0x06 | 0xA1 | MULTI-VIEWPOINTS VIDEO ENCODING, VIDEO 480p (525p), ASPECT RATIO 4:3 |
| 0x06 | 0xA2 | MULTI-VIEWPOINTS VIDEO ENCODING, VIDEO 480p (525p), ASPECT RATIO 16:9 HAVE PAN VECTOR |
| 0x06 | 0xA3 | MULTI-VIEWPOINTS VIDEO ENCODING, VIDEO 480p (525p), ASPECT RATIO 16:9 NO PAN VECTOR |
| 0x06 | 0xA4 | MULTI-VIEWPOINTS VIDEO ENCODING, VIDEO 480p (525p), ASPECT RATIO > 16:9 |
| 0x06 | 0xA5 - 0xB0 | RESERVED FOR FUTURE USE |
| 0x06 | 0xB1 | MULTI-VIEWPOINTS VIDEO ENCODING, VIDEO 1080i (1125i), ASPECT RATIO 4:3 |

| 0x06 | 0xB2 | MULTI-VIEWPOINTS VIDEO ENCODING, VIDEO 1080i (1125i), ASPECT RATIO 16:9 HAVE PAN VECTOR |
|---|---|---|
| 0x06 | 0xB3 | MULTI-VIEWPOINTS VIDEO ENCODING, VIDEO 1080i (1125i), ASPECT RATIO 16:9 NO PAN VECTOR |
| 0x06 | 0xB4 | MULTI-VIEWPOINTS VIDEO ENCODING, VIDEO 1080i (1125i), ASPECT RATIO > 16:9 |
| 0x06 | 0xB5 - 0xC0 | RESERVED FOR FUTURE USE |
| 0x06 | 0xC1 | MULTI-VIEWPOINTS VIDEO ENCODING, VIDEO 720p (750p), ASPECT RATIO 4:3 |
| 0x06 | 0xC2 | MULTI-VIEWPOINTS VIDEO ENCODING, VIDEO 720p (750p), ASPECT RATIO 16:9 HAVE PAN VECTOR |
| 0x06 | 0xC3 | MULTI-VIEWPOINTS VIDEO ENCODING, VIDEO 720p (750p), ASPECT RATIO 16:9 NO PAN VECTOR |
| 0x06 | 0xC4 | MULTI-VIEWPOINTS VIDEO ENCODING, VIDEO 720p (750p), ASPECT RATIO > 16:9 |
| 0x06 | 0xC5 - 0xD0 | RESERVED FOR FUTURE USE |
| 0x06 | 0xD1 | MULTI-VIEWPOINTS VIDEO ENCODING, VIDEO 240p, ASPECT RATIO 4:3 |
| 0x06 | 0xD2 | MULTI-VIEWPOINTS VIDEO ENCODING, VIDEO 240p, ASPECT RATIO 16:9 HAVE PAN VECTOR |
| 0x06 | 0xD3 | MULTI-VIEWPOINTS VIDEO ENCODING, VIDEO 240p, ASPECT RATIO 16:9 NO PAN VECTOR |
| 0x06 | 0xD4 | MULTI-VIEWPOINTS VIDEO ENCODING, VIDEO 240p, ASPECT RATIO > 16:9 |
| 0x06 | 0xD5 - 0xE0 | RESERVED FOR FUTURE USE |
| 0x06 | 0xE1 | MULTI-VIEWPOINTS VIDEO ENCODING, VIDEO 1080p (1125p), ASPECT RATIO 4:3 |
| 0x06 | 0xE2 | MULTI-VIEWPOINTS VIDEO ENCODING, VIDEO 1080p (1125p), ASPECT RATIO 16:9 HAVE PAN VECTOR |
| 0x06 | 0xE3 | MULTI-VIEWPOINTS VIDEO ENCODING, VIDEO 1080p (1125p), ASPECT RATIO 16:9 NO PAN VECTOR |
| 0x06 | 0xE4 | MULTI-VIEWPOINTS VIDEO ENCODING, VIDEO 1080p (1125p), ASPECT RATIO > 16:9 |
| 0x06 | 0xE5 - 0xFF | RESERVED FOR FUTURE USE |

FIG. 5D

COMPONENT CONTENT AND COMPONENT TYPE

| COMPONENT CONTENT | COMPONENT TYPE | DESCRIPTION |
|---|---|---|
| 0x07 | 0x00 | RESERVED FOR FUTURE USE |
| 0x07 | 0x01 | 3D VIDEO Side-by-Side 720p, ASPECT RATIO 4:3 |
| 0x07 | 0x02 | 3D VIDEO Side-by-Side 720p, ASPECT RATIO 16:9 HAVE PAN VECTOR |
| 0x07 | 0x03 | 3D VIDEO Side-by-Side 720p, ASPECT RATIO 16:9 NO PAN VECTOR |
| 0x07 | 0x04 | 3D VIDEO Side-by-Side 720p, ASPECT RATIO > 16:9 |
| 0x07 | 0x05 - 0x90 | RESERVED FOR FUTURE USE |
| 0x07 | 0x91 | 3D VIDEO Side-by-Side 1080i, ASPECT RATIO 4:3 |
| 0x07 | 0x92 | 3D VIDEO Side-by-Side 1080i, ASPECT RATIO 16:9 HAVE PAN VECTOR |
| 0x07 | 0x93 | 3D VIDEO Side-by-Side 1080i, ASPECT RATIO 16:9 NO PAN VECTOR |
| 0x07 | 0x94 | 3D VIDEO Side-by-Side 1080i, ASPECT RATIO > 16:9 |
| 0x07 | 0x95 - 0xA0 | RESERVED FOR FUTURE USE |
| 0x07 | 0xA1 | 3D VIDEO Side-by-Side 1080p, ASPECT RATIO 4:3 |
| 0x07 | 0xA2 | 3D VIDEO Side-by-Side 1080p, ASPECT RATIO 16:9 HAVE PAN VECTOR |
| 0x07 | 0xA3 | 3D VIDEO Side-by-Side 1080p, ASPECT RATIO 16:9 NO PAN VECTOR |
| 0x07 | 0xA4 | 3D VIDEO Side-by-Side 1080p, ASPECT RATIO > 16:9 |
| 0x07 | 0xA5 - 0xFF | RESERVED FOR FUTURE USE |

FIG. 5E

COMPONENT CONTENT AND COMPONENT TYPE

| COMPONENT CONTENT | COMPONENT TYPE | DESCRIPTION |
|---|---|---|
| 0x08 | 0x00 | RESERVED FOR FUTURE USE |
| 0x08 | 0x01 | 3D VIDEO Top-and-Bottom 720p, ASPECT RATIO 4:3 |
| 0x08 | 0x02 | 3D VIDEO Top-and-Bottom 720p, ASPECT RATIO 16:9 HAVE PAN VECTOR |
| 0x08 | 0x03 | 3D VIDEO Top-and-Bottom 720p, ASPECT RATIO 16:9 NO PAN VECTOR |
| 0x08 | 0x04 | 3D VIDEO Top-and-Bottom 720p, ASPECT RATIO > 16:9 |
| 0x08 | 0x05 - 0x90 | RESERVED FOR FUTURE USE |
| 0x08 | 0x91 | 3D VIDEO Top-and-Bottom 1080i, ASPECT RATIO 4:3 |
| 0x08 | 0x92 | 3D VIDEO Top-and-Bottom 1080i, ASPECT RATIO 16:9 HAVE PAN VECTOR |
| 0x08 | 0x93 | 3D VIDEO Top-and-Bottom 1080i, ASPECT RATIO 16:9 NO PAN VECTOR |
| 0x08 | 0x94 | 3D VIDEO Top-and-Bottom 1080i, ASPECT RATIO > 16:9 |
| 0x08 | 0x95 - 0xA0 | RESERVED FOR FUTURE USE |
| 0x08 | 0xA1 | 3D VIDEO Top-and-Bottom 1080p, ASPECT RATIO 4:3 |
| 0x08 | 0xA2 | 3D VIDEO Top-and-Bottom 1080p, ASPECT RATIO 16:9 HAVE PAN VECTOR |
| 0x08 | 0xA3 | 3D VIDEO Top-and-Bottom 1080p, ASPECT RATIO 16:9 NO PAN VECTOR |
| 0x08 | 0xA4 | 3D VIDEO Top-and-Bottom 1080p, ASPECT RATIO > 16:9 |
| 0x08 | 0xA5 - 0xFF | RESERVED FOR FUTURE USE |
| 0x09 - 0x0B | 0x00 - 0xFF | RESERVED FOR FUTURE USE |
| 0x0C - 0x0F | 0x00 - 0xFF | PROVIDER DEFINITION |

FIG. 6

COMPONENT GROUP DESCRIPTOR

| DATA STRUCTURE | NUMBER OF BITS | BIT LINE DESCRIPTION |
|---|---|---|
| component_group_descriptor () { | | |
|     descriptor_tag | 8 | uimsbf |
|     descriptor_length | 8 | uimsbf |
|     component_group_type | 3 | uimsbf |
|     total_bit_rate_flag | 1 | uimsbf |
|     num_of_group | 4 | uimsbf |
|     for (i=0;i<num_of_group;i++){ | | |
|         component_group_id | 4 | uimsbf |
|         num_of_CA_unit | 4 | uimsbf |
|         for (i=0;i<num_of_CA_unit;i++){ | | |
|             CA_unit_id | 4 | uimsbf |
|             num_of_component | 4 | uimsbf |
|             for (i=0;i<num_of_component_unit;i++){ | | |
|                 component_tag | 8 | uimsbf |
|             } | | |
|         } | | |
|         if(total_bit_rate_flag==1){ | | |
|             total_bit_rate | 8 | uimsbf |
|         } | | |
|         text_length | 8 | uimsbf |
|         for (i=0;i<text_length;i++){ | | |
|             text_char | 8 | uimsbf |
|         } | | |
|     } | | |
| } | | |

FIG. 7

COMPONENT GROUP TYPE

| COMPONENT GROUP TYPE | DESCRIPTION |
|---|---|
| 000 | MULTI-VIEW TV SERVICE |
| 001 | 3D TV SERVICE |
| 002 - 111 | NO-DEFINITION |

FIG. 8

COMPONENT GROUP IDENTIFICATION

| COMPONENT GROUP IDENTIFICATION | DESCRIPTION |
|---|---|
| 0x0 | MAIN GROUP |
| 0x1 - 0xF | SUB-GROUP |

FIG. 9

CHARGE UNIT IDENTIFICATION

| CHARGE UNIT IDENTIFICATION | DESCRIPTION |
|---|---|
| 0x0 | NON-CHARGE UNIT GROUP |
| 0x1 | CHARGE UNIT GROUP INCLUDING DEFAULT ES GROUP |
| 0x2 - 0xF | CHARGE UNIT GROUP OTHER THAN ABOVE |

FIG. 10A

3D PROGRAM DETAILS DESCRIPTOR

| DATA STRUCTURE | NUMBER OF BITS | BIT LINE DESCRIPTION |
|---|---|---|
| 3d_encode_descriptor () { | | |
|     descriptor_tag | 8 | uimsbf |
|     descriptor_length | 8 | uimsbf |
|     3d_2d_type | 8 | uimsbf |
|     3d_method_type | 8 | uimsbf |
|     stream_type | 8 | uimsbf |
|     for (i=0;i<N;i++){ | | |
|         component_tag | 8 | uimsbf |
|     } | | |
| } | | |

FIG. 10B

3D/2D IDENTIFICATION

| 3D/2D IDENTIFICATION | DESCRIPTION |
|---|---|
| 0x00 | RESERVED FOR FUTURE USE |
| 0x01 | 3D VIDEO |
| 0x02 | 2D VIDEO |
| 0x03 - 0x0F | RESERVED FOR FUTURE USE |
| | |

FIG. 11

3D METHOD IDENTIFICATION

| 3D METHOD IDENTIFICATION | DESCRIPTION |
|---|---|
| 0x00 | RESERVED FOR FUTURE USE |
| 0x01 | 3D 2-VIEWPOINTS SEPARATE TRANSMISSION METHOD |
| 0x02 | Side-by-Side METHOD |
| 0x03 | Top-and-Bottom METHOD |
| 0x04 – 0x0F | RESERVED FOR FUTURE USE |

FIG. 12

SERVICE DESCRIPTOR

| DATA STRUCTURE | NUMBER OF BITS | BIT LINE DESCRIPTION |
|---|---|---|
| service_descriptor () { | | |
|     descriptor_tag | 8 | uimsbf |
|     descriptor_length | 8 | uimsbf |
|     service_type | 8 | uimsbf |
|     service_provider_name_length | 8 | uimsbf |
|     for (i=0;i<N;i++){ | | |
|         char | 8 | uimsbf |
|     } | | |
|     service_name_length | 8 | uimsbf |
|     for (i=0;i<N;i++){ | | |
|         char | 8 | uimsbf |
|     } | | |
| } | | |

FIG. 13

SERVICE FORMAT TYPE

| SERVICE FORMAT TYPE | MEANING |
|---|---|
| 0x00 | NO-DEFINITION |
| 0x01 | DIGITAL TV SERVICE |
| 0x02 | DIGITAL AUDIO SERVICE |
| 0x03 - 0x10 | NO-DEFINITION |
| 0x11 | 3D VIDEO SERVICE |
| 0x12 - 0x7F | NO-DEFINITION |
| 0x80 - 0xA0 | PROVIDER DEFINITION |
| 0xA1 | TEMPORARY VIDEO SERVICE |
| 0xA2 | TEMPORARY AUDIO SERVICE |
| 0xA3 | TEMPORARY DATA SERVICE |
| 0xA4 | ENGINEERING SERVICE |
| 0xA5 | PROMOTION VIDEO SERVICE |
| 0xA6 | PROMOTION AUDIO SERVICE |
| 0xA7 | PROMOTION DATA SERVICE |
| 0xA8 | PRE-STORAGE DATA SERVICE |
| 0xA9 | STORAGE-ONLY DATA SERVICE |
| 0xAA | BOOKMARK LIST DATA SERVICE |
| 0xAB | SERVER-TYPE SIMUL-SERVICE |
| 0xAC | INDEPENDENT FILE SERVICE |
| 0xAD - 0xBF | NO-DEFINITION (STANDARDIZING ORGANIZATION DEFINITION AREA) |
| 0xC0 | DATA SERVICE |
| 0xC1 | STORAGE-TYPE SERVICE USING TLV |
| 0xC2 - 0xFF | NO-DEFINITION |

FIG. 14

SERVICE LIST DESCRIPTOR

| DATA STRUCTURE | NUMBER OF BITS | BIT LINE DESCRIPTION |
|---|---|---|
| service_list_descriptor () { | | |
|     descriptor_tag | 8 | uimsbf |
|     descriptor_length | 8 | uimsbf |
|     for (i=0;i<N;i++){ | | |
|         service_id | 16 | uimsbf |
|         service_type | 8 | uimsbf |
|     } | | |
| } | | |

FIG. 15

TRANSMISSION MANAGEMENT REGULATION FOR COMPONENT DESCRIPTOR

| TRANSMISSION MANAGEMENT REGULATION FOR EACH FIELD | |
|---|---|
| descriptor_tag | DESCRIBE "0x50" |
| descriptor_length | DESCRIBE DESCRIPTOR LENGTH OF COMPONENT DESCRIPTOR. NO DEFINITION OF MAX VALUE. |
| stream_content | DESCRIBE "0x01" (VIDEO) |
| component_type | DESCRIBE VIDEO COMPONENT TYPE OF THAT COMPONENT |
| component_tag | DESCRIBE COMPONENT TAG VALUE UNIQUE IN THAT PROGRAM |
| ISO_639_language_code | DESCRIBE "jpn ("0x6A706E")" |
| text_char | DESCRIBE WITHIN 16 BYTES (8 FULL-SIZE CHARACTERS) AS VIDEO TYPE NAME WHEN THERE ARE PLURAL NUMBERS OF VIDEO COMPONENTS.<br>NO RETURN CODE IS USED.<br>THIS FIELD CAN BE OMITTED WHEN COMPONENT DESCRIPTION IS DEFAULT CHARACTER LINE.<br>DEFAULT CHARACTER LINE IS "VIDEO". |

FIG. 16

TRANSMISSION MANAGEMENT REGULATION FOR COMPONENT GROUP DESCRIPTOR

| TRANSMISSION MANAGEMENT REGULATION FOR EACH FIELD | |
|---|---|
| descriptor_tag | DESCRIBE "0xD9" |
| descriptor_length | DESCRIBE DESCRIPTOR LENGTH OF COMPONENT GROUP DESCRIPTOR. NO DEFINITION OF MAX VALUE. |
| component_group_type | INDICATES TYPE OF COMPONENT GROUP<br>"000": MULTI-VIEW TV<br>"001": 3D TV |
| total_bit_rate_flag | = "0": ALL OF TOTAL BIT RATES WITHIN GROUP IN EVENT ARE IN PREDETERMINED DEFAULT<br>= "1": ANY ONE OF TOTAL BIT RATES WITHIN GROUP IN EVENT EXCEEDS PREDETERMINED DEFAULT |
| num_of_group | DESCRIBE NUMBER OF COMPONENT GROUPS IN EVENT<br>MAX: 3 WHEN MVTV<br>MAX: 2 WHEN 3DTV |
| component_group_id | DESCRIBE COMPONENT GROUP IDENTIFICATION. "0x0" IS ASSIGNED TO MAIN GROUP, AND IS ASSIGNED TO EACH SUB-GROUP, UNIQUELY, WITHIN EVENT BY BROADCASTING PROVIDER. |
| num_of_CA_unit | DESCRIBE NUMBER OF CHARGE/NON-CHARGE UNITS WITHIN COMPONENT GROUP. MAX VALUE IS 2. IT IS "0x1" WHEN NO CHARGING COMPONENT IS INCLUDED IN THAT COMPONENT GROUP. |
| CA_unit_id | DESCRIBE CHARGE UNIT IDENTIFICATION. THIS IS ASSIGNED BY BROADCASTING PROVIDED, UNIQUELY, WITHIN EVENT. |
| num_of_component | DESCRIBE NUMBER OF COMPONENTS, BELONGING TO THAT COMPONENT GROUP AND ALSO TO CHARGE/NON-CHARGE UNIT INDICATED BY "CA_unit_id" JUST BEFORE. MAX VALUE IS 15. |
| component_tag | DESCRIBE COMPONENT TAG VALUE BELONGING TO COMPONENT GROUP. |
| total_bit_rate | DESCRIBE TOTAL BIT RATE WITHIN COMPONENT GROUP. BUT, DESCRIBE "0x00" WHEN DEFAULT. |
| text_length | DESCRIBE BYTE LENGTH OF DESCRIPTION OF FOLLOWING COMPONENT GROUP. MAX VALUE IS 16 (OR, 8 FULL-SIZE CHARACTERS). |
| text_char | DESCRIBE EXPLANATION RELATING TO COMPONENT GROUP, NECESSARILY. NO DEFINITION OF DEFAULT CHARACTER LINE. ALSO, NO USE OF RETURN CODE. |

FIG. 17

TRANSMISSION MANAGEMENT REGULATION FOR
3D PROGRAM DETAILS DESCRIPTOR

| TRANSMISSION MANAGEMENT REGULATION FOR EACH FIELD | |
|---|---|
| descriptor_tag | DESCRIBE "0xE1" |
| descriptor_length | DESCRIBE DESCRIPTOR LENGTH OF 3D PROGRAM DETAILS DESCRIPTOR. |
| 3d_2d_type | DESCRIBE 3D/2D IDENTIFICATION. SET FROM AMONG FIG. 10B. |
| 3d_method_type | DESCRIBE 3D METHOD IDENTIFICATION. SET FROM AMONG FIG. 11 |
| stream_type | DESCRIBE ES FORMAT OF PROGRAM. SET FROM AMONG FIG. 3. |
| component_tag | DESCRIBE COMPONENT TAG VALUE TO BE UNIQUE IN THAT PROGRAM. |

FIG. 18

TRANSMISSION MANAGEMENT REGULATION FOR SERVICE DESCRIPTOR

| TRANSMISSION MANAGEMENT REGULATION FOR EACH FIELD | |
|---|---|
| descriptor_tag | DESCRIBE "0x48" |
| descriptor_length | DESCRIBE DESCRIPTOR LENGTH OF SERVICE DESCRIPTOR. |
| service_type | DESCRIBE SERVICE FORMAT TYPE. SET FROM AMONG FIG. 13. |
| service_provider_name_length | DESCRIBE PROVIDER'S NAME LENGTH IF BS/CS DIGITAL TV BROADCASTING. MAX VALUE IS 20. DESCRIBE "0x00" IF TERRESTRIAL DIGITAL TV BROADCASTING, SINCE NO MANAGEMENT IS MADE ON "service_provider_name". |
| char | DESCRIBE PROVIDER'S NAME IF BS/CS DIGITAL TV BROADCASTING. MAX 10 FULL-SIZE CHARACTERS. NOTHING IS DESCRIBED IF TERRESTRIAL DIGITAL TV BROADCASTING. |
| service_name_length | DESCRIBE PROGRAMMED CHANNEL NAME LENGTH. MAX VALUE IS 20. |
| char | DESCRIBE PROGRAMMED CHANNEL NAME. WITHIN 20 BYTES AND 10 FULL-SIZE CHARACTERS. |

FIG. 19

TRANSMISSION MANAGEMENT REGULATION FOR SERVICE LIST DESCRIPTOR

| TRANSMISSION MANAGEMENT REGULATION FOR EACH FIELD | |
|---|---|
| descriptor_tag | DESCRIBE "0x41" |
| descriptor_length | DESCRIBE DESCRIPTOR LENGTH OF SERVICE LIST DESCRIPTOR. |
| loop | DESCRIBE LOOPS OF NUMBER OF SERVICES INCLUDED IN TARGET TRANSPORT STREAM. |
| service_id | DESCRIBE "service_id" INCLUDED IN THAT TRANSPORT STREAM. |
| service_type | DESCRIBE SERVICE TYPE OF TARGET SERVICE. SET FROM AMONG FIG. 13. |

FIG. 20

RECEIVING PROCESS REGULATION FOR COMPONENT DESCRIPTOR

| RECEIVING PROCESS REGULATION FOR EACH FIELD | |
|---|---|
| descriptor_tag | IF "0x50", THAT DESCRIPTOR IS DETERMINED TO BE COMPONENT DESCRIPTOR. |
| descriptor_length | DETERMINED TO BE DESCRIPTOR LENGTH OF COMPONENT DESCRIPTOR. |
| stream_content | = "0x01", "0x05", "0x06", "0x07": DETERMINED TO BE VALID (VIDEO).<br>≠ "0x01", "0x05", "0x06", "0x07": THAT DESCRIPTOR IS DETERMINED INVALID. |
| component_type | DETERMINED TO BE VIDEO COMPONENT TYPE OF THAT COMPONENT (ABOUT COMPONENT TYPES, SEE FIG. 5). |
| component_tag | COMPONENT TAG VALUE TO BE UNIQUE IN THAT PROGRAM, AND CAN BE USED CORRESPONDING TO COMPONENT TAG VALUE OF STREAM IDENTIFIER OF PMT. |
| ISO_639_language_code | TREAT CHARACTER CODE DISPOSED BEHIND AS "jpn" IF OTHER THAN "jpn ("0x6A706E")". |
| text_char | DETERMINE THOSE WITHIN 16 BYTES (OR 8 FULL-SIZE CHARACTERS) AS COMPONENT DESCRIPTION. IF THIS FIELD IS OMITTED, DETERMINED AS COMPONENT DESCRIPTION OF DEFAULT. DEFAULT CHARACTER LINE IS "VIDEO". |

FIG. 21

TRANSMISSION MANAGEMENT REGULATION FOR COMPONENT GROUP DESCRIPTOR

| RECEIVING PROCESS REGULATION FOR EACH FIELD | |
|---|---|
| descriptor_tag | = "0xD9": DETERMINE THAT DESCRIPTOR IS COMPONENT GROUP DESCRIPTOR. |
| descriptor_length | DETERMINED TO BE DESCRIPTOR LENGTH OF COMPONENT GROUP DESCRIPTOR. |
| component_group_type | "000": DETERMINED AS MULTI-VIEW TV SERVICE.<br>"001": DETERMINED AS 3D TV SERVICE. |
| total_bit_rate_flag | = "0": DETERMINE NO TOTAL BIT RATE WITHIN GROUP IN EVENT IS DESCRIBED IN THAT DESCRIPTOR.<br>= "1": DETERMINE TOTAL BIT RATE WITHIN GROUP IN EVENT IS DESCRIBED IN THAT DESCRIPTOR. |
| num_of_group | DETERMINED AS NUMBER OF COMPONENT GROUPS IN EVENT. IF THERE IS MAX VALUE AND EXCEEDING THIS, THERE IS POSSIBILITY OF TREATING THIS AS MAX VALUE. |
| component_group_id | = "0x0": DETERMINED AS MAIN GROUP.<br>≠ "0x0": DETERMINED AS SUB-GROUP. |
| num_of_CA_unit | DETERMINED AS NUMBER OF CHARGE/NON-CHARGE UNITS WITHIN GROUP COMPONENT. THERE IS POSSIBILITY OF TREATING IT AS 2 WHEN EXCEEDING MAX VALUE. |
| CA_unit_id | "0x0": DETERMINED AS NON-CHARGE UNIT GROUP.<br>"0x1": DETERMINED AS CHARGE UNIT INCLUDING DEFAULT ES GROUP.<br>VALUE OTHER THAN THOSE: DETERMINED AS CHARGE UNIT IDENTIFICATION OTHER THAN ABOVE. |
| num_of_component | DETERMINED AS NUMBER OF COMPONENTS BELONGING TO THAT COMPONENT GROUP AND FURTHER TO CHARGE/NON-CHARGE UNIT INDICATED BY "CA_unit_id" JUST BEFORE. THERE IS POSSIBILITY OF TREATING IT AS 15 WHEN EXCEEDING MAX VALUE. |
| component_tag | DETERMINED AS COMPONENT TAG VALUE BELONGING TO COMPONENT GROUP, AND CAN BE USED CORRESPONDING TO COMPONENT TAG VALUE OF STREAM DESCRIPTOR OF PMT. |
| total_bit_rate | DETERMINED AS TOTAL BIT RATE WITHIN COMPONENT GROUP. BUT, DETERMINED AS DEFAULT WHEN "0x00". |
| text_length | ≤ 16 (OR 8 FULL-SIZE CHARACTERS): DETERMINED AS COMPONENT GROUP DESCRIPTOR LENGTH.<br>>16 (OR 8 FULL-SIZE CHARACTERS): EXPLANATION OF COMPONENT GROUP DESCRIPTOR EXCEEDING 16 (OR 8 FULL-SIZE CHARACTERS) IN LENGTH THEREOF CAN BE NEGLECTED. |
| text_char | DESIGNATES EXPLANATION RELATING TO COMPONENT GROUP. |

FIG. 22

TRANSMISSION MANAGEMENT REGULATION FOR
3D PROGRAM DETAILS DESCRIPTOR

| TRANSMISSION MANAGEMENT REGULATION FOR EACH FIELD ||
|---|---|
| descriptor_tag | DESCRIBE "0xE1". |
| descriptor_length | DESCRIBED DESCRIPTOR LENGTH OF 3D PROGRAM DETAILS DESCRIPTOR. |
| 3d_2d_type | DETERMINED AS 3D/2D IDENTIFICATION IN THAT 3D PROGRAM. DESIGNATED FROM AMONG FIG. 10B. |
| 3d_method_type | DETERMINED AS 3D METHOD IDENTIFICATION IN THAT 3D PROGRAM. DESIGNATED FROM AMONG FIG. 11. |
| stream_type | DETERMINED AS ES FORMAT OF THAT PROGRAM. DESIGNATED FROM AMONG FIG. 3. |
| component_tag | DETERMINED AS COMPONENT TAG VALUE TO BE UNIQUE IN THAT PROGRAM. |

FIG. 23

RECEIVING PROCESS REGULATION FOR SERVICE DESCRIPTOR

| RECEIVING PROCESS REGULATION FOR EACH FIELD ||
|---|---|
| descriptor_tag | = "0x48": DETERMINE THAT DESCRIPTOR IS SERVICE DESCRIPTOR. |
| descriptor_length | DETERMINED AS THE DESCRIPTOR LENGTH OF SERVICE DESCRIPTOR. |
| service_type | DETERMINED THAT DESCRIPTOR INVALID WHEN OTHER THAN "service_type" SHOWN IN FIG. 13. |
| service_provider_name_length | BS/CS DIGITAL TV BROADCASTING:<br>  ≤ 20: DETERMINED AS PROVIDER'S NAME LENGTH.<br>  >20: DETERMINE PROVIDER'S NAME BE INVALID.<br>TERRESTRIAL DIGITAL TV BROADCASTING:<br>  DETERMINED INVALID OTHER THAN "0x00". |
| char | BS/CS DIGITAL TV BROADCASTING: DETERMINED AS PROVIDER'S NAME.<br>TERRESTRIAL DIGITAL TV BROADCASTING: NEGLECT DESCRIBED CONTENT. |
| service_name_length | ≤ 20: DETERMINED AS PROGRAMMED CHANNEL NAME LENGTH.<br>>20: DETERMINE COMPOSED CHANNEL BE INVALID. |
| char | DETERMINE AS PROGRAMMED CHANNEL NAME. |

FIG. 24

RECEIVING PROCESS REGULATION FOR SERVICE LIST DESCRIPTOR (NIT 2$^{ND}$ GROUP)

| RECEIVING PROCESS REGULATION FOR EACH FIELD | |
|---|---|
| descriptor_tag | IF "0x41", DETERMINE THAT DESCRIPTOR IS SERVICE LIST DESCRIPTOR. |
| descriptor_length | DETERMINED AS DESCRIPTOR OF SERVICE LIST DESCRIPTOR. |
| loop | DESCRIBE LOOPS OF NUMBER OF SERVICES INCLUDED IN TARGET TRANSPORT STREAM. |
| service_id | DETERMINED AS "service_id" FOR THAT TRANSPORT STREAM. |
| service_type | INDICATES SERVICE TYPE OF TARGET SERVICE. DETERMINED INVALID OTHER THAN SERVICE TYPES DEFINED IN FIG. 13. |

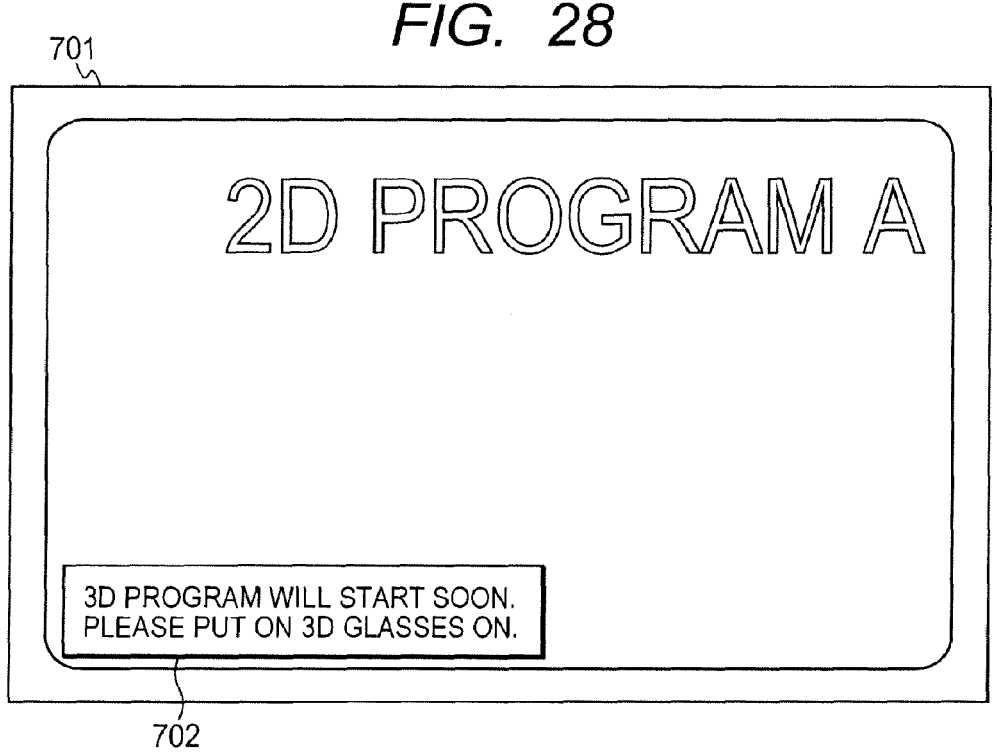
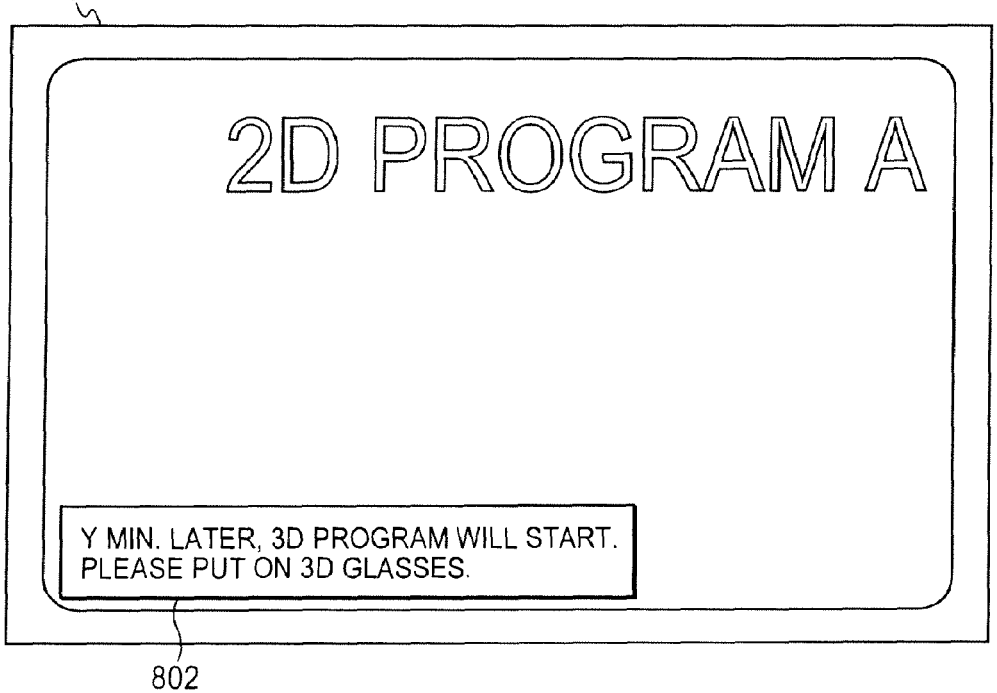

FIG. 47

WHEN TRANSMITTING MULTI-VIEWPOINTS OF 3D VIDEO ON SEPARATE ES
EXAMPLES OF COMBINING OF STREAMS OF ("3D 2-VIEWPOINTS SEPARATE ES TRANSMISSION METHOD")

| | MAIN VIEWPOINT (FOR LEFT-SIDE EYE) VIDEO ES | SUB-VIEWPOINT (FOR LEFT-SIDE EYE) VIDEO ES |
|---|---|---|
| COMBINATION EXAMPLE 1 | BASE VIEW BIT STREAM (MAIN VIEWPOINT) OF MULTI-VIEWPOINTS VIDEO ENCODED (FOR EXAMPLE, H.264/MVC) STREAM (STREAM FORMAT TYPE: 0x1B) | SUB-BIT STREAM (OTHER VIEWPOINT) OF MULTI-VIEWPOINTS VIDEO ENCODED (FOR EXAMPLE, H.264/MVC) STREAM (STREAM FORMAT TYPE: 0x20) |
| COMBINATION EXAMPLE 2 | BASE VIEW BIT STREAM (MAIN VIEWPOINT) OF H.262 (MPEG2) METHOD, WHEN TRANSMITTING MULTI-VIEWPOINTS OF 3D VIDEO ON SEPARATE STREAMS (STREAM FORMAT TYPE: 0x02) | OTHER VIEWPOINT BIT STREAM OF AVC STREAM METHOD DEFINED BY ITU-T RECOMMENDATION H.264|ISO/IEC 14496-10 VIDEO WHEN TRANSMITTING MULTI-VIEWPOINTS OF 3D VIDEO ON SEPARATE STREAMS (STREAM FORMAT TYPE: 0x22) |
| COMBINATION EXAMPLE 3 | BASE VIEW BIT STREAM (MAIN VIEWPOINT) OF H.262 (MPEG2) METHOD, WHEN TRANSMITTING MULTI-VIEWPOINTS OF 3D VIDEO ON SEPARATE STREAMS (STREAM FORMAT TYPE: 0x02) | OTHER VIEWPOINT BIT STREAM OF H.262 (MPEG2) METHOD WHEN TRANSMITTING MULTI-VIEWPOINTS OF 3D VIDEO ON SEPARATE STREAMS (STREAM FORMAT TYPE: 0x21) |
| COMBINATION EXAMPLE 4 | BASE VIEW BIT STREAM (MAIN VIEWPOINT) OF MULTI-VIEWPOINTS VIDEO ENCODED (FOR EXAMPLE, H.264/MVC) STREAM (STREAM FORMAT TYPE: 0x1B) | OTHER VIEWPOINT BIT STREAM OF H.262 (MPEG2) METHOD WHEN TRANSMITTING MULTI-VIEWPOINTS OF 3D VIDEO ON SEPARATE STREAMS (STREAM FORMAT TYPE: 0x21) |

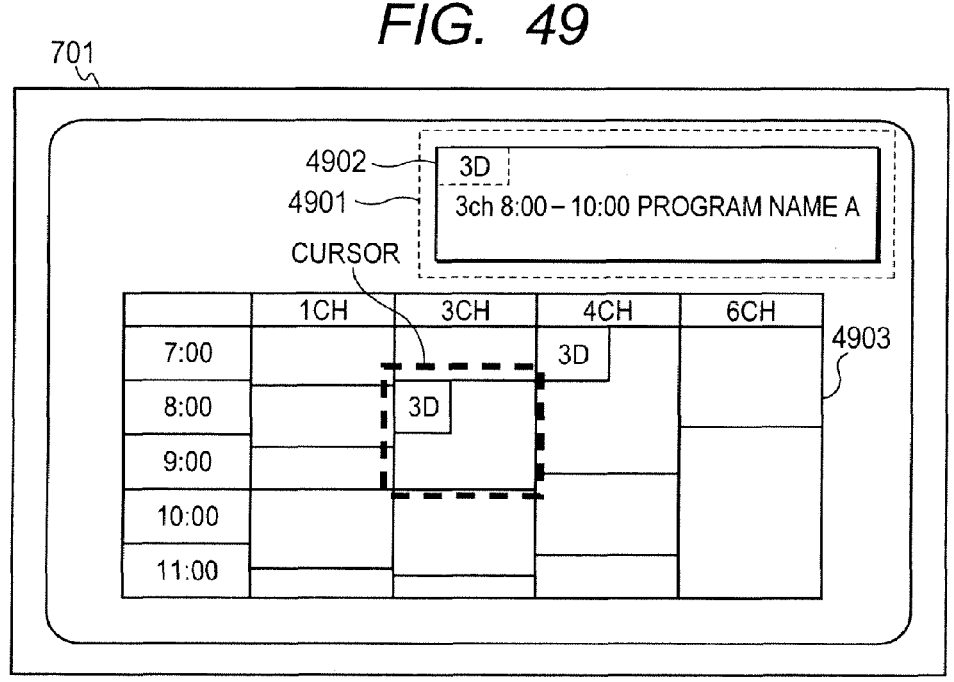
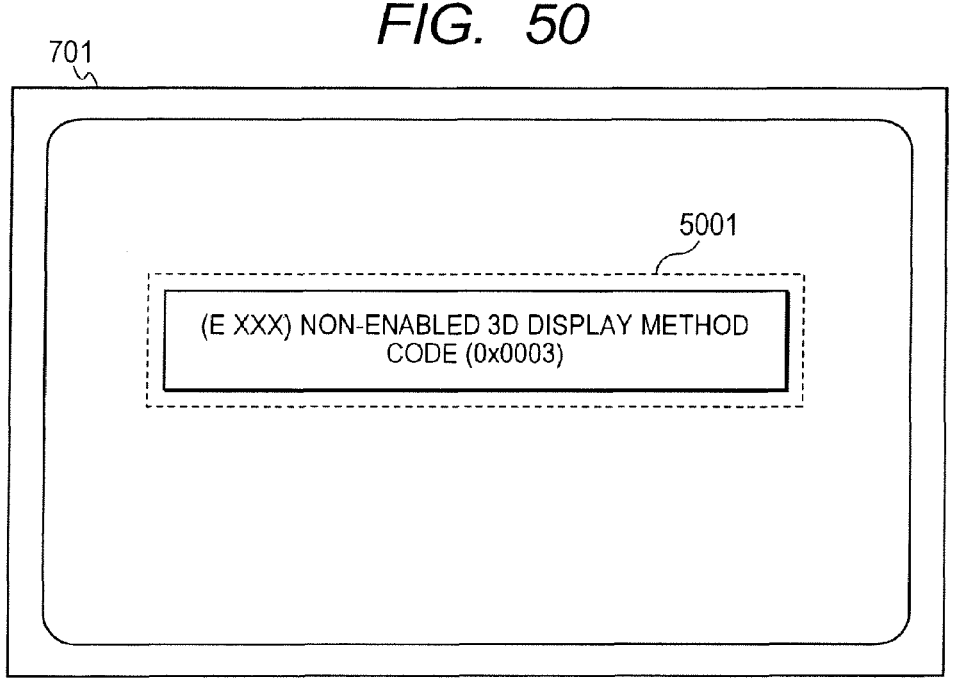

CONTENT DESCRIPTOR

| DATA STRUCTURE | NUMBER OF BITS | BIT LINE DESCRIPTION |
|---|---|---|
| content_descriptor () { | | |
|     descriptor_tag | 8 | uimsbf |
|     descriptor_length | 8 | uimsbf |
|     for (i = 0;i< N;i++) { | | |
|         content_nibble_level_1 | 4 | uimsbf |
|         content_nibble_level_2 | 4 | uimsbf |
|         user_nibble | 4 | uimsbf |
|         user_nibble | 4 | uimsbf |
|     } | | |
| } | | |

FIG. 55

EXAMPLE OF CODE TABLE ABOUT PROGRAM GENRES INDICATED
BY CONTENT DESCRIPTOR
(WHEN VALUE "content_nibble_level_1" IS NOT "0xE")

| content_nibble_level_1 (LARGE CLASS OF PROGRAM GENRE) | content_nibble_level_2 (MIDDLE CLASS OF PROGRAM GENRE) | GENRE | REMARKS |
|---|---|---|---|
| 0x0 | - | "NEWS/REPORTS" | LARGE CLASS |
| 0x0 | 0x1 | "WEATHER" | MIDDLE CLASS |
| 0x0 | 0x2 | "SPECIAL/DOCUMENT" | MIDDLE CLASS |
| ... | ... | ... | |
| 0x1 | - | "SPORTS" | LARGE CLASS |
| 0x1 | 0x1 | "BASEBALL" | MIDDLE CLASS |
| 0x1 | 0x2 | "SUCCOR" | MIDDLE CLASS |
| ... | ... | ... | |

FIG. 56

EXAMPLE OF CODE TABLE ABOUT PROGRAM CHARACTERISTICS INDICATED
BY CONTENT DESCRIPTOR
(WHEN VALUE "content_nibble_level_1" IS "0xE")

| $1^{ST}$ user_nibbl BIT | $2^{ND}$ user_nibbl BIT | PROGRAM CHARACTERISTICS |
|---|---|---|
| ... | ... | ... |
| 0x3 | - | INDICATES "PROGRAM CHARACTERISTIC INFORMATION RELATING TO 3D" |
| 0x3 | 0x0 | "NO 3D VIDEO IS INCLUDED IN TARGET EVENT (PROGRAM)" |
| 0x3 | 0x1 | "TARGET EVENT (PROGRAM) IS 3D VIDEO" |
| 0x3 | 0x2 | "3D VIDEO AND 2D VIDEO ARE INCLUDED IN TARGET EVENT (PROGRAM)" |
| ... | ... | ... |

FIG. 57

EXAMPLE OF CODE TABLE ABOUT PROGRAM CHARACTERISTICS INDICATED
BY CONTENT DESCRIPTOR
(WHEN VALUE "content_nibble_level_1" IS NOT "0xE")

| 1ST user_nibbl BIT | 2ND user_nibbl BIT | PROGRAM CHARACTERISTICS |
|---|---|---|
| ... | ... | ... |
| 0x3 | – | INDICATES "PROGRAM CHARACTERISTIC INFORMATION RELATING TO 3D" |
| 0x3 | 0x0 | "NO 3D VIDEO IS INCLUDED IN TARGET EVENT (PROGRAM)" |
| 0x3 | 0x1 | "3D VIDEO IS INCLUDED IN TARGET EVENT (PROGRAM), AND 3D VIDEO TRANSMISSION METHOD THEREOF IS Side-by-Side METHOD" |
| 0x3 | 0x2 | "3D VIDEO IS INCLUDED IN TARGET EVENT (PROGRAM), AND 3D VIDEO TRANSMISSION METHOD THEREOF IS Top-and-Down METHOD" |
| 0x3 | 0x3 | "3D VIDEO IS INCLUDED IN TARGET EVENT (PROGRAM), AND 3D VIDEO TRANSMISSION METHOD THEREOF IS 3D 2-VIEWPOINTS SEPARATE ES TRANSMISSION METHOD" |
| .... | .... | ... |

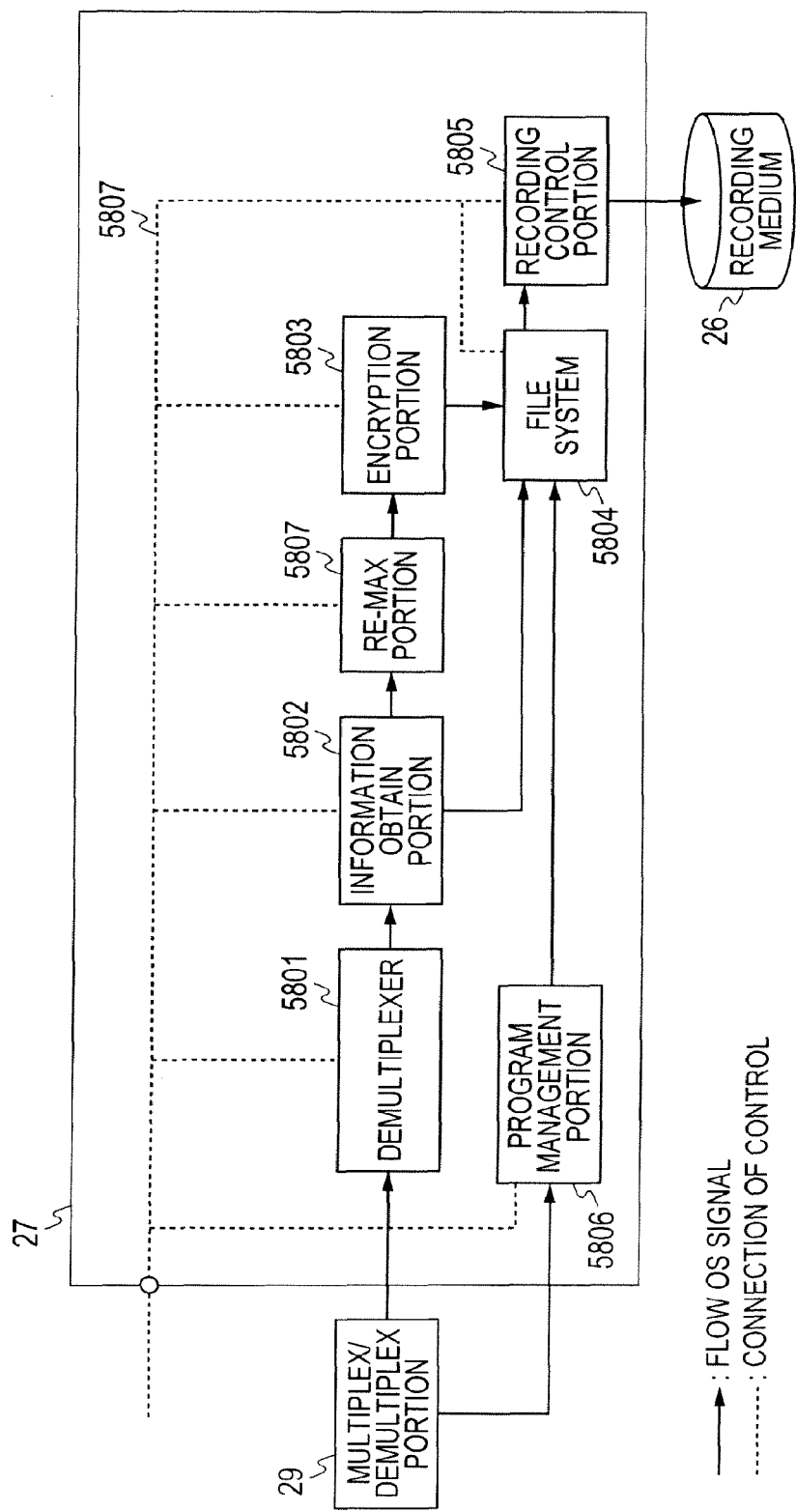

FIG. 64B

| 3D METHOD IDENTIFICATION INFORMATION BIT | MEANING |
|---|---|
| 0x00 | INCLUDES 3D VIDEO SIGNAL OF Side-by-Side METHOD |
| 0x01 | INCLUDES 3D VIDEO SIGNAL OF Top-and-Bottom METHOD |
| 0x02 | INCLUDES 3D VIDEO SIGNAL OF Frame-sequential METHOD |
| 0x03 | Reserved |

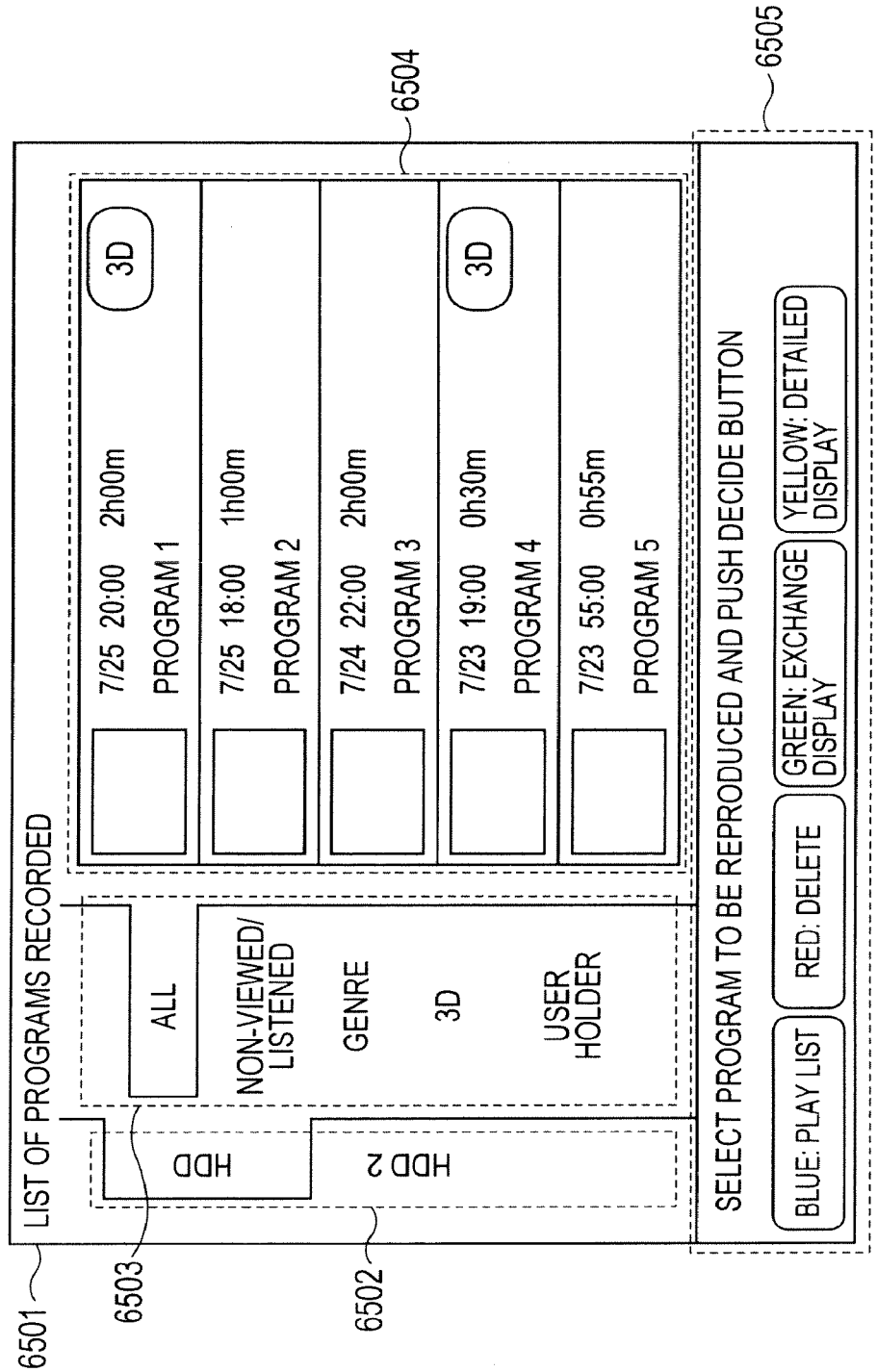

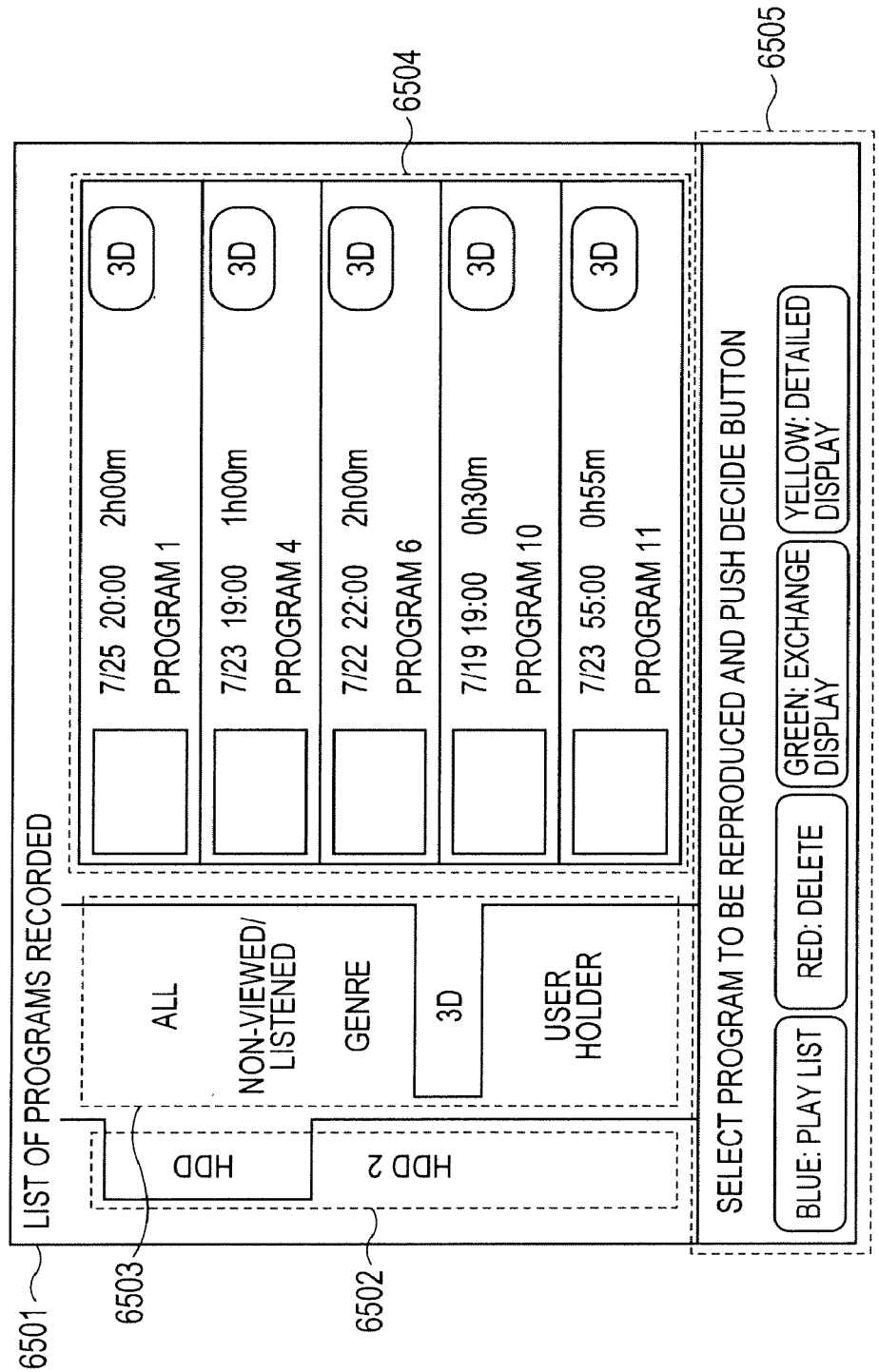

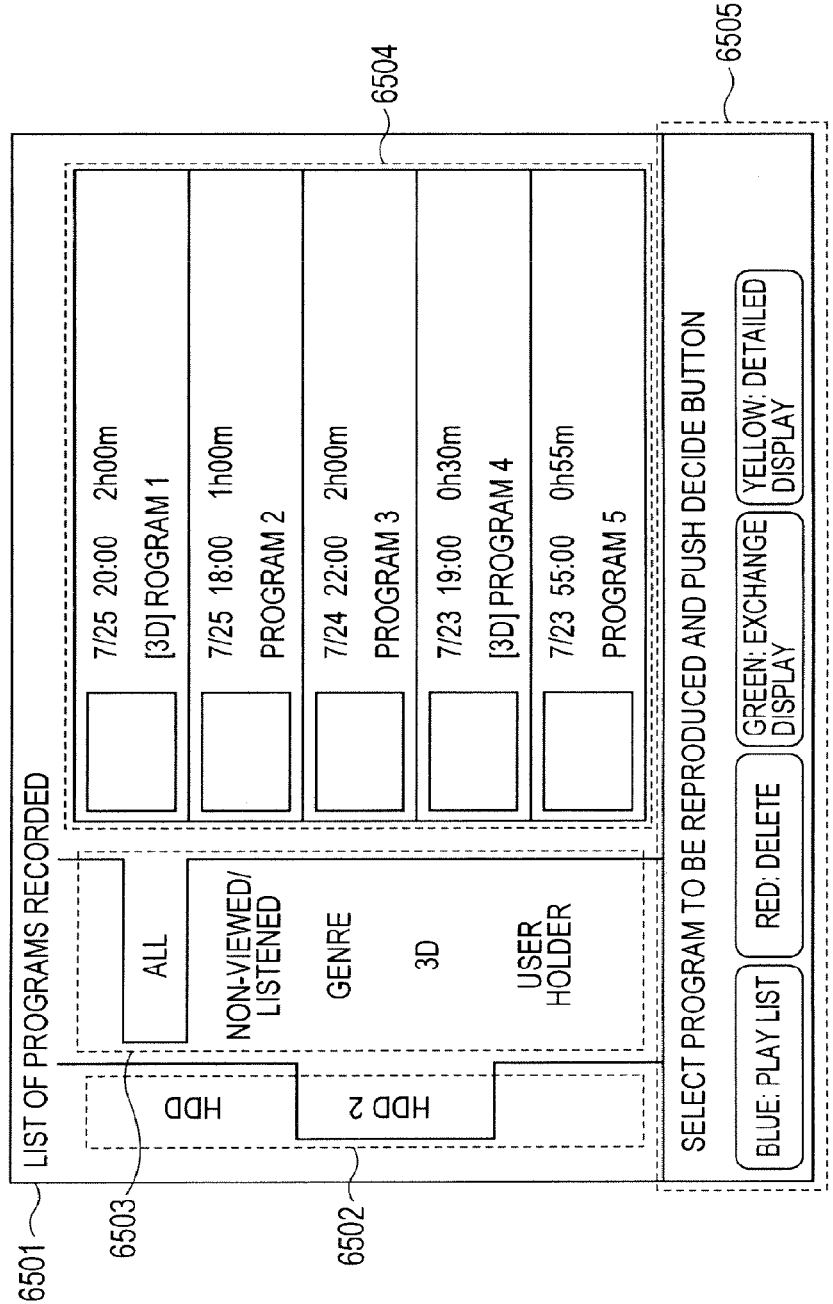

DIGITAL CONTENT RECEIVING APPARATUS, DIGITAL CONTENT RECEIVING METHOD AND DIGITAL CONTENT RECEIVING/TRANSMITTING METHOD

This application is a Continuation of U.S. patent application Ser. No. 13/327,224, filed on Dec. 15, 2011, which relates to and claims priority from Japanese Patent Application No. 2011-022253 filed on Feb. 4, 2011, the disclosures of which are incorporated herein by reference.

BACKGROUND OF THE INVENTION

The technical field of the present invention relates to a broadcast receiving apparatus, a receiving method and a receiving/transmitting method of three-dimension (hereinafter, "3D") video.

In the following Patent Documents 1 is described "to provide a digital broadcast receiving apparatus for enabling to notice, actively, that a program desired by a user will start on a certain channel, etc." (see [0005] of the Patent Document 1), as a problem to be dissolved, and also as a dissolving means thereof is described "comprising a means for taking out program information included in a digital airwave and for selecting a target program to be noticed with using selection information, which is registered by the user, and a means for displaying a message informing an existence of the selected target program to be noticed, cutting into a screen being presently displayed" (see [0006] of the Patent Document 1).

Also, in the following Patent Document 2 is described "to provide a video data producing apparatus of allowing the video data to have flexibility for the purpose of the 3D display, and a video data reproducing apparatus for reproducing that data" (see of the Patent Document 2), as a problem to be dissolved, and also as a dissolving means thereof is described "a video data recording apparatus comprises a 3D display control information producing portion while inputting and encoding a parameter presenting a condition of the time when photographing 3D pictures, and a file producing portion for producing a multimedia information file including both photographing condition information and 3D video data or at least either one of the 3D video data video data or 2D video data" (see [0015] of the Patent Document 2), etc.

Also, in the following Patent Document 3 is described "to provide a reproducing apparatus for compensating stereoscopic vision of a graphic when doing random accessing" (see the abstract of the Patent Document 3), as a problem to be dissolved, and also as a dissolving means thereof is described "each of a left-view graphic stream and a right-view graphic stream, which are included in a digital stream received from a distributing apparatus, includes one (1) or more numbers of display set(s) (hereinafter, being called "DS"), and each DS is a group of data to be used for displaying a graphic object for one (1) screen. One (1) or more numbers of DS (s) included in the left-view graphic stream mentioned above correspond (s) to one (1) or more numbers of DS (s) included in the right-view graphic stream mentioned above, 1 to 1, and in each DS corresponding to is set up a reproduction time, being same on a reproduction time axis of the vide stream mentioned above. The above-mentioned DS includes therein all of the data necessary for displaying the graphic objects for one (1) piece of screen, or condition information indicative of being the difference or not from the DS just before, and the condition information included in the DS corresponding thereto indicates the same contents" (see the abstract of the Patent Document 3).

PRIOR ART DOCUMENTS

Patent Documents

[Patent Document 1] Japanese Patent Laying-Open No. 2003-9033 (2003);
[Patent Document 2] Japanese Patent Laying-Open No. 2009-124719 (2009); and
[Patent Document 3] Japanese Patent Laying-Open No. 2010-171991 (2010).

BRIEF SUMMARY OF THE INVENTION

However, in the Patent Document 1 is no disclosure relating to viewing/listening of 3D content. For that reason, there is a problem to be dissolved, i.e., recognition cannot be made on whether the program, which a receiver is receiving at the present or will receive in future is the 3D program or not.

Also, in the Patent Document 2 is no disclosure, in particular, from a viewpoint, how to publish the information of a 3D method, which is recorded, to the user. For that reason, there is a problem to be dissolved, i.e., it is impossible to fully enjoy an advantage as the receiving apparatus.

Also, in the Patent Document 3, although disclosing a technical idea of fast-forward reproduction of the 3D video, however there is no mentioning about an aspect of easiness for the user to watch the video.

For dissolving such the problems mentioned above, as an embodiment according to the present invention, it is enough to apply such technical ideas as are described in the pending claims, which will be mentioned later, for example.

According to the means mentioned above, it is possible to increase usability for the user, in relation to viewing/listening of the 3D content.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 3 is a view for showing an example of assignment for each stream format classification;

FIG. 4 is a view for showing the structure of a component descriptor;

FIG. 5A is a view for showing an example of component content and component classification, as the constituent elements of the component descriptor;

FIG. 5B is a view for showing an example of component content and component classification, as the constituent elements of the component descriptor;

FIG. 5C is a view for showing an example of component content and component classification, as the constituent elements of the component descriptor;

FIG. 5D is a view for showing an example of component content and component classification, as the constituent elements of the component descriptor;

FIG. 5E is a view for showing an example of component content and component classification, as the constituent elements of the component descriptor;

FIG. 6 is a view for showing an example of the structure of a component group descriptor;

FIG. 7 is a view for showing an example of a component group classification;

FIG. 8 is a view for showing an example of component group identification;

FIG. 9 is a view for showing an example of counting unit identification;

FIG. 10A is a view for showing an example of the structure of a 3D program details descriptor;

FIG. 10B is a view for showing an example of a 3D/2D classification;

FIG. 11 is a view for showing an example of a format classification of 3D;

FIG. 12 is a view for showing an example of the structure of a service descriptor;

FIG. 13 is a view for showing an example of a service format classification;

FIG. 14 is a view for showing an example of the structure of a service list descriptor;

FIG. 15 is a view for showing an example of a transmission operation regulation of the component descriptor in the transmitting apparatus 1;

FIG. 16 is a view for showing an example of a transmission operation regulation of the component group descriptor in the transmitting apparatus 1;

FIG. 17 is a view for showing an example of a transmission operation regulation of the 3D program details descriptor in the transmitting apparatus 1;

FIG. 18 is a view for showing an example of a transmission operation regulation of the service descriptor in the transmitting apparatus 1;

FIG. 19 is a view for showing an example of a transmission operation regulation of the service list descriptor in the transmitting apparatus 1;

FIG. 20 is a view for showing an example of a process for each field of the component descriptor, in a receiving apparatus 4;

FIG. 21 is a view for showing an example of a process for each field of the component group descriptor, in a receiving apparatus 4;

FIG. 22 is a view for showing an example of a process for each field of the 3D program details descriptor, in a receiving apparatus 4;

FIG. 23 is a view for showing an example of a process for each field of the service descriptor, in a receiving apparatus 4;

FIG. 24 is a view for showing an example of a process for each field of the service list descriptor, in a receiving apparatus 4;

FIG. 28 is a view for showing an example of a message display;

FIG. 29 is a view for showing an example of a message display;

FIG. 47 is a view for showing an example of combination of streams when transmitting the 3D video;

FIG. 49 is a view for showing an example of display of a program table;

FIG. 50 is a view for showing an example of a message display;

FIG. 55 is a view for showing an example of an encode table for program genres;

FIG. 56 is a view for showing an example of an encode table for program characteristics;

FIG. 57 is a view for showing an example of an encode table for program characteristics;

FIGS. 58A and 58B are examples of the block diagram for showing an example of a record/reproduce portion 27;

FIG. 64B is a view for showing an example of the structure of a folder file of data to be recorded onto a recoding medium 26;

FIGS. 65A and 65B are views for showing an example of 3D information display when displaying a list of the programs, which are recorded on the recording medium 26;

FIGS. 68A and 68B are views for showing an example of 3D information display when displaying a list of the programs, which are recorded on the recording medium 26;

DETAILED DESCRIPTION OF THE PREFERRED EMBODIMENTS

Hereinafter, explanation will be given on preferable embodiments according to the present invention. However, the present invention should not be limited to the present embodiments. Thus, in the present embodiments, explanation will be given mainly on a receiving apparatus, i.e., being preferable to be implemented into the receiving apparatus; but it should not be prevented from being applied into those other than that receiving apparatus. Also, there is no necessity of adopting all of the constituent elements of the present embodiments, but they are selectable.

<System>

Figure 1:
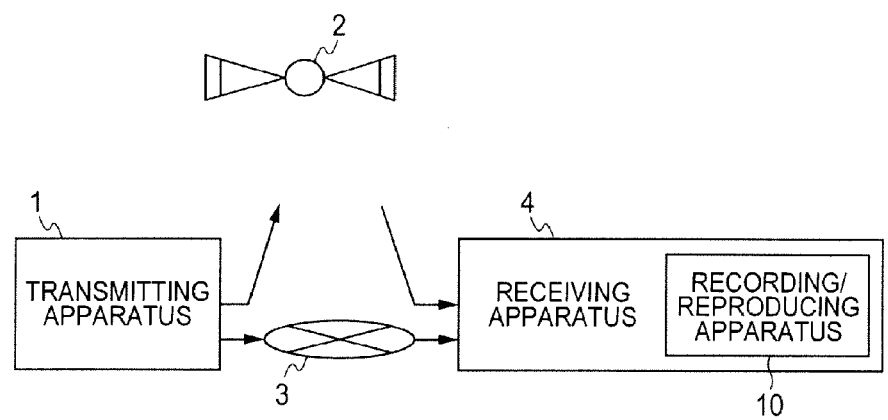
FIG. 1 is a block diagram for showing an example of the structure of a system.

FIG. 1 is a block diagram for showing an example of the structure of a system according to the present embodiment. Herein is shown a case where information is transmitted/received through broadcasting. However, this should not be limited to the broadcasting, but may be VOD through communication, and they also may be called "distributing", collectively.

A reference numeral 1 depicts a transmitting apparatus to be provided in an information providing station, such as, a broadcasting station, etc., 2 a relay apparatus to be provided in a relay station or a satellite for use of broadcasting, etc., 3 a network, which may be a public network for connecting between a general home and a broadcasting station, such as, the Internet, etc., or may be provided within a house of a user, and 10 a receiving record reproducing portion, which is built within the receiving apparatus 4. With the receiving record reproducing portion 10, it is possible to record/reproduce the broadcasted information, or to reproduce the content from an external removable medium, etc.

The transmitting apparatus 1 transmits a modulated signal radio wave through the relay apparatus 2. Other than such transmission with using the satellite as is shown in the figure, for example, it is also possible to use the transmission with using a cable, the transmission with using a telephone line, the transmission with using a terrestrial broadcasting, and the transmission passing through a network 3, such as, the Internet through the network 3 including the public network. This signal radio wave received by the receiving apparatus 4, as will be mentioned later, after being demodulated into an information signal, will be recorded on a recording medium depending on a necessity thereof. Or, when being transmitted through the public network, it is converted into a format, such as, a data format (an IP packet) in accordance with a protocol suitable to the public network (for example, TCP/IP), etc., while the receiving apparatus 4 receiving the data mentioned above decodes it into the information signal, being a signal suitable to be recorded depending on a necessity thereof, and it is recorded on the recoding medium. Also, the user can view/listen the video/audio shown by the information signal, on a display if this display is built within the receiving apparatus 4, or by connecting a display not show in the figure to the receiving apparatus 4 if it is not built therein.

<Transmitting Apparatus>

Figure 2:
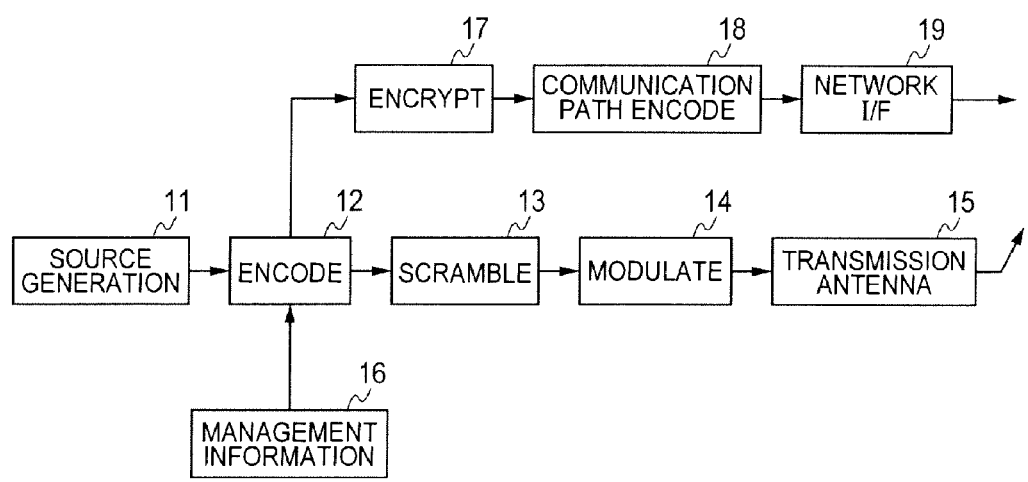
FIG. 2 is a block diagram for showing the structure of a transmitting apparatus 1.

FIG. 2 is a block diagram for showing an example of the structure of the transmitting apparatus among those of the system shown in FIG. 1/

A reference numeral 11 depicts a source generator portion, 12 an encode portion for conducting compression with using a method, such as, MPEG 2 or H.264, etc., and thereby adding program information or the like thereto, 13 a scramble portion, 14 a modulator portion, 15 a transmission antenna, and 16 a management data supply portion, respectively. The information, which generated in the source generator portion 11 composed of a camera and/or a recording/reproducing apparatus, such as, video/audio, etc., is treated with compression of the data volume thereof in the encode portion 12, so that it can be transmitted with occupying a less bandwidth. It is encrypted in the scramble portion 13 depending on a necessity thereof, so that it can be viewed/listened only for a specific viewer. After being modulated into a signal suitable to be transmitted, such as, OFDM, TC8PSK, QPSK, multi-value QAM, etc., within the modulator portion 14, it is transmitted as a radio wave directing to the relay apparatus 2 from the transmission antenna 15. In this instance, within the management information supply portion 16, it is supplied with program identification information, such as the property of the content, which is produced in the source generator portion 11 (for example, encoded information of video and/or audio, encoded information of audio, structure of program, if it is 3D video or not, etc.), and also is supplied with program arrangement information, which the broadcasting station produces (for example, the structure of a present program or a next program, a format of service, information of structures of programs for one (1) week, etc.). Hereinafter, the program identification information and the program arrangement information will be called "program information", combining those together.

However, it is very often that plural numbers of information are multiplexed on one (1) radio wave, through a method, such as, time-sharing, spectrum dispersion, etc. Although not mentioned in FIG. 2, for the purpose of simplification, but in this case, there are plural numbers of systems of the source generator portion 11 and the encode portion 12, wherein a multiplex portion (e.g., a multiplexer for multiplexing plural numbers of information is disposed between the encode portion 12 and the scramble portion 13.

Also, in the similar manner for the signal to be transmitted through the network 3 including the public network, the signal produced in the encode portion 12 is encrypted in an encryption portion 17 depending on a necessity thereof, so that it can be viewed/listened only for the specific viewer. After being encoded into a signal suitable to transmit through the public network within a communication path coding portion 18, it is transmitted from a network I/F (Interface) portion 19 directing to the public network.

<3D Transmission Method>

Figure 39A:
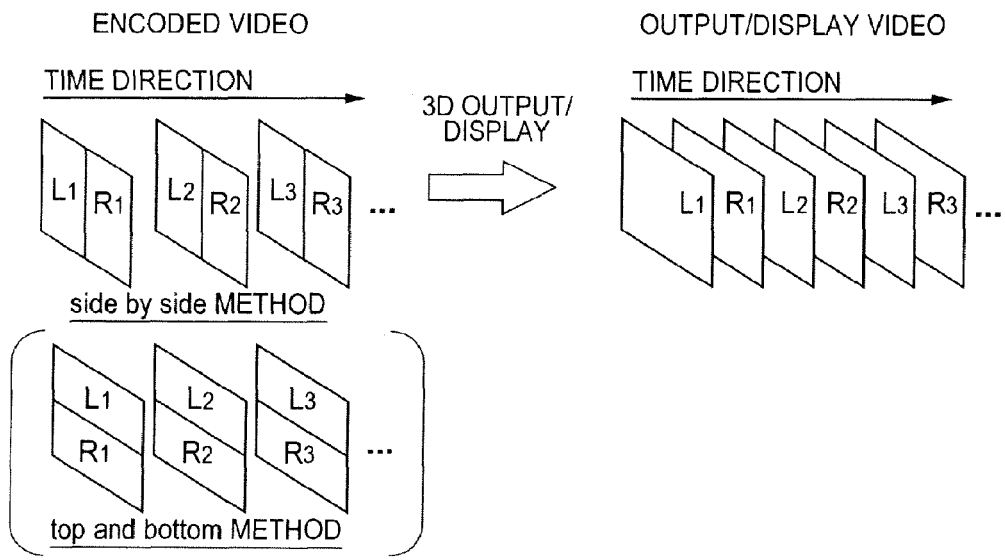
FIGS. 39A and 39B are views for explaining an example of a 3D reproducing/outputting/displaying process of the 3D content.

Roughly dividing the transmission methods for the 3D program to be transmitted from the transmitting apparatus 1, there are two (2) methods. One of them is a method of storing the videos for use of the left-side eye and for use of the right-side eye within one (1) piece of picture, with applying an existing broadcasting method for the 2D program effectively. In this method, the existing MPEG 2 (Moving Picture Experts Group 2) or H.264 AVC is utilized as a video compression method, and the characteristic thereof lies in that it has a compatibility with the existing broadcast, as well as, enabling to utilize an existing relay infrastructure, and it can be received by an existing receiver (such as, STB, etc.); however, it is transmission of the 3D video having a resolution of a half (½) of the highest resolution of the existing broadcast (in the vertical direction or the horizontal direction). For example, as is shown in FIG. 39A, there are the followings: a "Side-by-Side" method, i.e., diving one (1) piece of picture to the left and the right and storing them into a screen size of the 2D program, by reducing the video for use of the left-side eye (L) and the video for use of the right-side eye (R) down to about a half (½) of the 2D program in width of the horizontal direction, respectively, while keeping them to be equal thereto in width of the vertical direction, a "Top-and-Bottom" method, i.e., diving one (1) piece of picture up and down and storing them into the screen size equal to that of the 2D program, by keeping the video for use of the left-side eye (L) and the video for use of the right-side eye (R) to be equal thereto, respectively, while reducing them down to a half (½) of the 2D program in width of the vertical direction, and further others, such as, a "Field alternative" method of storing them with utilizing an interlace, a "Line alternative" method of storing the videos for use of the left-side eye and the right-side eye, alternately, for one (1) piece of scanning line, and a "Left+Depth" method of storing the 2D video (of one side) and depth (distance until an object) information for each pixel. Since those methods are such that each divides one (1) piece of picture into plural numbers of pictures and stores the pictures of plural numbers of viewpoints, the MPEG 2 or the H.264 AVC (excepting MVC), not a method for coding a multi-viewpoints picture, originally or inherently, can be applied as it is, as the coding method itself, and therefore there can be obtained a merit for enabling to carry out the 3D program broadcasting with applying the existing broadcasting method for the 2D program, effectively. Further, in case where it is possible to transmit the 2D program at a screen size of 1,920 dots in the maximum horizontal direction and of 1,080 lines in the vertical direction, for example, when carrying out the broadcasting of the 3D program with the "Side-by-Side" method, it is enough to divide one (1) piece of picture into the left and the right and to store the video for use of the left-side eye (L) and the video for use of the right-side eye (R) into a screen size of 960 dots in the horizontal direction and of 1,080 lines in the vertical direction, respectively, and thereby to transmit it. In the similar manner, in this case, when carrying out the 3D program broadcasting with the "Top-and-Bottom" method, it is enough to divide one (1) piece of picture up and down and to store the video for use of the left-side eye (L) and the video for use of the right-side eye (R) into a screen size of 1,920 dots in the horizontal direction and of 540 lines in the vertical direction, respectively, and thereby to transmit it.

As other method, there is already known a method of transmitting the video for use of the left-side eye and the video for use of the right-side eye by separate streams (ES), respectively. According to the present embodiment, that method will be called "2-viewpoints separate ES transmission". As an example of this method, there is a transmission method with using H.264 MVC, being a multi-viewpoints coding method, for example. The characteristic of that lies in that it can transmit the 3D video of high resolution. With using this method, there can be obtained an effect of enabling the transmission of the 3D video of high resolution. However, the multi-viewpoints coding method means a coding method, which is standardized for coding the video of multi-viewpoints, and with this, it is possible to encode the video of multi-viewpoints, without dividing one (1) piece of video into each viewpoint, i.e., for encoding other picture for each viewpoint.

In case when transmitting the 3D video with this method, it is enough to transmit the encoded picture of the viewpoint for use of the left-side eye as a main-viewpoint picture and the encoded picture of the viewpoint for use of the right-side eye as another viewpoint picture. With doing in this manner, for the main-viewpoint picture, it is possible to keep the compatibility with the existing broadcasting method of the 2D program. For example, when applying the H.264 MVC as the multi-viewpoints video coding method, for a base layer sub-bit stream of the H.264 MVC, the main-viewpoint picture can keep the compatibility with the 2D picture of the H.264 AVC, and the main-viewpoint picture can be displayed as the 2D picture.

Further, according to the embodiment of the present invention, the followings are included, as other examples of a "3D 2-viewpoints separated ES transmission method".

As other example of the "3D 2-viewpoints separated ES transmission method" is included a method of encoding the encoded picture for use of the left-side eye as a main-viewpoint picture with the MPEG 2, while encoding the encoded picture for use of the right-side eye as the other viewpoint picture with the H.264 AVC, and thereby obtaining separate streams, respectively. With this method, the main-viewpoint picture is compatible with the MPEG 2, i.e., it can be displayed as the 2D picture, and therefore it is possible to keep the compatibility with the existing broadcasting method of 2D program, in which the pictures encoded by the MPEG 2 are widely spreading.

As other example of the "3D 2-viewpoints separated ES transmission method" is included a method of encoding the encoded picture for use of the left-side eye as a main-viewpoint picture with the MPEG 2, while encoding the encoded picture for use of the right-side eye as the other viewpoint picture with the MPEG 2, and thereby obtaining separate streams, respectively. With this method, since the main-viewpoint picture is compatible with the MPEG 2, i.e., it can be displayed as the 2D picture, and therefore it is possible to keep the compatibility with the existing broadcasting method of 2D program, in which the pictures encoded by the MPEG 2 are widely spreading.

As further other example of the "3D 2-viewpoints separated ES transmission method" may be a method of encoding the encoded picture for use of the left-side eye as a main-viewpoint picture with the H.264 AVC or the H.264 MVC, while encoding the encoded picture for use of the right-side eye as the other viewpoint picture with the MPEG.

However, separating from the "3D 2-viewpoints separated ES transmission method", it is also possible to transmit the 3D, by producing the stream storing the video for use of the left-side eye and the video for use of the right-side eye, alternately, even with the encoding method, such as, the MPEG 2 or the H.264 AVC (excepting MVC), which is not regulated as the multi-viewpoints video encoding method, originally or inherently.

<Program Information>

Program identification information and program arrangement information are called "program information".

The program identification information is also called "PSI (Program Specific Information), and is compose of four (4) tables; i.e., a PAT (Program Association Table), being information necessary for selecting a desired program and for designating a packet identifier of a TS packet for transmitting a PMT (Program Map Table) relating to a broadcast program, a NIT (Network Information Table) for designating a packet identifier of a TS packet for transmitting common information among the packet identifier of the TS packet for transmitting each of encoded signals making up a broadcast program and information relating to pay broadcasting, a NIT (Network Information Table) for transmitting information of a transmission path, such as, a frequency, etc., and information to be associated with, and a CAT (Conditional Access Table) for designating the packet identifier of a packet for transmitting individual information among information relating to the pay broadcasting, and is regulated by a regulation of MPEG 2. For example, it includes the information for encoding the video, the information for encoding the audio, and the structure of the program. According to the present invention, newly, information for indicating if being the 3D video or not, etc., is included therein. That PSI is added within the management information supply portion 16.

The program arrangement information may be also called "SI (Service Information)", and is one of various types of information, which are regulated for the purpose of convenience when selecting a program; i.e., there is also included the PSI information of the MPEG 2 system regulation, and there are an EIT (Event Information Table), on which the information relating to programs is described, such as, a program name, broadcasting time, a program content, etc., and a SDT (Service Description Table), on which the information relating to organized channels (services) is described, such as, organized channel names, broadcasting provider names, etc.

For example, it includes the structure, the format of service, or information indicating the structure information of the programs for one (1) week, etc., of the program broadcasted at present and/or the program to be broadcasted next, and is added within the management information supply portion 16.

In the program information are included a component descriptor, a component group descriptor, a 3D program details descriptor, a service descriptor, and a service list descriptor, etc., each being the constituent element of the program information. Those descriptors are described within the tables, such as, PMT, EIT [schedule basic/schedule extended/present/following], NIT, and SDT.

As away of using the tables PMT or EIT, respectively, for example, with the PMT, since it describes only the information of the program being broadcasted at present, therefore it is impossible to confirm the information of the program(s), which will be broadcasted in the future. However, since the time-period until completion of receiving is short because a short transmission frequency from the transmitting side, and since it is the information of the program being broadcasted at the present, it has a characteristic of being high in reliability thereof, in a sense that no change is made. On the other hand, with the EIT [schedule basic/schedule extended], it can obtain the information of programs up to seven (7) days in the future, other than that of the program being broadcasted at the present, it has the following demerits; i.e., the time-period until the completion of receiving is long because of a long transmission frequency from the transmitting comparing to that of PMT, needing much more memory regions for holding, and further being low in the sense of reliability in a sense of having a possibility of being changed because of being phenomena in the future. With EIT [following], it can obtain the information of the program of a next broadcasting time.

The PMT of the program identification information is able to show a format of ES of the program being broadcasted, with using the table structure, which is regulated in ISO/IEC 13818-1, e.g., by means of "stream_type (a type of stream format)", being information of eight (8) bits, which is described in a $2^{nd}$ loop (e.g., a loop for each ES (Elementary Stream)) thereof. In the embodiment of the present invention, a number of formats of the ES more than that of the conventional one, for example, the formats of ES of the program to be broadcasted are assigned as is shown in FIG. 3.

First of all, with a base-view sub-bit stream (a main-viewpoint) of a multi-viewpoints video encoded (for example, H.264/MVC) stream, "0x1B" is assigned to, being same to that of the AVC video stream, which is regulated in the existing ITU-T recommendation H.264|ISO/IEC 14496-10 video. Next, to "0x20" is assigned a sub-bit stream (other viewpoint) of the multi-viewpoints video encoded stream (for example, the H.264 MVC), which can be applied into the 3D video program.

Also, with the base-view bit stream (e.g., the main-viewpoint) of the H.264 (MPEG 2) when being applied in the "3D 2 viewpoints separate ES transmission method", with which plural numbers of viewpoints of 3D video are transmitted by streams separated, "0x02" is assigned to, being same to that of the existing ITU-T recommendation H.262|ISO/IEC 13818-2 video. Herein, the base-view bit stream of the H.262

(MPEG 2), when transmitting the plural numbers of viewpoints of the 3D video by the streams separated, is a steam, only video of the main-viewpoint thereof being encoded with the H.262 (MPEG 2) method, among the videos of plural numbers of viewpoints of 3D videos.

Further, to "0x21" is assigned a bit stream of other viewpoint of the H.262 (MPEG 2) to be applied when transmitting the plural numbers of viewpoints of 3D video by the separated streams.

Further, to "0x22" is assigned a bit stream of other viewpoint bit stream of AVC stream method, which is regulated in the ITU-T recommendation H.264|ISO/IEC 14496-10 video to be applied when transmitting the plural numbers of viewpoints of 3D video by the separated streams.

However, in the explanation given herein, although it is mentioned that the sub-bit stream of the multi-viewpoints video encoded stream, which can be applied into the 3D video program, is assigned to "0x20", that the bit stream of the other viewpoint of the H.262 (MPEG 2), to be applied when transmitting the plural numbers of viewpoints of 3D video by the separated streams, is assigned to "0x21", and that the AVC stream regulated in the ITU-T recommendation H.264|ISO/IEC 14496-10 video, to be applied when transmitting the plural numbers of viewpoints of 3D video by the separated streams, is assigned to "0x22"; but each may be assigned to any one of "0x23" through "0x7E". Also, the MVC video stream is only the example, but it may be a video stream other than the H.264/MVC, as far as it indicates the multi-viewpoints video encoded stream, which can be applied into the 3D video program.

As was mentioned above, by assigning the bit of "stream_type (a type of stream format)", according to the embodiment of the present invention, it is possible to make transmission with a combination of the streams as is shown in FIG. 47, for example, when the broadcasting provider on the side of the transmitting apparatus 1.

In an example 1 of the combination, as the main-viewpoint (for use of the left-side eye) video stream, the base-view sub-bit stream (the main-viewpoint (the type of stream format: "0x1B") of the multi-viewpoints video encoded (for example; H.264/MVC) stream is transmitted, while as a sub-viewpoint (for use of the right-side eye), the sub-bit stream (the type of stream format: "0x20") for use of other viewpoint of the multi-viewpoints video encoded (for example; H.264/MVC) stream is transmitted.

In this instance, both the main-viewpoint (for use of the left-side eye) and the sub-viewpoint (for use of the right side eye) are applied with the stream of the multi-viewpoints video encoded (for example; H.264/MVC) method. The multi-viewpoints video encoded (for example; H.264/MVC) method is basically a method for transmitting the multi-viewpoints video, and is able to transmit the 3D program with high efficiency, among those combinations shown in FIG. 47.

Also, when displaying (or outputting) a 3D program in 3D, the receiving apparatus is able to process both the main-viewpoint (for use of the left-side eye) video stream and the sub-viewpoint (for use of the right-side eye) video stream, and thereby to reproduce the 3D program.

When displaying (or outputting), the receiving apparatus is able to display (or output) the 3D program as the 2D program, if processing only the main-viewpoint (for use of the left-side eye) video stream.

Further, since there is compatibility between the base-view sub-bit stream of the multi-viewpoints video encoding method, H.264/MVC, and the existing video stream of H.264/AVC (excepting MVC), by assigning both of the stream format types to the same "0x1B", there can be obtained the following effects. Namely, it is an effect of recognizing the main-viewpoint (for use of the left-side eye) video stream of that program as a stream being same to the video stream of the existing H.264/AVC (excepting MVC), and thereby enabling to display (or output) that as an ordinary 2D program, upon basis of the type of the stream format, even if the receiving apparatus, having no function of displaying (or outputting) the 3D program in 3D, receives the 3D program of the example 1 of combination, if there is provided a function of displaying (or outputting) the video stream (the AVC video stream, which is regulated by the ITU-T recommendation H.264|ISO/IEC 14496-10 video) of the existing H.264/AVC (excepting MVC) within the receiving apparatus.

Furthermore, since the sub-viewpoint (for use of the right-side eye) is assigned with a type of stream format, which cannot be found, conventionally, then it is neglected in the existing receiving apparatus. With this, it is possible to prevent the sub-viewpoint (for use of the right-side eye) video stream from being displayed (or outputted), in a manner, which the broadcasting station side does not intend, on the existing receiving apparatus.

Therefore, if the broadcasting of 3D program of the combination example 1 is started, newly, it is possible to avoid such a situation that it cannot be displayed on the existing receiving apparatus having the function of displaying (or outputting) the video stream of the existing H.264/AVC (excepting MVC). With this, if the broadcasting of that 3D program is started, newly, by the broadcasting or the like, which is managed by an income of advertisement, such as, CM (commercial message), etc., since it can be viewed/listened even on the receiving apparatus not cope with the 3D displaying (or outputting) function, and therefore, it is possible to avoid lowering of an audience rate by such restriction of the function in the receiving apparatus, i.e., also being meritorious on the side of the broadcasting station.

With an example 2 of combination, as the main-viewpoint (for use of the left-side eye) video stream is transmitted the base-view bit stream (the main-viewpoint) (the stream format type: "0x02") of the H.262 (MPEG 2) to be applied when transmitting plural numbers of the viewpoints of 3D video by the separated streams, while as the sub-viewpoint (for use of the right-side eye) video stream is transmitted the AVC stream (the stream format type: "0x22"), which is regulated by the ITU-T recommendation H.264|ISO/IEC 14496-10 video to be applied when transmitting plural numbers of the viewpoints of 3D video by the separated streams.

In the similar manner to the combination example 1, when displaying (or outputting) the 3D program in 3D, the receiving apparatus is able to reproduce the 3D program, by processing both the main-viewpoint (for use of the left-side eye) video stream and the sub-viewpoint (for use of the right-side eye) video stream, and also when displaying (or outputting) the 3D program in 2D, the receiving apparatus is able to display (or output) it as the 2D program if processing only the main-viewpoint (for use of the left-side eye) video stream.

Further, by bringing the base-view bit stream (the main-viewpoint) of the H.262 (MPEG 2), to be applied when transmitting plural numbers of the viewpoints of 3D video by the separated streams, into a stream having compatibly with the existing ITU-T recommendation H.262|ISO/IEC 13818-2 video stream, and assigning both the stream format types to the same "0x1B", as is shown in FIG. 3, it is possible for the receiving apparatus, but as far as it has a function of displaying (or outputting) the existing ITU-T recommendation H.262|ISO/IEC 13818-2 video stream, to display (or output) it as the 2D program, even if the receiving apparatus has no 3D displaying (or outputting) function.

Also, in the similar manner to the combination example 1, since the sub-viewpoint (for use of the right-side eye) is assigned with a type of stream format, which cannot be found, conventionally, then it is neglected in the existing receiving apparatus. With this, it is possible to prevent the sub-viewpoint (for use of the right-side eye) video stream from being displayed (or outputted), in a manner, which the broadcasting station side does not intend, on the existing receiving apparatus.

Since the receiving apparatus having the displaying (or outputting) function regarding the existing ITU-T recommendation H.262|ISO/IEC 13818-2 video stream is spread, widely, it is possible to prevent the audience rate from being lowered due to the limitation of the receiving apparatus, and therefore the most preferable broadcasting for the broadcasting station can be achieved.

Further, modifying the sub-viewpoint (for use of the right-side eye) into the AVC stream (the stream format type: "0x22"), which is regulated by the ITU-T recommendation H.264|ISO/IEC 14496-10 video, enables transmission of the sub-viewpoint (for use of the right-side eye) at a high compression rate.

Thus, according to the combination example 2, it is possible to achieve both the commercial merit for the broadcasting station and the technical merit due to the transmission of high efficiency.

With the combination example 3, as the main-viewpoint (for use of the left-side eye) video stream is transmitted the base-view stream (the main-viewpoint) (the stream format type: "0x02") of the H.262 (MPEG 2) to be applied when transmitting the plural numbers of viewpoints of 3D video by the separate streams, while as the sub-viewpoint (for use of the right-side eye) video stream is transmitted the bit stream (the stream format type: "0x21") of other viewpoint of the H.262 (MPEG 2) to be applied when transmitting the plural numbers of viewpoints of 3D video by the separate streams.

In this case, similar to the combination example 3, it is possible for the receiving apparatus, but as far as it has a function of displaying (or outputting) the existing ITU-T recommendation H.262|ISO/IEC 13818-2 video stream, to display (or output) it as the 2D program, even if the receiving apparatus has no 3D displaying (or outputting) function.

In addition to the commercial merit for the broadcasting station, i.e., preventing the audience rate from being lowered due to the restriction of functions of the receiving apparatus, it is also possible to simplify the hardware structure of a video decoding function within the receiving apparatus, by unifying the encoding methods of the main-viewpoint (for use of the left-side eye) video stream and the sub-viewpoint (for use of the right-side eye) video stream into the H.262 (MPEG 2).

However, as the combination example 4, it is also possible to transmit the base-view stream (the main-view) (the stream format type: "0x1B") of the multi-viewpoints video encoded (for example: H.264/MVC) stream, as the main-viewpoint (for the left-side eye) video stream, while transmitting the bit stream of other viewpoint (the stream format type: "0x21") of the H.262 (MPEG 2) method to be applied when transmitting the plural numbers of viewpoints of 3D video by the separate streams, as the sub-viewpoint (for use of the right-side eye).

However, in the combination shown in FIG. 47, the similar effect can be obtained if applying the AVC video stream (the stream format type: "0x1B"), which is regulated by the ITU-T recommendation H.264|ISO/IEC 14496-10 video, in the place of the base-view bit stream (the main-viewpoint) (the stream format type: "0x1B") of the multi-viewpoints video encoded (for example: H.264/MVC) stream.

Also, in the combination shown in FIG. 47, the similar effect can be obtained if applying the ITU-T recommendation H.262|ISO/IEC 13818-2 video stream (the stream format type: "0x1B"), in the place of the base-view bit stream (the main-viewpoint) of the H.262 (MPEG 2) method to be applied when transmitting the plural numbers of viewpoints of 3D video by the separate streams.

FIG. 4 shows an example of the structure of a component descriptor, as one of the program information. The component descriptor indicates a type of the component (an element building up the program. For example, video, audio, letters, various kinds of data, etc.), and is also used for presenting the elementary stream by a letter format. This descriptor is disposed in PMT and/or EIT.

Meanings of the component descriptor are as follows. Thus, "descriptor_tag" is a field of 8 bits, into which is described such a value that this descriptor can be identified as the component descriptor. "descriptor_length" is a field of 8 bits, into which is described a size of this descriptor. "stream_component" (content of the component) is a field of 4 bits, presenting the type of the stream (e.g., video, audio and data), and is encoded in accordance with FIG. 4. "component_type" is a field of 8 bits, defining the type of the component, such as, video, audio and data, for example, and is encoded in accordance with FIG. 4. "component_tag" is a field of 8 bits. A component stream of service can be referred by means of this field of 8 bits, i.e., the described contents (FIG. 5) thereof, which are indicated by the component descriptor.

In program session, the value of the component tag, to be given to each of the components, should be different from one other. The component tag is a label for identifying the component stream, and has the same value to that of the component tag within a stream identification descriptor (but, only when the stream deification descriptor exists within PMT). A field of 24 bits of "ISO__639_languate_code" (a language code) identifies the language of the component (audio or data) and the language of description of letters, which are included in this descriptor.

The language code is presented by a code of 3 alphabetical letters regulated in ISO 639-2 (22). Each letter is encoded in accordance with ISO 8859-1 (24), and is inserted into a field of 24 bits in that order. For example, Japanese language is "jpn" by the code of alphabetical 3 letters, and is encoded as follows. "0110 1010 0111 0000 0110 1110" "text_char" (component description) is a field of 8 bits. A field of a series of component descriptions regulates the description of letters of the component stream.

FIGS. 5A to 5E show example of "stream_content" (content of the component) and "component_type" (type of the component), being the constituent elements of the component descriptor. "0x01" of content of the component shown in FIG. 5A tells about various video formats of the video stream, being compressed in accordance with an MPEG 2 format.

"0x05" of the component content shown in FIG. 5B tells about various video formats of the video stream, being compressed in a H.264 AVC format. "0x06" of the component content shown in FIG. 5C tells about various video formats of the video stream, being compressed by the multi-viewpoints video encoding (for example, a H.264 MVC format).

"0x07" of the component content shown in FIG. 5D tells about various video formats of the stream of a "Side-by-Side" format of 3D video, being compressed in the format of MPEG 2 or H.264 AVC. In this example, although the same value is shown for the component contents in the MPEG 2 format and the H.264 AVC format, but different values may be set for the MPEG 2 and the H.264 AVC, respectively.

"0x08" of the component content shown in FIG. 5E tells about various video formats of a "Top-and Bottom" format of 3D video, being compressed in the format of MPEG 2 or H.264 AVC. In this example, although the same value is shown for the component contents in the MPEG 2 format and the H.264 AVC format, but different values may be set for the MPEG 2 and the H.264 AVC, respectively.

As is shown in FIG. 5D or FIG. 5E, with adopting the structure for indicating a combination of if being the 3D video or not, the method of 3D video, a resolution, and an aspect ratio, depending on the combination of "stream_content" (content of the component) and "component_type" (the component type), both being the constituent elements of the component descriptor, it is possible to transmit the information of various kinds of methods of the videos, including an identification of the 2D program or the 3D program, with a less volume of transmission, even if a combined broadcasting of 3D and 2D.

When transmitting a 3D video program, including the pictures of plural numbers of viewpoints within one (1) piece of picture of the "Side-by-Side" format or the "Top-and-Bottom" format, with using an encoding method, such as, the MPEG 2 or the H.264 AVC (except MVC), etc., which is not regulated as the multi-viewpoints video encoding method, originally, it is difficult to identify or discriminate if transmission is done, including pictures of plural numbers of viewpoints within one (1) picture for use of the 3D video program, or an ordinary picture of one (1) viewpoint, only with the "stream_type" (type of the stream format). Therefore, in this case, it is enough to execute the identification or discrimination on various kinds of video methods, including the identification of if that program is the 2D program or the 3D program, depending on the combination of the "stream_content" (content of the component) and the "component_type" (the component type). Or, due to distribution of the component descriptor relating to the program(s), which is/are broadcasted at present or will be broadcasted in future, by means of the EIT, it is possible to produce an EPG (a program table) within the receiving apparatus, by obtaining the EIT therein, and to produce if being the 3D video or not, the method of the 3D video, the resolution, and the aspect ratio, as information of the EPG. The receiving apparatus has a merit that it can display (or output) those information on the EPG.

As was explained in the above, since the receiving apparatus observes the "stream_content" and the "component_type", therefore there can be obtained an effect of enabling to recognize that the program is the 3D program, which is received at present or will be received in future.

FIG. 6 shows an example of the structure of the component group descriptor, being one of the program information. The component group descriptor defines the combination of components within an event, and thereby identifying. In other words, it describes grouping information for plural numbers of the components. This descriptor is disposed in the EIT.

Meaning of the component group descriptor is as follows. Thus, "descriptor_tag" is a field of 8 bits, into which is described such a value that this descriptor can be identified as the component group descriptor. "descriptor_length" is a field of 8 bits, in which the size of this descriptor is described. "component_group_type" (type of the component group) is a field of 3 bits, and this presents the type of the group of components.

Herein, "001" presents a 3D TV service, and is distinguished from a multi-view TV service of "000". Herein, the multi-view TV service a TV service for enabling to display the 2D video of multi-viewpoints by exchanging it for each viewpoint, respectively. There is a probability that, for example, it will be used, not only in the 3D video program in case where the transmission is made including the plural numbers of viewpoints into one (1) screen, in the multi-viewpoints video encoded video stream or the stream of an encoding method, which is not regulated as the multi-viewpoints video encoding method, originally, but also in the multi-view TV program. In this case, if the video of the multi-viewpoints in the stream, there may be also a possibility that identification cannot be made on if being the multi-view TV or not, only by the "stream_type" (type of the stream format) mentioned above. In such case, "component_group_type" (type of the component group) is effective. "total_bit_rate_flag" (flag of total bit rate) is a flag of 1 bit, and indicates a condition of description of the total bit rate within the component group among an event. When this bit is "0", it indicates there is no total rate field within the component group in that descriptor. When this bit is "1", it indicates that there is a total rate field within the component group in that descriptor. "num_of_group" (number of groups) is a field of 4 bits, and indicates a number of the component groups within the event.

"component_group_id" (identification of the component group) is a field of 4 bits, into which the identification of the component group is described, in accordance with FIG. 8. "num_of_CA_unit" (number of units of charging) is a field of 4 bits, and indicates a number of unit(s) of charging/non-charging within the component groups. "CA_unit_id" (identification of a unit of charging) is a field of 4 bits, into which the identification of a unit of charging is described, in accordance with FIG. 9.

"num_of_component" (number of components) is a field of 4 bits, and it belongs to that component group, and also indicates a number of components belonging to the unit of charging/non-charging, which is indicated by "CA_unit_id" just before. "component_tag" (component tag) is a field of 8 bits, and indicates a number of the component tag belonging to the component group.

"total_bit_rate" (total bit rate) is a field of 8 bits, into which a total bit rate of the components within the component group, while rounding the transmission rate of a transport stream packet by each ¼ Mbps. "text_length" (length of description of the component group) is a field of 8 bits, and indicates byte length of component group description following thereto. "text_char" (component group description) is a field of 8 bits. A series of the letter information fields describes an explanation in relation to the component group.

As was mentioned above, due to observation of the "component_group_type" by the receiving apparatus 4, there can be obtained an effect of enabling to identify a program, which is broadcasted at present or will be broadcasted in future, is the 3D program.

Next, explanation will be given on an example of applying a new descriptor, for showing the information in relation to the 3D program. FIG. 10A shows an example of the structure of a 3D program details descriptor, being one of the program information. The 3D program details descriptor shows detailed information in case where the program is the 3D program, and may be used for determining the 3D program within the receiving apparatus. This descriptor is disposed in the PMT and/or the EIT. The 3D program details descriptor may coexist together with the "stream_content" (content of the component) and the "component_type" (type of the component) for use of the 3D video program, which are shown in FIGS. 5C through 5E. However, if transmitting the 3D program details descriptor, there may be applied the structure of transmitting no "stream_content" (content of the component) nor "component_type" (type of the component). Meanings of the 3D program details descriptor are as follows. Next, "descriptor_tag" is a field of 8 bits, into which is described such a value (for example, "0xE1") that this descriptor can be identified to be the 3D program details descriptor. "descriptor_length" is a field of 8 bits, into which is described the size of this descriptor.

"3d_2d_type" (type of 3D/2D) is a field of 8 bits, and indicates a type of 3D video or 2D video within the 3D program, in accordance with FIG. 10B. This field is information for identifying of being the 3D video or the 2D video, in a 3D program being structured in such a manner that, for example, a main program is the 3D video, but a commercial advertisement, etc., to be inserted on the way thereof, is the 2D video, and is arranged for the purpose of protecting the receiving apparatus from an erroneous operation thereof (e.g., a problem of display (or output), being generated due to the fact that the broadcasted program is the 2D video in spite of 3D processing executed by the receiving apparatus). "0x01" indicates the 3D video, while "0x02" the 2D video, respectively.

"3d_method_type" (type of the 3D method) is a field of 8 bits, and indicates the type of the 3D method, in accordance with FIG. 11. "0x01" indicates the "3D 2-viewpoints separated ES transmission method", "0x02" indicates the "Side-by-Side method", and "0x03" indicates the "Top-and-Bottom method", respectively. "stream_type" (type of the stream format) is a field of 8 bits, and indicates the type of ES of the program, in accordance with FIG. 3.

However, it may be also possible to apply such structure that the 3D program details descriptor is transmitted only in case of the 3D video program, but not during the 2D video program. Thus, it is possible to identify if that program is the 2D video program or the 3D video program, only depending on presence/absence of the transmission of the 3D program details descriptor in relation to the program received.

"component_tag" (component tag) is a field of 8 bits. A component stream for the service can refer to the described content (in FIG. 5), which is indicated by the component descriptor, by means of this field of 8 bits. In program session, values of the component tags, being given to each stream, should be determined to be different from each other. The component tag is a label for identifying the component stream, and has the value same to that of the component tag(s) within a stream identification descriptor (however, only in a case where the stream identification descriptor exists within the PTM).

As was mentioned above, due to observation of the 3D program details descriptor by the receiving apparatus 4, there can be obtained an effect of enabling to identify that the program, which is received at present or will be received in future, is the 3D program, if this descriptor exists. In addition thereto, it is also possible to identify the type of the 3D transmission method, if the program is the 3D program, and if the 3D video and the 2D video exists, being mixed up with, to identify that fact.

Next, explanation will be given on an example of identifying the video of being the 3D video or the 2D video, by a unit of a service (e.g., a programmed channel). FIG. 12 shows an example of the structure of a service descriptor, being one of the program information. The service descriptor presents a name of the programmed channel and a name of the provider, by the letters/marks, together with the type of the service formats thereof. This descriptor is disposed in the SDT.

Meanings of the service descriptor are as follows. Namely, "service_type" (type of the service format) is a field of 8 bits, and indicates a type of the service in accordance with FIG. 13. "0x01" presents the 3D video service. A field of "service_pro-vider_name_length" (name of the provider) of 8 bits presents byte length of the provider's name following thereto. "char" (letters/marks) is a field of 8 bits. A series of letter information fields presents the provider's name or the service name. "service_name_length" (length of the service name) is a field of 8 bits, and presents byte length of the service name following thereto.

As was mentioned above, due to observation of the "service_type" by the receiving apparatus 4, there can be obtained an effect of enabling to identify the service (e.g., the programmed channel) to be a channel of the 3D program. In this manner, if possible to identify the service (e.g., the programmed channel) to be a channel of the 3D program, it is possible to display a notice that the service is a 3D video program broadcasting service, etc., for example, through an EPG display, etc. However, in spite of the service of mainly broadcasting the 3D video program, there may be a case that it must broadcast the 2D video, such as, in case where a source of an advertisement video is only the 2D video, etc. Therefore, for identifying the 3D video service by means of the "service_type" (type of the service format) of that descriptor, it is preferable to apply the identification of the 3D video program by combining the "stream_component" (content of the component) and the "component_type" (type of the component), the identification of the 3D video program by means of the "component_group_type" (type of the component group), or the identification of the 3D video program by means of the 3D program details descriptor, which are already explained previously, in common therewith. When identifying by combining plural numbers of information, it is possible to make such identification that, the program is the 3D video broadcasting service, but apart thereof is the 2D video, etc. In case where such identification can be made, for the receiving apparatus, it is possible to expressly indicate that the service is the "3D video broadcasting service", for example, on the EPG, and also to exchange display controlling, etc., between the 3D video program and the 2D video program, when receiving the program and so on, even if the 2D video program is mixed into that service, other than the 3D video program.

FIG. 14 shows an example of the structure of a service list descriptor, being one of the program information. The service list descriptor provides service a list of services, upon basis of service identification and service format type. Thus, it describes therein a list of the programmed channels and the types of them. This descriptor is disposed in the NIT.

Meanings of the service list descriptor are as follows. Namely, "service_id" (identification of the service) is a field of 16 bits, and identifies an information service within that transport stream, uniquely. The service identification is equal or equivalent to the identification of broadcast program numbers within a corresponding program map session. "service_type" (type of the service format) is a field of 8 bits, and presents the type of the service, in accordance with FIG. 12.

With such "service_type" (type of the service format), since it is possible to identify if the service is the "3D video broadcasting service" or not, therefore, for example, it is possible to conduct the display for grouping only the "3D video broadcasting service" on the EPG display, etc., with using the list of the programmed channels and the types thereof, which are shown in that service list descriptor.

As was mentioned above, due to observation of the "service_type" by the receiving apparatus 4, there can be obtained an effect of enabling to identify a program, if the channel is that of the 3D program or not.

In the examples explained in the above, description was made only the representative members, but there can be considered the followings: i.e., to have a member (s) other than those, to combine plural numbers of the members into one, and to divide one (1) member into plural numbers of members, each having detailed information thereof.

<Example of Transmission Management Regulation of Program Information>

The component descriptor, the component group descriptor, the 3D program details descriptor, the service descriptor, and the service list descriptor of the program information, which are explained in the above, are the information, to be produced and added in the management information supply portion 16, for example, and stored in PSI (for example, the PMT, etc.) or in SI (for example, the EIT, SDT or NIT, etc.) of MPEG-TS, and thereby to be transmitted from the transmitting apparatus 1.

Hereinafter, explanation will be given on an example of management regulation for transmitting the program information within the transmitting apparatus 1.

FIG. 15 shows an example of the transmission management regulation of the component descriptors within the transmitting apparatus 1. In "descriptor_tag" is described "0x50", which means the component descriptor. In "descriptor_length" is described the descriptor length of the component descriptor. The maximum value of the descriptor length is not regulated. In "stream_component" is described "0x01" (video).

In "component_type" is described the video component type of that component. With the component type, it is determined from among those shown in FIG. 5. In "component_tag" is described such a value of the component tag to be unique in said program. In "ISO_639_language_code" is described "jpn ("0x6A706E")".

In "text_char" is described characters less than 16 bytes (or, 8 full-size characters) as a name of the video type when there are plural numbers of video components. No line feed code can be used. This field can be omitted when the component description is made by a letter (or character) string of default.

However, it must be transmitted by only one (1) thereof, necessarily, to all the video components, each having the "component_tag" values of "0x00" to "0x0E", which are included in an event (e.g., the program).

With such transmission management within the transmitting apparatus 1, the receiving apparatus 4 can observe the "stream_component" and the "component_type", and therefore there can be obtained an effect of enabling recognition that the program, which is received at present or will be received in future, is the 3D program.

FIG. 16 shows an example of the transmission management regulation of the component group within the transmitting apparatus 1.

In "descriptor_tag" is described "0xD9", which means the component group descriptor. In "descriptor_length" is described the descriptor length of the component group descriptor. No regulation is made on the maximum value of the descriptor length. "000" indicates a multi-view TV and "001" a 3D TV, respectively.

"total_bit_rate_flag" indicates "0" when all of the total bit rates within a group in an event are at the default value, which is regulated, or "1" when any one of the total bit rates within a group in an event is exceeds the regulated default value.

In "num_of_group" is described a number of the component group(s) in an event. In case of the multi-view TV (MVTV), it is assumed to be three (3) at the maximum, while two (2) at the maximum in case of the 3D TV (3DTV).

In "component_group_id" is described an identification of the component group. "0x0" is assigned when it is a main group, and in case of each sub-group, IDs are assigned in such a manner that broadcasting providers can be identified, uniquely.

In "num_of_CA_unit" is described a number of unit(s) of charging/non-charging within the component group. It is assumed that the maximum value is two (2). It is "0x1" when no charging component is included within that component group, completely.

In "CA_unit_id" is described an identification of unit of charging. Assignment is made in such a manner that broadcasting providers can be identified, uniquely. "num_of_component" belongs to that component group, and also it describes a number of the components belonging to the charging/non-charging unit, which are included in "CA_unit_id" just before. It is assumed that the maximum value is fifteen (15).

In "component_tag" is described a component tag value, which belongs to the component group. In "total_bit_rate" is described a total bit rate within the component group. However, "0x00" is described therein, when it is the default value.

In "text_length" is described a byte length of description of a component group following thereto. It is assumed that the maximum value is 16 (or, 8 full-size characters). In "text_char" must be described an explanation, necessarily, in relation to the component group. No regulation is made on a default letter (or character) string.

However, when executing the multi-view TV service, transmission must be made after turning the "component_group_type" into "000", necessarily.

With such transmission management within the transmitting apparatus 1, the receiving apparatus 4 can observe the "component_group_type", and therefore there can be obtained an effect of enabling recognition that the program, which is received at present or will be received in future, is the 3D program.

FIG. 17 shows an example of the transmission management regulation of the 3D program details descriptor within the transmitting apparatus 1. In "descriptor_tag" is described "0xE1", which means the 3D program details descriptor. In "descriptor_length" is described the descriptor length of the 3D program details descriptor. It is determined from among those shown in FIG. 10B. In "3d_method_type" is described the type of the 3D method. It is determined from among those shown in FIG. 11. In "stream_type" is described a format of ES of the program. It is determined from among those shown in FIG. 3. In "component_tag" is described such a value of component tag that it can be identified uniquely within that program.

With such transmission management within the transmitting apparatus 1, the receiving apparatus 4 can observe the 3D program details descriptor, and therefore, if this descriptor exists, there can be obtained an effect of enabling recognition that the program, which is received at present or will be received in future, is the 3D program.

FIG. 18 shows an example of the transmission management regulation of the service descriptor within the transmitting apparatus 1. In "descriptor_tag" is described "0x48", which means the service descriptor. In "descriptor_length" is described the descriptor length of the service descriptor.

With the service format type, it is determined from among those shown in FIG. 13. In "service_provider_name_length" is described a name of the service provider, if the service is a BS/CS digital TV broadcasting. It is assumed that the maximum value is 20. Since no "service_provider_name_length" is managed in the terrestrial digital TV broadcasting, "0x00" is described therein.

In "char" is described the provider's name when the service is the BS/CS digital TV broadcasting. It is 10 full-size characters at maximum. Nothing is described therein in case of the terrestrial digital TV broadcasting. In "service_name_length" is described name length of a programmed channel. It is assumed the maximum value is 20. In "char" is described a name of the programmed channel. It can be written within 20 bytes or within 10 full-size characters. However, only one (1) piece is disposed for a programmed channel targeted.

With such transmission management within the transmitting apparatus 1, the receiving apparatus 4 can observe the "service_type", and therefore there can be obtained an effect of enabling recognition that the programmed channel is the channel of 3D program.

FIG. 19 shows an example of the transmission management regulation of the service list descriptor within the transmitting apparatus 1. In "descriptor_tag" is described "0x41", which means the service list descriptor. In "descriptor_length" is described the descriptor length of the service list descriptor. In "loop" is described a loop of the number of services, which are included within the transport stream targeted.

In "service_id" is described the "service_id", which is included in that transport stream. In "service_type" is described the service type of an object service. It is determined from among those shown in FIG. 13. However, it must be disposed for a TS loop within NIT, necessarily.

With such transmission management within the transmitting apparatus 1, the receiving apparatus 4 can observe the "service_type", and therefore there can be obtained an effect of enabling recognition that the programmed channel is the channel of 3D program.

As was mentioned above, although the explanation was made on the example of transmitting the program information within the transmitting apparatus 1; however, if transmitting the video produced by the transmitting apparatus 1 with inserting a notice, such as, "3D program will start from now", "please wear glasses for use of 3D view/listen when viewing/listening 3D display", "recommend to enjoy of viewing/listening 2D display if eyes are tired or physical condition is not good", or "long time viewing/listening of 3D program may bring about tiredness of eyes or bad physical condition", etc., with using a telop (or, an on-screen title), for example, there can be obtained an effect for enabling to make an attention or a warning about viewing/listening the 3D program to the user who is viewing/listening the 3D program, on the receiving apparatus 4.

<Hardware Structure of Apparatus>

Figure 25:
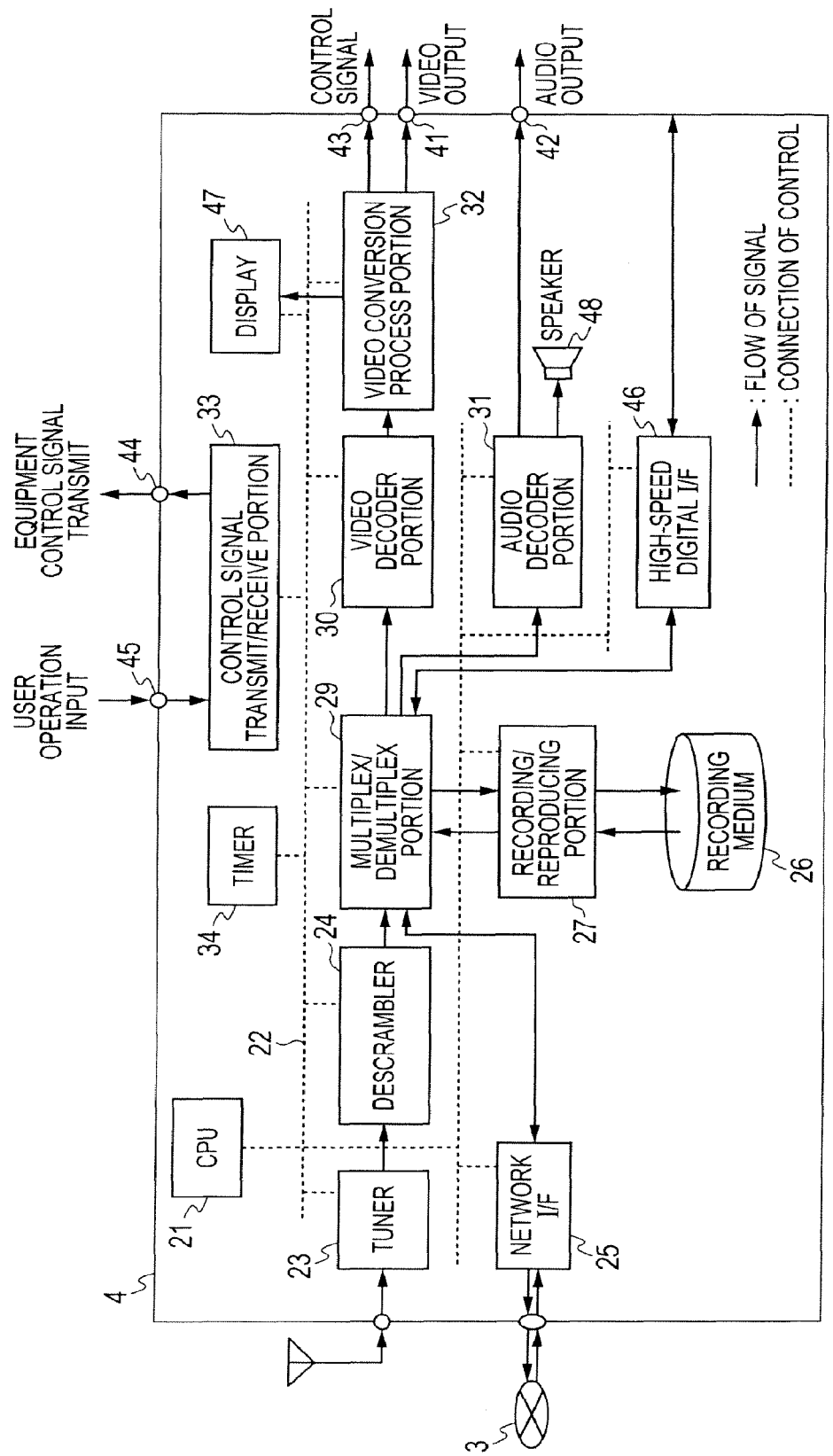
FIG. 25 is a view for showing an example of the structure of a receiving apparatus according to the present invention.

FIG. 25 is a hardware structure view for showing an example of the structure of the receiving apparatus 4, among the system shown in FIG. 1. A reference numeral 22 depicts a CPU (Central Processing Unit) for controlling the receiver as a whole, 22 a common bus for transmitting control and information between the CPU 2 and each portion within the apparatus, 23 a tuner for receiving a radio signal broadcasted from the transmitting apparatus 1 through a broadcast transmission network, such as, a radio wave (satellite, terrestrial), a cable, etc., for example, to execute selection at a specific frequency, demodulation, an error correction process, etc., and thereby outputting a multiplexed packet, such as, MPEG2-Transport Stream (hereinafter, also may be called "TS"), 24 a descrambler for decoding a scramble made by a scrambler portion 13, 25 a network I/F (Interface) for transmitting/receiving information between the network, and thereby transmitting/receiving various kinds of infarction and MPEG2-TS between the Internet and the receiving apparatus, 26 a recording medium, such as, a HDD (Hard Disk Drive) or a flash memory, which is built within the receiving apparatus, or a removable HDD, disc-type recording medium, or flash memory, etc., 27 a recording/reproducing portion for controlling the recording medium 26, and thereby controlling the recording of a signal onto the recording medium 26 and/or the reproduction of a signal from the recording medium 26, and 29 a multiplex/demultiplex portion for separating the signals multiplexed into a form, such as, MPEG2-TS, etc., into a video ES (Elementary Stream), an audio ES, program information, etc. Herein, ES means each of the video/audio data being compressed/encoded, respectively. A reference numeral 30 depicts a video decoder portion for decoding the video ES into the video signal, 31 an audio decoder portion for decoding the audio ES into the audio signal, and thereby outputting it to a speaker 48 or outputting it from an audio output 42, 32 a video conversion processor portion, executing a process for converting the video signal decoded in the video decoder portion 30, or the video signal of 3D or 2D through a converting process, which will be mentioned later, into a predetermined format, in accordance with an instruction of the CPU mentioned above, and/or a process for multiplexing a display, such as, on OSD (On Screen Display), etc., which is produced by the CPU 21, onto the video signal, etc., and thereby outputting the video signal after processing to a display 47 or a video signal output portion 41 while outputting a synchronization signal and/or a control signal (to be used in control of equipment) corresponding to the video signal after processing from the video signal output portion 41 and a control signal output portion 43, 33 a control signal transmitter portion for receiving an operation input from a user operation input portion 45 (for example, a key code from a remote controller generating IR (Infrared Radiation)), and also for transmitting an equipment control signal (for example, IR) to an external equipment, which is produced by the CPU 21 or the video conversion processor portion, from an equipment control signal transmit portion 44, 34 a timer having a counter in an inside thereof, and also holding a present time therein, 46 a high-speed digital I/F, for outputting TS to an outside after executing a process necessary for encoding, etc., upon the TS, which is restructured in the multiplex/demultiplex portion mentioned above, or for inputting TS into the multiplex/demultiplex portion 29 after decoding the TS received from the outside, 47 a display for displaying the 3D video and the 2D video, which are decoded by the video decoder portion 30 and converted by the video conversion processor portion 32, and 48 a speaker for outputting sounds upon basis of the audio signal decoded by the audio decoder portion, respectively, wherein the receiving apparatus 4 is built up, mainly, with those devices. When displaying 3D on the display, if necessary, the synchronization signal and/or the control signal are outputted from the control signal output portion 43 and/or the equipment control signal transmit terminal 44.

Figure 35:
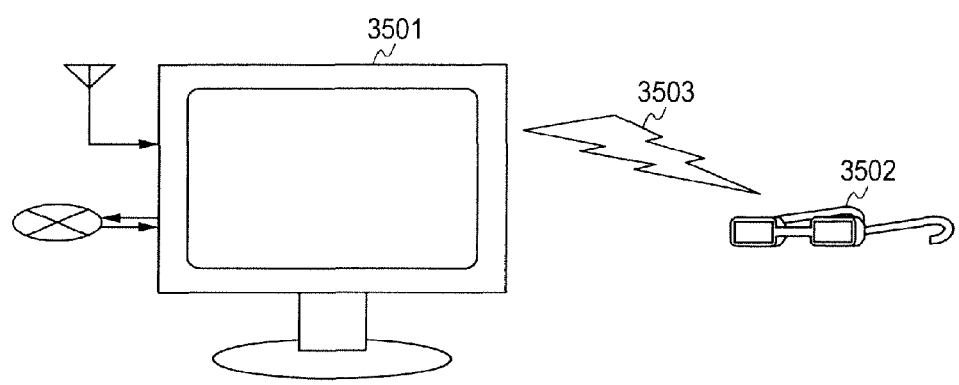
FIG. 35 is an example of block diagram for showing an example of the structure of a system.
Figure 36:
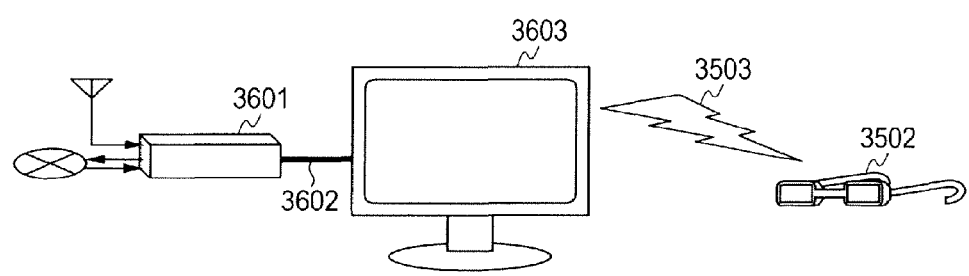
FIG. 36 is an example of block diagram for showing an example of the structure of a system.

The system structure or configuration, including therein the receiving apparatus and a viewing/listening device and also a 3D view/listen assisting device (for example, 3D glasses), will be shown by referring to FIGS. 35 and 36. FIG. 35 shows an example of the system configuration when the receiving apparatus and the viewing/listening device are unified into one body, while FIG. 36 shows an example of the structure when the receiving apparatus and the viewing/listening device are separated in the structures.

In FIG. 35, a reference numeral 3501 depicts a display device, including the structure of the receiving apparatus 4 mentioned above therein and being able to display the 3D video and to output the audio, 3503 a 3D view/listen assisting device control signal (for example, IR), being outputted from the display device 3501 mentioned above, and 3502 the 3D view/listen assisting device, respectively. In the example shown in FIG. 35, the video signal is outputted from a video display, being equipped on the display apparatus 3501 mentioned above, while the audio signal is outputted from a speaker, being equipped on the display device 3501 mentioned above. Also, in the similar manner, the display device 3501 is equipped with an output terminal for outputting the equipment control signal 44 or the 3D view/listen assisting device control signal, which is outputted from the output portion for the control signal 43.

However, in the explanation given in the above, the explanation was made upon an assumption of the example, wherein the display is made by the display device 3501, and the 3D view/listen assisting device 3502, as well, make the display through an active shutter method, which will be mentioned later which are shown in FIG. 35; but in case where the display device 3501 and the 3D view/listen assisting device 3502 shown in FIG. 35 make the 3D display through a polarization separation, which will be mentioned later, the 3D view/listen assisting device 3502 may be such a one of being able to achieve the polarization separation, so as to enter different pictures into the left-side eye and the right-side eye, but it is not necessary to output the equipment control signal 44 from the display device 3501 or the 3D view/listen assisting device control signal 3503, which is outputted from the output portion to the 3D view/listen assisting device 3502.

Also, in FIG. 36, a reference numeral 3601 depicts a video/audio output device including the structure of the receiving apparatus 4 mentioned above, 3602 a transmission path (for example, a HDMI cable) for transmitting a video/audio/control signal, and 3603 a display for displaying/outputting the video signal and/or the audio signal, which are inputted from the outside.

In this case, the video signal and the audio signal, which are outputted from the video output 41 and the audio output 42 of the video/audio output device 3601 (e.g., the receiving apparatus 4), and also the control signal, which is outputted from the control signal output portion 43, are converted into transmission signals, each being of a form in conformity with a format, which is regulated for the transmission path 3602 (for example, the format regulated by the HDMI standard), and they are inputted into the display 3603 passing through the transmission path 3602. The display 3603 decodes the above-mentioned transmission signals received thereon into the video signal, the audio signal and the control signal, and outputs the video and the audio therefrom, as well as, outputting the 3D view/listen assisting device control signal 3503 to the 3D view/listen assisting device 3502.

However, in the explanation given in the above, the explanation was made upon an assumption that the display device 3603 and the 3D view/listen assisting device 3502 shown in FIG. 36 do displaying through the active shutter method, which will be mentioned later, but in case where the display device 3603 and the 3D view/listen assisting device 3502 shown in FIG. 36 apply the method for displaying the 3D video through the polarization separation, the 3D view/listen assisting device 3502 may be such a one of being able to achieve the polarization separation, so as to enter different pictures into the left-side eye and the right-side eye, but it is not necessary to output the 3D view/listen assisting device control signal 3503 from the display device 3603 to the 3D view/listen assisting device 3502.

However, a part of each of the constituent element shown by 21 to 46 in FIG. 25 may be constructed with one (1) or plural numbers of LSI(s). Or, such a structure may be adopted that the function of a part of each of the constituent element shown by 21 to 46 in FIG. 25 can be achieved in the form of software.

<Function Block Diagram of Apparatus>

Figure 26:
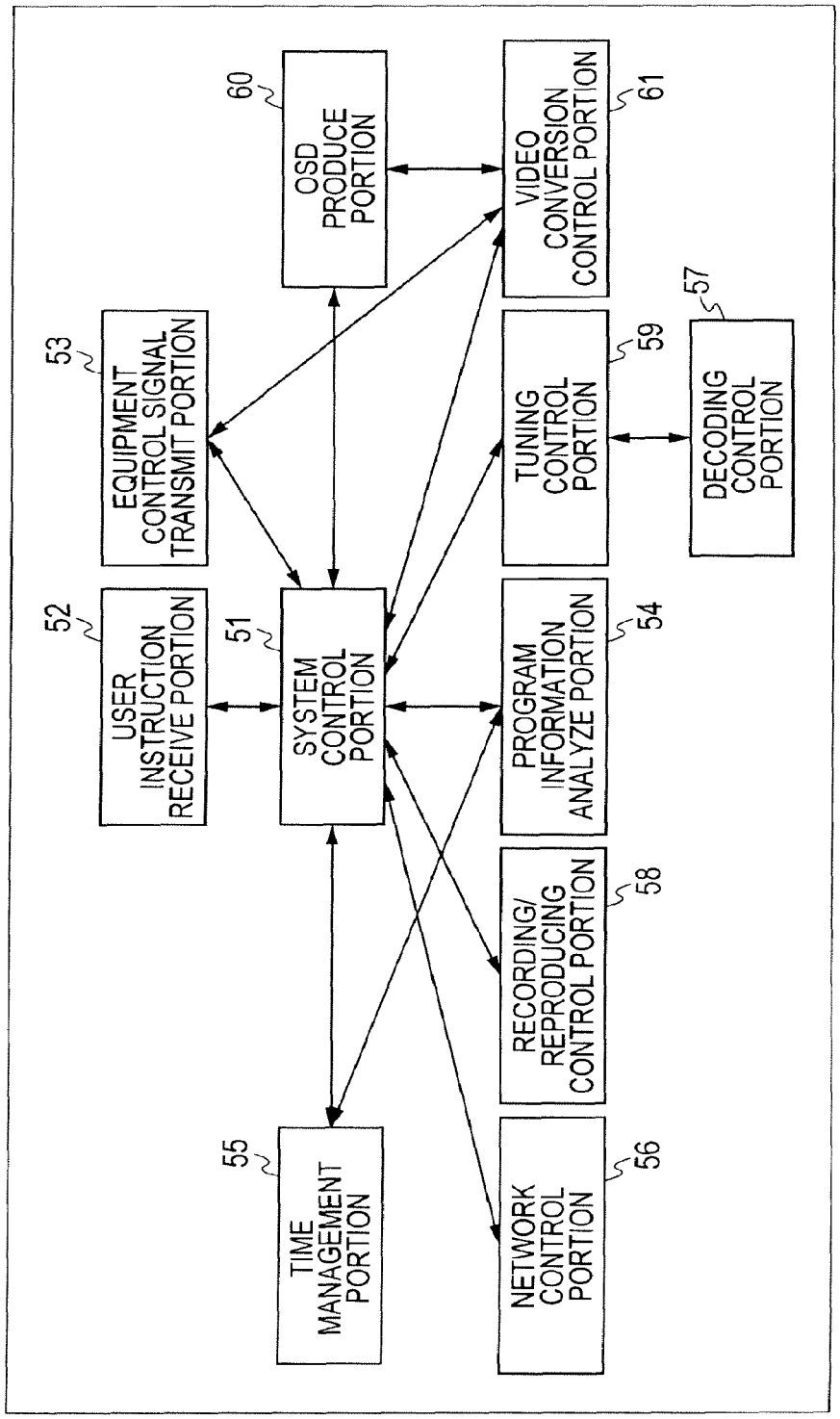
FIG. 26 is a view for showing an example of an outlook block diagram of internal functions inside a CPU in the receiving apparatus according to the present invention.

FIG. 26 shows an example of the function block structure of processing in an inside of the CPU 21. Herein, each function block exists, for example, in the form of a module of software to be executed by the CPU 21, wherein delivery of information and/or data and an instruction of control are conducted by any means, between the respective modules (for example, a message passing, a function call, an event transmission, etc.).

Also, each module also executes transmission/receiving hardware of information between each of hardwires within the receiving apparatus 4 through the common buss 22. Also, relation lines (e.g., arrows) are drawn in the figure, mainly, for the portions relating to the explanation of this time; however, there is processing necessitating communication means and/or communication even between other modules. For example, a tuning control portion 59 obtains the program information necessary for tuning from a program information analyzer portion 54, appropriately.

Next, explanation will be given on the function of each function block. A system control portion 51 manages a condition of each module and/or a condition of instruction made by the user, etc., and also gives a control instruction to each module. A user instruction receiver portion 52 receives and interprets an input signal of a user operation, which the control signal transmitter portion 33 receives, and transmits an instruction of the user to the system control portion 51. An equipment control signal transmitter portion 53 instructs the control signal transmitter portion 33 to transmit an equipment control signal, in accordance with an instruction from the system control portion 51 or other module(s).

The program information analyzer portion 54 obtains the program information from the multiplex/demultiplex portion 29, to analyze it, and provides necessary information to each module. A time management portion 55 obtains time correction information (TOT: Time offset table), which is included in TS, from the program information analyzer portion 54, thereby managing the present time, and it also gives a notice of an alarm (noticing an arrival of the time designated) and/or a one-shot timer (noticing an elapse of a preset time), in accordance with request (s) of each module, with using the counter that the time 34 has.

A network control portion 56 controls the network I/F 25, and thereby obtains various kinds of information from a specific URL (Unique Resource Locator) and/or IP (Internet Protocol) address. A decode control portion 57 controls the video decoder portion 30 and the audio decoder portion 31, and conducts start or stop of decoding, obtaining the information included in the stream, etc.

A recording/reproducing control portion 58 controls the record/reproduce portion 27, so as to read out a signal from a recoding medium 26, from a specific position of a specific content, and in an arbitrary readout format (normal reproduce, fast-forward, rewind, a pause). It also executes a control for recording the signal inputted into the record/reproduce portion 27 onto the recording medium 26.

A tuning control portion 59 controls the tuner 23, the descrambler 24, the multiplex/demultiplex portion 29 and the decode control portion 57, and thereby conducts receiving of broadcast and recording of the broadcast signal. Or, it conducts reproducing from the recording medium, and also controlling until when the video signal and the audio signal are outputted. Details of the operation of broadcast receiving and the recording operation of the broadcast signal and the reproducing operation from the recording medium will be given later.

An OSD produce portion 60 produces OSD data, including a specific message therein, and instructs a video conversion control portion 61 to pile up or superimpose that OSD data produced on the video data, thereby to be outputted. Herein, the a video conversion control portion 61 produces the OSD data for use of the left-side eye and for use of the right-side eye, having parallax therebetween, and requests the video conversion control portion 61 to do the 3D display upon basis of the OSD data for use of the left-side eye and for use of the right-side eye, and thereby executing display of the message in 3D.

The video conversion control portion 61 controls the video conversion processor portion 32, and superimpose the video, which is converted into 3D or 2D in accordance with the instruction from the system control portion 51 mentioned above, and the OSD inputted from the OSD produce portion 61, onto the video signal, which is inputted into the video conversion processor portion 32 from the video decoder portion 30, and further processes the video (for example, scaling or PinP, 3D display, etc.) depending on the necessity thereof; thereby displaying it on the display 47 or outputting it to an outside. Details of the converting method of the 2D video into a predetermined format will be mentioned later. Each function block provides such function as those.

<Broadcast Receiving>

Herein, explanation will be given on a control process and a flow of signals when receiving the broadcast. First of all, the system control portion 51, receiving an instruction of the user indicating to receive broadcast at a specific channel (CH) (for example, pushdown of a CH button on the remote controller) from the user instruction receiver portion 52 instructs tuning at the CH, which the user instructs (hereinafter, "designated CH"), to the tuning control portion 59.

The tuning control portion 59 receiving the instruction mentioned above instructs a control for receiving the designated CH (e.g., a tuning at designated frequency band, a process for demodulating the broadcast signal, an error correction process) to the tuner, so that it output TS to the descrambler 24.

Next, the tuning control portion 59 instructs the descrambler 24 to descramble the TS mentioned above and to output it to the multiplex/demultiplex 29, while it instructs the multiplex/demultiplex 29 to demultiplex of the TS inputted and to output the video ES demultiplexed to the video decoder portion 30, and also to output the audio ES to the audio decoder portion 31.

Also, the tuning control portion 59 instructs the decode control portion 57 to decode the video ES and the audio ES, which are inputted into the video decoder portion 30 and the audio decoder portion 31. The decode control portion 57 controls the video decoder portion 30 to output the video signal decoded into the video conversion processor portion 32, and controls the audio decoder portion 31 to output the audio signal decoded to the speaker 48 or the audio output 42. In this manner is executed the control of outputting the video and the audio of the CH, which the user designates.

Also, for displaying a CH banner (e.g., an OSD for displaying a CH number, a program name and/or the program information, etc.), the system control portion 51 instructs the OSD produce portion 60 to produce and output the CH banner. The OSD produce portion 60 receiving the instruction mentioned above transmits the data of the banner produced to the video conversion control portion 61, and the video conversion control portion 61 receiving the data mentioned above superimposes the CH banner on the video signal, and thereby to output it. In this manner is executed the display of the message when tuning, etc.

<Recording of Broadcast Signal>

Next, explanation will be given on a recording control of the broadcast signal and a flow of signals. When recording a specific CH, the system control portion 51 instructs the tuning control portion 59 to tune up to the specific CH and to output a signal to the record/reproduce portion 27.

The tuning control portion 59 receiving the instruction mentioned above, similar to the broadcast receiving process mentioned above, instructs the tuner 23 to receive the designated CH, instructs the descrambler 24 to descramble the MPEG2-TS received from the tuner 23, and further instructs the multiplex/demultiplex portion 29 to output the input from the descrambler 24 to the record/reproduce portion 27.

Also, the system control portion 51 instructs the recording/reproducing control portion 58 to record the input TS into the record/reproduce portion 27. The record/reproduce control portion 58 receiving the instruction mentioned above executes a necessary process, such as, an encoding, etc., on the signal (TS) inputted into the record/reproduce portion 27, and after executing production of additional information necessary when recording/reproducing (e.g., the program information of a recoding CH, content information, such as, a bit rate, etc.) and recording into management data (e.g., an ID of recording content, a recording position on the recording medium 26, a recording format, encryption information, etc.), it executes a process for writing the management data onto the recording medium 26. In this manner is executed the recording of broadcast signal.

<Reproducing from Recording Medium>

Explanation will be given on a process for reproducing from the recoding medium. When doing reproduction of a specific program, the system control portion 51 instructs the recording/reproducing control portion 58 to reproduce the specific program. As an instruction in this instance are given an ID of the content and a reproduction starting position (for example, at the top of program, at the position of 10 minutes from the top, continuation from the previous time, at the position of 100 Mbytes from the top, etc.) The recording/reproducing control portion 58 receiving the instruction mentioned above controls the record/reproduce portion 27, and thereby executes processing so as to read out the signal (TS) from the recording medium 26 with using the additional information and/or the management information, and after treating a necessary process thereon, such as, decryption of encryption, etc., to output the TS to the multiplex/demultiplex portion 29.

Also, the system control portion 51 instructs the tuning control portion 59 to output the video/audio of the reproduced signal. The tuning control portion 59 receiving the instruction mentioned above controls the input from the record/reproduce portion 27 to be outputted into the multiplex/demultiplex portion 29, and instructs the multiplex/demultiplex portion 29 to demultiplex the TS inputted, and to output the video ES demultiplexed to the video decoder portion 30, and also to output the audio ES demultiplexed to the audio decoder portion 31.

Also, the tuning control portion 59 instructs the decode control portion 57 to decode the video ES and the audio ES, which are inputted into the video decoder portion 30 and the audio decoder portion 31. The decode control portion 57 receiving the decode instruction mentioned above controls the video decoder portion 30 to output the video signal decoded to the video conversion processor portion 32, and controls the audio decoder portion 31 to output the audio signal decoded to the speaker 48 or the audio output 42. In this manner is executed the process for reproducing the signal from the recording medium.

<Display Method of 3D Video>

As a method for displaying the 3D video, into which the present invention can be applied, there are several ones; i.e., producing videos, for use of the left-side eye and for use of the right-side eye, so that the left-side eye and the right-side eye can feel the parallax, and thereby inducing a person to perceive as if there exists a 3D object.

As one method thereof is known an active shutter method of generating the parallax on the pictures appearing on the left and right eyes, by conducting the light shielding on the left-side and the right-side glasses with using a liquid crystal shutters, on the glasses, which the user wears, and also displaying the videos for use of the left-side eye and for use of the right-side eye in synchronism with that.

In this case, the receiving apparatus 4 outputs the sync signal and the control signal, from the control signal output portion 43 and the equipment control signal 44 to the glasses of the active shutter method, which the user wears. Also, the video signal is outputted from the video signal output portion 41 to the external 3D video display device, so as to display the video for use of the left-side eye and the video for use of the right-side eye, alternately. Or, the similar 3D display is conducted on the display 47, which the receiving apparatus 4 has. With doing in this manner, for the user wearing the glasses of the active shutter method, it is possible to view/listen the 3D video on that 3D video display device or the display 47 that the receiving apparatus 4 has.

Also, as other method thereof is already known a polarization light method of generating the parallax between the left-side eye and the right-side eye, by separating the videos entering into the left-side eye and the right-side eye, respectively, depending on the polarizing condition, with sticking films crossing at a right angle in liner polarization thereof or treating liner polarization coat, or sticking films having opposite rotation directions in rotating direction of a polarization axis in circular polarization or treating circular polarization coat on the left-side and right-side glasses, on a pair of glasses that the user wears, while outputting the video for use of the left-side eye and the video for use of the right-side eye, simultaneously, of polarized lights differing from each other, corresponding to the polarizations of the left-side and the right-side glasses, respectively.

In this case, the receiving apparatus 4 outputs the video signal from the video signal output portion 41 to the external 3D video display device, and that 3D video display device displays the video for use of the left-side eye and the video for use of the right-side eye under the different polarization conditions. Or, the similar display is conducted by the display 47, which the receiving apparatus 4 has. With doing in this manner, for the user wearing the glasses of the polarization method, it is possible to view/listen the 3D video on that 3D video display device or the display 47 that the receiving apparatus 4 has. However, with the polarization method, since it is possible to view/listen the 3D video, without transmitting the sync signal and the control signal from the receiving apparatus 4, there is no necessity of outputting the sync signal and the control signal from the control signal output portion 43 and the equipment control signal 44.

Also, other that this, a color separation method may be applied of separating the videos for the left-side and the right-side eyes depending on the color. Or may be applied a parallax barrier method of producing the 3D video with utilizing the parallax barrier, which can be viewed by naked eyes.

However, the 3D display method according to the present invention should not be restricted to a specific method.

<Example of Detailed Determining Method of 3D Program Using Program Information>

As an example of a method for determining the 3D program, if obtaining the information for determining on whether being a 3D program newly included or not, from the various kinds of tables and/or the descriptors included in the program information of the broadcast signal and the reproduce signal, which are already explained, it is possible to determine on whether being the 3D program or not.

Determination is made on whether being the 3D or not, by confirming the information for determining on whether being the 3D program or not, which is newly included in the component descriptor and/or the component group descriptor, described in the table, such as, PTM and/or EIT [schedule basic/schedule extended/present/following], or confirming the 3D program details descriptor, being a new descriptor for use of determining the 3D program, or by confirming the information for determining on whether being the 3D program or not, which is newly included in the service descriptor and/or the service list descriptor, etc., described in the table, such as, NIT and/or SDT, and so on. Those information are supplied or added to the broadcast signal in the transmitting apparatus mentioned previously, and are transmitted therefrom. In the transmitting apparatus, those information are added to the broadcast signal by the management information supply portion 16.

As proper uses of the respective tables, for example, regarding the PMT, since it describes therein only the information of present programs, the information of future programs cannot be confirmed, but it has a characteristic that the reliability thereof is high. On the other hand, regarding the EIT [schedule basic/schedule extended], although possible to obtain the information of, not only the present programs, but also the information of future programs therefrom; however, it takes a long time until completion of receipt thereof, and needs a large memory area or region for holding it, and has a demerit that the reliability thereof is low because of phenomenon in future. Regarding the EIT [following], since possible to obtain the information of programs of next coming broadcast hour (s), it is preferable to be applied into the present embodiment. Also, regarding the EIT [present], it can be used to obtain the present program information, and the information differing from the PMT can be obtained therefrom.

Next, explanation will be given on detailed example of the process within the receiving apparatus 4, relating to the program information explained in FIGS. 4, 6, 10, 12 and 14, which is transmitted from the transmitting apparatus 1.

FIG. 20 shows an example of the process for each field of the component descriptor within the receiving apparatus 4.

When "descriptor_tag" is "0x50", it is determined that the said descriptor is the component descriptor. By "descriptor_length", it is determined to be the descriptor length of the component descriptor. If "stream_content" is "0x01", "0x05", "0x06" or "0x07", then it is determined that the said descriptor is valid (e.g., the video). When other than "0x01", "0x05", "0x06" and "0x07", it is determined that the said descriptor is invalid. When "stream_content" is "0x01", "0x05", "0x06" or "0x07", the following processes will be executed.

"component_type" is determined to be the component type of that component. With this component type, it is assigned with any value shown in FIG. 5. Depending on this content, it is possible to determine on whether that component is the component of the 3D video program or not.

"component_tag" is a component tag value to be unique within that program, and can be used by corresponding it to the component tag value of the stream descriptor of PMT.

"ISO_639_language_code" identifies the language of that component and the language of the description of letters included in this component. For example, if the value is "jpn" ("0x6A706E")", then the letter codes disposed following thereto are treated as "jpn" (Japanese language).

With "text_char", if being within 16 bytes (or, 8 full-size characters), it is determined to be the component description. If this field is omitted, it is determined to be the component description of the default. The default character string is "video".

As was explained in the above, with an aid of the component descriptor, it is possible to determined the type of the video component, which builds up the event (e.g., the program), and the component description can be used when selecting the video component in the receiver.

However, only a video component, determined the "component_tag" value thereof at the value from "0x00" to "0x0F", is a target of the selection, alone. The video component determined the "component_tag" value thereof at other value is not the target of the selection, alone, nor a target of the function of component selection, etc.

Also, due to mode change during the event (e.g., the program), there is a possibility that the component description does not agree with an actual component. ("component_type" of the component descriptor describes only the representative component types of that component, but it is hardly done to change this value in real time responding to the mode change during the program.)

Also, "component_type" described by the component descriptor is referred to when determining a default "maximum_bit_rate" incase where a digital copy control descriptor, being the information for controlling a copy generation and the description of the maximum transmission rate within digital recording equipment, is omitted therefrom, for that event (e.g., the program).

In this manner, with doing the process upon each field of the present descriptor, in the receiving apparatus 4, the receiving apparatus 4 can observe the "stream_type" and the "component_type", and therefore there can be obtained an effect of enabling to recognize that the program, which is received at present, or which will be received in future, be the 3D program.

FIG. 21 shows an example of a process upon each field of the component group descriptor, in the receiving apparatus 4.

If "descriptor_tag" is "0xD9", it is determined that the said descriptor is the component group descriptor. By the "descriptor_length", it is determined to have the descriptor length of the component group descriptor.

If "component_group_type" is "000", it is determined to be the multi-view TV service, on the other hand if "001", it is determined to be the 3D TV service.

If "total_bit_rate_flag" is "0", it is determined that the total bit rate within the group of an event (e.g., the program) is not described in that descriptor. On the other hand, if "1", it is determined the total bit rate within the group of an event (e.g., the program) is described in that descriptor.

"num_of_group" is determined to be a number of the component group(s) within an event (e.g., the program). While there is the maximum number, and if the number exceeds that maximum number, then there is a possibility of treating it as the maximum value. If "component_group_id" is "0x0", it is determined to be a main group. If it is other than "0x0", it is determined to be a sub-group.

"num_of_CA_unit" is determined to be a number of charging/non-charging units within the component group. If exceeding the maximum value, there is a possibility of treating it to be "2".

If "CA_unit_id" is "0x0", it is determined to be the non-charging unit group. If "0x1", it is determined to be the charging unit including a default ES group therein. If other than "0x0" and "0x1", it is determined to be a charging unit identification of other(s) than those mentioned above.

"num_of_component" belongs to that component group, and is determined to be a number of the component(s) belonging to the charging/non-charging unit, which indicated by the "CA_unit_id" just before. If exceeding the maximum value, there is a possibility of treating it to be "15".

"component_tag" is determined to be a component tag value belonging to the component group, and this can be used by corresponding it to the component tag value of the stream descriptor of PMT.

"total_tag_rate" is determined to be the total bit rate within the component group. However, when it is "0x00", it is determined to be default.

If "text_length" is equal to or less than 16 (or, 8 full-size characters), it is determined to be the component group description length, and if being larger than 16 (or, 8 full-size characters), the explanation exceeding 16 (or, 8 full-size characters) may be neglected.

"text_char" indicates an explanation in relation to the component group. However, with determining that the multi-view TV service be provided in that event (e.g., the program), depending on an arrangement of the component group descriptor(s) of "component_group_type"="000", this can be used in a process for each component group.

Also, with determining that the 3D TV service be provided in that event (e.g., the program) depending on an arrangement of the component group descriptor(s) of "component_group_type"="001", this can be used in a process for each component group.

Further, the default ES group for each group is described, necessarily, within the component loop, which is arranged at a top of "CA_unit" loop.

In the main group ("component_group_id=0x0"), the following are determined:
  If the default ES group of the group is a target of the non-charging, "free_CA_mode" is set to "0" ("free_CA_mode=0"), and no setting up of the component group of "CA_unit_id=0x1" is allowed.
  If the default ES group of the group is a target of the charging, "free_CA_mode" is set to "1" (free_CA_mode=1), and the component group of "CA_unit_id=0x1" must be set up to be described.

Also, in the sub-group ("component_group_id>0x0"), the following are determined:
  For the sub-group, only the charging unit, which is same to that of the main group, or non-charging unit can be set up.
  If the default ES group of the group is a target of the non-charging, a component group of "CA_unit_id=0x0" is set up, to be described.
  If the default ES group of the group is a target of the charging, a component group of "CA_unit_id=0x1" is set up, to be described.

In this manner, with doing the process upon each field of the present descriptor, in the receiving apparatus 4, the receiving apparatus 4 can observe the "component_group_type", and therefore there can be obtained an effect of enabling to recognize that the program, which is received at present, or which will be received in future, be the 3D program.

FIG. 22 shows an example of a process for each field of the 3D program details descriptor, within the receiving apparatus 4.

If "descriptor_tag" is "0xE1", it is determined that the said descriptor is the 3D program details descriptor. By the "descriptor_tag", it is determined to have the descriptor length of the 3D program details descriptor. "3d_2d_type" is determined to be 3D/2D identification in that 3D program. This is designated from among of those shown in FIG. 10B. "3d_method_type" is determined to be the identification of 3D method in that 3D program. This is designated from among of those shown in FIG. 11.

"stream_type" is determined to be a format of the ES of that 3D program. This is designated from among of those shown in FIG. 3. "component_tag" is determined to be the component tag value, to be unique within that 3D program. This can be used by responding it to the component tag value of the stream identifier of PMT.

Further, it is also possible to adopt such structure that determination can be made on whether that program is the 3D video program or not, depending on existence/absence of the 3D program details descriptor itself. Thus, in this case, if there is no 3D program details descriptor, it is determined to the 2D video program, on the other hand if there is the 3D program details descriptor, it is determined to be the 3D video program.

In this manner, through observation of the 3D program details descriptor by the receiving apparatus 4 by executing the process on each field of the present descriptor, there can be obtained an effect of enabling to recognize that the program, which is received at present, or which will be received in future is the 3D program, if there exists this descriptor.

FIG. 23 shows an example of a process upon each field of the service descriptor, within the receiving apparatus 4. If "descriptor_tag" is "0x48", it is determined that the said descriptor is the service descriptor. By "descriptor_length" it is determined to be the description length of the service descriptor. If "service_type" is other than those shown in FIG. 13, said descriptor is determined invalid.

"service_provider_name_length" is determined to be a name length of the provider, when receiving the BS/CS digital TV broadcast, if it is equal to or less than 20, and if it is greater than 20, the provider name is determined to be invalid. On the other hand, when receiving the terrestrial digital TV broadcast, those other than "0x00" are determined to be invalid.

"char" is determined to be a provider name, when receiving the BS/CS digital TV broadcast. On the other hand, when receiving the terrestrial digital TV broadcast, the content described therein is neglected. If "service_name_length" is equal to or less than 20, it is determined to be the name length of the programmed channel, and if greater than 20, the programmed channel name is determined invalid.

"char" is determined to be a programmed channel name. However, if impossible to receive SDT, in which the descriptors are arranged or disposed in accordance with the transmission management regulation explained in FIG. 18 mentioned above, basic information of a target service is determined to be invalid.

With conducting the process upon each field of the present descriptor, in this manner, within the receiving apparatus 4, the receiving apparatus 4 can observe the "service_type", and there can be obtained an effect of enabling to recognize that the programmed channel is the channel of the 3D program.

FIG. 24 shows an example of a process upon each field of the service list descriptor, within the receiving apparatus 4. If "descriptor_tag" is "0x41", it is determined that said descriptor is the service list descriptor. By "descriptor_length", it is determined to be the description length of the service list descriptor.

In "loop" is described a loop of the number of services, which are included in the target transport stream. "service_id" is determined as "service_id" to that transport stream. "service_type" indicates a type of service of the target service. Other(s) than those defined in FIG. 13 is/are determined to be invalid.

As was explained in the above, the service list descriptor can be determined to be the information of the transport stream included within the target network.

With conducting the process upon each field of the present descriptor, in this manner, within the receiving apparatus 4, the receiving apparatus 4 can observe the "service_type", and there can be obtained an effect of enabling to recognize that the programmed channel is the channel of the 3D program.

Next, explanation will be given about the details of the descriptor within each table. First of all, depending on the type of data within the "service_type", which is described in a $2^{nd}$ loop (a loop for each ES) of PMT, it is possible to determine the format of ES, as was explained in FIG. 3 mentioned above; however, if there is the description indicating that the stream being broadcasted at present is the 3D video, then that program is determined to be the 3D program (for example, if there is "0x1F" indicating the sub-bit stream (e.g., other viewpoint) of the multi-viewpoints video encoded (for example, H.264/MVC) stream in the "stream_type", that program is determined to be the 3D program).

Also, other than the "stream_type", it is also possible to assign a 2D/3D identification bit, newly, for identifying the 2D program or the 3D program, in relation to an area or region that is made "reserved" at present within the PMT, and thereby to determine in that area or region.

With the EIT, it is also possible to assign the 2D/3D identification bit, newly, and to determine.

When determining the 3D program by the component descriptor, which is disposed or arranged in the PMT and/or the EIT, as was explained in FIGS. 4 and 5 in the above, the type for indicating the 3D video is assigned to the "component_type" of the component descriptor (for example, in FIGS. 5C to 5E), and if there is any one, "component_type" of which indicates the 3D, then it is possible to determine that program to be the 3D program. (For example, with assigning that shown in FIGS. 5C to 5E, etc., it is confirmed that said value exists in the program information of the target program.)

As a method for determining by means of the component group descriptor, which is arranged in the EIT, as was explained in FIGS. 6 and 7 mentioned above, the description for indicating the 3D service is assigned to the value of the "service_group_type", and if the value of the "component_group_type" indicates the 3D service, then it is possible to determine it is the 3D program. (For example, while assigning "001" of the bit field to the 3D TV service, etc., it is confirmed that said value exists in the program information of the target program.)

As a method for determining by means of the 3D program details descriptor, which is arranged in the PMT and/or the EIT, as was explained in FIGS. 10 and 11 mentioned above, when determining whether the target program is the 3D program or not, it is possible to determine depending on the content of the "2d_3d_type" (the 3D/2D type) within the 3D program details descriptor. Also, if the 3D program details descriptor about the receiving program, it is determined to be the 2D program. Also, there can be considered a method for determining the next coming program be the 3D program if it is such 3D method, that the receiving apparatus can deal with the 3D method type (i.e., the "3d_method_type" mentioned above) thereof, which is included in the descriptor mentioned above. In that case, although a process for analyzing the descriptor becomes complicated, but it is possible to stop the operation of conducting the message display process and/or the recording process upon the 3D program, with which the receiving apparatus cannot deal with.

In the information of "service_type", which is included in the service descriptor disposed in the SDT and/or the service list descriptor disposed in the NIT, with assigning the 3D video service to "0x01", as was explained in FIGS. 12, 13 and 14 mentioned above, it is possible to determine to be the 3D program, when that descriptor obtain a certain program information. In this case, determination is made, not by a unit of the program, but by a unit of service (e.g., CH: the programmed channel), although determination of the 3D program cannot be made on the next coming program within the same programmed channel, but there is also a merit of being easy because the obtaining of the information is not the unit of program.

Also, with the program information, there is also a method of obtaining it through a communication path for exclusive use thereof (e.g., the broadcast signal, or the Internet). In such case, it is possible to make the 3D program determination, in the similar manner, if there is the descriptor for indication that said program is the 3D program.

In the explanation given in the above, the explanation was given on various kinds of information (i.e., the information included in the table and/or the descriptor) for determining if being the 3D video or not, by the unit of the service (CH) or the program; however, all of those are not necessarily needed to be transmitted, according to the present invention. It is enough to transmit the information necessary fitting to configuration of the broadcasting. Among those information, it is enough to determine if being the 3D video or not, upon a unit of the service (CH) or the program, by confirming a single information, respectively, or to determine if being the 3D video or not, upon a unit of the service (CH) or the program, by combining plural numbers of information. When making the determination by combining the plural numbers of information, it is also possible to make the determination, such as, that it is the 3D video broadcasting service, but a part of the program is the 2D video, etc. In case where such determination can be made, for the receiving apparatus, it is possible to indicate clearly, for example, that said service is "3D video broadcasting service" on the EPG, and also, if the 2D video program is mixed with in said service, other than the 3D video program, it is possible to exchange the display control between the 3D video program and the 2D video program when receiving the program.

However, in the case where determination is made to be the 3D program, in accordance with such determining method as was mentioned above, the 3D components, which are designated in FIGS. 5C to 5E, for example, are processed (e.g., reproduced, displayed and/or outputted) in 3D, if they can be processed (e.g., reproduced, displayed and/or outputted), appropriately, within the receiving apparatus 4; however, if they cannot be processed (e.g., reproduced, displayed and/or outputted), appropriately, within the receiving apparatus 4 (for example, in case where there is no function of reproducing the 3D video for dealing with the 3D transmitting method, which is designated), they may be processed (e.g., reproduced, displayed and/or outputted) in 2D. In this instance, there may be displayed that said 3D video program cannot be displayed in 3D or outputted in 3D, appropriately, on the receiving apparatus, together with the display and the output of the 2D video.

An example of the message display in this case is shown in FIG. 50. A reference numeral 701 depicts an entire of screen to be displayed or outputted by the apparatus, and 5001 depicts an example of a message to the user for an indication of being the 3D method type, which the receiving apparatus 4 cannot deal with. In the message 5001 may be displayed an error code for presenting a type of an error, a 3D method type (for example, a value of "3d_method_type") or a value of combining those. With this, there can be obtained a merit of enabling the user to decide the condition in an inside of the receiving apparatus, and so on.

Figure 51:
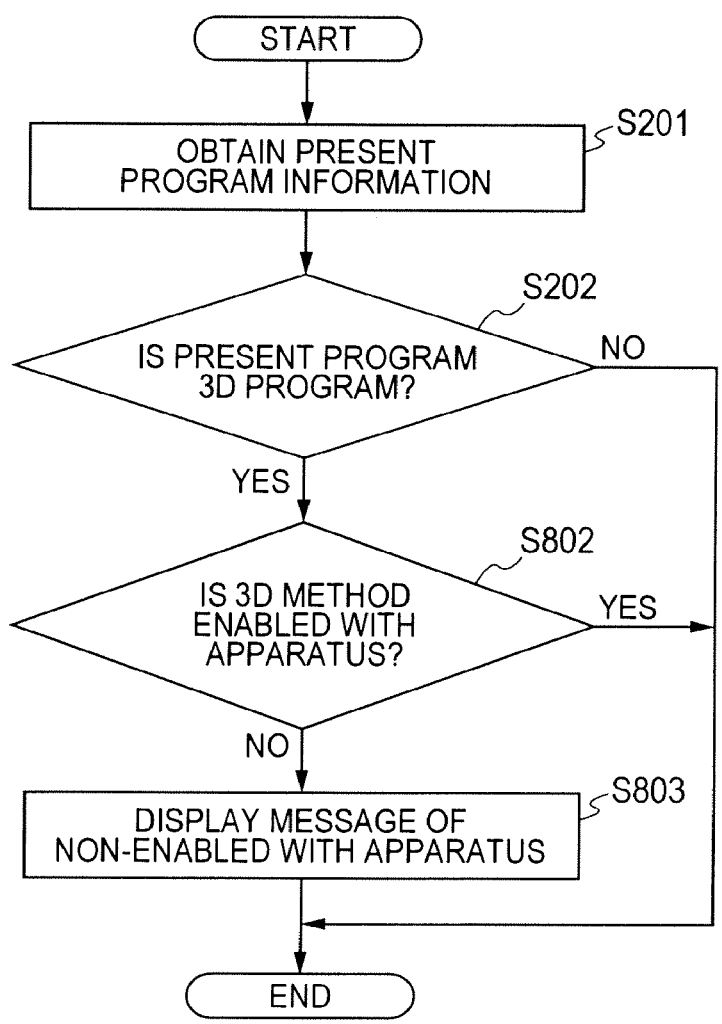
FIG. 51 is a view for showing a flowchart when displaying a message of a 3D method, which is not yet supported.

About an example of a processing flow within the system control portion 51, when displaying the error message in this manner, explanation will be given by referring to FIG. 51. The system control portion 51 obtains the program information of the present program from the program information analyzer portion 54 (S201), and determines on whether the present program is the 3D program or not, in accordance with the determining method for the 3D program mentioned above. If the present program is not the 3D program ("no" in S202), no process is conducted, in particular. If the present program is the 3D program ("yes" in S202), next, it is confirmed on whether the receiving apparatus is enabled or not, with the 3D method type of the present program (S802). In more details, there is already known a method of determining if the 3D method type included in the program information mentioned above (for example, "3d_method_type" described in the 3D program details descriptor mentioned above) has a value or not, indicating the 3D method, which the receiving apparatus 4 can deal with, etc. The value (s) of the 3D method (s) being enabled with may be memorized previously, for example, in a memory portion of the receiving apparatus 4, so as to be in that determination. As a result of the determination, if being the 3D method type, with which the receiving apparatus is enabled ("yes" in 3802), no message display or the like is made, in particular. If being the 3D method type, with which the receiving apparatus is un-enabled ("no" in S5802), then such a message display of not enabled with the apparatus, as is shown in FIG. 49 (S803).

With doing so, for the user, it is possible to grasp if the program is broadcasted as the 2D video program, or it displays the 2D video because the receiving apparatus cannot deal with, appropriately, although it is the program being broadcasted as the 3D video program.

<Example of Display of Electronic Program Table and Screen Display of 3D Program>

Figure 48:
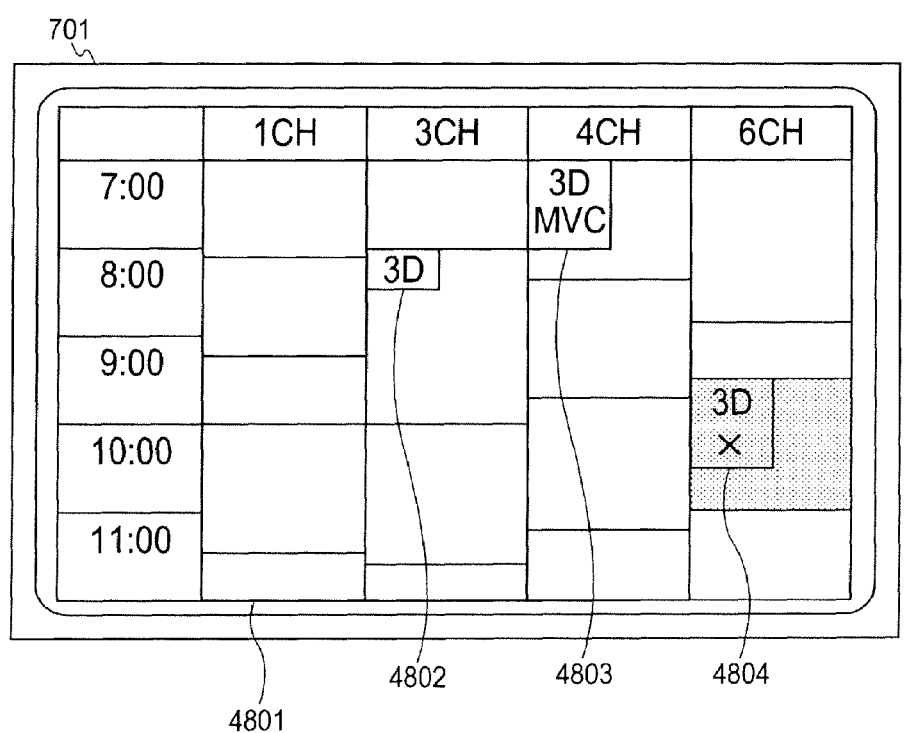
FIG. 48 is a view for showing an example of display of a program table.

FIG. 48 shows an example of a display of an electronic program table including the 3D program therein. The electronic program table is mainly constructed upon basis of the program information included in the EIT, which is transmitted after being multiplexed on the broadcast signal; however other than that, there may be done data sending of the program information with a unique multiplexing method, or sending of the program information via the Internet, etc. The information to be applied on the electronic program table are a program name, a broadcast starting time, a broadcasting period, and other detailed information of the programs (e.g., the cast, director, information relating to decoding of video and/or audio, a series name, etc.), in relation to an event (the program), and such the electronic program table is conducted with, as shown in FIG. 48, upon basis of those information. However, the EIT is transmitted in relation to, not only the program, which is broadcasted at present, but also the program, which will be broadcasted in future. Thus, within the receiving apparatus, it is possible to execute the displaying process of the electronic program table, which will be mentioned hereinafter, and so on, with using the information included in the EIT, in relation to the program, which is broadcasted at present, and also the program, which will be broadcasted in future.

A reference numeral 701 shown in the figure depicts an entire of the screen, which the apparatus displays or outputs, 4801 an entire of the electronic program table presented on the screen mentioned above, respectively, wherein the vertical axis presents the service (CH: channel) while the horizontal axis the time, respectively, and in this example is shown an electronic program table of the services 1CH, 3CH, 4CH and 6CH from 7:00 until 12:00. Further, when displaying the electronic program table, only the electronic program table may be displayed, without reproducing the program, which is received at present. Those processed may be executed, in the receiving apparatus shown in FIG. 25, under the control of the CPU 21 (e.g., the system control portion 51 and the OSD produce portion 60), within the video conversion processor portion 32.

In this example, if there exists the 3D program to be determined with the method mentioned above among the events (the programs), which are included in the electronic program table (for example, the EIT) (for example, a program presented by an rectangle, displayed by "8:00-10:00" of 3CH, in the example shown in FIG. 48), then a mark (hereinafter, being called "3D program mark"), such as "4802", for example, with which it can be seen that said program be the 3D program, is displayed in such an extent that the mark can be seen being attached to that program (for example, within the range of the rectangular for indicating the program, or in a predetermined range surrounding that rectangular). With doing so, for the user, it is possible to recognize which program is the 3D program in the electronic program table, easily.

Herein, as a method for displaying the 3D program mark, other than the example of displaying by 4802, for example, as is shown by a reference numeral 4802, the 3D method type of that program may be obtained from the information of the "3d_method_type" mentioned above, to be determined, and there may be displayed characters or a mark for indicating the method of the 3D broadcast. In case of this example, there is shown an example of displaying the mark "MVC" for indicating the multi-viewpoints encoding method. In this case, the user can decide that said program is the 3D program, as well as, with which 3D method type it is broadcasted.

Also, as other displaying method, as an example shown by 4804, in case where the 3D method type, which is obtained from the "3d_method_type" mentioned above, is not enabled with the receiving apparatus, there can be considered a method of changing the content displayed depending on if the receiving apparatus is enabled or not, with the 3D method type of said program, such as, displaying a mark for indicating "non-enabled" (for example, "X" in the figure) or changing a display color (for example, conducting a display like a shading in the figure, or changing a color of a region of the electronic program display), or in case where said program is the 3D method type, with which the receiving apparatus is enabled, a method of displaying a mark indicating "enabled" (for example, "O" in the place of "X" at the displaying position thereof in the figure). With doing this, it is possible to let the user to recognize if said program is the program of the 3D method type or not, with which the receiving apparatus is enabled, easily.

Or, combining those displays, also is applicable a display of indicating that it is the 3D method type, with which the apparatus itself is not enabled, by changing the display color while displaying the 3D method type of the program. In that case, for the user, it is possible to decide if it is the 3D method type or not, with which the receiving apparatus is enabled, while confirming the 3D display type of that program, easily.

Or, in case where a focus of a cursor hits on the 3D program when the user operates the cursor (e.g., a selection region), which is displayed on the electronic program table, via the remote controller, the 3D program mark may be displayed in a region separating from the region selected. As a concrete example thereof, for example, it may be displayed, as is shown by a reference numeral 4902, together with the detailed information of the program (for example, a CH number, a broadcasting time, a program name, shown by a reference numeral 4901), in an outside of the rectangular region indicating the selected program mentioned above. However, the example shown in FIG. 49 is that providing the regions for displaying the 3D program mark 4902 and the detailed information 4901 of the program, outside a region 4903 for displaying a program list of the electronic program table.

As a method for displaying the electronic program table, other than that, when the user do a specific operation through the remote controller (for example, pushdown of a button, or setup on a menu), or when she/he opens the electronic program table for exclusive use of the 3D program, or if the apparatus is the 3D enabled, only the 3D programs may be displayed on the electronic program table. With doing in this way, for the user, it is easy to find out the 3D program.

Other than the electronic program table, the 3D program mark may be displayed on a program display (for example, a CH banner), which is displayed when tuning up to a program or when changing the program information, or when the user pushes down a specific button (for example, "screen display"). When determining that the present program is the 3D program, in accordance with the 3D program determining method similar to that mentioned above, it is also possible to display the 3D program mark mentioned above, on a program display 5301 displayed when displaying the 3D program in 2D, as an example shown in FIG. 53. With doing in this way, for the user, it is possible to decide if said program is the 3D program or not, but without opening the program table. In this case, also the 3D program mark may be displayed together with the detailed information of the program(s), such as, the CH number, the broadcasting time and/or the program name, etc. Also, the display shown in FIG. 53 may be made when displaying the 3D program in 3D.

Herein, with the display of the 3D program mark, it may be the letters, such as, "3D", which is included at a specific position (for example, at a head portion) in the character data of the electronic program table (for example, "text_char" portion of a short-formatted event descriptor included in the EIT). In this case, even on the existing receiving apparatus, the user can recognize the 3D program from the electronic program table.

<3D Reproducing/Outputting/Displaying process of 3D Content of 3D 2-Viewpoints Separate ES Transmission Method>

Next, explanation will be given on a process when reproducing 3D content (i.e., digital content including the 3D video). Herein, first of all, the explanation will be given on a reproducing process in case of the 3D 2-viewpoints separate ES transmission method, in which a main viewpoint video ES and a sub-viewpoint video ES exist in one (1) TS, as is shown in FIG. 47. First of all, when the user executes an instruction for exchanging to 3D output/display (for example, pushing down "3D" key on the remote controller), etc., the user instruction receive portion 52, receiving the key code mentioned above, instructs the system control portion 51 to exchange to the 3D video (however, in the processing given hereinafter, a similar process will be done, for the content of the 3D 2-viewpoints separate ES transmission method, even when exchanging to the 3D output/display under the condition other than that the user instructs to exchange into 3D display/output of the 3D content). Next, the system control portion 51 determines if the present program is the 3D program or not, in accordance with the method mentioned above.

When the present program is the 3D program, the system control portion 51 firstly instructs the tuning control portion 59 to output the 3D video. The tuning control portion 59 upon receipt of the instruction mentioned above, first of all, obtains PID (packet ID) and an encoding method (for example, H.264/MVC, MPEG 2, H.264/AVC, etc.), for each of the main viewpoint video ES and the sub-viewpoint video ES mentioned above, from the program information analyze portion 54, and next, makes a control on the multiplex/demultiplex portion 29 to demultiplex the main viewpoint video ES and the sub-viewpoint video ES, thereby to output them to the video decoder portion 30.

Herein, the multiplex/demultiplex portion 29 is controlled, so that, for example, the main viewpoint video ES mentioned above is inputted into a first input of the video decode portion while the sub-viewpoint video ES mentioned above into a second input thereof. Thereafter, the tuning control portion 59 instructs the decode control portion 57 to transmit information indicating that the first input of the video decode portion 30 is the main viewpoint video ES while the second input thereof is the sub-viewpoint video ES and the respective encoding methods thereof, and also to decode those ES.

As a combining example 2 and/or a combining example 4 of the 3D 2-viewpoints separate ES transmission method shown in FIG. 47, in order to decode the 3D programs being different in the encoding methods thereof between the main viewpoint video ES and the sub-viewpoint video ES, it is enough that the video decode portion 30 is constructed to have plural numbers of decoding functions, corresponding to the encoding methods, respectively.

As a combining example 1 and a combining example 3 of the 3D 2-viewpoints separate ES transmission method shown in FIG. 47, in order to decode the 3D programs being same in the encoding methods thereof between the main viewpoint video ES and the sub-viewpoint video ES, it does not matter with if the video decode portion 30 is constructed to have only a decoding function corresponding to a single encoding method. In this case, the video decode portion 30 can be constructed, cheaply.

The decode control portion 57 receiving the instruction mentioned above executes decoding on the main viewpoint video ES and the sub-viewpoint video ES, respectively, and outputs the video signals for use of the left-side eye and for use of the right-side eye to the video conversion processor portion 32. Herein, the system control portion 51 instructs the video conversion control portion 61 to execute the 3D outputting process. The video conversion control portion 61 receiving the instruction mentioned above controls the video conversion processor portion 32, thereby to output the 3D video from the video output 41, or to display it on the display 47, which is equipped with the receiving apparatus 4.

About that 3D reproducing/outputting/displaying method will be given explanation, by referring to FIGS. 37A and 37B.

Figure 37A:
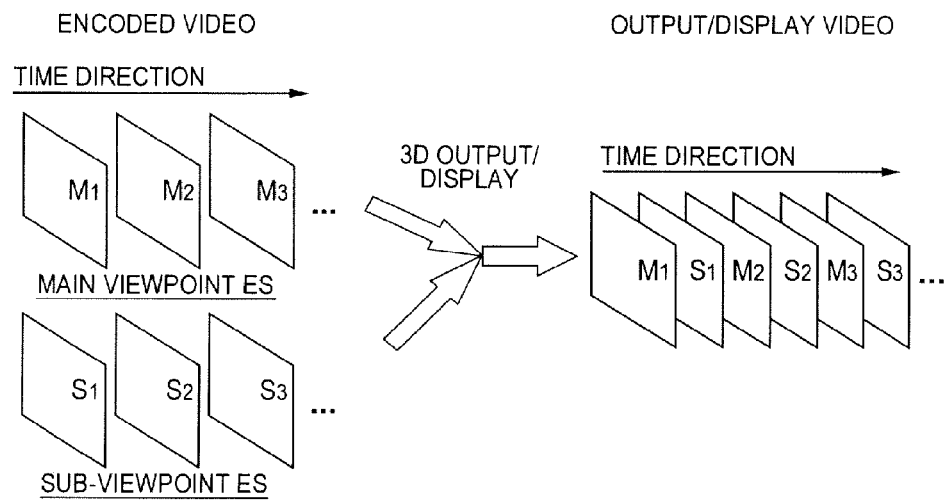
FIGS. 37A and 37B are views for explaining an example of a 3D reproducing/outputting/displaying process of the 3D content.

FIG. 37A is a view for explaining the reproducing/outputting/displaying method for dealing with output and display of a frame sequential method, which alternately displays and outputs the videos of the left and the right viewpoints of the 3D content of the 3D 2-viewpoints separate ES transmission method. Frame lines (M1, M2, M3 . . . ) in the left-side upper portion of the figure present plural numbers of frames, which are included in the main viewpoint (for use of the left-side eye) ES of the content of the 3D 2-viewpoints separate ES transmission method, frame lines (S1, S2, S3 . . . ) in the left-side lower portion of the figure present plural numbers of frames, which are included in the sub-viewpoint (for use of the right-side eye) ES of the content of the 3D 2-viewpoints separate ES transmission method, respectively. The video conversion processor portion 32 outputs/displays each frame of the main viewpoint (for use of the left-side eye)/sub-viewpoint (for use of the right-side eye) video signals inputted, as the video signals, alternately, as is shown by frame lines (m1, S1, M2, S2, M3, S3) on the right side in the figure. With such outputting/displaying method, it is possible to utilize a resolution at the maximum, at which each viewpoint can be displayed on the display, i.e., enabling the 3D display of high resolution.

In case where the method shown in FIG. 37A is applied in the system configuration shown in FIG. 36, as well as, outputting the video signals mentioned above, sync signals are outputted from the control signal 43, for enabling the video signals to be identified as that for use of the main viewpoint (for use of the left-side eye) and that for use of the sub-viewpoint (for use of the right-side eye), respectively. An external video outputting device receiving the video signals and the sync signals mentioned above outputs the videos of the main viewpoint (for use of the left-side eye) and the sub-viewpoint (for use of the right-side eye) by fitting the video signals with the sync signals, and also transmits the sync signals to the 3D view/listen assisting device, thereby enabling the 3D display. However, the sync signals to be outputted from the external video outputting device may be produced within that external video outputting device.

Also, when displaying the video signals mentioned above on the display 47, which is equipped with the receiving apparatus 4, with applying the method shown in FIG. 37A, in the system configuration shown in FIG. 35, the sync signals mentioned above are outputted from the equipment control signal transmit terminal 44, passing through the equipment control signal transmitter portion 53 and the control signal transmitter portion 33, so as to make the control (for example, exchanging light shutoff of the active shutter) on the external 3D view/listen assisting device; thereby conducting the 3D display.

Figure 37B:
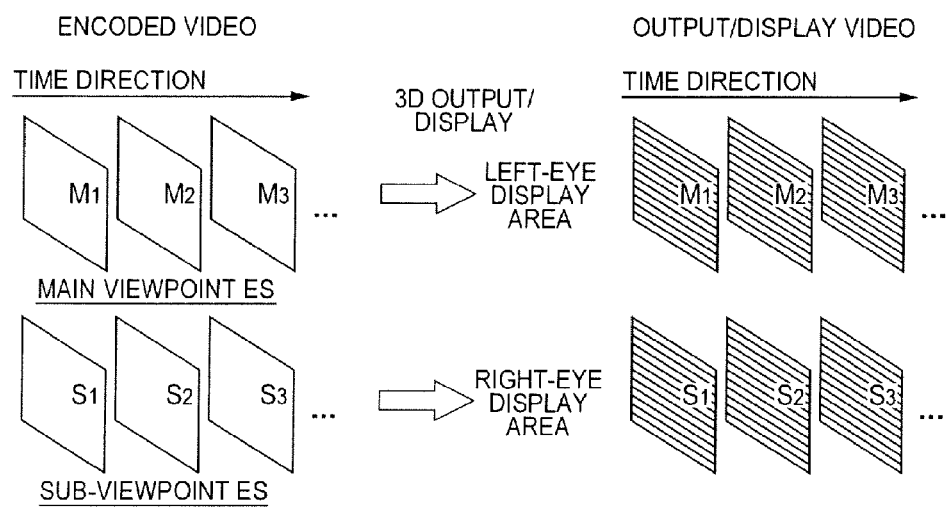

FIG. 37B is a view for explaining the reproducing/outputting/displaying method for dealing with output and display of a method for displaying the videos of the left and the right viewpoints of the 3D content of the 3D 2-viewpoints separate ES transmission method in different areas or regions of the display. With said method, the streams of the 3D 2-viewpoints separate ES transmission method are decoded in the video decode portion 30, and thereby executing the video conversion process in the video conversion processor portion 32. Herein, for the purpose of displaying the videos in the different areas or regions, there is a method of, for example, displaying them with using odd number lines and even number lines of the display as display areas or regions for use of the main viewpoint (the left-side eye) and for use of the sub-viewpoint (the right-side eye), respectively, and so on. Or, the display areas or regions may not be a unit of the line, for example, in the case of the display having different pixels for each viewpoint, a combination of plural numbers of pixels for use of the main viewpoint (the left-side eye) and a combination of plural numbers of pixels for use of the sub-viewpoint (the right-side eye) may be used as the display areas or regions, respectively. For example, with the display device of the polarization light method mentioned above, it is enough to output the videos having the polarization conditions, different from each other, corresponding to the respective polarization conditions of the left-side eye and the right-side eye of the 3D view/listen assisting device, from the different areas or regions mentioned above. With such outputting/displaying method, the resolution at which each viewpoint can be displayed on the display comes to be less than that of the method shown in FIG. 37A; however the video for use of the main viewpoint (the left-side eye) and the video for use of the sub-viewpoint (the right-side eye) can be outputted/displayed at the same time, and there is no necessity of displaying them alternately. With this, it is possible to obtain the 3D display having fewer flickers than those with the method shown in FIG. 37A.

However, in any system configuration shown in FIG. 35 or 36, the 3D view/listen assisting device may be polarization separation glasses, when applying the method shown in FIG. 37B, and there is no necessity, in particular, for executing an electronic control. In this case, the 3D view/listen assisting device can be supplied, with a price much cheaper.

<2D Outputting/Displaying Process of 3D Content of 3D 2-Viewpoints Separate ES Transmission Method>

Operations when executing 2D output/display on the 3D content of the 3D 2-viewpoints separate ES transmission method will be explained hereinafter. When the user gives an instruction to exchange to the 2D video (for example, pushing down "2D" button on the remote controller), the user instruction receive portion 52, receiving the key code mentioned above, instructs the system control portion 51 to exchange the signal to the 2D video (however, in the processing given hereinafter, a similar process will be done, even when exchanging into the 2D output/display under the condition other than that the user instructs to exchange into 2D display/output of the 3D content of the 3D 2-viewpoints separate ES transmission method). Next, the system control portion 51 gives an instruction to the tuning control portion 59, at first, to output the 2D video therefrom.

The tuning control portion 59 receiving the instruction mentioned above, firstly obtains PID of the ES for use of the 2D video (i.e., the main viewpoint ES mentioned above, or an ES having a default tag) from the program information analyze portion 54, and controls the multiplex/demultiplex portion 29 to output the ES mentioned above towards the video decoder portion 30. Thereafter, the tuning control portion 59 instructs the decode control portion 57 to decode the ES mentioned above. Thus, with the 3D 2-viewpoints separate ES transmission method, because the sub-stream or ES differs from, between the main viewpoint and the sub-viewpoint, it is enough to decode only the sub-stream or ES of the main viewpoint.

The decode control portion 57 receiving the instruction mentioned above control the video decoder portion 30, so as to decode the ES mentioned above, and outputs the video signal to the video conversion processor portion 32. Herein, the system control portion 51 controls the video conversion control portion 61 to make the 2D output of the video. The video conversion control portion 61 receiving the above-mentioned instruction for the system control portion 51 outputs the 2D video signal from the video output terminal 41 towards the video conversion processor portion 32, or executes such a control on the display 47 that it displays the 2D video thereon.

Figure 38:
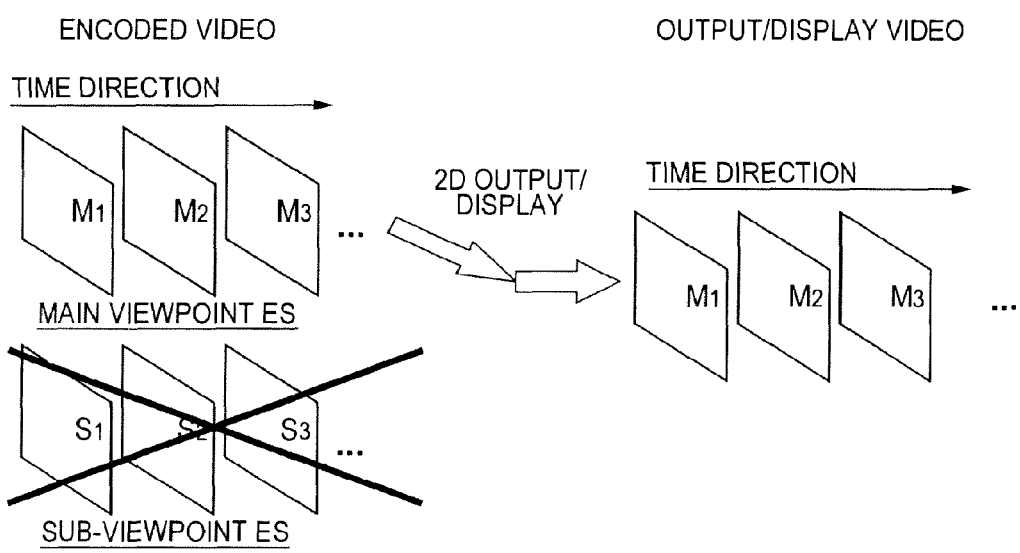
FIG. 38 is a view for explaining an example of a 2D reproducing/outputting/displaying process of the 3D content.

Explanation will be give about said 2D outputting/displaying method, by referring to FIG. 38. Although the configuration of the encoded video is same to that shown in FIG. 37, however since the second ES (i.e., the sub-viewpoint ES) is not decoded in the video decoder portion 30, as was explained in the above, the video signal of one side, which is decoded in the video conversion processor portion 32, is converted into the 2D video signal, as is shown by the frame lines (M1, M2, M3 . . . ) on the right-hand side in the figure, to be outputted. In this manner is executed the outputting/displaying of the 2D.

Herein, although the description is made about the method of not executing the decoding on the ES for use of the right-side eye as the method for outputting/displaying 2D; however, the 2D display may be executed, by decoding both the ES for use of the left-side eye and the ES for use of the right-side, and by executing a process of culling or thinning out in the video conversion processor portion 32. In that case, since no process for decoding and/or no process for exchanging the demultiplexing process are needed, there can be expected an effect of reducing the exchanging time and/or simplification of software processing, etc.

<3D Outputting/Displaying Process of 3D Content of Side-by-Side Method/Top-and-Bottom Method>

Next, explanation will be made on a process for reproducing the 3D content when the video for use of the left-side eye and the video for use of the right-side eye in one (1) video ES (for example, in case where the video for use of the left-side eye and the video for use of the right-side eye are stored in one (1) 2D screen, like the Side-by-Side method or the Top-and-Bottom method). Similar to that mentioned above, when the user gives an instruction to exchange into the 3D video, the user instruction receive portion 52 receiving the key code mentioned above instructs the system control portion 51 to exchange into the 3D video (however, in the processing given hereinafter, a similar process will be done, even when exchanging into the 2D output/display under the condition other than that the user instructs to exchange into 2D output/display of the 3D content of the Side-by-Side method or the Top-and-Bottom method). Next, the system control portion 51 determines, similarly with the method mentioned above, if the present program is the 3D program or not.

If the present program is the 3D program, the system control portion 51 firstly instructs the tuning control portion 59 to output the 3D video therefrom. The tuning control portion 59 receiving the instruction mentioned above obtains PID (e.g., packet ID) of the 3D video ES, including the 3D video therein, and the encoding method (for example, MPEG 2, H.264/AVC, etc.) from the program information analyze portion 54, and next it controls the multiplex/demultiplex portion 29 to demultiplex the above-mentioned 3D video ES, thereby to output it towards the video decoder portion 30, and also controls the video decoder portion 30 to execute the decoding process corresponding to the encoding method, thereby to output the video signal decoded towards the video conversion processor portion 32.

Herein, the system control portion 51 instructs the video conversion control portion 61 to execute the 3D outputting process. The video conversion control portion 61, receiving the instruction mentioned above from the system control portion 51, instructs the video conversation processor portion 32 to divide the video signal inputted into the video for use of the left-side eye and the video for use of the right-side eye and to treat a process, such as, scaling, etc. (details will be mentioned later). The video conversation processor portion 32 outputs the video signal converted from the video output portion 41, or displays the video on the display, which is equipped with the receiving apparatus 4.

Explanation will be given about said reproducing/outputting/displaying method of the 3D video, by referring to FIGS. 39A and 39B.

FIG. 39A is a view for explaining the reproducing/outputting/displaying method for dealing with the output and the display of the frame sequential method, which displays and outputs, alternately, the videos of the left and the right viewpoints of the 3D content of the Side-by-Side method or the Top-and-Bottom method. Although illustration is given together with the explanation of the Side-by-Side method and the Top-and-Bottom method, as the encoded videos; however, since an aspect differing from between the both lies only in that, the arrangement of the video for use of the left-side eye and the video for use of the right-side eye within the video, therefore in the explanation, which will be given hereinafter, the explanation will be made by using the Side-by-Side method, but the explanation of the Top-and-Bottom method be omitted. The frame line (L1/R1, L2/R2, L3/R3 . . . ) shown on the left-hand side in the figure presents the video signal of the Side-by-Side method, in which the videos for use of the left-side eye and for use of the right-side eye are arranged on the left side/the right side of one (1) frame. In the video decoder portion 30 are decoded the video signals of the Side-by-Side method, under the condition of being disposed on the left side/the right side of one (1) frame of the videos for use of the left-side eye and for use of the right-side eye, and in the video conversion processor portion 32, each frame of the decoded video signals of the Side-by-Side method mentioned above is divided to be the video for use of the left-side eye or the video for use of the right-side eye, and is further treated with the scaling (i.e., carrying out extension/interpolation so as to fit to the horizontal size of an output video, or compression/thinning, etc.). Further, as is shown by the frame line (L1, R1, L2, R2, L3, R3 . . . ) on the right-hand side in the figure, the frames are outputted, alternately, as the video signals.

In FIG. 39A, since the process after converting the frames, alternately, into output/display signals to be outputted/displayed, and the outputting of the sync signal and/or the control signal, etc., is same to the 3D reproducing/outputting/displaying process of the 3D content of the 3D 2-viewpoints separate ES transmission method, which was already explained in FIG. 37A, previously, therefore the explanation thereof will be omitted here.

Figure 39B:
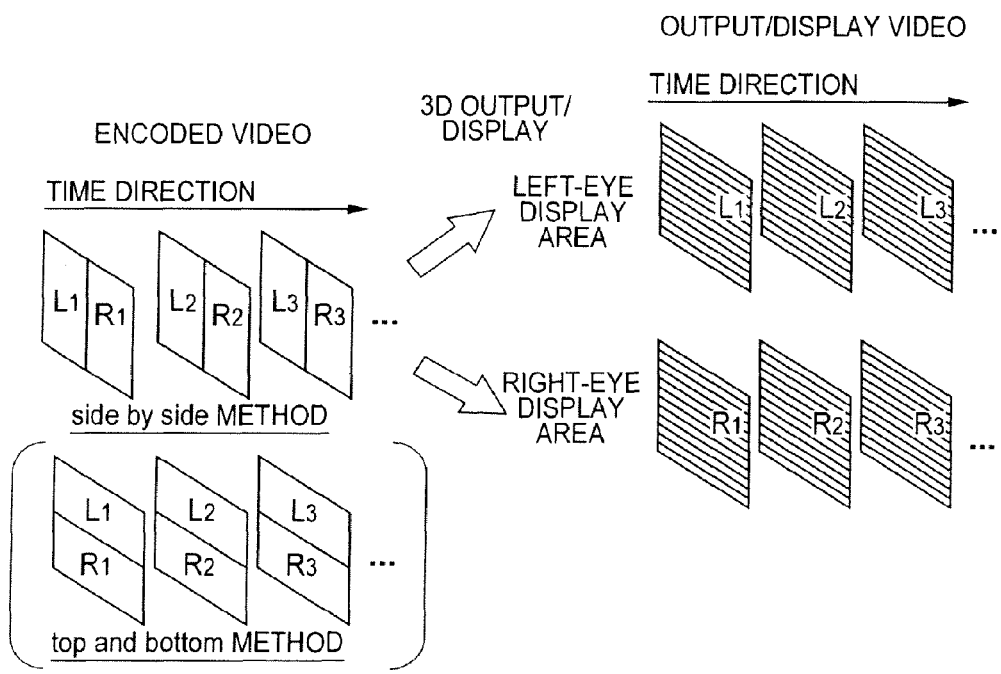

FIG. 39B is a view for explaining a reproducing/outputting/displaying method for dealing with the output and/or display of a method of displaying the videos having the left/right viewpoints of the 3D content, of the Side-by-Side method or the Top-and-Bottom method, in the different areas or regions on the display. In similar as is shown in FIG. 39A, although there is described and illustrated the explanation of the Side-by-Side method and the Top-and-Bottom method, together with, as the encoded video; however, since an aspect differing from between the both lies only in the arrangement of the video for use of the left-side eye and the video for use of the right-side eye within the video, therefore in the explanation, which will be given hereinafter, the explanation will be given with using the Side-by-Side method, but the explanation of the Top-and-Bottom method be omitted. The frame line (L1/R1, L2/R2, L3/R3 . . . ) shown on the left-hand side in the figure presents the video signal of the Side-by-Side method, in which the videos for use of the left-side eye and for use of the right-side eye are arranged or disposed on the left side/the right side of one (1) frame. In the video decoder portion 30 are decoded the video signals of the Side-by-Side method, under the condition of being disposed on the left side/the right side of one (I) frame of the videos for use of the left-side eye and for use of the right-side eye, and in the video conversion processor portion 32, each frame of the decoded video signals of the Side-by-Side method mentioned above is divided to be the video for use of the left-side eye or the video for use of the right-side eye, and is further treated with the scaling (i.e., carrying out extension/interpolation so as to fit to the horizontal size of an output video, or compression/thinning, etc.). Further, the video for use of the left-side eye and the video for use of the right-side eye, on which the scaling is treated, are outputted or displayed in the different areas or regions. Similar to the explanation given in FIG. 37B, herein, for the purpose of displaying the videos in the different areas or regions, there is a method of, for example, displaying them with using odd number lines and even number lines of the display as display areas or regions for use of the main viewpoint (the left-side eye) and for use of the sub-viewpoint (the right-side eye), respectively, and so on. As other than that, but the process for displaying in the different regions and the method for displaying on the display device of the polarization light method are similar to the 3D reproducing/outputting/displaying process for the 3D content of the 3D 2-viewpoints separated ES transmission method, which was explained in FIG. 37B, and therefore the explanation thereof will be omitted herein.

With the method shown in FIG. 39B, there is a case where the respective vertical resolutions must be reduced, when outputting or displaying the video for use of the left-side eye and the video for use of the right-side eye on the odd-numbered lines and the even-numbered of the respective displays, even if the vertical resolution of the display is equal to the vertical resolution of the input video; however, in such case, it is also enough to execute the thinning corresponding to the display regions for the video for use of the left-side eye and the video for use of the right-side eye, in the scaling process mentioned above.

<2D Output/Display Process for 3D content of Side-by-Side Method/Top-and-Bottom Method>

Explanation will be given about the operations of each portion when displaying the 3D content of the Side-by-Side method or the Top-and-Bottom method, below. When the user instructs to exchange into the 2D video (for example, pushing down "2D" key on the remote controller, the user instruction receive portion 52 receiving the key code mentioned above instructs the system control portion 51 to exchange the signal into the 2D video (however, in processing given hereinafter, a similar process will be done, even when exchanging into the 2D output/display under the condition other than that the user instructs to exchange into 2D output/display of the 3D content of the Side-by-Side method or the Top-and-Bottom method). The system control portion 51 receiving the instruction mentioned above instructs the video conversion control portion 61 to output the 2D video therefrom. The video conversion control portion 61, receiving the instruction mentioned above from the system control portion 51, controls the video conversion processor portion 32 to output the 2D video responding to the inputted video signal mentioned above.

Figure 40A:
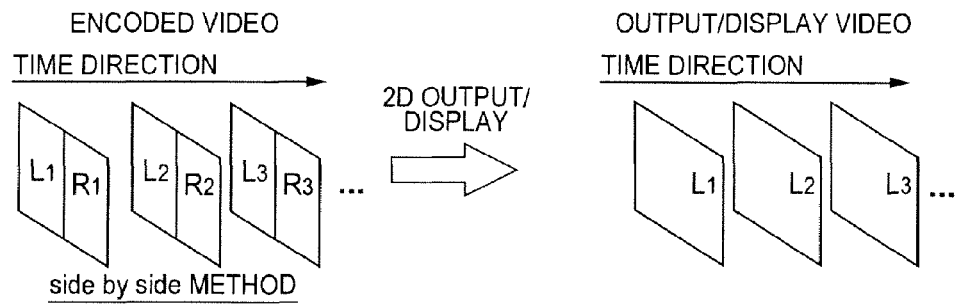
FIGS. 40A to 40D are views for explaining an example of a 2D reproducing/outputting/displaying process of the 3D content.

Explanation will be given on the existing 2D output/display method, by referring to FIGS. 40A through 40D. FIG. 40A illustrates the explanation of the Side-by-Side method, while FIG. 40B the Top-and-Bottom method; however, in either of them, the difference lies only in the arrangements of the video for use of the left-side eye and the video for use of the right-side eye within the video, and therefore the explanation will be made by referring to the Side-by-Side method shown in FIG. 40A. The frame line (L1/R1, L2/R2, L3/R3 . . . ) shown on the left-hand side in the figure presents the video signal of the Side-by-Side method, in which the video signals for use of the left-side eye and for use of the right-side eye are disposed on the left side/the right side of one (1) frame. The video conversion processor portion 32 divides each frame of the above-mentioned video signal of the Side-by-Side method, which is inputted, into each frame of the video for use of the left-side eye or the video for use of the right-side eye, and thereafter treats the scaling only upon a portion of the main viewpoint video (e.g., the video for use of the left-side eye); thereby outputting only the main viewpoint video (e.g., the video for use of the left-side eye) as the video signal, as is shown by the frame line (L1, L2, L3 ... ) on the right-hand side in the figure.

The video conversion processor portion 32 outputs the video signal, being conducted with the process mentioned above, as the 2D video from the video output portion 41, and also outputs the control signal from the control signal output portion 43. In this manner, the 2D output/display is conducted.

Figure 40B:
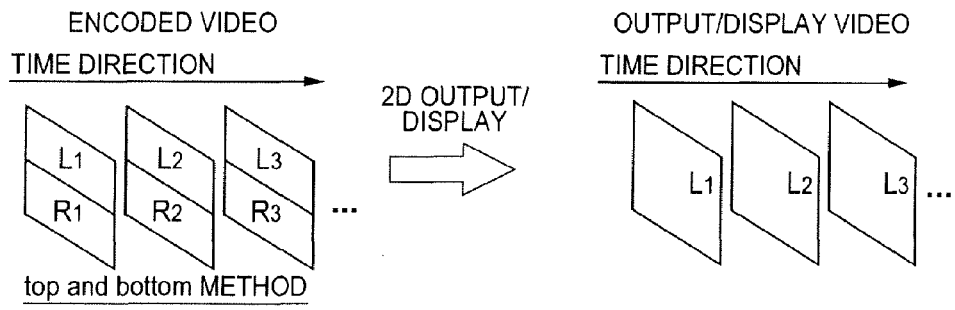
Figure 40C:
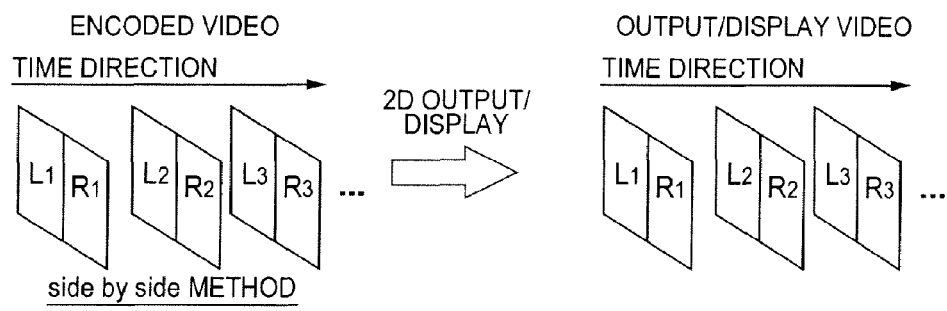
Figure 40D:
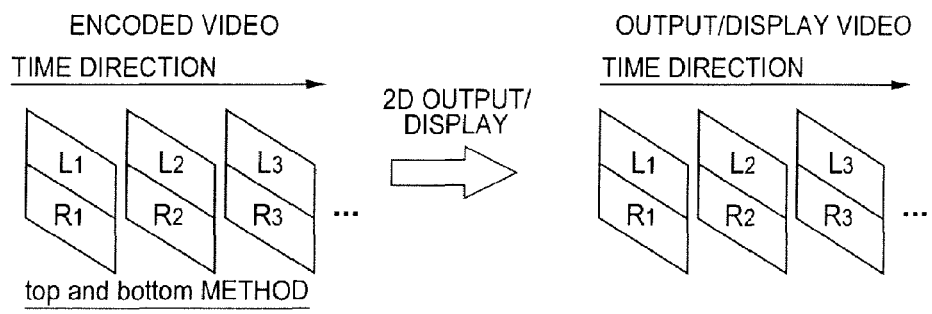

However, there is an example of doing the 2D output/display while keeping the 3D content of the Side-by-Side method or the Top-and-Bottom method, as it is, i.e., storing 2 viewpoints in one (1) screen, and such a case will be shown in FIGS. 40C and 40D. For example, as is shown in FIG. 36, in case where the receiving apparatus and the viewing/listening device are separated in the structures thereof, etc., the video may be outputted from the receiving apparatus, while keeping to store the videos of the 2 viewpoints of Side-by-Side method or the Top-and-Bottom method in one (1) screen, and the conversion for the 3D display may be conducted in the viewing/listening device.

<Example of 2D/3D Video Display Process Upon Basis of if Present Program is 3D Content or not>

Next, explanation will be given about an output/display process of the content, in particular, when the present program is 3D content, or the present program becomes the 3D content. In regard with viewing/listening of the 3D content when the present program is the 3D content program or when it becomes the 3D content program, if the display of the 3D content is done, unconditionally, then the user cannot view/listen that content; i.e., there is a possibility of spoiling the convenience for the user. On the contrary to this, if doing the processing, which will be shown blow; it is possible to improve the convenience for the user.

Figure 41:
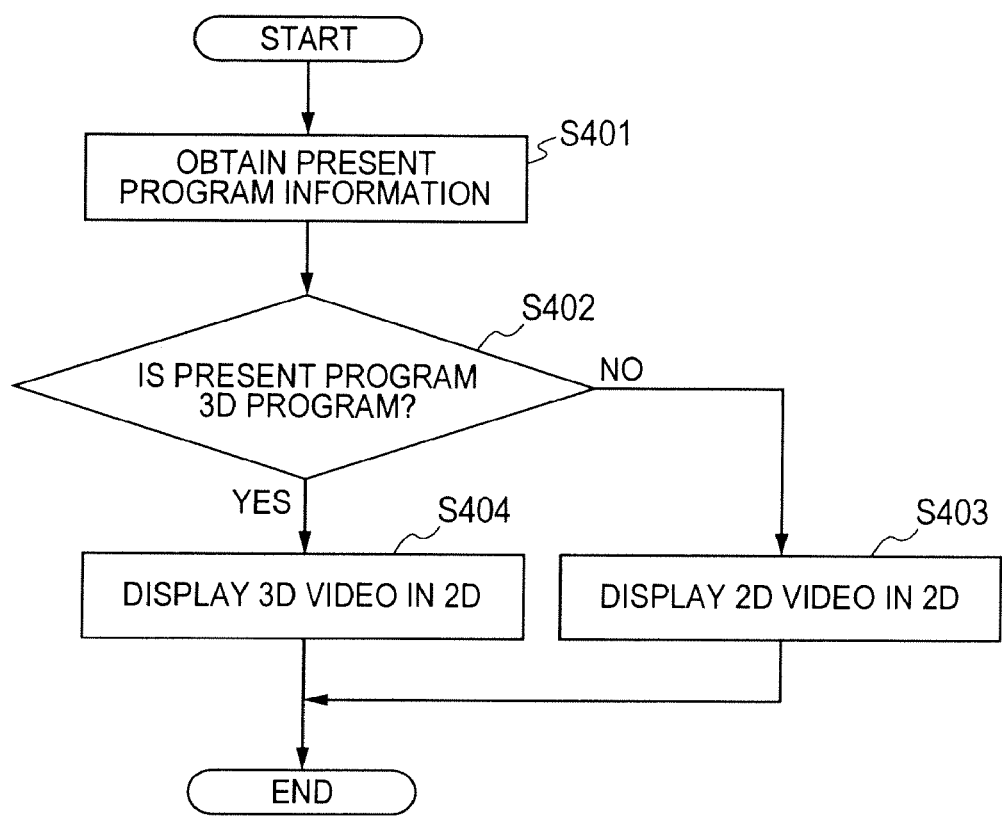
FIG. 41 is a view for showing an example of a flowchart of a 2D/3D video displaying process upon basis of whether a present program is 3D content or not.

FIG. 41 shows an example of a flow of processes of the system control portion 51, which is executed at an opportunity, such as, change of the present program and/or the program information at the time when the program is exchanged. The example shown in FIG. 41 is a flow for executing the 2D display, at first, of one viewpoint (for example, the main viewpoint), even if being the 2D program or the 3D program.

The system control portion 51 obtains the program information of the present program from the program information analyze portion 54, so as to determine if the present program is the 3D program or not, with the method for determining the 3D program mentioned above, and further obtain the 3D method type of the present program (for example, determined from the 3D method type, which is described in the 3D program details descriptor, such as, 2-viewpoints separate ES transmission method/Side-by-Side method, etc.), from the program information analyze portion 54 (S401). However, the program information of the present program may be obtained, periodically, not limited to the time when the program is exchanged.

As a result of determination, if the present program is not the 3D program ("no" in S402), such a control is conducted that the video of 2D is displayed in 2D (S403).

If the present program is the 3D program ("yes" in S402), the system control portion 51 executes such a control that one viewpoint (for example, the main viewpoint) of the 3D video signal is displayed in 2D, in the format corresponding to the respective 3D method type, with the methods, which are explained in FIGS. 38 and 40A and 40B (S404). In this instance, a display indicative of being the 3D program may be displayed on the 2D display video of the program, superimposing it thereon. In this manner, when the present program is the 3D program, the video of the one viewpoint (for example, the main viewpoint) is displayed in 2D.

Further, also when the present program is change due to conduction of the tuning operation, such flow as was mentioned above shall be executed in the system control portion 51.

In this manner, when the present program is the 3D program, for the time being, the video of one viewpoint (for example, the main viewpoint) is displayed in 2D. With doing so, for the time being, the user can view/listen it, in the similar manner to that when being the 2D program, if the user is not ready for the 3D viewing/listening, such as, the user does not wear the 3D view/listen assisting device, etc. In particular, in case of the 3D content of the Side-by-Side method or the Top-and-Bottom method, not outputting the video as it is, i.e., storing 2 views in one (1) screen, as is shown in FIGS. 40C and 40D, but outputting/displaying the video of one viewpoint in 2D, as is shown in FIGS. 40A and 40B, it is possible, for the user, to view/listen the 3D program, in the similar manner to that of the 2D program, ordinarily, but without giving an instruction to display the video of one viewpoint between those of the two (2) viewpoints stored in one (1) screen, by the user, manually, through the remote controller, etc.

Figure 42:
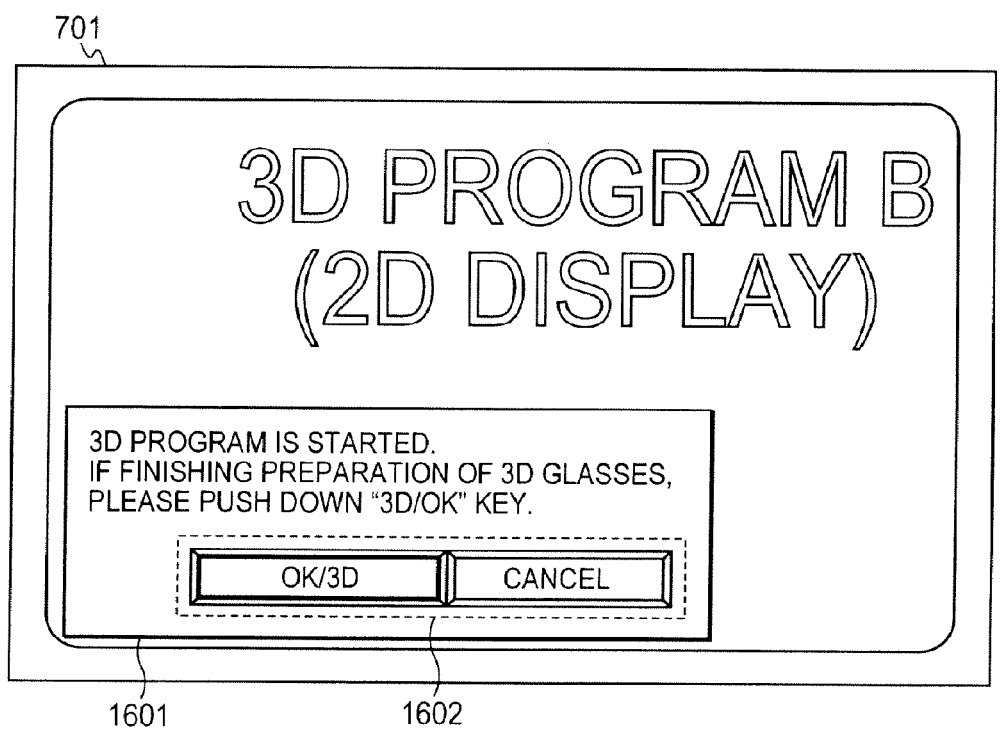
FIG. 42 is a view for showing an example of a message display.

Next, FIG. 42 shows an example of a message, the video of which is displayed in 2D in the step S404 and is displayed by the system control portion 51 through the OSP produce portion 60. With this, a message is displayed for informing the user that the 3D program is started, and further an object 1602 (hereinafter, being called "a user response receiving object; for example, a button in the OSD) for the user to make a response thereto, is displayed thereon, so as to let her/him to select the operation thereafter.

Upon display of the message 1601, for example, when the user pushes down an "OK" button on the remote controller, the user instruction receive portion 52 inform the system control portion 51 that the "OK" is pushed down.

As an example of a method for determining the user selection on the screen display shown in FIG. 42, for example, when the user, operating the remote controller, pushes down a <3D> button on the remote controller through operation by the user on the remote controller, or when she/he pushes down the <OK> button on the remote controller while fitting a cursor to "OK/3D" on the screen, the user selection is determined as "exchange to 3D".

Also, when the user pushes down a <cancel> button or a <return> button on the remote controller, or when she/he pushes down the <OK> while fitting the cursor to "cancel" on the screen, the user selection is determined is "other than exchange to 3D". Other than those, for example, when such an operation is made that it brings the condition indicative of, if preparation is completed or not, by the user, for the 3D viewing/listening (i.e., 3D view/listen preparation condition), into "OK" (for example, wearing the 3D glasses), then the user selection comes to "exchange to 3D".

Figure 43:
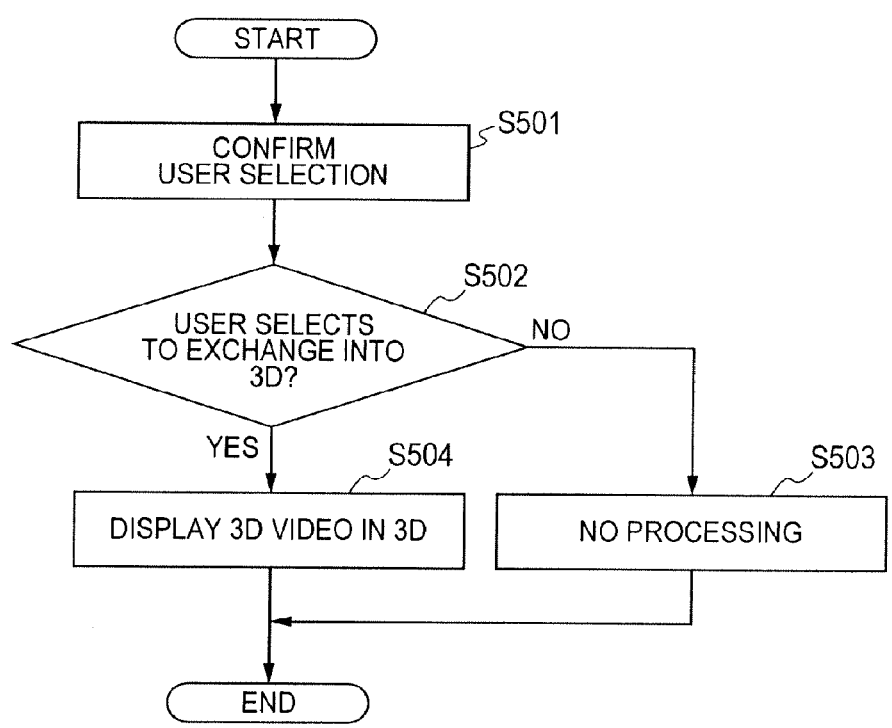
FIG. 43 is a view for showing an example of a flowchart of display processing process after user selection.

A flow of processes in the system control portion 51, to be executed after the user selects is shown in FIG. 43. The system control portion 51 obtains a result of the user select from the user instruction receive portion 52 (S501). If the user select is not "exchange to 3D" ("no" in S502), then the video ends while being displayed in 2D, no particular process is executed.

If the user select is "exchange to 3D" ("yes" in S502), the video is displayed in 3D in accordance with the 3D displaying method mentioned above.

With the flow mentioned above, when the 3D program starts, it is possible for the user to view/listen the video in 3D by outputting/displaying the 3D video, when she/he wishes to do the 3D viewing/listening, such as, when the user has done the operations and/or preparation for 3D viewing/listening, while outputting/displaying the video of the one viewpoint.

However, in the example of display shown in FIG. 42, although the object is displayed for the user to respond; however, it may be only that of displaying a letter, or a logo or a mark, etc., only for indicating that said program is that enabled with "3D view/listen", such as, simply, "3D program", etc. In this case, for the user recognizing that the program is enabled with "3D view/listen", it is enough to push down the "3D" key on the remote controller, so as to exchange from the 2D display into the 3D display at an opportunity of a notice from the user instruction receive portion 52, which receives the signal from that remote controller, to the system control portion 51.

Further, as other example of the message display to be displayed in the step S404, there may be considered a method, displaying only "OK", simply, but also clearly indicating or asking if the method for displaying the program should be that for the 2D video or for the 3D video. Examples of the message and the user response receiving object in that case are shown in FIG. 44.

With doing so, comparing to such display "OK" as is shown in FIG. 42, other than for the user it is possible to decide the movement after pushing down the button, easily, it is possible to instruct to display in 2D, in a clear manner, etc. (i.e., the user 3D view/listen preparation condition is determined "NG"

when pushing down "watch in 2D" described by 1202,), the convenience can be increased.

Figure 44:
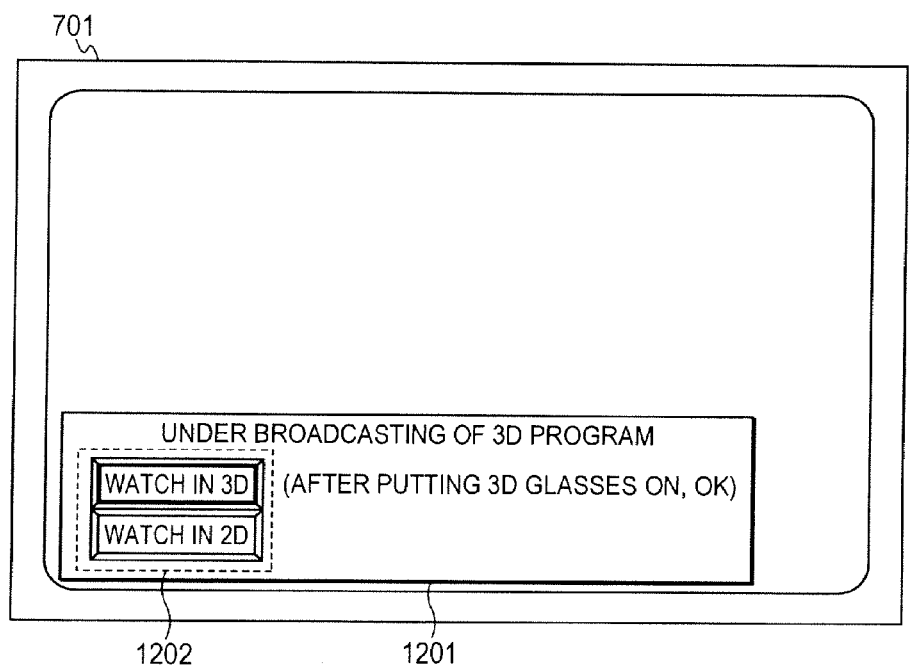
FIG. 44 is a view for showing an example of a message display.
Figure 52A:
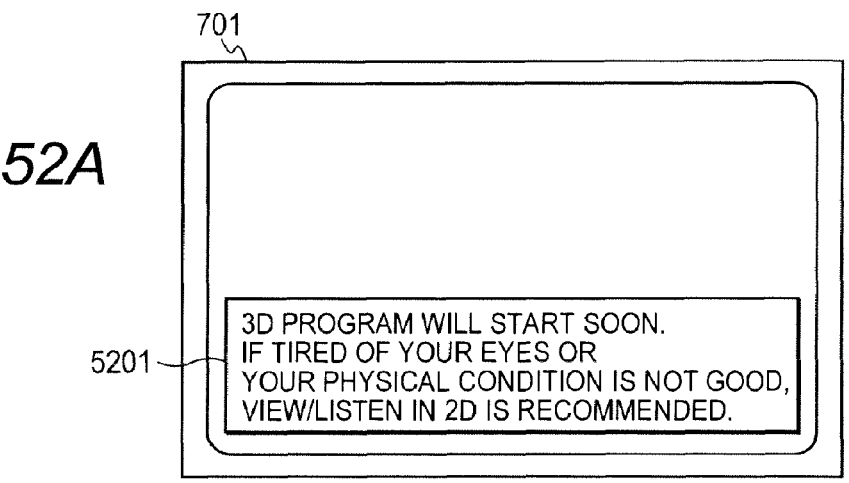
FIGS. 52A to 52C are views for showing an example of a message display.
Figure 52B:
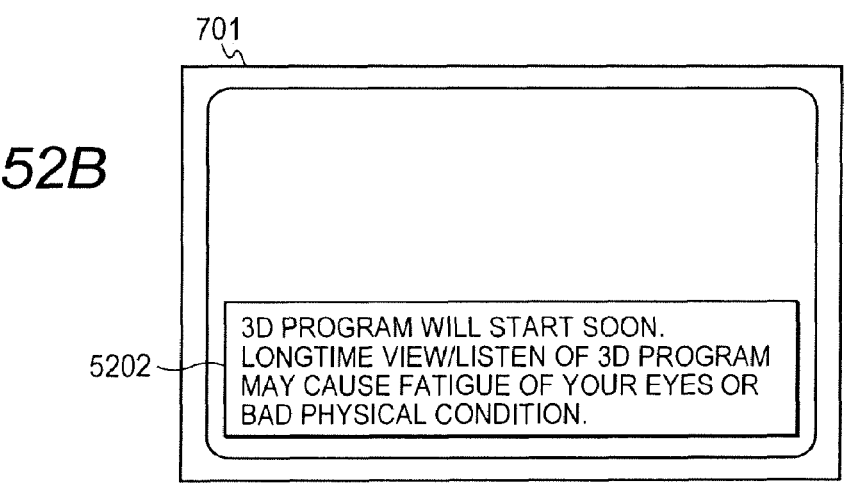
Figure 52C:
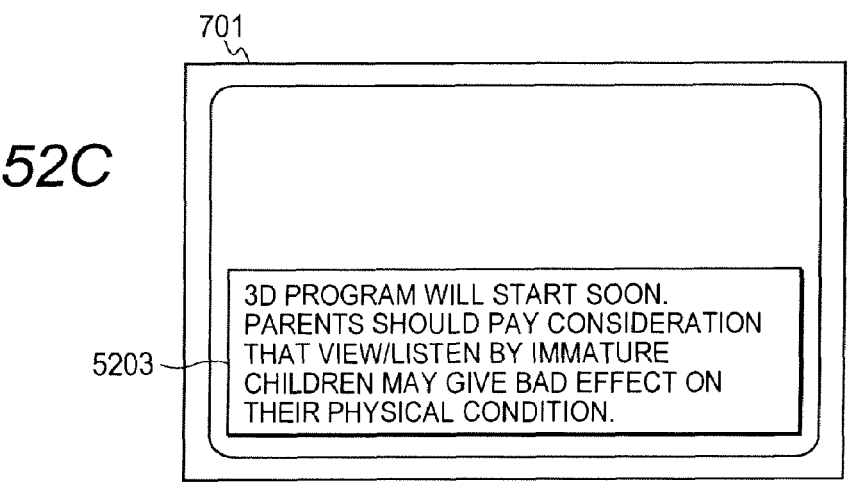

In the place of such message display as was shown in FIG. 42 or 44 (e.g., the message shown by 1601 or 1201), it can be considered to display a message for calling an attention, such as, those shown by 5201, 5202 and 5203 in FIGS. 52A through 52C. By displaying such message as shown by 5201, it is possible to propose the user, to view/listen the video in 2D by taking her/his health into the consideration, or by displaying such message as shown by 5202, to call an attention of her/his health to the user, or to call an attention to parents of the viewing/listening by their child(ren), such as that shown by 5203.

Further, together with those messages, the user response receiving object shown in FIG. 42 or 44 may be displayed on the screen. In that case, the user can make an operation for exchanging the video between 2D/3D, while confirming the message mentioned above.

As timing for displaying those messages shown in FIGS. 52A, 52B and 52C, it is preferable at the time before the program starts, as is shown by the example mentioned above, for the user to prepare the viewing/listening. Also, it/they can be displayed after the program starts, or at the time when executing exchange into the 3D video. When displaying the message at the time when the program starts, since it is a time point of exchange of the video, there can be brought about such a merit that it is easy to make the user recognize that it is the massage relating to that program; i.e., causing the attention, easily. Also, with the message display at the timing when the video exchanges into the 3D video (for example, when the user pushes down the 3D button), since the possibility that the user is doing the operation is high, there can be obtained a merit that the possibility is high for the user to view the message.

At the same time of displaying those messages shown in FIGS. 52A, 52B and 52C, it can be also considered to reproduce or output sound effects. In that case, there can be obtained an effect of attracting the user to the attention of the message mentioned above. The sound effects mentioned above may be transmitted, after being multiplexed on the audio ES or the data broadcast ES, on the side of the broadcasting station, and may be reproduced and/or outputted by the receiving apparatus, for example. Or, the sound effects, which the receiving apparatus has therein, may be reproduced and/or outputted (for example, the data thereof is read out within the audio decoder portion 31, or from a ROM or the recording medium 26, to be outputted after being decoded).

Next, in relation to the 3D content, explanation will be given on an example of outputting a specific video/audio or muting the video/audio (e.g., a black screen display/stop of display and stop of audio output), when starting the 3D program view/listen. This is because there is a possibility of losing the convenience for the user, since the user cannot view/listen the that content if starting the display of the 3D content, unconditionally, when the user starts the view/listen of the 3D program. On the contrary to this, by executing the processing, which will be shown below, it is possible to improve the convenience of the user.

Figure 45:
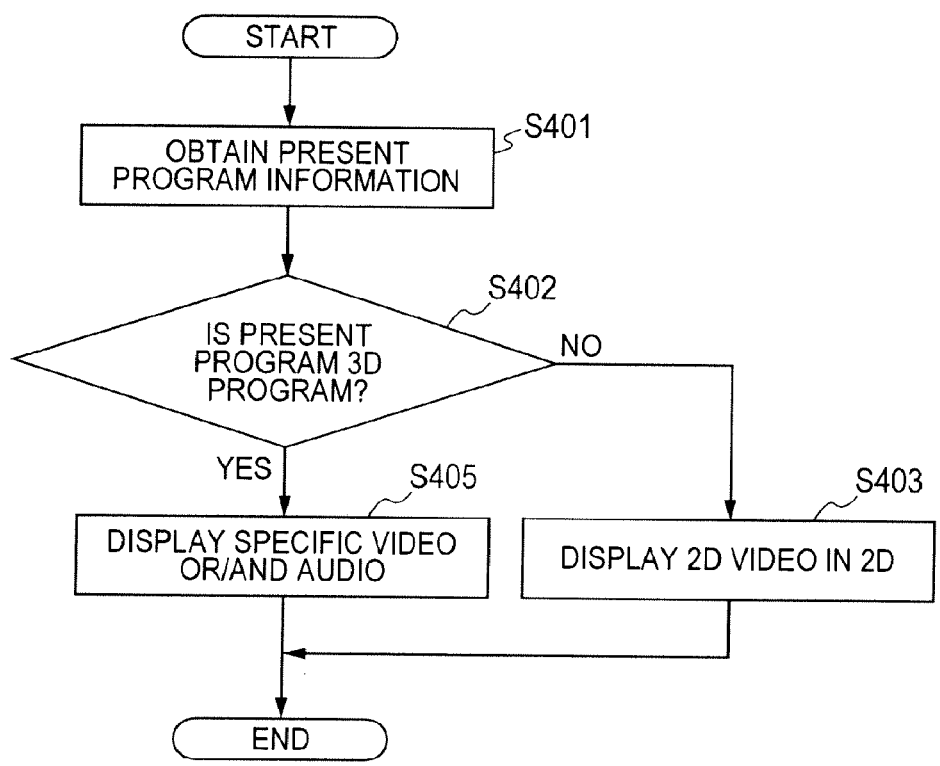
FIG. 45 is a view for showing an example of a flowchart of a 2D/3D video displaying process upon basis of whether a present program is 3D content or not.

A processing flow executed in the system control portion 51 when the 3D program starts is shown in FIG. 45. An aspect differing from the processing flow shown in FIG. 41 lies in that a step for outputting a specific video/audio (S405) is added, in the place of the processing of S404.

As the specific video/audio mentioned herein can be listed up, if it is the video, a message of paying an attention to preparation of 3D, a black screen, s still picture of the program, etc., while as the audio can be listed up a silence, or music of fixed pattern (e.g., an ambient music), etc.

With displaying a video of fixed pattern (e.g., a message or an ambient picture, or the 3D video, etc.), it can be achieved by reading out the data thereof, from the inside of the video decoder portion 30 or the ROM not shown in the figure or the recording medium 26, thereby to be outputted after being decoded. With outputting the black screen, it can be achieved by, for example, the video decoder portion 30 outputting the video of signals indicating only a black color, or the video conversion processor portion 32 outputting the mute or the black video as the output signal.

Also, in case of the audio of fixed pattern (e.g., the silence or the ambient music), in the similar manner, it can be achieved by reading out the data, for example, within the audio decoder portion 31 or from the ROM or the recording medium 26, thereby to be outputted after being decoded, or by muting the output signal, etc.

With outputting of the still picture of the program video, it can be achieved by giving an instruction of a pause of the reproduction of program or the video, from the system control portion 51 to the recording/reproducing control portion 58. The processing in the system control portion 51, after execution of the user selection, will be carried out, in the similar manner mentioned above, as was shown in FIG. 43.

With this, it is possible to achieve no output of the video and the audio of the program, during the time period until when the user completes the preparation for 3D view/listen.

Figure 46:
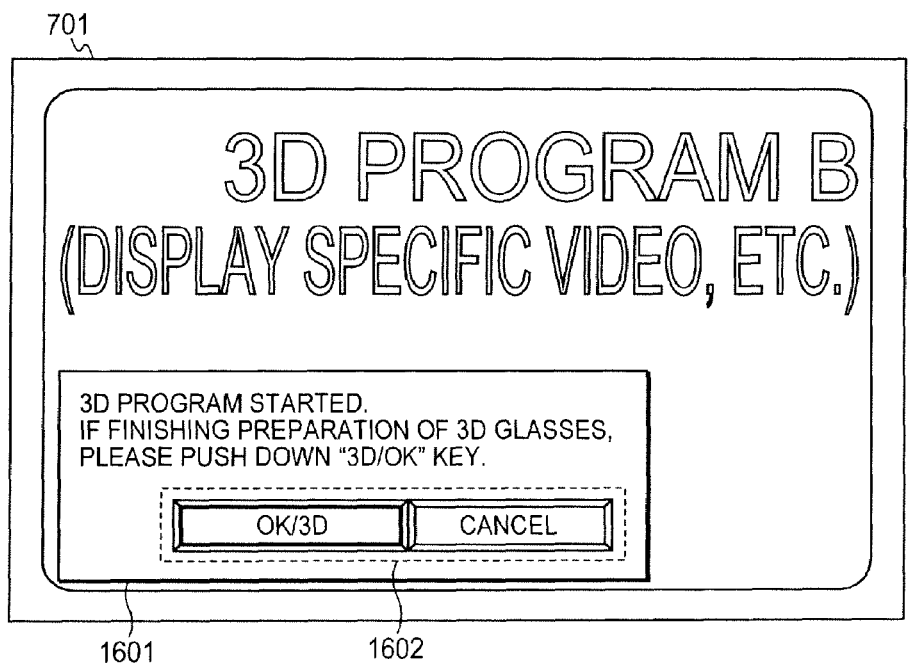
FIG. 46 is a view for showing an example of a message display.

In the similar manner to the example mentioned above, as the message display to be displayed in the step S405, it is as shown in FIG. 46. An aspect differing from those shown in FIG. 42 lies only in the video and the audio, which are displayed; but, the configurations of the message and/or the user response receiving object to be displayed and the operation of the user response receiving object are same to those.

Regarding display of the message, not only displaying "OK", simply, as was shown in FIG. 46, but there can be considered a manner of clearly indication or asking if the display method of the program should be the 2D video or the 3D video. Examples of the message and the user response receiving object in that case can be displayed, similar to those shown in FIG. 44, and if doing so, comparing to such display of "OK" as was mentioned above, in addition to that the user can easily decide the operation (s) after pushing down the button, she/he can instruct the display in 2D, clearly, etc.; i.e., the convenience is increased, in the similar manner to that of the example mentioned above.

<Example of Processing Flow for Displaying 2D/3D Video Upon Basis of if Next Program is 3D Content or Not>

Next, explanation will be given on an outputting/displaying process for the content when the next program is the 3D content. In relation to the view/listen of the 3D content program, i.e., being said next program when the next coming program is the 3D content, there is a possibility of losing the convenience for the user, since the user cannot view/listen that content under the best condition, if display of the 3D content starts, irrespective of the fact that the user is not in the condition of enabling to view/listen the 3D content. On the contrary to this, with doing such processing as will be shown blow, it is possible to improve the convenience for the user.

Figure 27:
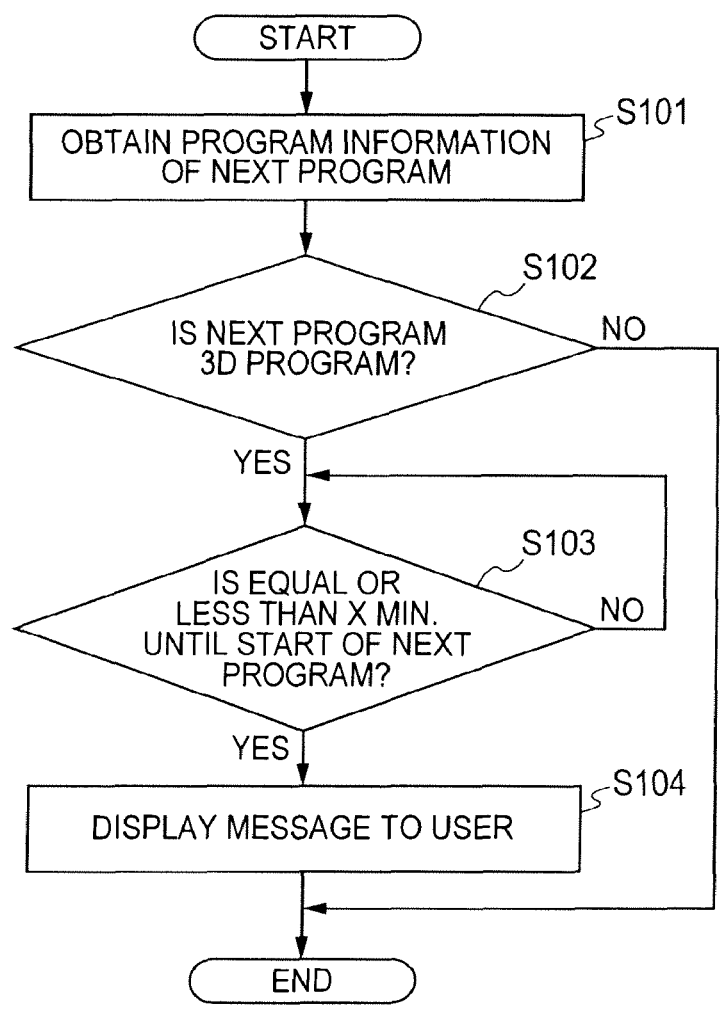
FIG. 27 is a view for showing an example of a flowchart of a 2D/3D video displaying process upon basis of whether a next program is 3D content or not.

FIG. 27 shows an example of a flow to be executed in the system control portion 51, when the time-period until starting of the next program is changed due to the tuning process or the like, or when it is determined that the time of starting of the next program is changed, because of the staring time of the next program, which is included in the EIT of the program information transmitted from the broadcasting station, or the information of ending time of the present program, etc. First of all, the system control portion 51 obtains the program information of the next coming program from the program information analyze portion 54 (S101), and determines if the next program is the 3D program or not, in accordance with the determining method of the 3D program mentioned above.

When the next coming program is not the 3D program ("no" in S102), the process is ended, but without doing any particular processing. When the next coming program is the 3D program ("yes" in S102), calculation is done on the time-period until when the next program starts. In more details, the starting time of the next program or the ending time of the present program is obtained from the EIT of the obtained program information mentioned above, while obtaining the present time from the time management portion 55, and thereby calculating the difference between them.

When the time-period until the next program starts is equal to or less than "X" minutes ("no" in S103), waiting is made until when it comes to "X" minutes before the next program start, without doing any particular processing. If it is equal to or less than "X" minutes until when the next program starts ("yes" in S103), a message is displayed indicating that a 3D program will begin soon, to the user (S104).

FIG. 28 shows an example of the message to be shown in that instance. A reference numeral 701 depicts the entire of screen that the apparatus displays, and 702 the message itself that the apparatus displays, respectively. In this manner, it is possible to call an attention for the preparation of the 3D view/listen assisting device to the user, before the 3D program starts.

Regarding the above-mentioned time "X" for determination until the time when the program starts, if it is made small, there is a possibility of not being in time for preparation of the 3D view/listen by the user until starting of the program. Or, if making it large, then there is brought about demerits, such as, preventing the message display for a long time, and also generating a pause after completion of the preparation; therefore, it must be adjusted at an appropriate time-period.

Also, the starting time of the next coming program may be displayed, in the details thereof, when displaying the message to the user. An example of the screen display in that case is shown in FIG. 29. A reference numeral 802 is the message displaying the time until when the 3D program starts. Herein, although the time is described by a unit of minute, however it may be described by a unit of second. In that case, although the user is able to know the starting time of the next program, in more details thereof, but there is also a demerit of increasing a processing load.

However, although the example is shown in FIG. 29, of displaying the time-period until the 3D program starts, but in the thereof may be displayed a time when the 3D program starts. In case where the 3D program is started at 9:00 PM, there may be displayed a message, such as, "3D program will starts from 9:00 PM. Please wear 3D glasses." for example.

With making displaying of such message, for the user, it is possible to know the starting time of the next coming program, in details thereof, and thereby to make the preparation for 3D view/listen at an appropriate pace.

Figure 30:
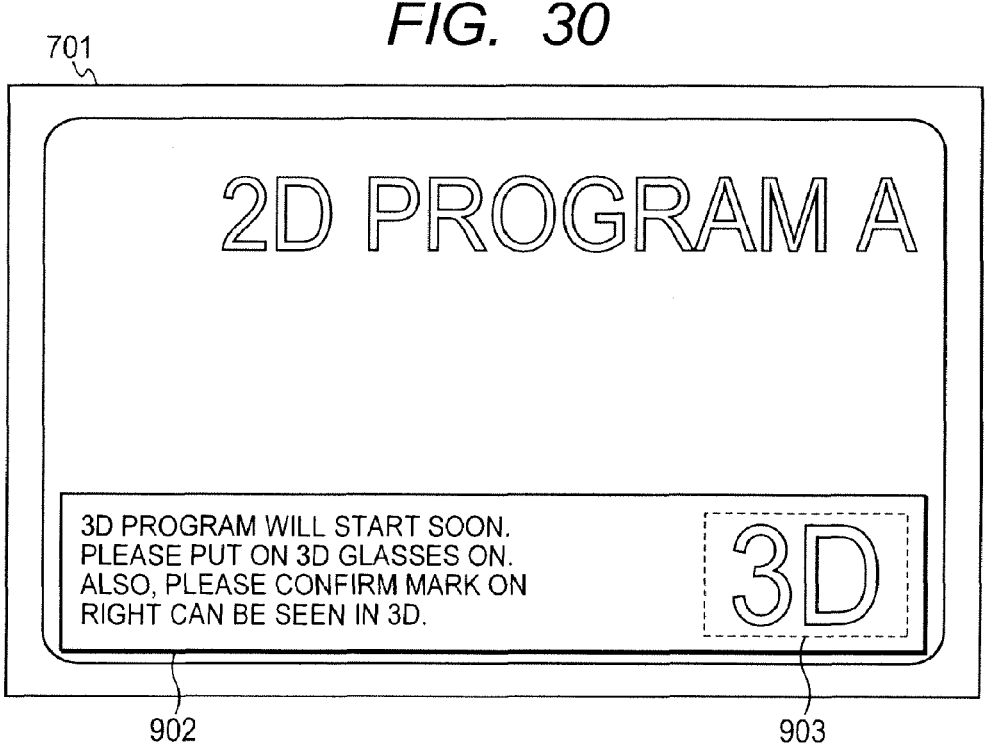
FIG. 30 is a view for showing an example of a message display.

Also, as is shown in FIG. 30, when using the 3D view/listen assisting device, it can be considered to add a mark (e.g., a 3D checkmark), which can be seen three-dimensionally. A reference numeral 902 depicts the message for alerting the start of the 3D program, and 903 the mark, which can be seen three-dimensionally when the user uses the 3D view/listen assisting device. With this, for the user, it is possible to confirm a normal operation of the 3D view/listen assisting device, before the 3D program starts. It is also possible, for example, to do a countermeasure, such as, mending or replacing, etc., until starting of the program, if malfunctioning (for example, shortage of a battery, a trouble, etc.) is generated in the 3D view/listen assisting device.

Next, explanation will be given about a method for exchanging the video of the 3D program into the 2D display or the 3D display, by determining the condition of whether the 3D view/listen preparation by the user is completed or not (3D view/listen preparation condition), after noticing that the next coming program is the 3D to the user.

Figure 31:
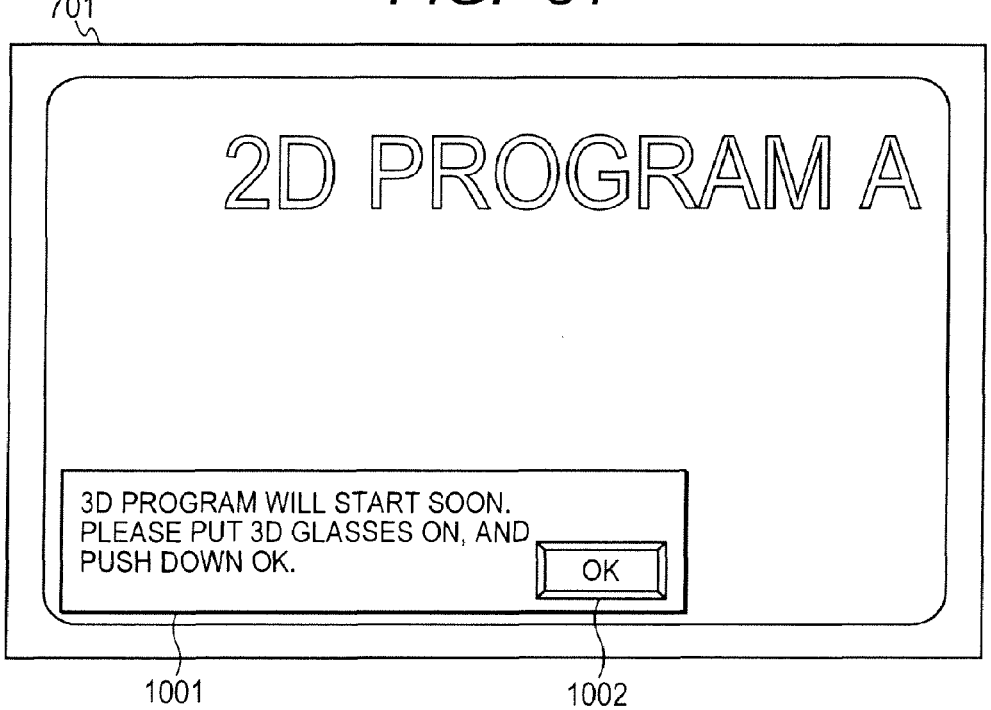
FIG. 31 is a view for showing an example of a message display.

In relation to the method for noticing to the user that the next coming program is the 3D, it is as was mentioned above. However, in relation to the message to be displayed for the user in the step S104, it differs from in that there is displayed the object, to which the user makes a response (hereinafter, being called a "user response receiving object: for example, a button on the OSD). An example of this message is shown in FIG. 31.

A reference numeral 1001 depicts an entire of the message, and 1002 a button for the user to make the response, respectively. In case where the user pushes down the "OK" button of the remote controller, for example, when displaying the message 1001 shown in FIG. 31, the user instruction receive portion 52 notices to the system control portion 51 that the "OK" is pushed down.

Figure 32:
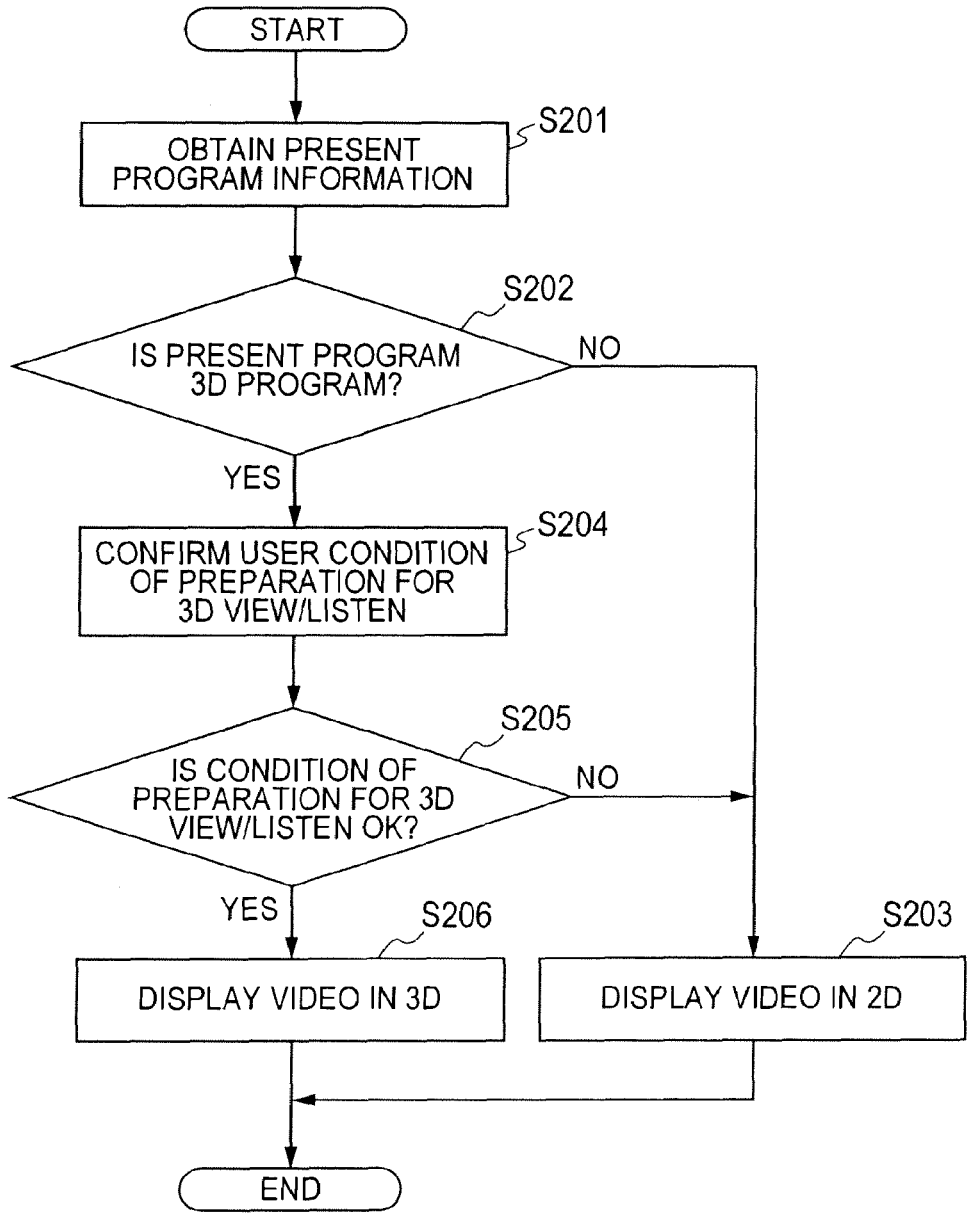
FIG. 32 is a view for showing an example of a flowchart of a system controller portion when the next program starts.

The system control portion 51 receiving the notice mentioned above stores the fact that the 3D view/listen preparation condition is "OK", as a condition. Next, explanation will be given on a processing flow in the system control portion when the present program changes to the 3D program, after an elapse of time, by referring to FIG. 32.

The system control portion 51 obtains the program information of the present program from the program information analyze portion 54 (S201), and determines if the present program is the 3D program or not, in accordance with the method mentioned above, for determining the 3D program. When the present program is not the 3D program ("no" in S202), such a control is executed that the video is displayed in 2D in accordance with the method mentioned above (S203).

When the present program is the 3D program ("yes" in S202), next, confirmation is made on the 3D view/listen preparation condition of the user (S204). When the 3D view/listen preparation condition stored by the system control portion 51 is not "OK" ("no" in S205), as is similar to the above, the control is made so as to display the video in 2D (S203).

When the 3D view/listen preparation condition mentioned above is "OK" ("yes" in S205), the control is made so as to display the video in 3D, in accordance with the method mentioned above (S206). In this manner, the 3D display of the video is executed, when it can be confirmed that the present program is the 3D program and that the 3D view/listen preparation is completed.

Figure 33:
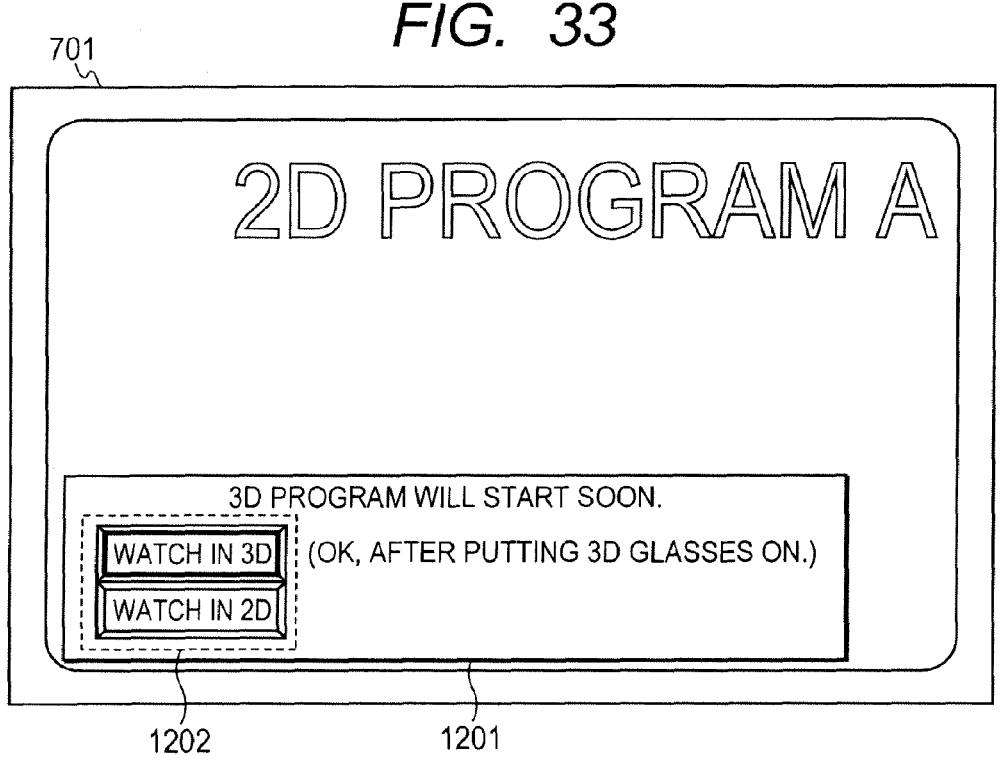
FIG. 33 is a view for showing an example of a message display.
Figure 34:
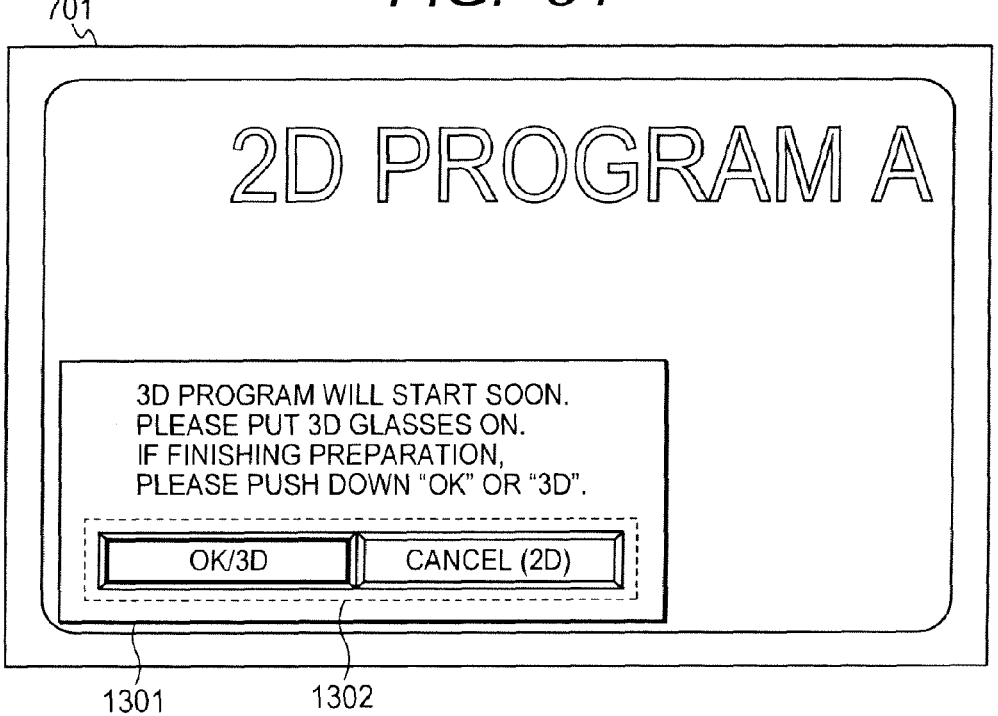
FIG. 34 is a view for showing an example of a message display.

As the message display to be displayed in the step S104, there can be considered, not only displaying "OK" simply, as is shown in FIG. 41, but also clearly indication or asking if the display method of the next coming program should be the 2D video or the 3D video. Examples of the message and the user response receiving object in that case are shown in FIGS. 33 and 34.

With doing so, comparing to the display of only "OK" mentioned above, other than that the user can easily decide the operation (s) after pushing down of the button, she/he can instruct clearly, in 2D, etc. (the user 3D view/listen preparation condition is determined "NG", when the "watch in 2D" shown by 1202 is pushed down); increasing the convenience.

Also, though explaining that the determination on the 3D view/listen preparation condition of the user is made upon the operation on the menu by the user through the remote controller, herein; however, other than that may be applied a method of determining the 3D view/listen preparation condition mentioned above, upon basis of a user wearing completion signal, which the 3D view/listen assisting device generates, or a method of determining that she/he wears the 3D view/listen assisting device, by photographing a viewing/listening condition of the user by an image pickup or photographing device, so as to make an image recognition or a face recognition of the user from the result of photographing.

With making the determining in this manner, it is possible to eliminate a trouble, such as, the user makes any operation to the receiving apparatus, and further it is also possible to avoid her/him from mischievously setting up between the 2D video view/listen and the 3D video view/listen through an erroneous operation.

Also, as other method, there is a method of determining the 3D view/listen preparation condition be "OK" when the user pushes down the <3D> button of the remote controller, or a method of determining the 3D view/listen preparation condition be "OK" when the user pushes down a <2D> button or a <return> button or a <chancel> button of the remote controller. In this case, for the user, it is possible to notice the condition of herself/himself, clearly and easily, to the apparatus; however, there can be considered a demerit, such as, transmission of the condition caused due to an error or misunderstanding, etc.

Also, in the example mentioned above, it can be considered to execute the processing while making the determination only on the program information of the next coming program, which is obtained previously, without obtaining the information of the present program. In this case, in the step S201 shown in FIG. 32, there can be considered a method of using the program information, which is obtained previously (for example, in the step S101 shown in FIG. 27), without make determination of whether the present program is the 3D program or not. In this case, there can be considered a merit, such as, the processing configuration becomes simple, etc.; however, there is a demerit, such as, a possibility that the 3D video exchange process is executed even in the case where the next coming program is not the 3D program, due to a sudden change of the program configuration.

With the message display to each user, which was explained in the present embodiment, it is desirable to delete it after the user operation. In that case, there is a merit that the user can view/listen the video, easily, after making the operation. Also, after elapsing of a certain time-period, on an assumption that the user already recognized the information of the message, in the similar manner to the above, deleting the message, i.e., bringing the user into a condition she/he can view/listen the video, easily, increases the convenience for the user.

With the embodiment explained in the above, for the user, it is possible to view/listen the 3D program under the condition much better, in particular, in a starting part of the 3D program; i.e., the user can complete the 3D view/listen preparation, in advance, or can display the video, again, after completing the preparation for viewing/listening the 3D program by the user, with using the recording/reproducing function, when she/he is not in time for starting of the 3D program. Also, it is possible to increase the convenience for the user; i.e., automatically exchanging the video display into that of a display method, which can be considered desirable or preferable for the user (e.g., the 3D video display when she/he wishes to view/listen the 3D video or the contrary thereto). Also, there can be expected a similar effect, when the program is changed into the 3D program through tuning, or when reproduction of the 3D program recorded starts, etc.

In the above, the explanation was given on the example of transmitting the 3D program details descriptor, which was explained in FIG. 10A, while disposing it in the table, such as, the PMT (Program Map Table) or the EIT (Event Information Table), etc. In the place of this, or in addition to this, it is also possible to transmit the information, which is included in said 3D program details descriptor, while storing it in a user data area or an additional information area, to be encoded together with the video when the video is encoded. In this case, those information are included within the video ES of the program.

As an example of the information to be stored, there can be listed up: the "3d__3d_type" (type of 2D/3D) information, which is explained in FIG. 10B, and the "3d_method_type" (type of the 3D method) information, which is explained in FIG. 11. However, when storing, the "3d__3d_type" (type of 2D/3D) information and the "3d_method_type" (type of the 3D method) information may be separated, but it is also possible to build up information to identify if being the 3D video or the 2D video and to identify which 3D method that 3D program has, together.

In more details, when the video encoding method is the MPEG 2 method, encoding may be executed thereon, including the 3D/2 type information and the 3D method type information mentioned above in the user data area following "Picture Head" and "Picture Coding Extension".

Also, when the video encoding method is the H.264/AVC, encoding may be executed thereon, including the 3D/2 type information and the 3D method type information mentioned above in the addition information (e.g., supplement enhancement information) area, which is included in an access unit.

In this manner, with transmitting the information indicating the type of the 3D video/2D video and the information indicating the type of the 3D method, on an encoding layer within the ES, there is an effect of enabling to identify the video upon basis of a frame (or, picture) unit.

In this case, since the identification mentioned above can be made by using a unit shorter than that when storing it in the PMT (Program Map Table), it is possible to improve or increase a speed of the receiver responding to the exchanging between the 3D video/2D video in the video to be transmitted, and also to suppress noises, much more, which can be generated when exchanging between the 3D video/2D video.

Also, when storing the information mentioned above on the video encoding layer to be encoded, together with the video, when encoding the video, but without disposing the 3D program details descriptor mentioned above on the PMT (Program Map Table), the broadcast station side may be constructed, for example, only the encode portion 12 in the transmitting apparatus 1 shown in FIG. 2 is renewed to be enabled with a 2D/3D mixed broadcasting; there is no necessity of chaining the structure of the PMT (Program Map Table) to be added in the management information supply portion 16, and therefore it is possible to start the 2D/3D mixed broadcasting with a lower cost.

However, if 3D related information (in particular, the information for identifying 3D/2D), such as, the "3d__2d_type" (type of 3D/2D) information and/or the "3d_method_type" (type of the 3D method) information, for example, is not stored within the predetermined area or region, such as, the user data area and/or the additional information area, etc., which is/are to be encoded together with the video when encoding the video, the receiver may be constructed in such manner that it determines said video is the 2D video. In this case, for the broadcasting station, it is also possible to omit storing of those information when it processes the encoding, and therefore enabling to reduce a number of the processes in broadcasting.

In the explanation in the above, as an example of disposing or arranging the identification information for identifying the 3D video, upon basis of the program (the event) unit or the service unit, the explanation was given on the example of including it within the program information, such as, the component descriptor, the component group descriptor, the service descriptor, and the service list descriptor, etc., or the example of newly providing the 3D program details descriptor. Also, those descriptors are explained to be transmitted, being included in the table (s), such as, PMT, EIT [schedule basic/schedule extended/present/following], NIT, and SDT, etc.

Herein, as a further other example, explanation will be given on an example of disposing the identification information of the 3D program (the event) in the content descriptor shown in FIG. 54.

Figures 53, 54:
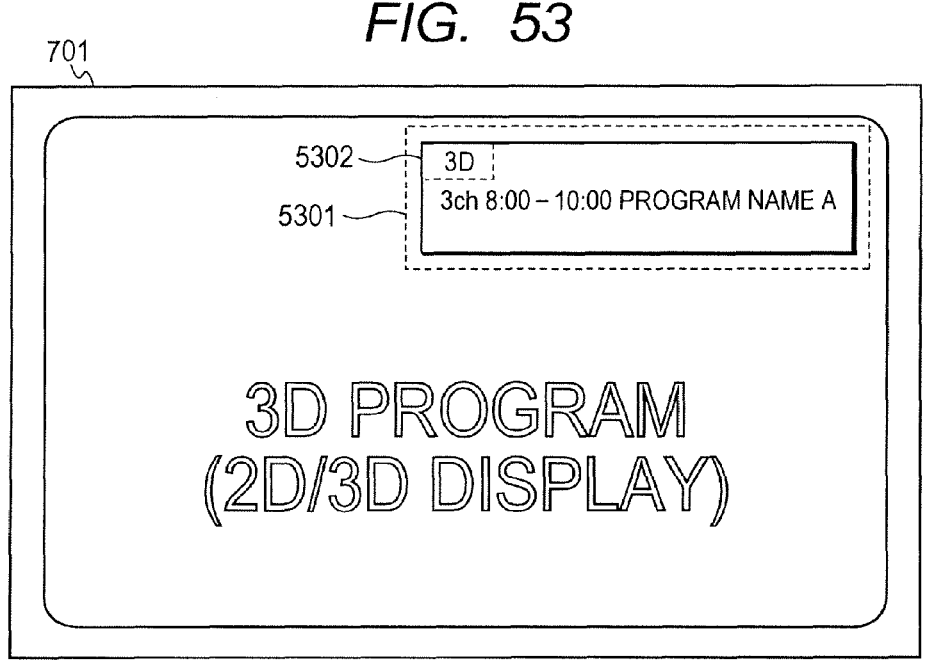
FIG. 53 is a view for showing an example of display of a program.
FIG. 54 is a view for showing an example of the structure of a content descriptor.

FIG. 54 shows an example of the structure of the content descriptor, as one of the program information. This descriptor is disposed in the EIT. In the content descriptor can be described the information indicative of program characteristics, other than genre information of the event (the program).

The structure or configuration of the content descriptor is as follows. "descriptor_tag" is a field of 8 bits for identifying the descriptor itself, in which a value "0x54" is described so that this descriptor can be identified as the content descriptor. "descriptor_length" is a field of 8 bits, in which a size of this descriptor is described.

"content_nibble_level__1" (genre 1) is a field of 4 bits, and this presents a first stage grouping or classification of the content identification. In more details, there is described a large group of the program genre. When indicating the program characterstics, "0xE" is designated.

"content_nibble_level__2" (genre 2) is a field of 4 bits, and this presents a second stage grouping or classification of the content identification, in more details thereof comparing to the "content_nibble_level__1" (genre 1). In more details, a middle grouping of the program genre is described therein. When the "content_nibble_level__1"="0xE", a sort or type of a program characteristic code table.

"user_nibble" (user genre) is a field of 4 bits, in which the program characteristics are described only when "content_nibble_level__1"="0xE". In other cases, it should be "0xFF" (not-defined). As is shown in FIG. 54, the field of 4 bits of the "user_nibble" can be disposed by two (2) pieces thereof, and upon combination of the values of two (2) pieces of "user_nibble" (hereinafter, bits disposed in front being called "first user_nibble" bits, while bits disposed in the rear "second user_nibble") bits, it is possible to define the program characteristics.

The receiver receiving that content describer determines that said described is the content describer when the "descriptor_tag" is "0x54". Also, upon the "descriptor_length" it can decide an end of the data, which is described within this describer. Further, it determine the description, being equal to or shorter than the length presented by the "descriptor_length", to be valid, while neglecting a portion exceeding that, and thereby executing the process.

Also, the receiver determines"content_nibble_level__1" if the value thereof is "0xE" or not, and determines as the large group of the program genre, when it is not "0xE". When being "0xE", determination is not made that it is the genre, but any one of the program characteristics is designated by the "user_nibble" following thereto.

The receiver determines the "content_nibble_level__2" to be the middle group of the program genre when the value of the "content_nibble_level__1" mentioned above is not "0xE", and uses it in searching, displaying, etc., together with the large group of the program genre. When the "content_nibble_level__1" mentioned above is "0xE", the receiver determines it indicates the sort of the program characteristic code table, which is defined upon the combination of the "first user_nibble" bits and the "second user_nibble" bits.

The receiver determines the bits to be that indicating the program characteristics upon the basis of the "first user_nibble" bits and the "second user_nibble" bits, when the "content_nibble_level__1" mentioned above is "0xE". In case where the value of the "content_nibble_level__1" is "0xE", they are neglected even if any value is inserted in the "first user_nibble" bits and the "second user_nibble" bits.

Therefore, the broadcasting station can transmit the genre information of a target event (the program) to the receiver, by using combination of the value of "content_nibble_level__1" and the value of "content_nibble_level__2", in case where it does not set the "content_nibble_level__1" to "0xE".

Herein, explanation will be given on the case, for example, as is shown in FIG. 55, wherein the large group of the program genre is defined as "news/reporting" when the value of "content_nibble_level__1" is "0x0", further defined as "weather" when the value of "content_nibble_level__1" is "0x0" and the value of "content_nibble_level__2" is "0x1", and defined as "special program/document" when the value of "content_nibble_level__1" is "0x0" and the value of "content_nibble_level__2" is "0x2", and the large group of the program genre is defined as "sports" when the value of "content_nibble_level__1" is "0x1", further defined as "baseball" when the value of "content_nibble_level__1" is "0x1" and the value of "content_nibble_level__2" is "0x1", and is defined as "succor" when the value of "content_nibble_level_1" is "0x1" and the value of "content_nibble_level_2" is "0x2", respectively.

In this case, for the receiver, it is possible to determine the large group of the program genre, if being "news/reporting" or "sports", depending on the value of "content_nibble_level_1", and upon basis of the combination of the value of "content_nibble_level_1" and the value of "content_nibble_level_2", it is possible to determine the middle group of the program genre, i.e., down to program genres lower than the large group of the program genre, such as, "news/reporting" or "sports", etc.

However, for the purpose of achieving that determining process, in the memory portion equipped with the receiver may be memorized genre code table information for showing a corresponding relationship between the combination of the values of "content_nibble_level_1" and "content_nibble_level_2", and the program genre, in advance.

Herein, explanation will be given on a case when transmitting the program characteristic information in relation to the 3D program of the target event (the program) with using that content describer. Hereinafter, the explanation will be given on the case where the identification information of the 3D program is transmitted as the program characteristics, but not the program genre.

Firstly, when transmitting the program characteristic information in relation to the 3D program with using the content describer, the broadcasting station transmits the content describer with setting the value of "content_nibble_level_1" to "0xE". With doing this, the receiver can determine that the information transmitted by that describer is, not the genre information of the target event (the program), but the program characteristic information of the target event (the program). Also, with this, it is possible to determine that the "first user_nibble" bits and the "second user_nibble" bits, which are described in the content describer, indicate the program characteristic information by the combination thereof.

Herein, explanation will be given on the case, for example, as is shown in FIG. 56, wherein the program characteristic information of the target event (the program), which that content describer transmits, is defined as "program characteristic information relating to 3D program" when the value of "first user_nibble" bits is "0x3", the program characteristics are defined as "no 3D video is included in target event (program)" when the value of "first user_nibble" bits is "0x3" and the value of "second user_nibble" bits is "0x0", the program characteristics are defined as "video of target event (program) is 3D video" when the value of "first user_nibble" bits is "0x3" and the value of "second user_nibble" bits is "0x1", and the program characteristics are defined as "3D video and 2D video are included in target event (program)" when the value of "first user_nibble" bits is "0x3" and the value of "second user_nibble" bits is "0x2", respectively.

In this case, for the receiver, it is possible to determine the program characteristics relating to the 3D program of the target event (the program), upon basis of the combination of the value of "first user_nibble" bits and the value of "second user_nibble" bits; therefore, the receiver receiving the EIT, including that content describer therein, can display an explanation on the electronic program table (EPG) display, in relation to program(s), which will be received in future or is received at present, that "no 3D video is included" therein, or that said program is "3D video program", or that "3D video and 2D video are included" in said program, or alternately display a diagram for indicating that fact.

Also, the receiver receiving the EIT, including that content describer therein, is able to make a search on a program(s) including no 3D video therein, a program(s) including the 3D video therein, and a program(s) including the 3D video and 2D program therein, etc., and thereby to display a list of said program(s), etc.

However, for the purpose of achieving that determining process, in the memory portion equipped with the receiver may be memorized the program characteristic code table information for showing a corresponding relationship between the combination of the value of "first user_nibble" bits and the value of "second user_nibble" bits, and also the program characteristics, in advance.

Also, as other example of definition of the program characteristic information in relation to the 3D program, explanation will be given on a case, for example, as is shown in FIG. 57, wherein the program characteristic information of the target event (the program), which that content descriptor transmits, is determined as "program characteristic information relating to 3D program" when the value of the "first user_nibble" bits is "0x3", and further the program characteristics are defined as "no 3D video is included in target event (program)" when the value of the "first user_nibble" bits is "0x3" and the value of the "second user_nibble" bits is "0x0", the program characteristics are defined as "3D video is included in target event (program), and 3D transmission method is Side-by-Side method" when the value of the "first user_nibble" bits is "0x3" and the value of the "second user_nibble" bits is "0x1", the program characteristics are defined as "3D video is included in target event (program), and 3D transmission method is Top-and-Bottom method" when the value of the "first user_nibble" bits is "0x3" and the value of the "second user_nibble" bits is "0x2", and the program characteristics are defined as "3D video is included in target event (program), and 3D transmission method is 3D 2-viewpoints separate ES transmission method" when the value of the "first user_nibble" bits is "0x3" and the value of the "second user_nibble" bits is "0x3", respectively.

In this case, for the receiver, it is possible to determine the program characteristics relating to the 3D program of the target event (the program), upon basis of the combination of the value of "first user_nibble" bits and the value of "second user_nibble" bits, not only if the 3D video is included or not, in the target event (the program), but also to determine the 3D transmission method when the 3D video is included therein. If memorizing the information of the 3D transmission methods, with which the transmitter is enabled (e.g., 3D reproducible), in the memory portion equipped with the receiver, in advance, the receiver can display an explanation on the electronic program table (EPG) display, in relation to the program(s), which will be received in future or is received at present, that "no 3D video is included", or that "3D video is included, and can be reproduced in 3D on this receiver" or that "3D video is included, but cannot be reproduced in 3D on this receiver", or alternately display a diagram for indicating that fact.

Also, in the example mentioned above, although the program characteristics, when the "first user_nibble" bits is "0x3" and the value of the "second user_nibble" bits is "0x3", are defined as "3D video is included in target event (program), and 3D transmission method is 3D 2-viewpoints separate ES transmission method"; however, there may be prepared values of the "second user_nibble" bits for each detailed combination of the streams of "3D 2-viewpoints separate ES transmission method", as is shown in FIG. 47. With doing so, for the receiver, it is possible to make further detailed identification thereof.

Or, the information of the 3D transmission method of the target event (the program) may be displayed.

Also, the receiver receiving the EIT, including that content describer therein, is able to make a search on a program(s) including no 3D video therein, a program(s) including the 3D video and reproducible on the present receiver and a program(s) including the 3D video but irreproducible on the present receiver, etc., and thereby to display a list of said program(s), etc.

Also, it is possible to make a program search on each 3D transmission method, in relation to the program(s) including the 3D video therein, and thereby also enabling a list display for each 3D transmission method. However, the program search on the program, including the 3D video therein but unable to be reproduced on the present receiver, and/or the program search for each 3D transmission method are/is effective, for example, when it is reproducible on other 3D video program reproducing equipment, which the user has, even if it cannot be reproduced in 3D on the present receiver. This is because, even with the program including therein the 3D video, being irreproducible in 3D on the present receiver, if outputting that program, from the video output portion of the present receiver to the other 3D video program reproducing equipment, in the transport stream thereof as it is, then the program of that transport stream format received can be reproduced in 3D, also, on that 3D video program reproducing equipment, or alternately, if the present receiver has a recording portion for recording the content into a removable medium, and if recording that program into the removable medium, then the above-mentioned program recorded in that removable medium can be reproduced in 3D on the 3D video program reproducing equipment mentioned above.

However, for the purpose of achieving that determining process, in the memory portion equipped with the receiver may be memorized the program characteristic code table information for showing a corresponding relationship between the combination of the value of "first user_nibble" bits and the value of "second user_nibble" bits, and also the information of the 3D transmission methods, with which the receiver is enabled (reproducible in 3D), in advance.

<Example of Information Reservation Process to Recording Medium 26>

Figure 58A:
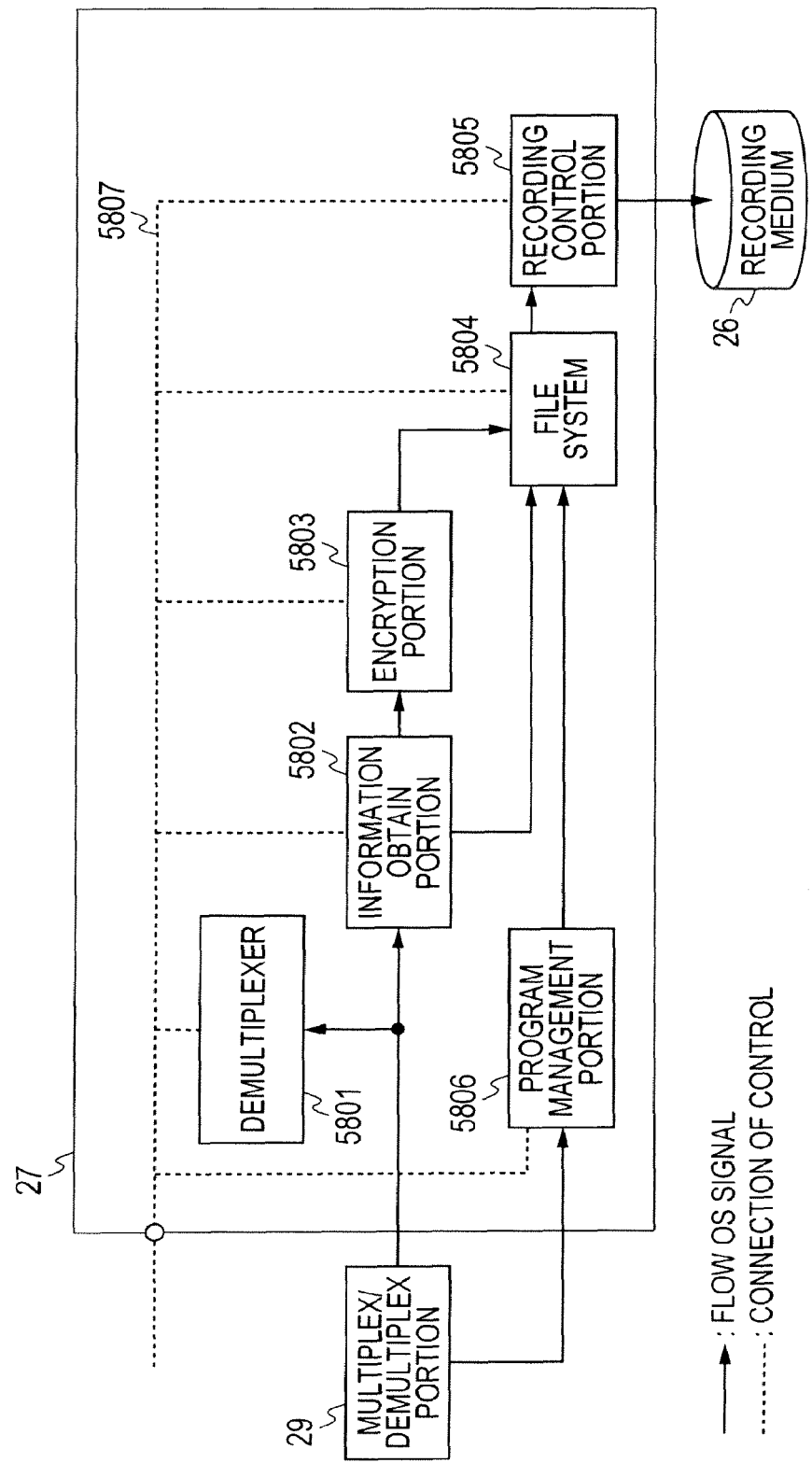

An example of the operations of the receiving apparatus, for recording the information, if the video data to be recorded is the 3D or not, in addition thereto, when recording the broadcast data into the recording medium 26 by the record/reproduce portion 27, by referring to the drawings, FIGS. 58A and 58B and following thereafter.

FIGS. 58A and 58B show an internal block diagram of the recording/reproducing portion 27. In the multiplex/demultiplex portion 29 is selected a partial TS (or a full TS) to be recorded, and into the record/reproduce portion 27 is inputted the stream to be recorded. Also, multiplex/demultiplex portion 29 divides or de-multiplexes the program information, such as, the EIT included in the broadcast stream, etc., thereby obtaining them. Among the program information obtained, recorded program information, which may be needed in display of a reproduction list, etc., is collected, and this data is also inputted therein.

In FIG. 58A, the stream divided in the multiplex/demultiplex portion is inputted into a demultiplexer 5801 and an information obtain portion 5802. In the demultiplexer 5801, the information is analyzed down to the ES level, and thereby obtains the 3D/2D identifier, which is written in the User Data area thereof, for example. The information obtained is transmitted to a program information manage portion 5806 through the CPU 21, to be recorded together with other program information. In the information obtain portion 5802 is obtained the information, which can be obtained on the TS level. For example, there is produced a position information for reading out the data, which is necessary when executing reproduction of the recorded program, in particular, the special reproduction (may be called "clip information", and the details thereof will be mentioned later).

Next, in an encode portion 5803 is encoded the stream data, from a viewpoint of security thereof. An encoding method may be a unique or original one, or may be a method determined in accordance with any regulation. The data completed in encoding thereof is delivered to a file system 5804. In the file system 5804 is executed recording into the recording medium 26 in a unique or original format or predetermined one.

When executing the recording or reading out, processing is conducted on the data through a recording medium control portion 5805. Also, in relation to the program information mentioned previously, the program information manage portion 5806 receives it, so as to adjust it into data of a predetermined format. The program information completed is transmitted to the file system 5804, to be written into the recording medium 26.

A reference numeral depicts a common bus, which is connected with, continuing from the common but 22, and it transmits the control signals between the CPU 21 and each block.

Timing to execute recording of the program information may be sufficient to be the timing, which the information seems to be fixed or decided, and there can be listed up the examples; for example, 10 seconds after starting the recording, or after all of the recording is completed, etc. Also, the demultiplexer 5801 may be stopped the operation thereof at the timing when the 2D/3D information seems to be decided.

FIG. 58B shows a variation of that shown in FIG. 58A, wherein the stream data selected in the multiplex/demultiplex portion 27 is inputted into the demultiplexer 5801. In the information obtain portion 5802, it is possible to obtain the 2D/3D information on the ES level from demuxed data. In a remux portion, it is reconstructed into the partial TS, and the recording thereafter is executed in the similar manner to that shown in FIG. 58A.

For example, a format conversion (being called, also "trans-code") of the video signal/audio signal or a bit rate conversion (e.g., trans-rate) may be made between the demux and the remux. When executing the trans-code of the video signal, it is necessary to produce a flag indicating the 2D/3D format, depending on that, appropriately, so as to record it.

Figure 59:
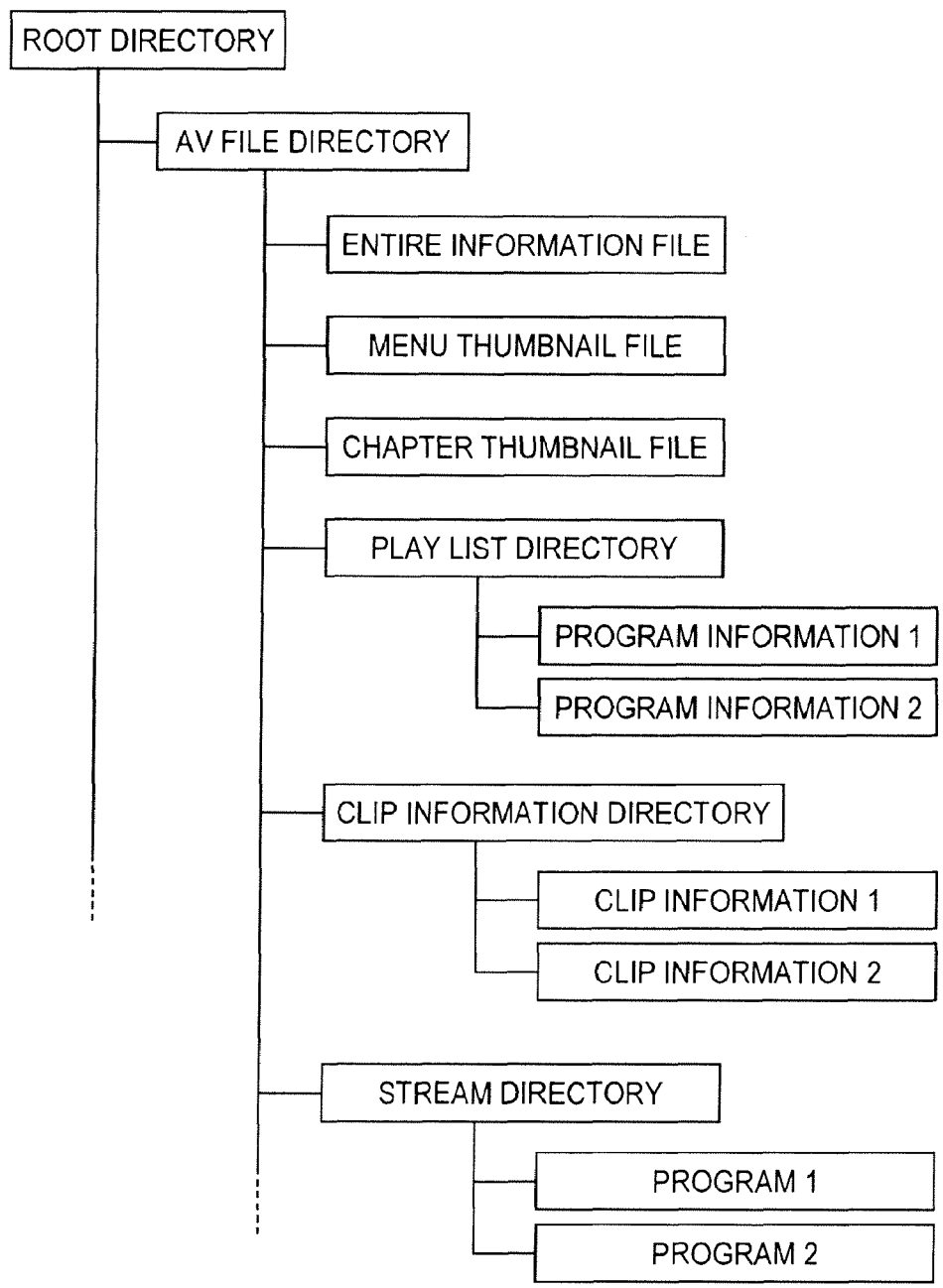
FIG. 59 is a view for showing an example of the structure of a folder file of data to be recorded onto a recoding medium 26.
Figure 60:
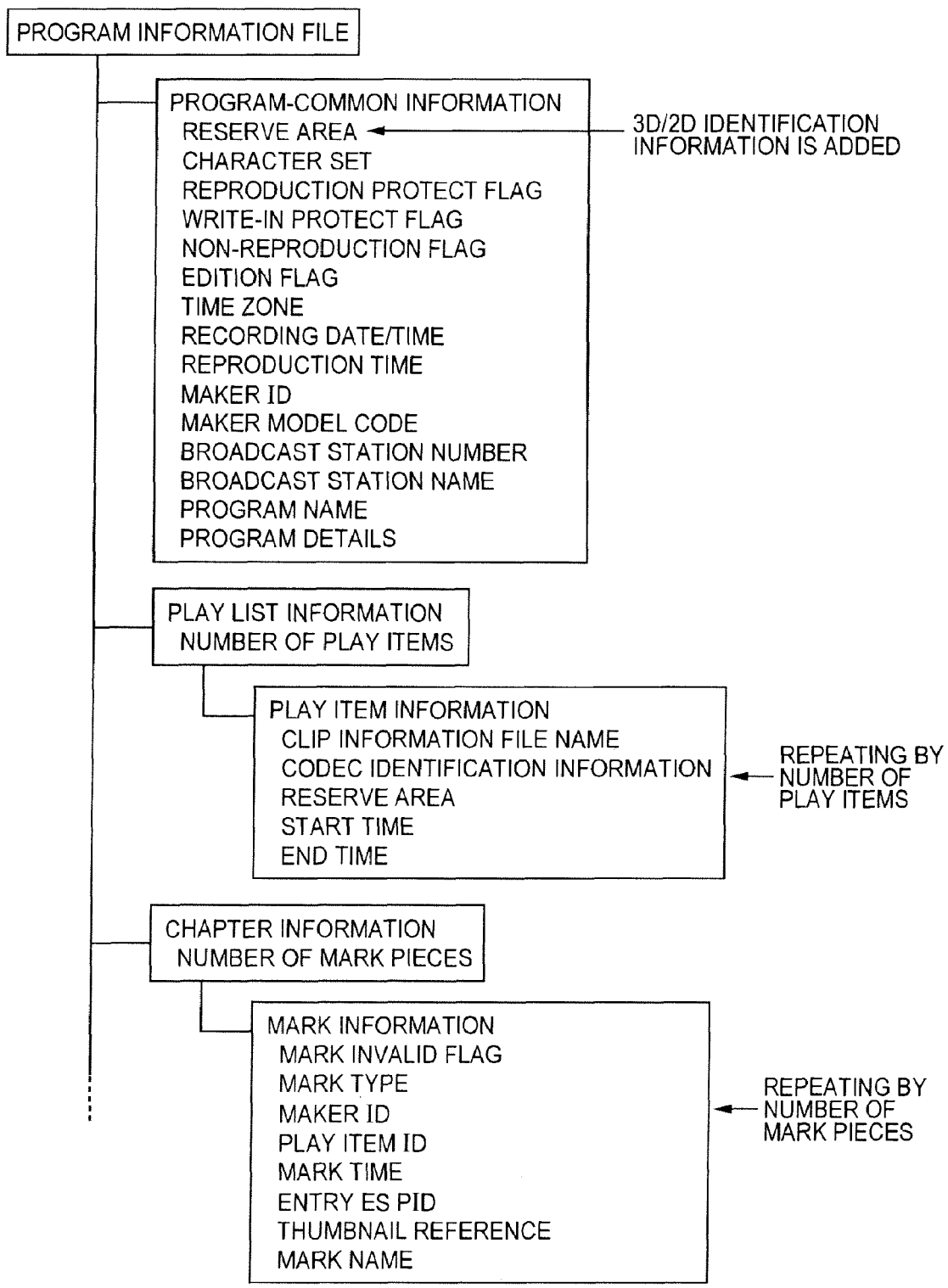
FIG. 60 is a view for showing an example of the structure of a folder file of data to be recorded onto a recoding medium 26.

An example of a method for reserving the 3D/2D information in the recording medium 26 will be shown, by referring to FIGS. 59 and 60. FIG. 59 shows an example of the structures of a folder and/or a file when it is recorded. In an entire information file is recorded information, such as, how many numbers of files are recorded, and recording positions and data sizes of management data of those (being called, also "program information file"), for example. In a menu thumbnail file are recoded, such as, a number of pieces of all menu thumbnail pictures recorded, picture data to be used in the menu screen of displaying a list of the programs recorded and/or recording position information for reading out those picture data, etc.

In a chapter thumbnail file is recorded a number of pieces of thumbnail pictures recorded for use in a chapter, picture data to be displayed when displaying a list of chapter information, which will be mentioned later, for each recorded program, and/or recording position information for reading out those picture data, etc.

In FIG. 59 are shown examples of the folder and file configurations, each of which records a corresponding program information file (e.g., program information N), recording position of the video/audio data and a clip information file (e.g., clip information N) for binding a reproduction time, for each recorded program file (e.g., a program N ("N" is a natural number equal to or greater than "1")) including the video/audio data therein, within a one folder separated respectively.

In this case, for example, when recording a further new program, then a program 3 file is produced in a directory equal to or lower than a playlist directory, a program information 3 file is produced in a directory equal to or lower than a clip information directory, and a clip information 3 file is produced in a directory equal to or lower than a clip information directory, for example. In case where an edition of data is allowed to the user, it is enough to record the information of plural numbers of the recorded program files into one (1) program information file or one (1) clip information file, or to record a certain part of the recorded program files therein.

For example, when the program information 1 presents the combination of information corresponding to the entire program 1 and a part of the program 2, it is possible to show those to the user as a one (1) reproduced program.

Also, when deleting the program data, which was already recorded, for example, when an instruction to edit made by the user is to delete the content by a unit of the program information, then the program information file corresponding to that is deleted, and a search is made on whether it is referred only to that program information file or not, for all of the recorded program files (e.g., the program), which are associated with, thereby to delete it if referring to only the corresponding program file, but not delete if referring to the program information file (s) other than that.

Doing in this manner maintains a condition of coordinating or adjusting in the reference or association thereof, between the program information file and the recorded program file. With the menu thumbnail file and the chapter thumbnail file, the references therebetween may be confirmed, in the similar manner, so as to maintain the condition coordinated or adjusted. Also, the entire information is revised, appropriately, every time when data alternation is made within the same directory (e.g., within an AV directory shown in FIG. 59), so as to maintain the condition coordinated.

Examples of the data structure or configuration in an inside of the program information file, and of adding the 3D/2D determination information thereto are shown, by referring to FIG. 60.

Into program-common information is recorded, for example, the information to be held, not depending on a program referred to. "character set" designates, for example, a language code to record the following informing therein. "reproduction protect flag" means, when the value thereof is "1", for example, that there is a restriction, such as, reproduction cannot be made if the user inputs a PIN code. When the value is "0", it is assumed that there is no restriction and reproduction can be made.

When "write-in protect flag" is "1" in the value thereof, for example, it means that the user cannot make an edition and/or deletion. When the value is "0", the user can make an operation of the edition/deletion, freely. The write-in protect flag may be settable by the user, with provision of an OSD (interface), such as, a setup menu, etc.

"non-reproduced flag" indicates that it is never reproduced by the user, yet, after recording thereof, if the value thereof is "1", for example. If the value is "0", it indicates that the reproduction is made at least once. "edition flag" means that no edition process is made ever, after recording thereof, such as, partial deletion and/or division/combining, for example, if the value thereof is "1". If the value is "0", it means that any kind of edition was made by the user.

"time zone" indicates a time zone of a land, for example, where this program information is recorded. "recording date/time" indicates a date and time, for example, when this program information is recorded. "reproduction time" indicates a total value by a unit of time, for example, recording time of each program, to which this program information is referred.

In "maker ID" is registered, for example, a numerical value, presenting an equipment manufacturing company, which is determined, uniquely and separately, when producing this program information. In "maker model code" is registered, for example, a model number of equipment, which is uniquely determined by the equipment manufacturing company, separately, when this program information is produced. In "broadcasting station number" is recorded, for example, that broadcasting station number when the program recorded is the data that is received on the air.

In "broadcasting station name" is recorded, for example, that broadcasting station name when the program recorded is the data that is received on the air. In "program name" is reserved, for example, a program title name of the program recoded. The program name may be edible by the user, freely, even after being recorded. In "program details" is reserved, for example, detailed information for presenting the content of the program recorded. For example, the cast of the program, which is included in the SI/PSI, or the program content, in which a brief explanation of story thereof is described, may be recorded as it is.

Into a reserve area or region of the program-common information is added the 3D/2D identification information. This means, for example, when the value is "1" upon one (1) bit information, that there is at least one (1) program including the 3D video signal therein, among the programs relating to the present playlist, and when the value is "0", that no 3D video signal is included in the program relating thereto. In this case, no inquire is made of the 3D method of the 3D video signal.

If recording the information herein, it is possible to inform the user of whether the 3D video is included or not, within a certain program, for example, by referring to this information when she/he displays the list of the program(s) recorded.

In "playlist information" is recorded, for example, "play item number". This "play item" means, for example, one (1) program, to which this program information is related or associated. Thus, the play item and the program are related or associated with, one by one (1:1). Accordingly, the "play item number" means a number of program(s), with which this program information is related or associated.

"play item information" is held by the number of pieces same to that of the number of the "play item", and in an inside thereof is recorded the information unique to each program corresponding thereto. In "clip information fine name" is held a name of the clip information file corresponding thereto. "codec identification information" indicates an encoding method of the video/audio data of the program corresponding thereto. It is, for example, MPEG 2 or H.264, if being the video, or if being the audio, the audio encoding method, such as, MPEG 2-AAC or MP3, or MPEG 1-Layer 2, etc.

"start time" indicates the starting position of the program corresponding, to which the position indicated by this "play item information" corresponds. A value to be designated may be recorded by time information, such as, PTS/DTS, etc. "end time" indicates the ending portion of the program, to which the position indicated by this "play item information" corresponds. A value to be designated thereto may be recorded by time information, such as PTS/DTS, etc.

In the example shown in FIG. 60, although only one play item information is described, however in case where there are plural numbers of programs related or associated therewith, plural numbers of the play item information are recorded, in the similar manner.

As a representative example thereof, though there is shown the example of adding the 3D/2D identification information into the program-common information, in FIG. 60; however, in case where there is provided the "reserve area" in the play item information, the 3D/2D identification information may be added therein, or may be recorded in both. For example, if being the information of 1 bit and having "1" in the value thereof, it indicates that the 3D video signal is included in that program, but if the value is "0", it is indicated that no 3D video signal is included in that program. Recording it herein enables a management by a detailed unit much more. However, for the purpose of adding the 3D/2D identification information, it may be added into a vacant area or region for registering the information, within an area or region where the information for indicating the characteristics of the video signals, such as, codec, etc., are integrated.

In "chapter information" is recorded a number of pieces of "mark information" for indicating how many chapter(s) (may be called "chapter mark" or simply "mark") is/are setup in the play list corresponding to this program information. In "mark information" is recorded one information, by each, as time information for uniquely identifying where that mark exists among the program files, for example, combining the information of a number of times of renewal of PTS and/or STC, etc., therewith. For example, when a chapter is added in the program corresponding thereto through the user's operation of the function of registering the chapter automatically, the "mark information" is increased by one (1).

"mark invalid flag" means, when the value thereof is "1", that said chapter is invalid, for example, it is not displayed even to the user. If the value is "0", it means that said chapter is valid, and that the display thereof is also made. "mark type" means a type of the mark. It may be a mark for indicating a resume position or a mark for indicating a chapter portion, etc.

Assuming that a manufacturer of the receiving apparatus 4 is also able to set the type, arbitrarily, it is possible to make an arbitrary classification, such as, a mark for indicating a chapter position indicative of separation between a main program and CM, a mark for indicating the chapter position, which is set up through the user operation, for example. In "maker ID" is registered a numerical value, presenting an equipment manufacturing company, which is determined, uniquely and separately, when producing that mark.

In "play item ID" is held an ID of the play item information corresponding thereto. "mark time" indicates a position on a program corresponding to this "mark information". "entry ES PID" indicates to which ES the mark information is directed, among the programs corresponding thereto.

With this, it is possible to specify the target, uniquely, even if there are plural numbers of video ES on the corresponding program. "thumbnail reference", though not shown in the present figure, but stores therein an ID for identifying that file, when holding a file of thumbnail still picture(s) locating at the position of each mark.

"mark name" holds therein information when a name is given to the corresponding mark. In the example shown in FIG. 60, although only one mark information is described, but plural numbers of mark information may be recorded therein, in the similar manner, in case where there are plural numbers of marks, which are produced through the user operation, or produced automatically by program within the recording/reproducing device.

As was shown in the embodiment mentioned above, by recording the 3D/2D identification information in a place, which was used as the reserve area for the information recorded up to then, there an be obtained an effect of not causing an error, in the conventional apparatus, which cannot recognize the 3D information. Also, in case of recoding it in the data format, different from that of the present embodiment, there can be obtained the similar effect, by using the reserve area or region.

Also, looking down to the information of the video ES level by the demultiplexer 5801 enables to grasp exchanging between 2D/3D by a unit of frame. With using this, if storing the position of the exchanging between 2D/3D as the mark information, for the receiving apparatus, it is possible to manage the position of the exchanging, more strictly, therefore there can be obtained an advantage that, for example, it is possible to control the timing, more accurately, when displaying a message for suggesting the user to wear the glasses when reproducing, as was mentioned above. The mark type may be held as a type (class) for indicating the exchange between 2D/3D.

The clip information file to be recorded in the clip information directory is a file corresponding to the program file, for example, one by one (1:1), and the data position information of the corresponding program file is recorded. For example, in the information obtain portion 5802, detection is made on a packet, in which the "I" picture top data of the stream to be recorded is included, and on the time information (for example, PTS) thereof, and in the file system 5804, they are recorded in the clip information file, as the data of format enabling to determine the top data position of the "I" picture, for example, combining the number of the packets from the top of the program and the time information.

Recording of this information enable a control, such as, not reading out all data, but reading out only data of the necessary "I" picture to display, when starting the reproduction or fast-forward/rewind reproduction from the position of an arbitrary "I" picture during the reproduction, etc.

Or alternately, when the "I" picture position cannot be detected in the information obtain portion 5802, for example, data obtained by combining a certain data size and time information (for example, PCR or PTS) may be recorded in the clip information file. With this, although not possible to obtain such a correct control as when recording the "I" picture position, it is possible to achieve starting of the reproduction from the display position recorded, or a special reproduction with an aid of partial display, in the similar manner.

In the embodiment explained in the above, although the recorded program file including the program information and the video/audio data therein, and the program information file and the clip information file are provided within the folders separated, but as a variation thereof, they may be recorded in a same folder, or the program information folder may be attached to the recorded program file in the form of stream directory.

Also, the data configuration within the program information file should not be limited to the example shown in FIG. 60; however it is enough that all of the files can be recorded in a certain format and information can be read out therefrom regularly when reproducing, and thereby the similar effect can be obtained.

In the example of the data configuration, which was explained in the above, description is made on only representative members; however there can be also considered to have a member other than this, to combine plural numbers of members, or to divide one (1) member into plural numbers of members.

Figure 61:
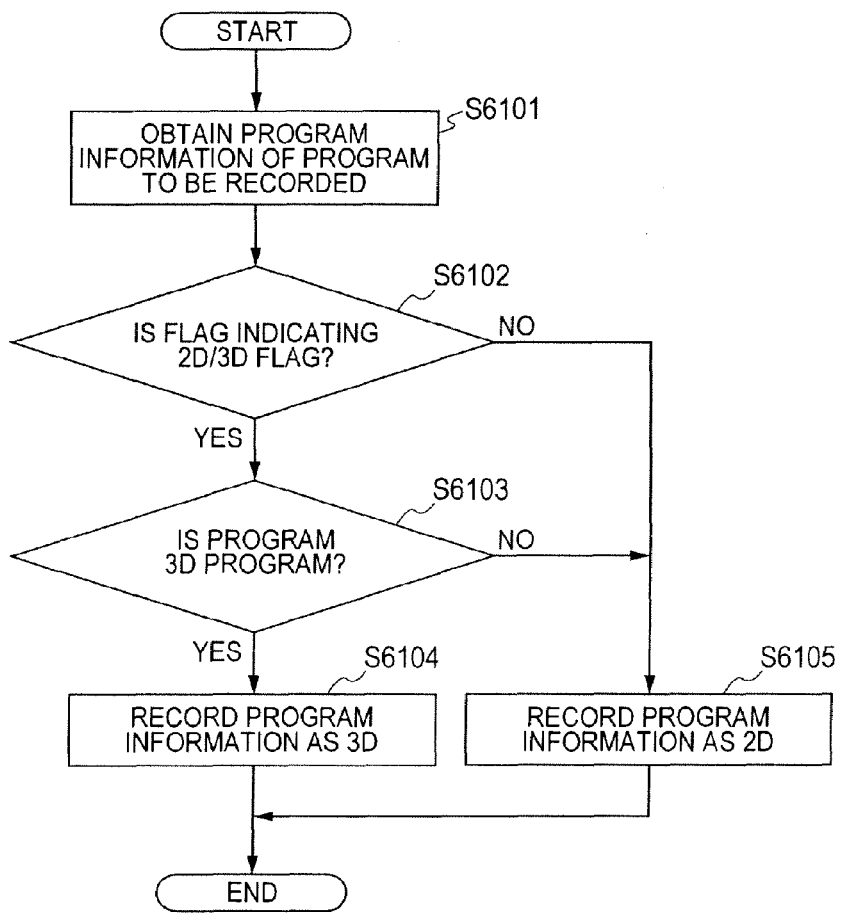
FIG. 61 is a view for showing an example of a flowchart when recording 2D/3D identification information.

FIG. 61 shows an example of a sequence for determining if the program to be recorded is a program or not, including such a 3D display video of SBS method, for example. In S6101, the multiplex/demultiplex portion 29 obtains an identifier for determining 3D/2D on such PSI or SI information as shown in FIG. 7, 10A or 56, from the stream to be recorded, and transmits it as data to the CPU 21, and then advances the process to S6102.

In S6102, the CPU 21 determines if there is the information or not, indicating 3D/2D in the information obtained. As a result of determination, if there is the identifier (e.g., if "Yes"), the process is shifted to S6103, on the other hand if nothing (e.g., if "No") to S6104.

In S6103, the CPU 21 determines if the information obtained indicates the 3D program or not, and if it is the 3D program (e.g., if "Yes"), it advances to S6104, while if indicating the 2D program (e.g., if "No") to S6105.

In S6104, an instruction is given from the CPU 21 to the program information management portion 5806, so that "3D" is recorded into the program information in accordance with such regulated format as shown in FIG. 60, for example, and the process is completed.

In S6105, an instruction is given from the CPU 21 to the program information management portion 5806, so that "2D" is recorded into the program information in accordance with such regulated format as shown in FIG. 60, for example, and the process is completed.

Figure 62:
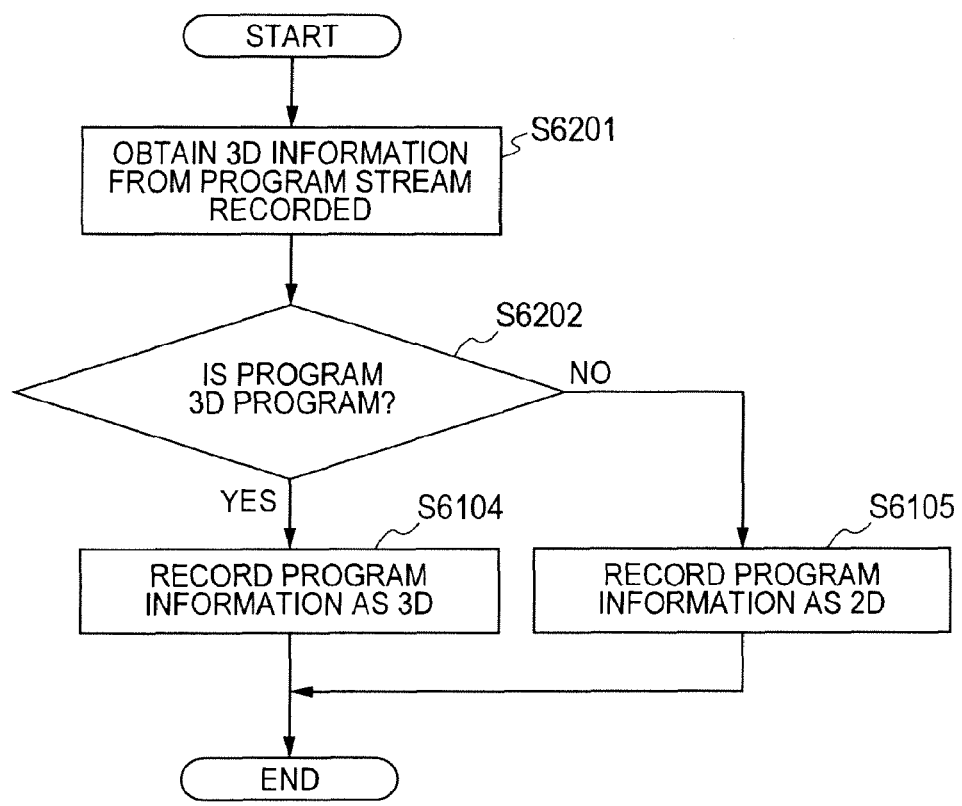
FIG. 62 is a view for showing an example of a flowchart when recording 2D/3D identification information.

FIG. 62 shows an example of other sequence for determining if the program is the 3D program or not. In S6201, the demultiplexer 5801 obtains the 3D identification information (for example, information in User Data of MPEG 2 video, or Frame Packing Arrangement SEI information of H.264 video) existing within the video ES of the stream to be recorded, to transmit it to the CPU 21, and advances the process to S6202.

In S6202, the CPU 21 determines of the information obtained is the 3D program or not, and if the information obtained indicates the 3D program (e.g., if "Yes"), it advances to S6104, or if it indicates the 2D program (e.g., if "No"), to S6105.

In S6104, an instruction is given from the CPU 21 to the program information management portion 5806, so that "3D" is described in the program information in accordance with such regulated format as shown in FIG. 60, for example, and the process is completed. In S6105, an instruction is given from the CPU 21 to the program information management portion 5806, so that "2D" is described into the program information in accordance with such regulated format as shown in FIG. 60, for example, and the process is completed.

Figure 63:
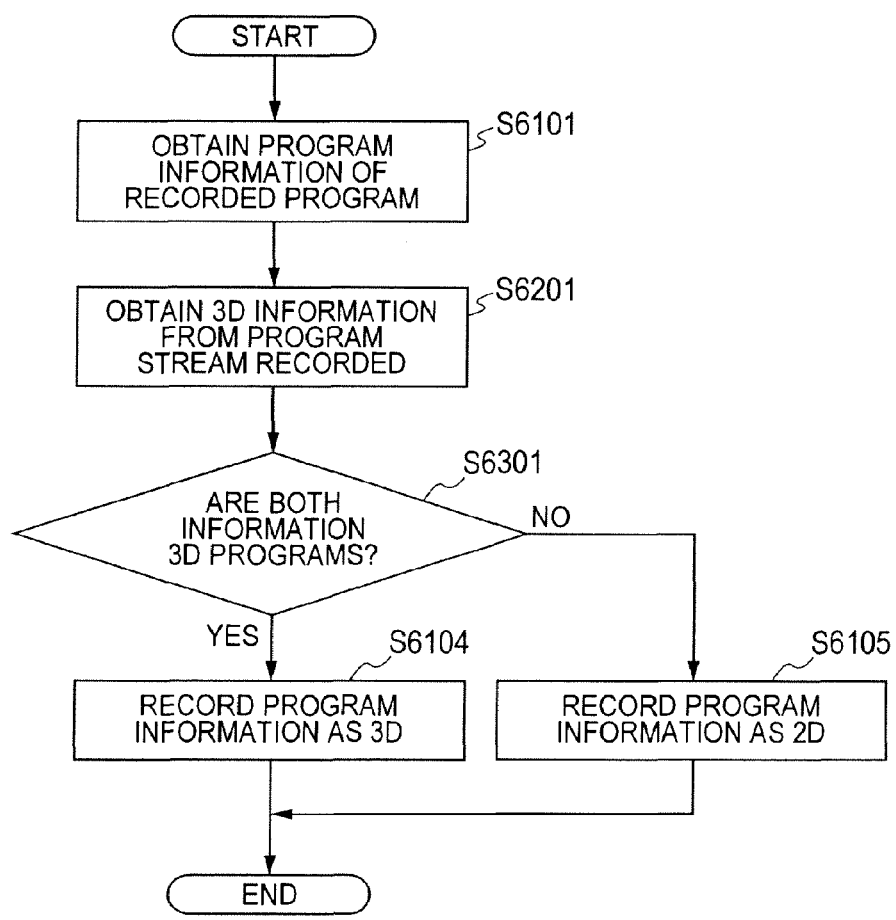
FIG. 63 is a view for showing an example of a flowchart when recording 2D/3D identification information.

The information to be recorded in PSI or SI and the information to be recorded in "user_nibble" can exist within one (1) stream, at the same time. FIG. 63 shows an example of a sequence for determining if the program is the 3D program or not with using both of that information.

In S6101, the multiplex/demultiplex portion 29 obtains an identifier for determining 3D/2D on such PSI or SI information as shown in FIG. 7 or 10A, from the stream to be recorded, and transmits as data to the CPU 21, and then advances the process to S6201.

In S6201, the demultiplexer 5801 obtains such information as is described in the "user_nibble" shown in FIG. 56, to transmit it to the CPU 21, and advances the process to S6301.

In S6301, the CPU 21 determines if the stream to be recorded is the 3D or not, from two (2) pieces of information obtained, and if both information indicate 3D, it advances the process to S6104, on the other hand if either one information indicates 2D, to S6105.

In S6104, an instruction is given from the CPU 21 to the program information management portion 5806, so that "3D" is recorded into the program information in accordance with such regulated format as shown in FIG. 60, for example, and the process is completed.

In S6105, an instruction is given from the CPU 21 to the program information management portion 5806, so that "2D" is recorded into the program information in accordance with such regulated format as shown in FIG. 60, for example, and the process is completed.

Although timings when executing the processes shown in FIGS. 61 to 63 are arbitrary, for example, in case where recording is programmed from a top of a certain program, the receiving apparatus 4 may record the program information attached therewith, responding to the timing when an establishing of recording (i.e., it means that the data is reserved into the recording medium 26) is settled, or may record the value, which is obtained after an elapse of certain time-period after when the recording is started. If it is a system recording one of the broadcasting programs in one (1) recoding file, by each, the program information may be recorded after an elapse of certain time-period (for example, 10 seconds later) from detection of exchange of the broadcast program, etc.

The time-period from when determining 3D of the program to be recorded up to when actually recording the program information into the recording medium 26 by the CPU 21 may have an arbitrary time difference, for example, while obtaining and analyzing the information after elapsing a certain time-period from when the recording starts, the program information may be recorded into the recording medium 26 at the timing of completion of the recording.

Figure 64A:
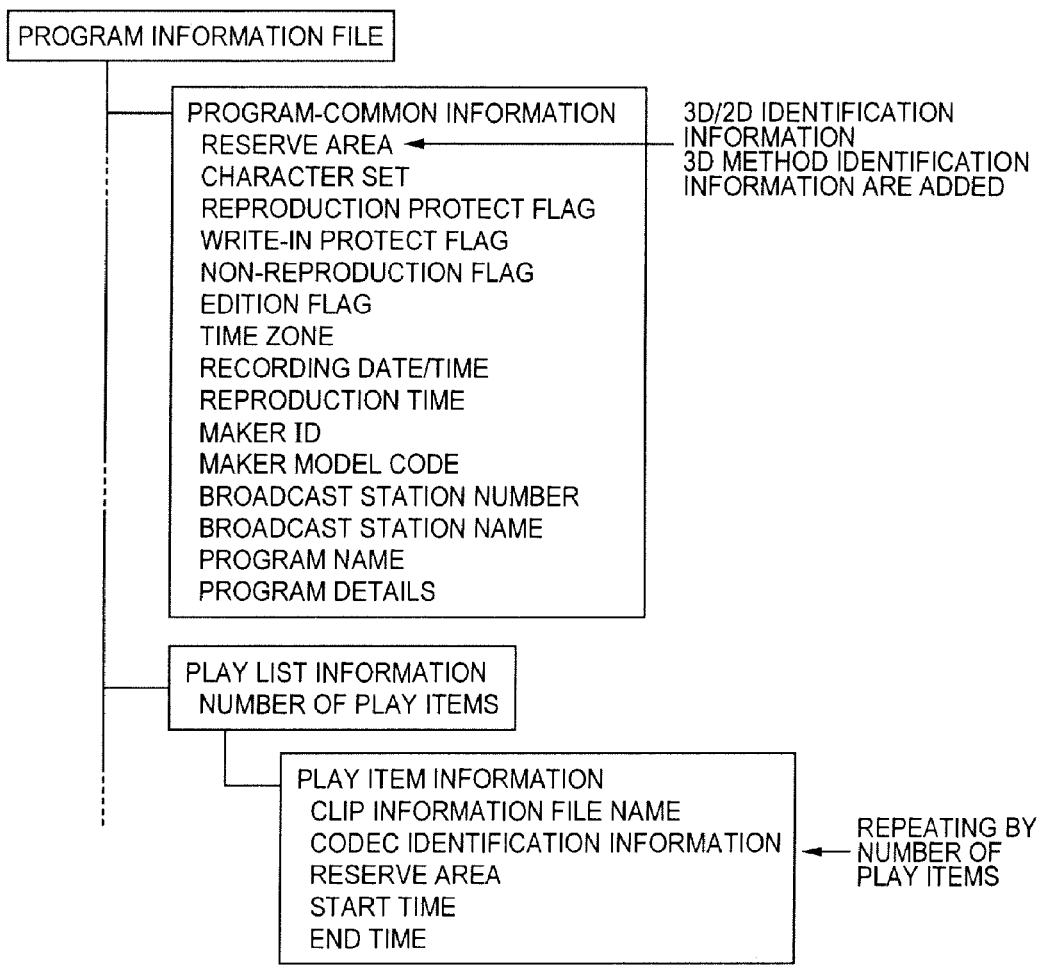
FIG. 64A is a view for showing an example of the structure of a folder file of data to be recorded onto a recoding medium 26.

FIG. 64A shows an example of adding method identification information of the 3D broadcasting, further to the example of the data configuration in an inside of the program information file shown in FIG. 60. "3D/2D identification information" and "3D method identification information" are added, where there is sufficient "reserve area" within the program-common information.

In this figure, a part (s), such as, the chapter information, for example, where no change is made, is/are omitted from displaying thereof. An example of bit-strings of "3D method identification information" and meanings presented by them is shown in FIG. 64B. If the bit value is "0x00", the corresponding program includes the 3D video signal of "Side-by-Side" method. If the bit value is "0x01", the corresponding program includes the 3D video signal of "Top-and-Bottom" method. If the bit value is "0x02", the corresponding program includes the 3D video signal of the frame sequential method. "0x03" is reserved for future extension.

With this, the receiving apparatus 4 is able to display the information, when recording plural numbers of 3D broadcastings different in the methods thereof upon receipt thereof, and also is able to reproduce them through an appropriate selection of the 3D display method when reproducing.

The sequence for obtaining the information when recording is similar to that of the example, which is shown in FIGS. 61 to 63; i.e., it is enough to record the 3D method identification information when recording the program information into the recording medium 26. With this, it is possible to provide the user, also the 3D method(s) together with, when displaying the list of the program(s) recorded. In case where there is no necessity of providing the 3D method, there may be displayed only that it contains the 3D video.

Also, the "3D/2D identification information" and the "3D method identification information" may be recorded in the "reserve area" within the play item information. With this, it is also possible to provide the user, the 3D method by more detailed unit thereof.

As further different variation, the "3D/2D identification information" may be recorded within the program-common information, while the "3D method identification information" within the play item information. With doing in this manner, it is possible to provide the user if the 3D video signal is contained or not, only by referring to the program-common information for her/him.

In FIG. 64, although there is shown the example of recording the "3D/2D identification information" and the "3D method identification information", separately, however those may be combined into one (1) piece of information, such as, "3D identification information". For example, the bit value may be defined as follow: if the bit value of this information is "0x00", the corresponding program does not contain the 3D video signal therein; if being "0x01", the corresponding program contains the 3D video signal of the "Side-by-Side" method; if the bit value is "0x02", the corresponding program contains the 3D video signal of the "Top-and-Bottom" method; and if the bit value is "0x03", the corresponding program contains the 3D video signal of the frame sequential method, and also even in the case of using the 3D display other than the method (s) mentioned in the present embodiment, if they are defined, one by one, with assigning sufficient bits thereto, it is possible to obtain the similar effect to that of the embodiment mentioned above.

<Example of Process for Displaying Information when Reproducing>

As was explained in the above, if a 3D determination information is included in the program information, which is recorded in the recording medium 26, there can be obtained such an effect as will be mentioned blow, when reproducing.

FIG. 65 shows an example of a screen display when displaying a list of the program data, which is recorded in the recording medium 26. A reference numeral 6501 depicts a display for displaying. 6502 depicts an area or region where a tag is displayed, indicating, recording data of which recording medium is displayed at present, for example, when the receiving apparatus is connectable with plural numbers of recoding media. 6503 depicts an area or region where a type information tag is displayed, which is selected by the user when she/he wishes to display the programs classified.

For example, when selection is made on a tab "not-viewed/listened" with using an up/down key of the remote controller, then in the display area 6504 is displayed only a program(s) corresponding thereto, which is/are never reproduced yet after being recorded. The tab displayed on this hierarchy may be displayed covering over plural numbers of the hierarchies. For example, when selecting "genre", it is possible to align the genre tabs, such as, "drama", "news" and "animation", with providing a tab display area one more in the area 6503.

For example, when the user selects "drama" among those, only the drama program(s) corresponding thereto is/are displayed in the display area 6504. For that purpose, there is necessity that the genre information is recorded in the program information. The area 6504 is an area for displaying the list of data of the recorded program(s) fitting to the classification selected by 6503. The user makes an operation, such as, selecting a program, which she/he wishes to reproduce, among from the program(s) displayed here.

If there are programs recorded, in a number of pieces equal to or greater than that acceptable on one screen (e.g., 5 pieces in the this example), they are displayed covering over plural numbers of pages. A scroll bar may be displayed in the horizontal direction. Although the information to be displayed within one data of the recoded program is arbitrary, but there are displayed, for example, a thumbnail picture, date and time when recoding is made, a program name, a recoding mode when recording, etc. The thumbnail picture may be a still picture or a moving picture. A reference numeral 6505 depicts a guide display area for displaying a brief explanation of operations and/or contents of operations available on the remote controller to the user.

FIG. 65A shows an example of displaying a mark (also, may be called "icon") to the 3D program, for indicating that, by referring to the 3D determination information of the program information, when displaying the list of all the programs recorded in the recording medium 26. A program D and a program D are the 3D programs, but other than those are the 2D programs, therefore no display is made thereon.

With this, there can be obtained an effect that the user can find the 3D program(s) easily. Of course, not limiting to the display with an aid of the icon, but there may be displayed a character string for indicating the 3D program, adding to the program title. Or, similarly, to the 2D program may be displayed a mark for indicating to be 2D. In that instance, display colors thereof may be changed so that the user can make distinction between them, further easily.

FIG. 65B shows an example when "3" is selected by a classification or type tab and there is displayed a list of the 3D programs, which are recorded in the recording medium 26. Such a display with applying the classification can be made also, by recoding the 3D determination information as the program information when recording. This can be achieved by means of the CPU 21, extracting only the 3D program to display, by referring to the 3D determination information of the program information for all the recorded programs.

With this, the user can find out the 3D program even from among, easily, if there are the recoded programs in a large number thereof. In the present example, although the mark for indicating to be the 3D program is displayed for each program in the list display area 6504, however since it is apparent that the 3D program(s) is/are displayed in the type tab area 6503, this mark may not be displayed.

The information shown in the display area 6504 should not be limited to the content as shown in FIG. 65. Thus, an order of displaying each of information, such as, the program names and/or the program recoding times, etc., may be different from this example, and also as the information to be displayed, other than this example, information delivered from the program information may be displayed, for example, a mark for indicating the condition of not-viewed/listened and/or a mark for indicating that the chapter is registered, etc.

Figure 66:
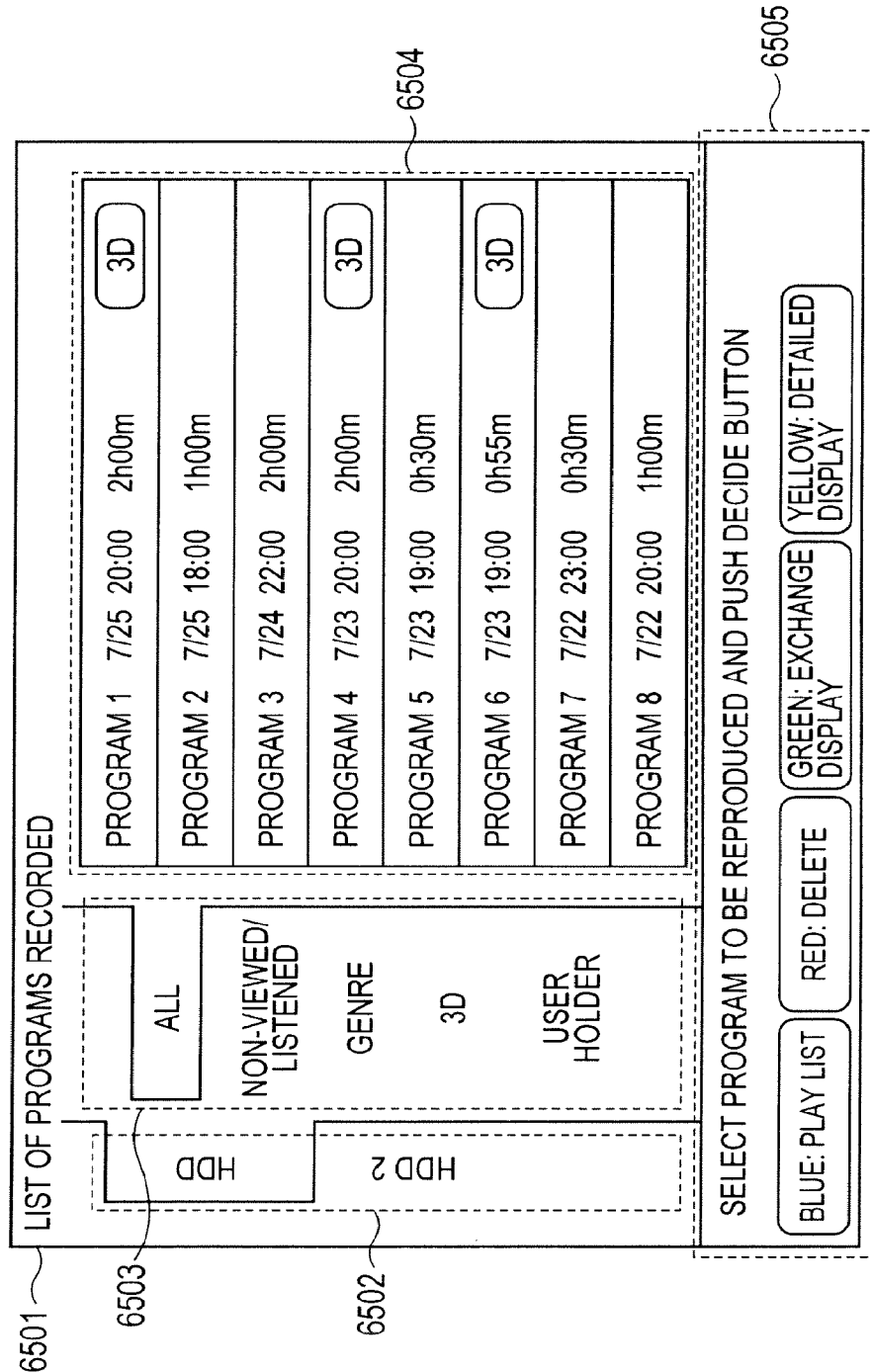
FIG. 66 is a view for showing an example of 3D information display when displaying a list of the programs, which are recorded on the recording medium 26.

FIG. 66 shows an example of a list display differing in the method of displaying the programs in the list display area 6504 for each program. Although the display content for each program is simplified, a large number of the programs can be displayed one time. In this display example, too, the user can distinguish the 3D program, easily, if displaying the mark indicating the 3D program together with.

Figure 67:
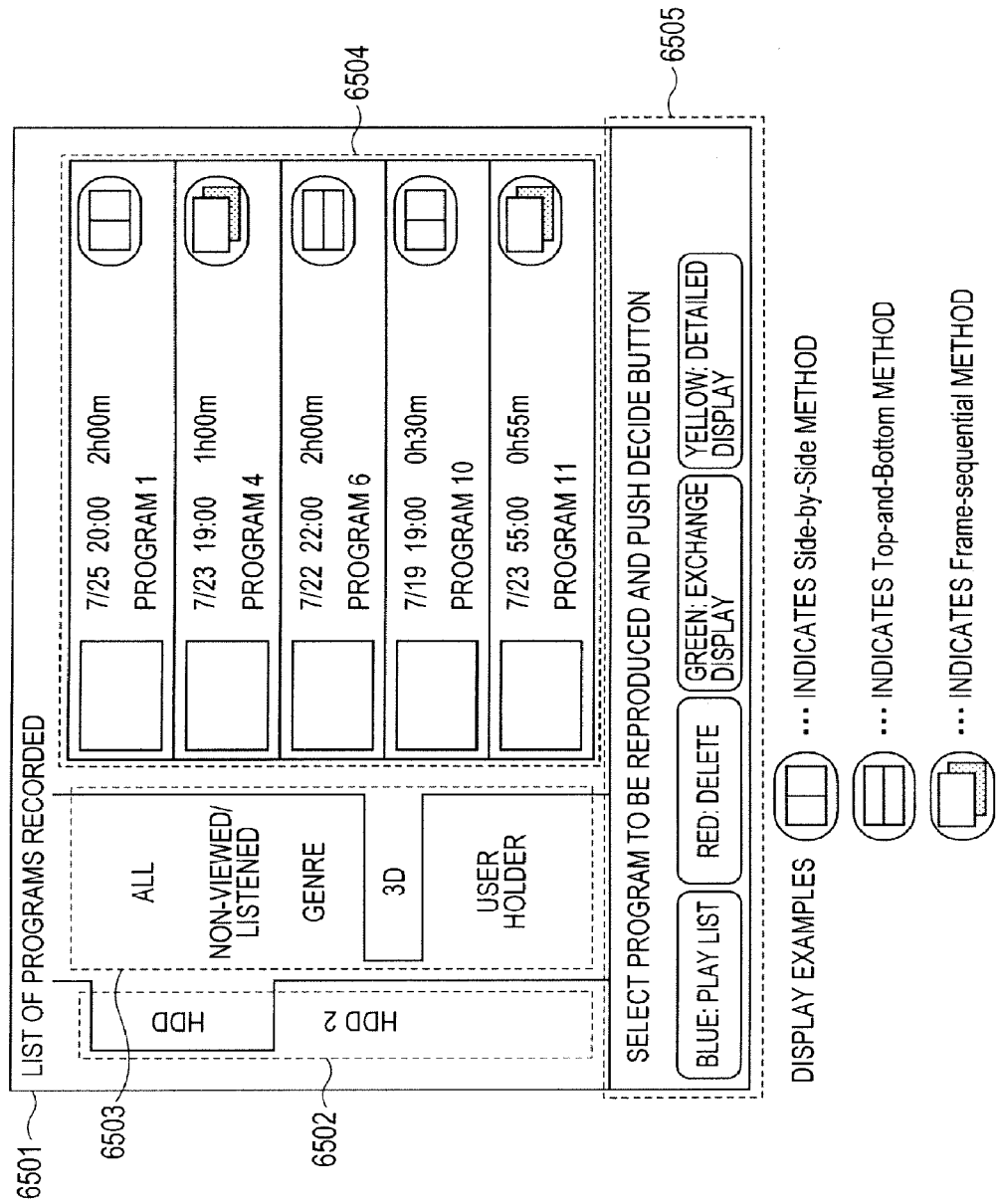
FIG. 67 is a view for showing an example of 3D information display when displaying a list of the programs, which are recorded on the recording medium 26.

Also, in case where the program information is recorded, being combined with the 3D method identification information, as is shown in FIG. 67, the 3D method may be displayed when displaying the list. With displaying the marks catching the characteristics, such as, "Sid-by-Side", "Top-and-Bottom" and "frame sequential", there can be obtained an effect that the user can understand, easily, which 3D method it is.

With this, the user can obtain an effect that she/he can understand, easily, which program is the 3 D broadcasting, including the transmission method thereof. In FIG. 67, although there is shown the example of the case where "3D" is selected by the type tag; however, also when selecting "all" or other tab, similarly, the method type information may be displayed.

Also, as the operations when recording, in case where the 3D program is detected along the sequence shown in FIGS. 61 to 63, with recording the character data, such as, "[3D]", for example, at the top of the program name of the program information, which the CPU 21 records within the program information management portion 5806, in the operation of S6104, there can be a further effect.

Regarding a character string to be added, the recording position and/or the content thereof does not matter with, as far as it can be seen that it is the 3D program, and it may be a character string, such as, "[3D]" or "(3D)", or may be a character string, such as, "being broadcasted as 3D program" at the last of the program name, for example. If there is an upper limit in the number of characters, which can be recorded in the program name, and if the number exceed the upper limit when the character string, such as, "[3D]" is added, then only such an amount of data sufficient to add the data of the characters at the end (for example, 4 full-size characters in this example) are deleted, and the character data "[3D]" is added at the top thereof.

Figure 68A:
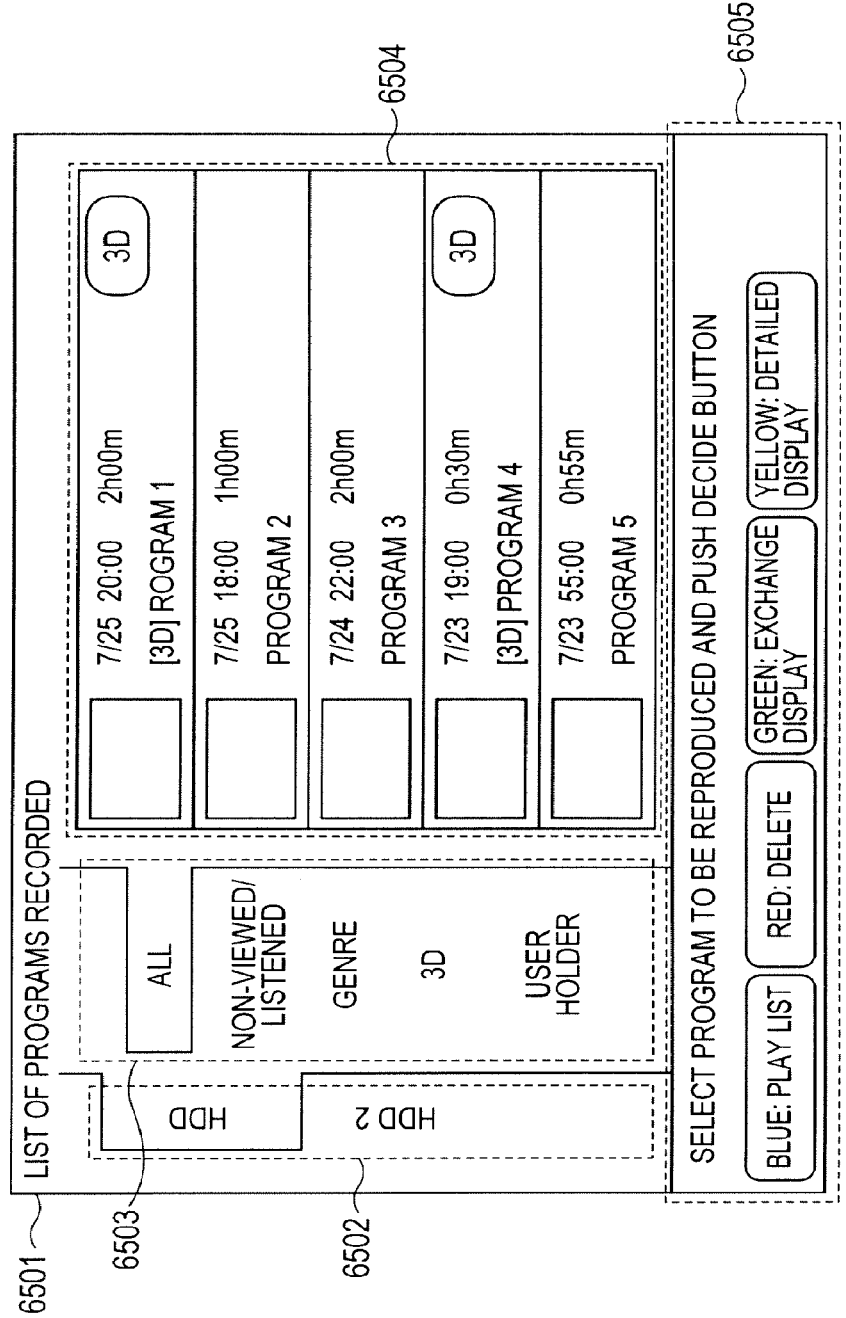

FIGS. 68A and 68B show examples of a list screen of the recorded programs, which are displayed when executing the control in such a manner. Because the character strings are added to a program 1 and a program 4, being the 3D program, at the top of the program name thereof, there can be obtained an effect that it can be determined, which one of the programs is the 3D broadcasting, at a glance, only from the program name thereof. In this instance, such mark for indicating the 3D program, as shown in FIG. 65, may be displayed together with. Even in case where the display is made in a list display format, the similar effect can be obtained with doing the similar display.

If considering the case where the receiving apparatus has a detachable recording medium, and the recording medium detached can be used, being connected with other equipment, then with this control, there can be obtained an effect that the user can determines, which one of the programs is the 3D when the information of the recorded programs is displayed, by reading out the program names, even if the equipment connected with cannot read out the 3D determination information of the program information.

An example of the display of the recorded program list at this time is shown in FIG. 68B. In a display area of the recording medium information 6502 and a display area of the program list 6504, similarly in FIG. 68A, "[3D]" is shown for the program 1 and the program 4. With this, the user can determine the 3D program on the list, easily, even when she/he is using the equipment, which cannot read out the 3D determination information.

In the present example, although no "3D" tab is displayed in the type tab display area 6503, but since there is regularity in the top of the program name, it is possible to produce a tab, such as, "[3D]", for example, by detecting this.

Since the thumbnail pictures of the list display format shown in FIGS. 65A and 65B are small in the sizes thereof and are the still pictures, therefore they may be produced/displayed in 2D even if being the thumbnails of the 3D programs. For example, in the case of the program having the video signal of the "Side-by-Side", data is read out from the recording medium 26, so as to decode the video on the left-hand side in the video decode portion 30, and a picture expanded by 2 times in the horizontal direction is captured, so as to be converted into the still picture of JPEG format, etc., thereby to be reserved in the corresponding portion of the recoding medium 26. Also, in the data of the previous program information is recorded that fact, thereby doing a renewal thereof.

Reproduction content, which can be obtained by connecting or linking all or a part of the plural numbers of recorded programs, is presented as a play list, and the list display, which is exemplarily shown in FIGS. 65A and 65B, is exchanged to the list display of the play list through pushing-down of a blue button of the remote controller device by the user.

Figure 69:
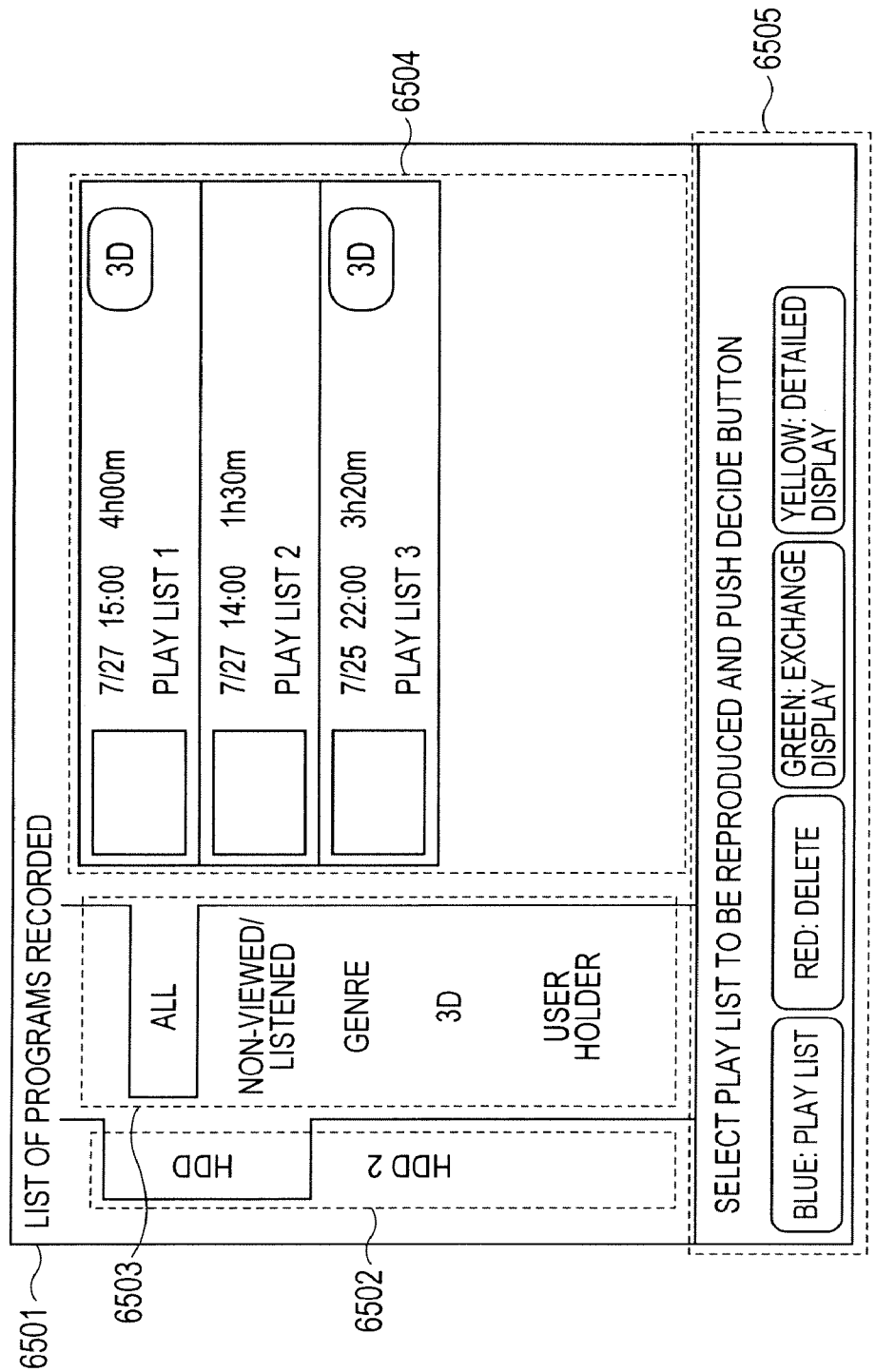
FIG. 69 is a view for showing an example of 3D information display when displaying a list of the programs, which are recorded on the recording medium 26.

FIG. 69 shows an example for displaying a content list of the play lists. In this case, a reference numeral 6504 is a list display area of the play list (s) already produced. Confirming the program information of the respective programs included in each play list, if at least one of the values of the 3D/2D identification information has the value meaning to include the 3D therein, the mark for indicating the 3D is displayed together with that play list, at the display point thereof.

With this, there can be obtained an effect that the user can grasp the stream including the 3D program therein at a glance. Further, the information of at which position the 2D/3D is exchanged among those play lists can be deal with, by recording the mark as the chapter information mentioned previously.

In the method for displaying when the user selects the 3D from the type tags as shown in FIG. 69 or when displaying the play list after she/he pushes down a green button of the remote controller, the display similar to that shown in FIG. 65B or 66 is executed. Also, if displaying the play list upon basis of the 3D/2D identification information, when she/he edits or newly produces, there can be brought about an merit for the user, that she/he can confirm into which position the 3D program enters.

Figure 70:
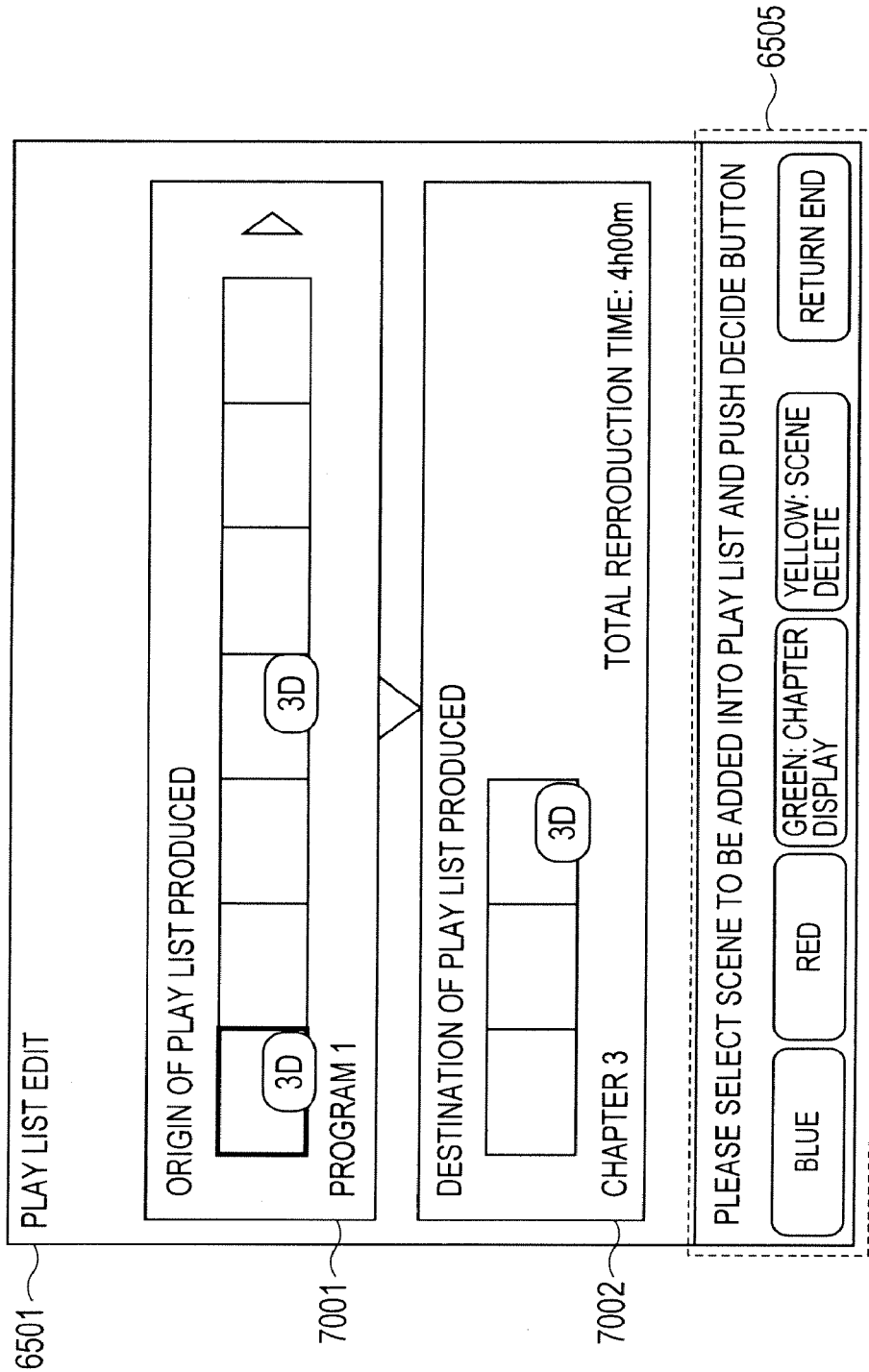
FIG. 70 is a view for showing an example of 3D information display when producing a play list.

FIG. 70 shows an example of a screen display for producing the play list, by extracting or cutting out a program or a scene from the recorded programs, which are memorized in the recording medium 26. A reference numeral 7001 depicts a display area for program data, which should be a source for producing the play list, wherein a thumbnail picture is displayed upon a unit of program or a unit of chapter of each program.

It is so configured that the user can add a scene of her/his wish into the play list if the user selects the thumbnail picture of that scene. A reference numeral 7002 depicts an area, in which the contents of the play list under the condition of production are displayed, as a line of thumbnail pictures of the respective scenes. For example, the user selects a desired scene in the area 7001, through the lest and the right keys of the remote controller, etc., and next in the area 7002, she/he inserts that scene at the position of her/his desire; thereby producing the play list.

Also, when a yellow button is pushed down in the area 7002, for example, one scene, on which the cursor is touching, is deleted from the play list. If there is chapter information for indicating an exchanging boundary between 3D/2D, it is possible to determine 3D/2D by referring to this chapter information, for each program or scene, which is displayed in 7001 and 7002, and a mark for indicating to be 3D is displayed on the program or the scene of 3D.

The mark may be displayed by analyzing the program or the video data of the scene or the program information. With this, the user can produce the play list while confirming in which position the 3D program is inserted.

<Example of List Displaying/Reproducing Process with Other System Configuration>

In the system configuration shown in FIG. 36, consideration is paid on the case where a video/audio output device 3601 (i.e., the receiving apparatus 4) holds the recording medium therein. As is shown in FIG. 60, if it holds the information indicating if each recorded program includes the 3D video or not by adding only information of 1 bit within the program information, for example, it is possible to display such a list screen on the display 3603, enabling the user to easily identify the 3D program thereon, as is shown in FIG. 65, via the transmission path 3602.

When viewing/listening the recorded program data including the 3D video data therein on the present system configuration, if it is possible to transmit 3D metadata in a format, which is regulated on the transmission path 3602 (for example, the format regulated according to the HDMI regulation), the video/audio output device 3601 (i.e., the receiving apparatus 4) notices the 3D method type information to the display 3603 with an aid the metadata, as well as, the video output. If it is impossible to transmit the 3D metadata in the format, which is regulated on the transmission path 3602, the display 3603 may receive the recorded program data including the 3D video therein, and may decode it into the original video signal so as to determine the 3D method type.

If the video/audio output device 3601 further holds therein the 3D method identification information, as the program information, with assigning the plural numbers of bits thereto, as is shown in FIG. 64, it is possible to display such a list screen on the display 3603, that the user can easily identify even the 3D method thereof, as is shown in FIG. 67. In this instance, when viewing/listening the recorded program data including the 3D video data therein on the present system configuration, it is possible to notice the 3D method type information to the display 3603, by converting the 3D method identification information, which is held in the program information, into a predetermined format of the metadata, if the 3D metadata can be transmitted on the transmission path 3602 (for example, the format regulated according to the HDMI regulation).

<Example of Viewing/Listening Process Via Network>

Figure 71:
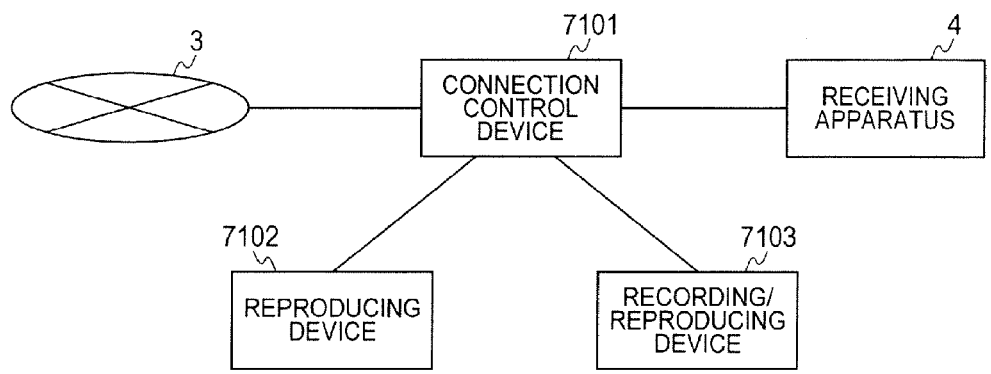
FIG. 71 is a view for showing an example of the structure of a local network.

The programs recorded on the receiving apparatus 4 according to the present invention can be reproduced on other reproducing apparatus, which is connected therewith through an in-house network, for example. FIG. 71 shows an example of connecting the receiving apparatus 4 and the reproducing apparatus 7102 and a recording/reproducing apparatus 7103. A connect control device 7101 is equipment having a looting function, such as, a modem or the like, for example, and transmits the data, which is inputted from the network 3, including the public network, with determining an appropriate one from among the devices or apparatuses connected with. Or, it controls the data transmission process between the equipments connected to the connect control device 7101.

The reproducing apparatus 7102 is an apparatus, which can obtain/display the list information of the programs, which is recorded in the recording medium 26 within the receiving apparatus 4, via the network, or receive the data of the desired program via the network, to be viewed/listened. As a detailed method for controlling the content through the network, it may be based on a measured specification, such as, DLNA (Digital Living Network Alliance), for example.

The recording/reproducing apparatus 7103 has a recording medium, and is able to obtain/display the list information of the programs within the receiving apparatus 4, similar to the reproducing apparatus 7102, and to receive the data of the desired program via the network, to be viewed/listened, and further to copy the data of an arbitrary program the receiving apparatus 4, into recording medium so as to utilize it therein. As a process for outputting the data in the receiving apparatus 4, the CPU 21 converts the program information into a format appropriate for network transmission, and output it to the network 3 from the network I/F 25.

For outputting the video/audio data therefrom, the recording/reproducing portion 27 reads out the data of the program, which is recorded in the recording medium 26, and the CPU 21 treats an encryption process on it, appropriate for transmission on the network, and it is outputted from the network I/F 25.

Contrary to that, on the receiving apparatus 4, it is also possible to obtain/display the list information of the programs, which are recorded in the recording medium within the recording/reproducing apparatus 7103, to receive the data of the desired program jumping over the network, to be viewed/listened, and to copy the data of an arbitrary program into the recording medium 26 so as to utilize it.

Figure 72A:
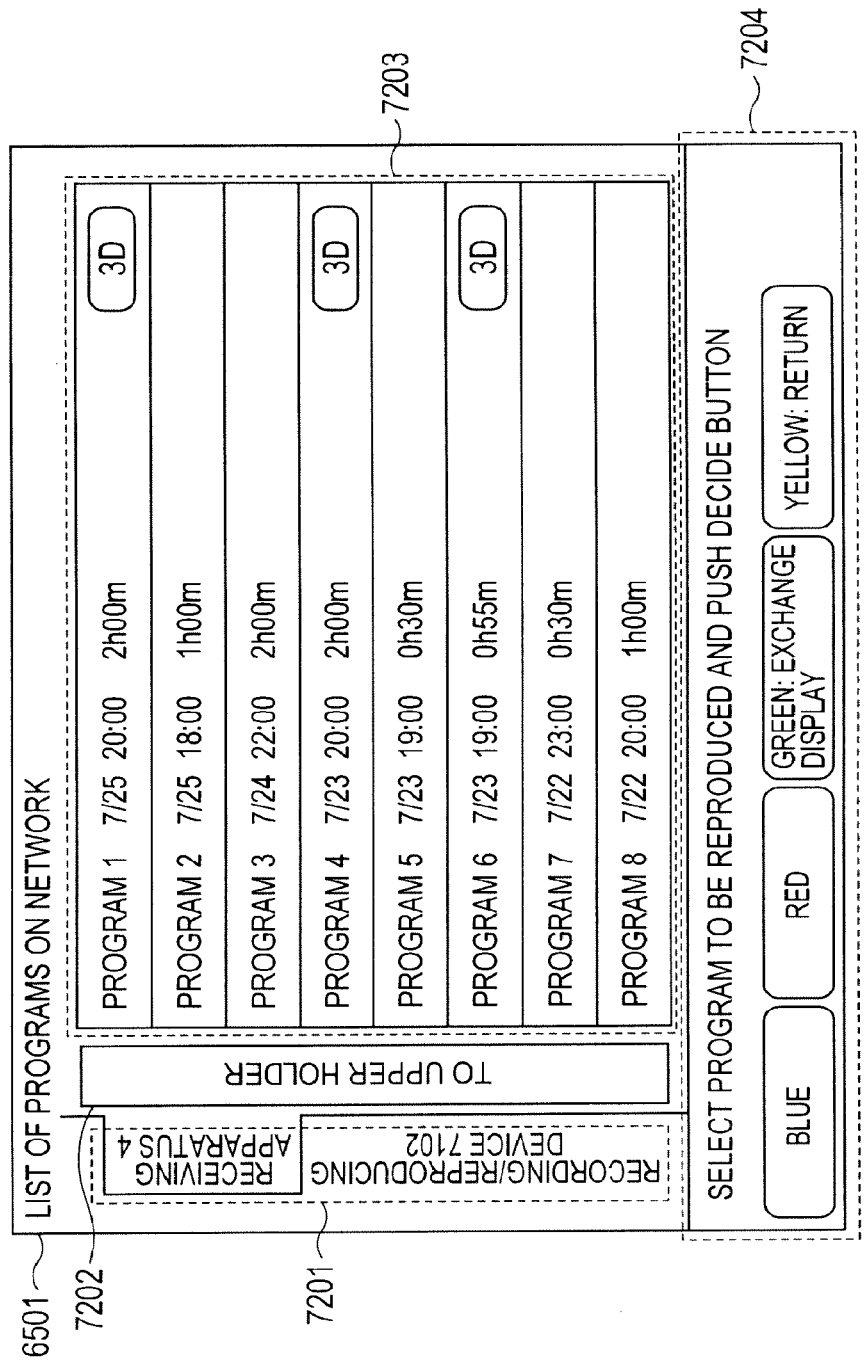
FIGS. 72A and 72B are views for showing an example of 3D information display when displaying a list of the programs, which are recorded on the recording medium 26.

In the connecting configuration of equipments shown in FIG. 71 mentioned above, FIG. 72 shows an example of displaying the list of the programs, which are recorded in the recording medium 26, on the reproducing apparatus 7102. A reference numeral 7201 depicts an area for display a list of an apparatus(es) connected with through the network. The user can call up the program information from a desired apparatus by operating the up/down keys, etc., of the remote controller.

A reference numeral 7202 depicts a select button for shifting to the hierarchy higher by one (1). 7203 depicts an area for displaying a list of programs, which are recorded within the folder selected in the apparatus selected. In the present example, in addition to the program name, the recording date/time, the recoding time-length, in FIG. 72A, there is displayed an icon of indicating to be the 3D program for that.

When displaying the list of programs, which are recorded in the recording medium 26, it is possible to make an easily understandable display, such as, displaying an icon or the like, for example, together with the information of the program name and the length of program, by obtaining the 3D/2D identification information of the program information data through the network, for example.

On the other hand, in case where the reproducing apparatus 7102 does not hold icon data therein because of not being enabled with the 3D reproduction, etc., it is impossible to do such display.

Figure 72B:
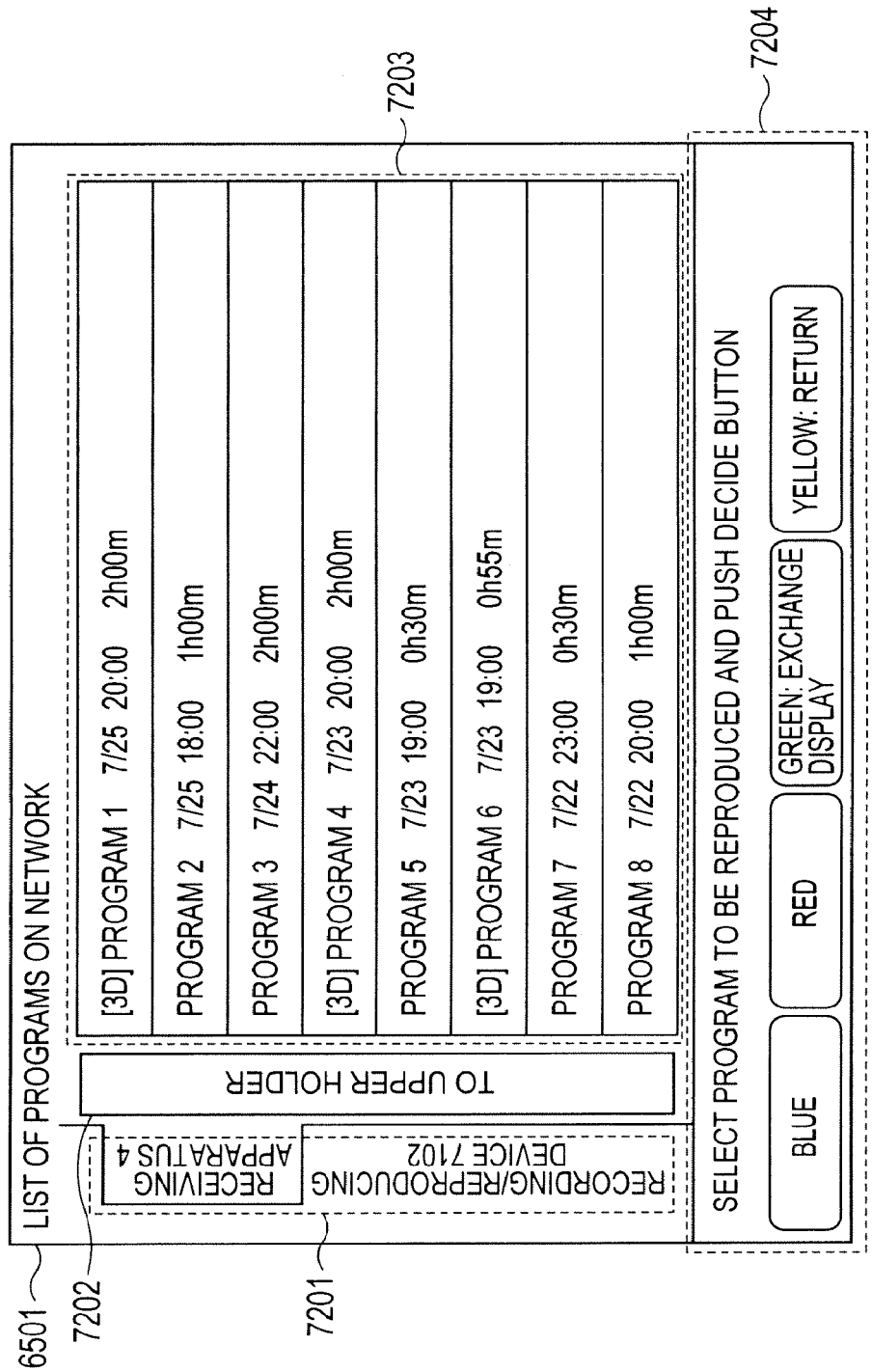

FIG. 72B shows an example of displaying the list of programs, which are recorded in the recording medium 26, on the reproducing apparatus 7102, when the receiving apparatus 4 records the character string, such as, "[3D]" by revising the program name when recording, as was explained by referring to FIG. 68. With this, even if the reproducing apparatus 7102 does not hold the icon data for use of the 3D program therein, the user can identify which one is the 3D program.

A reference numeral 7204 depicts an area for displaying an operation guide for the user, similar to 6505. This may differs from 6505 in the setup content thereof, such as, no function is assigned to a "red" and "blue" buttons, but to "yellow" one is assigned a function of turning the display screen back to the previous condition by one (1) time, etc.

It is similar to when displaying on the recording/reproducing apparatus 7103, or when displaying the list of the programs recorded within the recording/reproducing apparatus 7103 on the receiving apparatus 4.

Regarding connection of the apparatuses, as the configuration for accomplishing the embodiment mentioned above, it can be also achieved by connecting the reproducing apparatus 7102 and the receiving apparatus 4 directly. Or, there may be connected plural numbers of sets of the reproducing apparatuses and/or the recording/reproducing apparatuses, or the receiving apparatuses, much more than those shown in FIG. 71, or the connect control devices may be combined in multi-stages. Even with such configuration different in the connection, it is possible to look the recorded program(s) of the receiving apparatus 4 from the reproducing equipment (s), which is/are connected in the similar manner to that of the reproducing apparatus 7201. And, it is also possible to look the recorded program(s) of other recording device or apparatus from the receiving apparatus 4.

Figure 73:
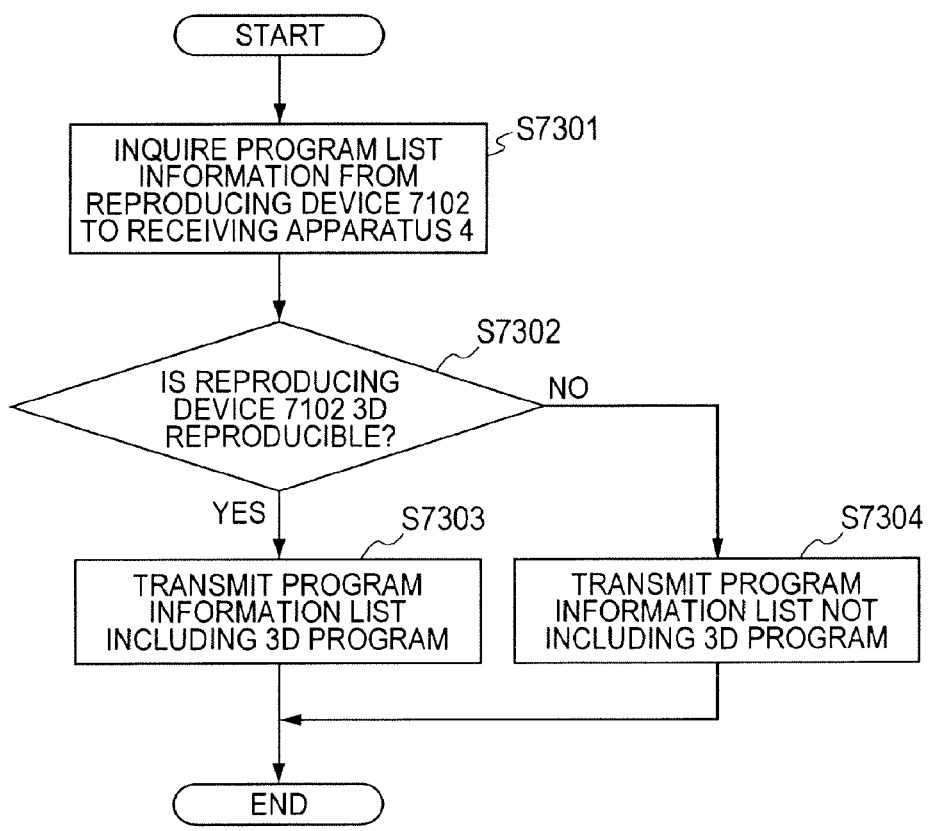
FIG. 73 is a view for showing an example of a flowchart when transmitting program information of 3D program to network connected equipments.

In case where the reproducing apparatus 7102 is an apparatus unable to display the 3D, the receiver 4 may recognize the characteristics of the reproducing apparatus 7102 in advance, so as not transmit the information of the 3D content thereto. In FIG. 73 is shown a sequence.

In 7301, the reproducing apparatus 7102 inquires about the list of contents to the receiving apparatus 4 via the network. In 7302, it is determined if the 3D program can be reproduced or not, by the CPU 21 of the receiving apparatus 4, for example, through obtaining model information of the reproducing apparatus 7102, etc. If determining it is irreproducible, the sequence moves into 7304, while if reproducible or unknown, then it moves into 7303.

In 7303, the list of the recorded program(s) is transmitted, including the information of 3D program therein, and then the process is completed. In 7304, the list of the recorded program(s) is transmitted, but not including the information of 3D program therein, and then the process is completed. With doing this, in case where the reproducing apparatus 7102 cannot reproduce the 3D program, since it goes without showing gash or superfluous information (e.g., information of the 3D program, which cannot be reproduced) when displaying the list of the recorded program(s) within the recording medium 26 of the receiving apparatus 4, therefore the usability can be improved.

Or alternately, in case where the reproducing apparatus 7102 is unable to display the 3D, the usability for the user may be improved, by transmitting the recorded program information, including the 3D program therein, so that the user can select the 3D program on the reproducing apparatus 7102, to convert it from the 3D program into the 2D within the receiving apparatus 4, and thereby outputting the video data therefrom, when reproducing.

<Example of Copying/Moving Process of Data Via Network>

In such configuration as shown in FIG. 71, it is also possible to copy/move the data, for example, which is recorded in the recording medium of the receiving apparatus 4, via the network, to the recording medium of the recording/reproducing apparatus 7103. The CPU 21 of the receiving apparatus 4 converts the program data and/or the recorded program data into the transmission signals of a format suited to the format regulated on the network (for example, the format regulated by DLNA), and then transmits the data in accordance with the method adapted to the sequence, which is regulated on the network transmission path.

For example, it is the sequence as follows: such as, first of all, an equipment authentication is executed, for confirming on whether copying/moving can be made or not, without any trouble, between the equipment at the origin of transmission and the equipment at the destination of transmission; when the authentication is established, the data at the origin of transmission is invalidated, so that it cannot be reproduced, if it is movement of the data; the program information is transmitted in a predetermined format (for example, XML format); the recorded program data is transmitted in a predetermined format (for example, MPEG-TS format, on which DTCP-IP encryption is treated); and if the transmission is completed up to the end, the session is closed, for example. The recording/reproducing apparatus 7103 converts the data transmitted, appropriately, into a data format and/or an encryption method, which is/are regulated for recording it within the apparatus, and then records the data into the recording medium.

If the 3D/2D identification information is regulated by a data format on the transmission path, and also by a data format applied when being recorded in the recording/reproducing apparatus 7103, as a result of executing the copying/moving of the data, equivalent information can be held, as the program information of the recording/reproducing apparatus 7103, and therefore the usability for the user is improved. Or, the 3D method identification information may be transmitted in the similar manner.

<Example of Dubbing Process Between Recording Media>

As a scene of using the 3D/2D determination information, there are cases when copying and moving the data between the recording media (being called "dubbing", collectively). Thus, it is the case where plural numbers of the recording media can be connected to the receiving apparatus 4 through the recoding/reproducing portion 27, or where dubbing can be made from a one (1) recording medium to other recording medium.

Figure 74A:
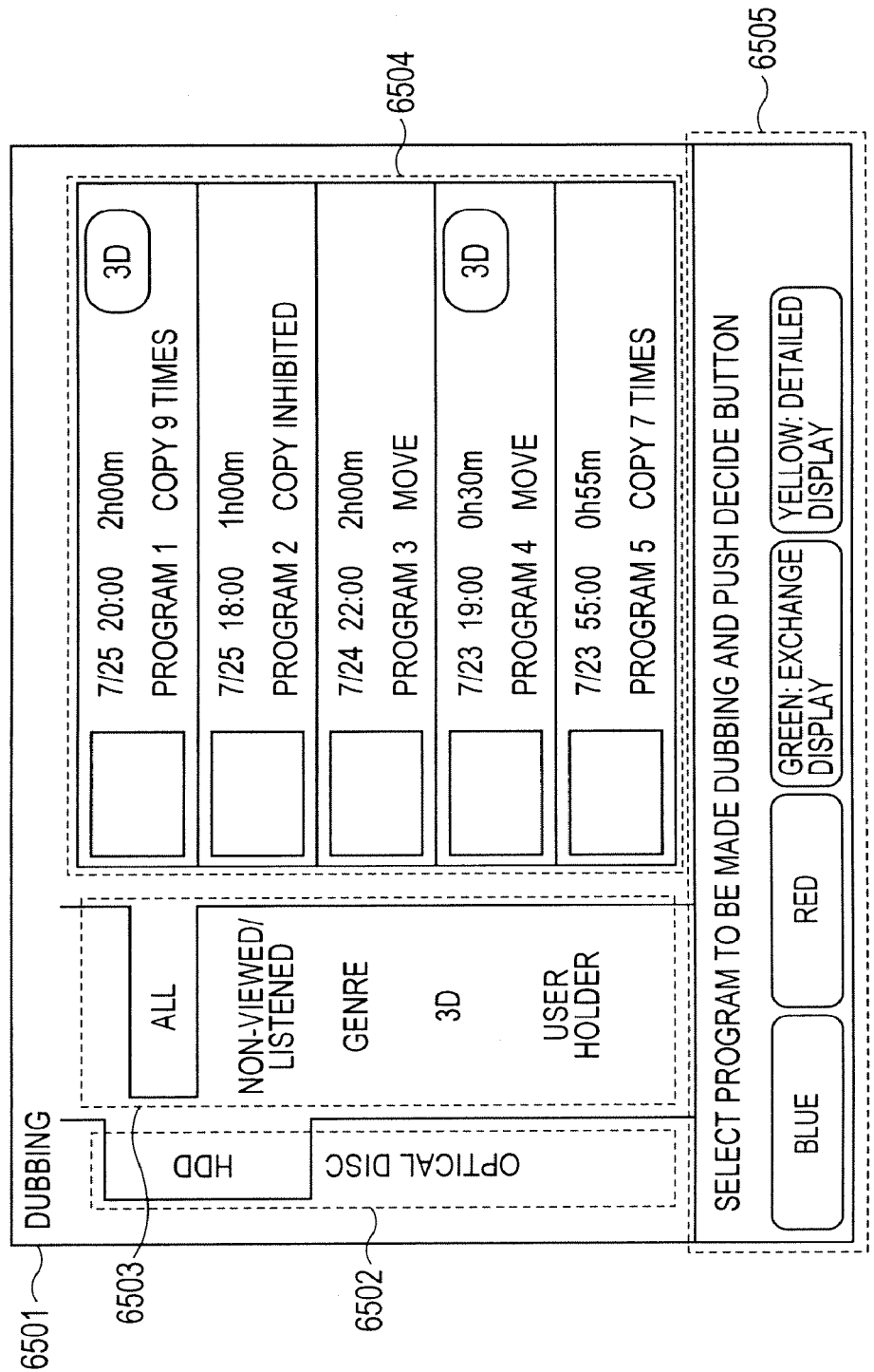
FIGS. 74A and 74B are views for showing an example of 3D information display when executing dubbing.

Also, if the recording medium has portability, such as, an optical disc or the like, for example, the user can reproduce the data, which is obtained through the dubbing, on further other reproducing apparatus. FIG. 74A shows a display screen when she/he selects the data of a dubbing target from among the recorded program(s) recorded in the recording medium 26.

In a program list display area 6504 is displayed; if it can be copied or not, or an allowable number of times of copying, as the information relating to the dubbing. For example, the following indications are made; i.e., for the program indicated as "copy inhibited", it cannot be copied nor moved, for the program indicated as "move", it can be moved (but, the original data is deleted when the data is moved to other equipment), and for the program indicated as "copy N times", it can be copied (N−1) times (i.e., the last time is "move"), for example.

Among of those, in the similar manner to that of the example of displaying the recorded program list, there may be made a display of an icon or the like, enabling easy determination of the 3D program therewith. With this, the user can determine the 3D program, easily, even when she/he executes the dubbing.

Upon executing the dubbing, there are cases where the folder and/or folder configuration differ(s) from, depending on a kind thereof, between the recording medium at the origin of movement and the recording medium at the destination of movement. Accordingly, the CPU 21 understands or grasps the data format, recording the origin of movement and the destination of movement therein, in advance, to convert the information to be recorded (i.e., the program information, the thumbnail file, the recorded video/audio data) into a format of the destination of transmission, appropriately, and thereby executing the dubbing. However, it is not necessary to move all the information.

For example, in case where no 2D/3D identification information is defined, in accordance with the regulation of the program information having the data format, to which the recording medium at the destination of movement follows, the CPU 21 cannot record the 3D/2D identification information to the destination of movement. Or, in case where the thumbnail picture is large the data thereof, and where not defined as an essential matter to be recoded, according to the regulation, to which the recording medium at the destination of movement follows, there can be also made such an implementation that no dubbing is made on the thumbnail pictures, by taking the time-period necessary for completing a dubbing operation into the consideration thereof.

As was mentioned above, in case where no dubbing is made of the 2D/3D identification information, because of convenience of the data format of the recording medium at the destination of movement, or the like, as was mentioned in the embodiment mentioned previously, if adding the character string, such as, "[3D]", to the program name, for example, since the user can understand if the program is the 3D or not, by seeing the program name thereof; therefore an improvement of the convenience can be achieved.

Figure 74B:
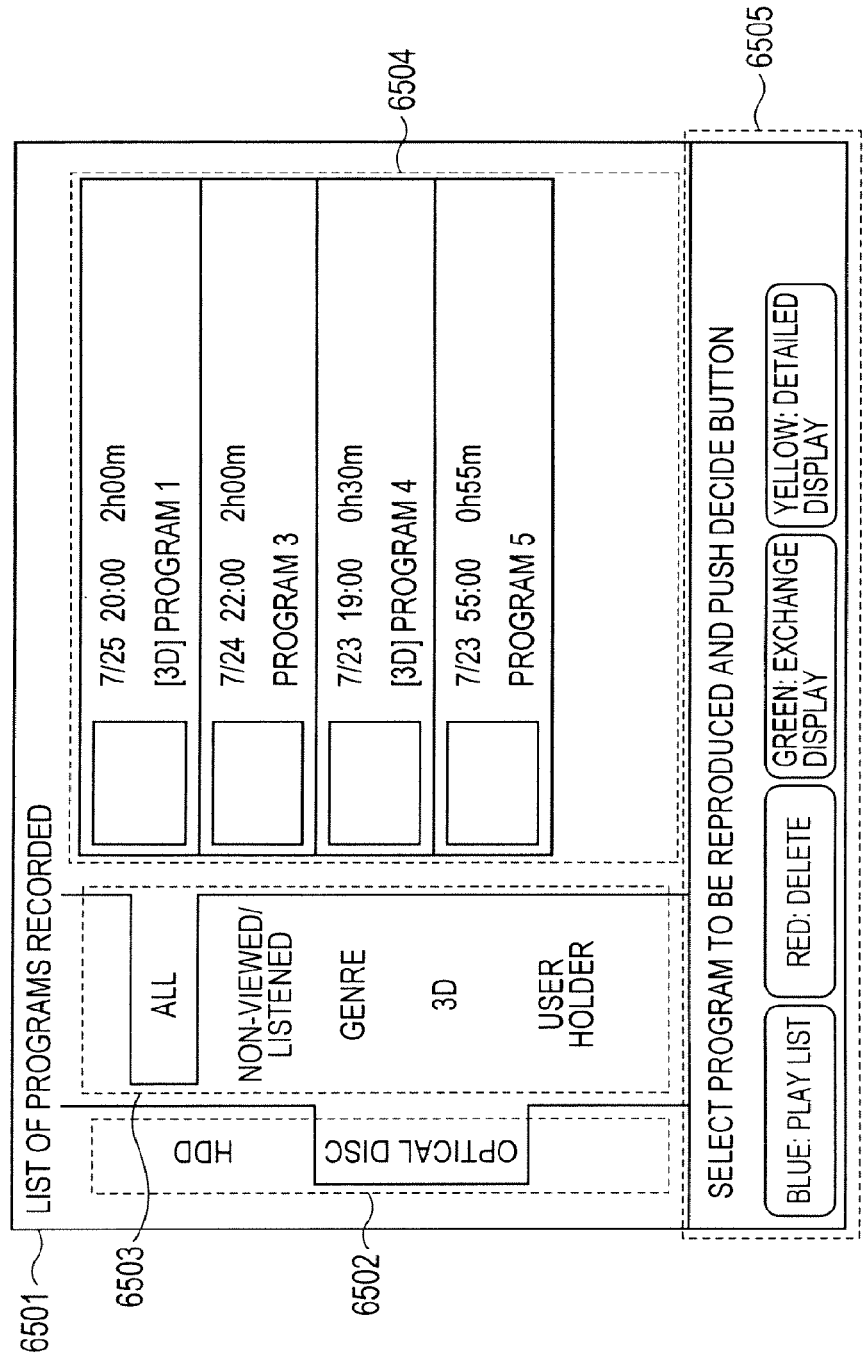

FIG. 74B shows an example of displaying a list of the program(s) recorded within the optical disc, when executing the dubbing from the recording medium 26 to the optical disc after treading a process for chaining the program name, in particular, when after completing the dubbing. Although there is no such the icon display as is shown in FIG. 74A, however the user can determine the 3D program, easily, with an aid of the program name. If the dubbing is executed, also including the 2D/3D identification information therein, the icon display may be made in FIG. 74B. With the 3D method identification information, if it can succeeded when making the dubbing, in the similar manner, then that information may be displayed in FIG. 74B.

<Special Reproducing Process>

When the user selects one (1) program from the program list display screen, shown in FIG. 65, reproduction is started of the selected program from among the program data reserved in the recording medium 26. In general, there is equipped with a function for enabling to adjust a reproduce speed, a reproduce direction and/or a reproduce position, arbitrarily (herein, reproduction in a positive direction and at 1×speed is called "normal reproduction", on the contrary to that, methods of reproducing at other speed and in the reverse direction may be sometimes called "special reproduction", collectively), through the remote controller operations by the user, during the reproducing. As an example can be listed up, for example, a high-speed search, such as, in the positive direction and at 2×speeds or 10×speeds, a high-speed search in the reverse direction, reproduction of executing output/display at 1.3×speeds accompanying the audio output (may be called "quick reproduction", too), etc.

Figure 75:
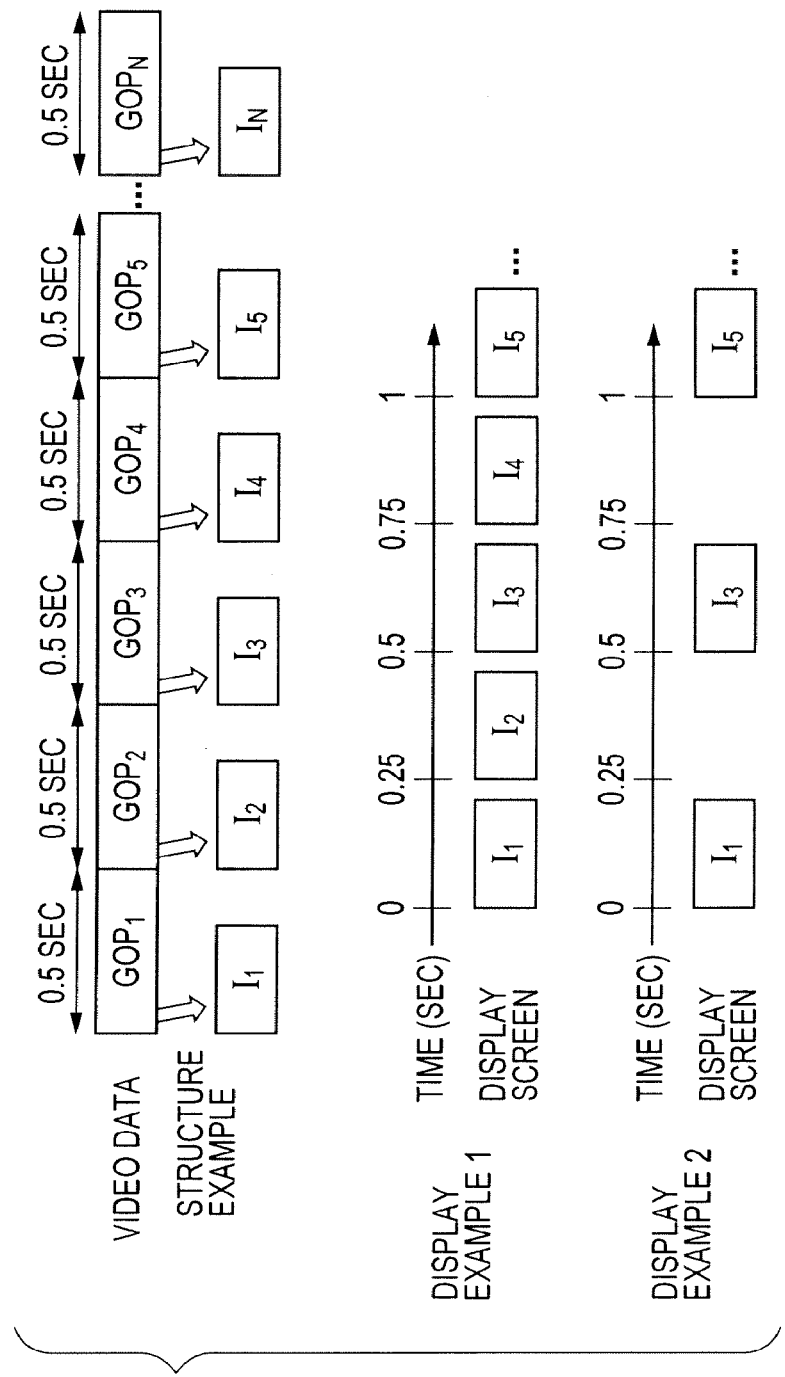
FIG. 75 is a view for showing an example of picture structure of the video data and video display when executing a high-speed search.

In the high-speed search, not decoding/displaying all of the videos included in a stream, but by repeating decoding/displaying upon only a predetermined "I" picture (s), it is possible to adjust the reproduction double-speed at an arbitrary one. It should not limited to the "I" picture, for example, but may be a picture, only with which a video display can be made. In FIG. 75 is shown a diagram of an example of the process when executing the high-speed search at 2×speeds.

An example of the configuration when extracting the video data from the stream is shown in an upper portion of FIG. 75. In this FIG. 75 is shown an example of 3D video data, which is stored in one (1) piece of the picture, being divided into the video for use of the left-side eye and the video for use of the right-side eye, like the "Side-by-Side" method or the "Top-and-Bottom" method, (this may be also called "2-viewpoints same ES method), for example.

The video data is made up with a series of GOD structures; wherein in one (1) GOD is contained a line of still pictures for 0.5 second, for example. Also, it is assumed that one (1) piece of the "I" picture is contained in one (1) GOP. When reproducing such video data at the 2×speeds, in a display example 1, the high-speed search at 2×speeds is executed, by displaying the "I" pictures of all GOP at time-interval two (2) times faster to the original one, such like, after displaying the "I" picture of GOP 1, by displaying the "I" picture of GOP 2 after elapsing 0.25 second, the "I" picture of GOP 3 after elapsing 0.5 second . . . .

On the other hand, in a display example 2, after displaying the "I" pictures of GOP 1, the time-period for displaying one (1) piece of the "I" picture is elongated, in the place of removing the display pictures at every two pieces, such like, displaying the "I" picture of GOP 3 after elapsing 0.5 second, the "I" picture of GOP 5 after elapsing 1 second, and with this, the 2×speeds display can be achieved.

Namely, the high-speed search can be achieved, arbitrarily, by adjusting the number of pieces of the still pictures to be displayed and/or the time-period for displaying per one (1) piece thereof. Not limiting to the example of the 2×speeds display shown in FIG. 75, the double-speed can be achieved at an arbitrary number thereof, in the similar manner, by adjusting the number of pieces of the still pictures to be displayed and/or the time-period for displaying per one (1) piece thereof. This is also true to the high-speed search, but in the reverse direction. Also, there is no necessity for the time-period for displaying one (1) piece of the still picture to be constant.

In the high-speed search, since the input data to the decoder portion, as well as the video data outputted therefrom, come to be discontinuous, a control, such as, treating a mute process or the like, may be executed on the output of the decoder portion, in particular, on the audio output, not to be outputted; thereby preventing from becoming an unnatural output not synchronized between the video and the audio.

The explanation given in the above is also applicable in case when reproducing the 3D program of the 2-viewpoints separate ES method, wherein there are two (2) pieces of data, each corresponding to the video data shown in FIG. 75, and the respective "I" pictures at the same displaying timing are read out, so as to execute such display as shown in FIG. 37, alternately; thereby enabling the high-speed search of the 3D programs, in the similar manner.

The stream reproduction time and the data readout position on the recording medium are determined, uniquely, depending on the position information to be referred when reading out the data, which will be explained next. By referring to the position information when reproducing, since a reproduction time-interval at the data readout position can be grasped, it is possible to adjust the number of pieces of the still pictures and the time-period for displaying per one (1) piece thereof, even if the time-interval of each GOP is not unique, like, 0.5 second, as is shown in FIG. 75, in the GOP configuration, or if plural numbers of "I" pictures (or, a picture, which can be displayed alone) are included in one (1) GOP, and therefore it is possible to achieve the high-speed reproduction at the arbitrary double-speed. In FIG. 76 is shown examples of the clip information data and the data readout position information.

<Clip Information Data and Data Readout Position Information>

Figure 76A:
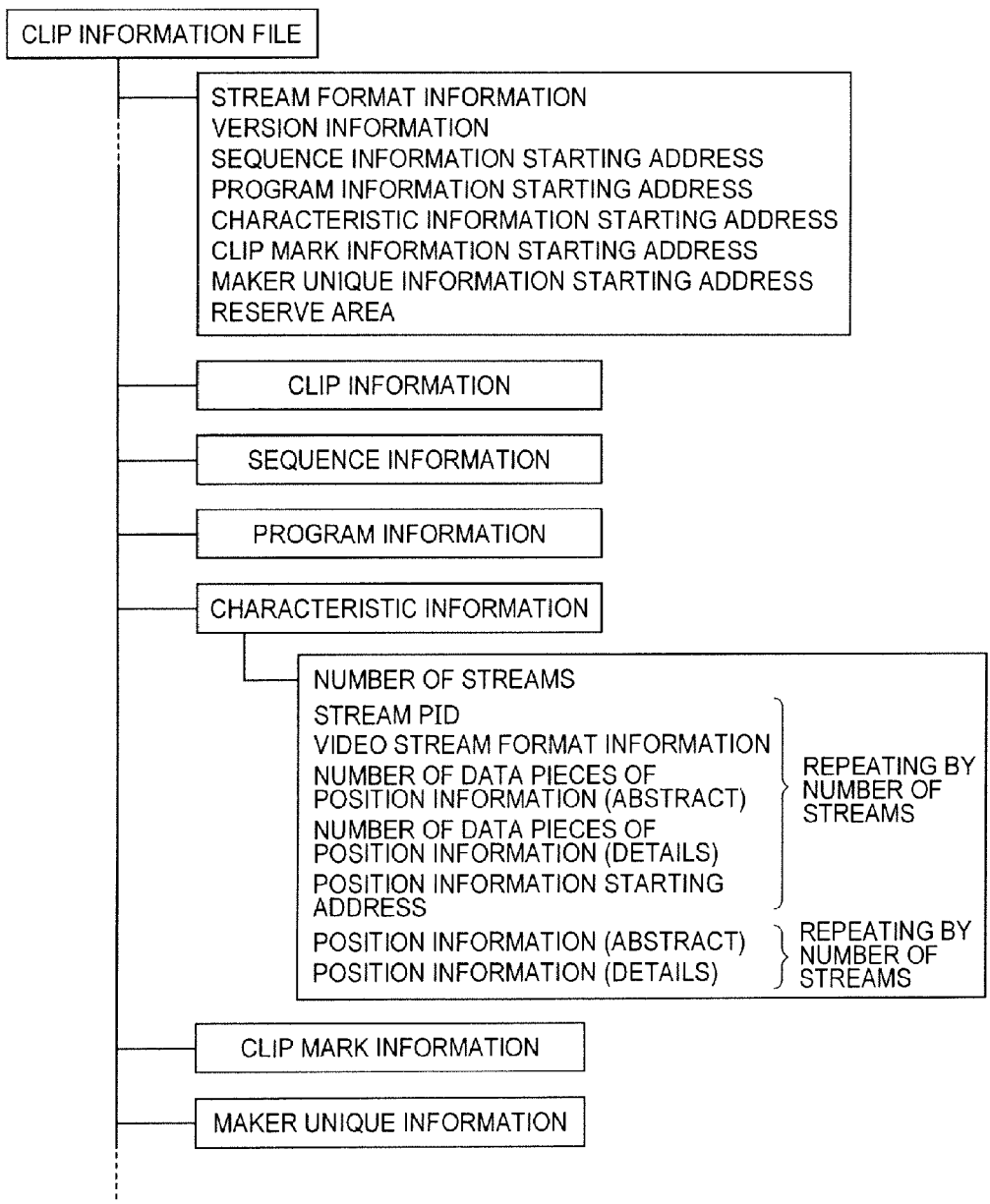
FIG. 76A is a view for showing an example of the structure of a folder file of data to be recorded onto a recoding medium 26.

In FIG. 76A is shown an example of the data configuration of a clip information file. "stream format information" indicates a format of the stream, such as, MPEG2-TS, for example. "version information" indicates a version of the regulation at the time when this clip information file is recorded. By referring to this, the format of information lines or strings thereafter can be determined, uniquely, and it is possible to keep compatibility between the equipments if the recording medium is portable.

"sequence information start address" indicates a starting position of "sequence information" which will be mentioned later. In the similar manner, "program information start address", "characteristic information start address", "clip mark information start address" and "maker unique information start address" indicate the starting positions of those information, respectively.

"clip information" indicates the characteristic of the program corresponding to this clip information, such as, how it is encode, if conversion is made or not when receiving the broadcasting, at which number the bite rate is, etc., for example.

"sequence information" includes the information of how many sequences are included in the program corresponding to this clip information if defining a portion continuous in STC values of the stream as one (1) sequence, PCR values of those sequences and PST values at the starting position and the ending position, etc.

"program information" records a number of program(s) included by the program corresponding to this clip information, and holds therein, an ID of stream at the time when each program is broadcasted, and further detailed information of all ES included in that program (e.g., video format, frame rate, aspect ratio, if being the video ES, while sampling frequency thereof if being the audio ES).

In "clip mark information" is recorded the information of chapter(s) included by the program corresponding to this clip information, and the content thereof is analogous to the chapter information shown in FIG. 60. "maker unique information" is a data area, which can be used for a maker manufacturing the receiving apparatus to input unique information therein.

In "characteristic information" are recorded the following: i.e., "stream number" for indicating a number of vide ES, "stream PID" for indicating PID for each of that video ES, "video stream format information" for determining the data format at the top of GOP (for example, the data of MPEG 2 format, wherein a GOP header and a sequence header are provided before the "I" picture, etc.), a number of pieces of data of the position information (e.g., an abstract), which will be mentioned later, and "position information start address" for indicating the starting position of the position information, and thereafter is recorded a substance of the position information for each vide ES.

Figure 76B:
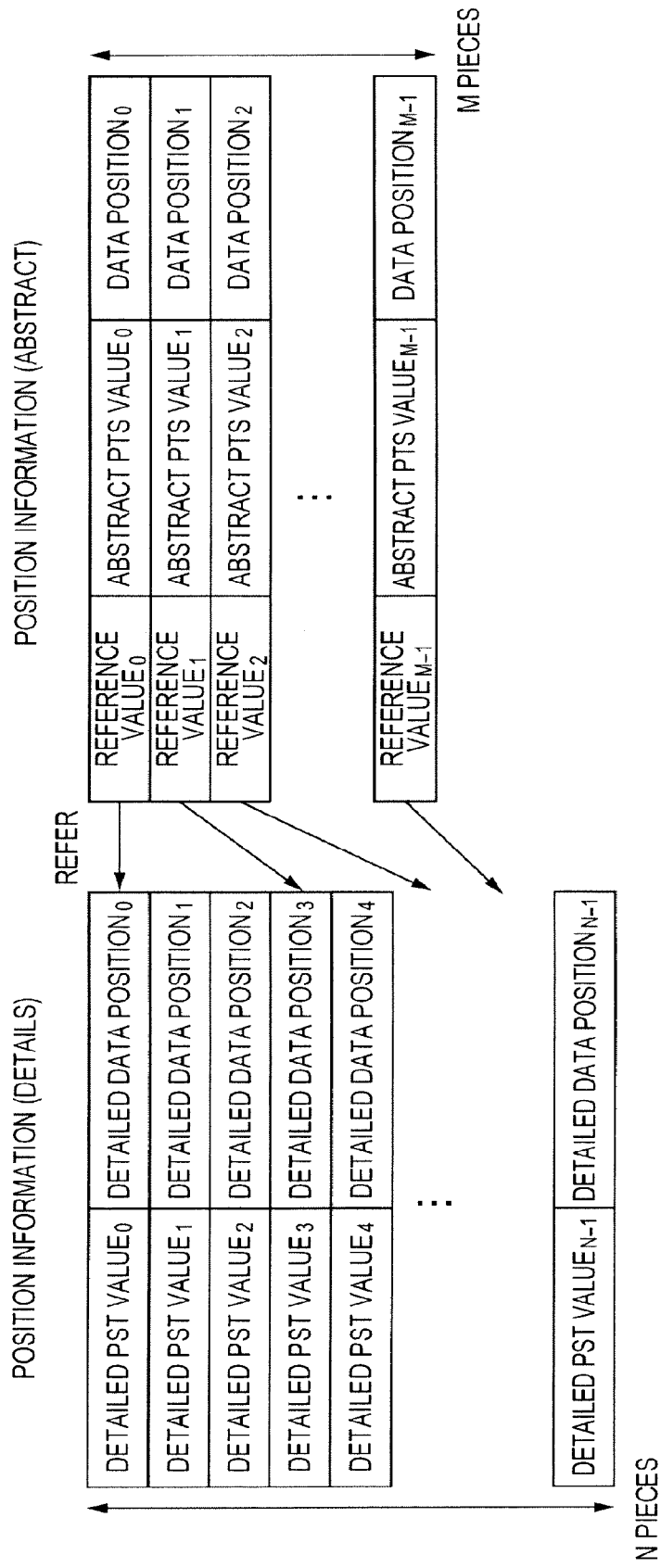
FIG. 76B is a view for showing an example of the structure of a folder file of data to be recorded onto a recoding medium 26.

FIG. 76B shows an example of the data configuration of the position information. In this example, the position information for indicating the readout position is managed by two (2) sets of tables of position information (details) and the position information (abstract). For example, in the position information (abstract) table are held data position information on the recording medium and an abstract PTS value, which records therein upper bits (for example, 14 bits) of the PTS value applicable in calculation for reproduction time of that data.

Also, each data holds a reference value for showing a relationship between the data of the position information (details) table. The data of the position information (details) table corresponds to an actual readout position (for example, a packet at the top of the "I" picture, etc.), and the table holds therein the data position information (for example, upper 17 bits) and a detailed PTS value applicable in calculation for the reproduction time of that data. The detailed PTS value may not include down to the lower bit(s), completely, but may be enough in a format of reserving the middle 11 bits thereof, for example, if sufficient time resolution can be maintained with it.

With holding those information, it is possible to determine an arbitrary data position and the PTS value corresponding thereto, uniquely. The position, at which data of the reference value of the position information (abstract) refers to the position information (details), depends on data size presentable by each.

For example, when the data position information turns back to "0", again, after starting from "0" and exceeding the size presentable, new data is added to the position information table (abstract), and the data of the position information (details) table, which is produced at the same time to this, is the reference value. Recording of those two (2) arrangement information into one (1) file, such as, the characteristic data, aligning in an order the position information (details) next to the position information (abstract), for example, enables management thereof.

However, the configuration of the data should not be limited to that of the present embodiment, and into the position information (details) may be recorded additional information, for example, PID or the data size of "I" picture of the corresponding video ES, the format of the video data (e.g., being MPEG 2 format or H.264 format, etc.) together with. With doing in this manner, since a background of that stream can be determined for each data managed by the position information (details), control can be made in more details thereof, when reproducing it.

Also, though the explanation was given on the method of managing with using two (2) tables, i.e., the position information (details) and the position information (abstract), in the present embodiment; however, since an advantage of the method of managing two (2) tables lies, since the data volume is reduced by collecting the information of an upper level(s) into the abstract table, comparing to the case of managing with using a table, in that a search can be made at high-speed when making the search from a large volume of information. Of course, this may be achieved by managing with using only one (1) table, on which the PTS value and the data recording position on the recording medium are corresponded one by one (1:1).

<Processing Steps when Recording>

Next, explanation will be give on a recording process of the position information. During when recording the data received into the recording medium 26, if detecting the "I" picture within the information obtain portion 5802, the position thereof is recognized by a value of number of the packets from the top of data, so as to be used as the data position information. Also, if there is the PTS value in the packet at the top of the "I" picture, an abstract PTS value and a detail PTD value are produced and recorded. Correct positions of the PTS values can be deiced, uniquely, when the stream formats thereof are determined.

Also, there is not always necessity of producing/recording the position information for all of the "I" pictures, and the position information of a "P" picture or a "B" picture can be recorded together with the information of the "I" information, in the similar manner.

In case where the recorded program is the 3D of the 2-viewpoints separate ES transmission method, it is possible to record all of the arrangement information aligning those in one (1) file, while producing such a table for each ES. Thus, the "stream number" of "characteristic information" is "2", and this means a condition that the position information of a main viewpoint video and the position information of a sub-viewpoint video are recorded in serfs.

However, in general, recording of the position information mentioned above generates necessity of processing by hardware of exclusive use or an addition of software processing, for detecting the position information for each picture. By taking a situation of being unable to implement those processing into the consideration, there may be cases of determining methods much more easy, for recording the characteristic information.

There are the followings: such as, a method of recording a packet recording position at that time, together with a value of a time counter or an arrival time, while managing the arrival time of an input stream by the time counter operating upon basis of a clock in synchronism with that of transmission equipment provided within the apparatus (in general, driving at 27 MHz), and providing a periodical punctuation, such as, every 1 second, for example, and a method of recording the value of the time counter or the arrival time, together with the packet recording position at that time, every time when data of a certain volume size is inputted, etc.

With those methods, although the recording position cannot be determined, correctly, binding can be made between the stream readout position and the time information, therefore, upon basis of this information, there can be achieved the high-speed reproduction. When conducting the reproduction at N×speeds, for example, there is an implementing method, wherein data is read out from a packet position corresponding thereto, by referring a time count value or information of the arrival time, which are recorded, in the similar manner to that shown in FIG. 75, and the video decoder portion 30 executes the decoding thereon when detecting a picture decodable, while proceeding analysis on the input data sequentially, for example.

In case of executing such high-speed search as was explained in the above, since the scene is exchanged for each one (1) display picture, the faster the speed, the higher the possibility that completely different pictures are displayed, continuously. When reproducing the 3D display video, in particular, since it takes a time from when the picture for use of the left-side eye and the picture for use of the right-side eye are displayed until when the user combines the two (2) pieces of pictures in her/his brain, so as to recognize to be the 3D video, then there is a problem that she/he cannot normally view/listen the video displayed, if shortening the time-period for displaying per one (1) piece thereof.

For dissolving this problem, a displaying method for use when executing the high-speed search, being fitted to that when displaying the 3D video, is applied.

<Embodiment of Control when High-Speed Search>

Figure 77:
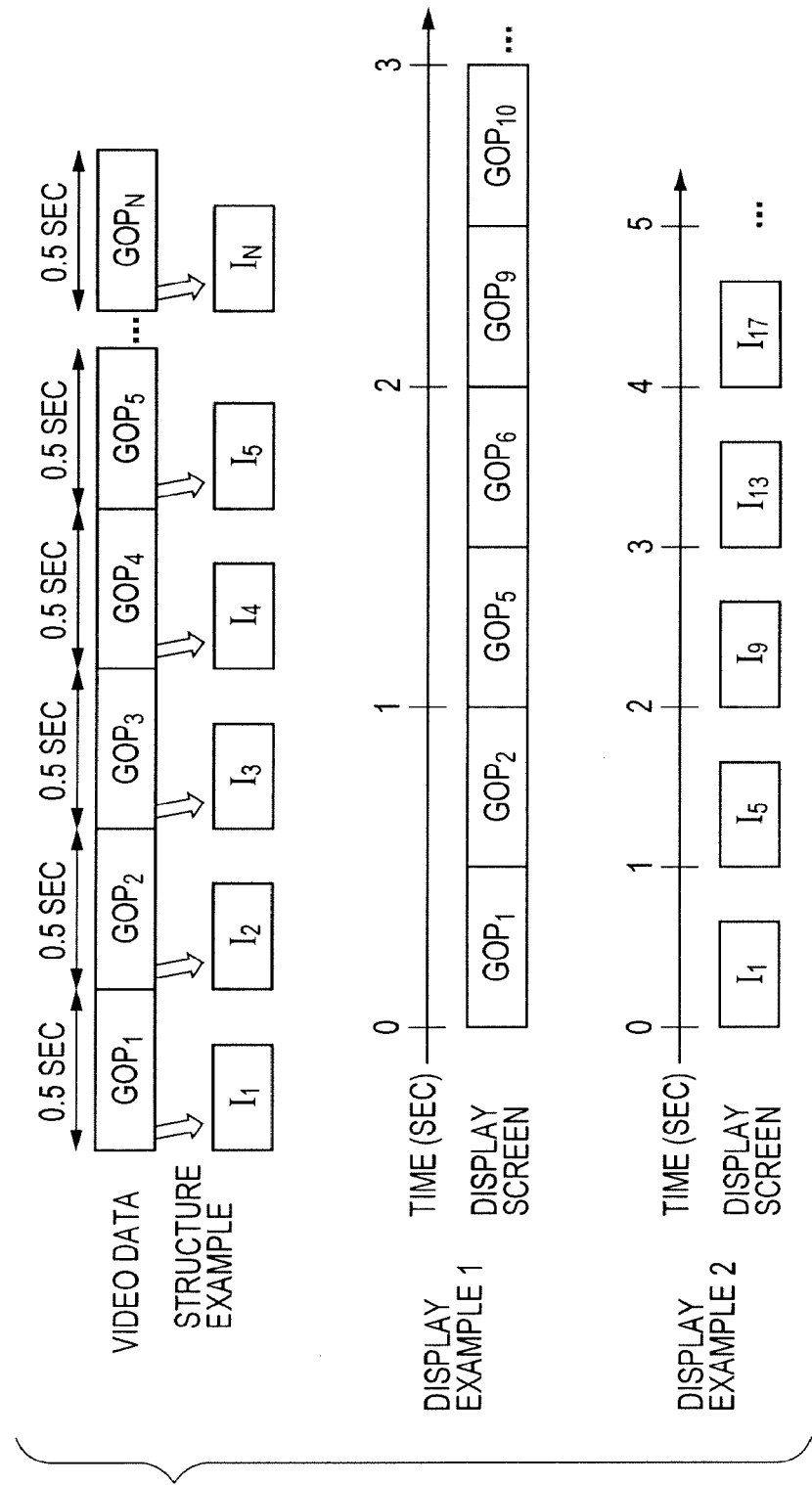
FIG. 77 is a view for showing an example of picture structure of the video data and video display when executing a high-speed search.

In FIG. 77 is shown an example of high-speed search processing of the 3D video, in a manner for the user to view/listen easily, with respect to the configuration of the 2-viewpoints same ES video data shown in FIG. 75.

In a display example 1 is shown a case where the high-seed search at 2×speeds is achieved by conducting a skip (i.e., change of the reproduction position, and may be also called "jump"), after conducting the normal reproduction for "1" second. The skip can be made with using the clip information mentioned above.

Although the normal reproduction is determined to be "1" second, in the time-period thereof, in FIG. 77, but it may be executed for a period of an arbitrary number of second(s). The high-speed search of 2×speeds can be obtained, for example, if determining the time-period of the normal reproduction at "2" seconds and skipping to GOP 9, "2" seconds later. The longer the time-period of the normal reproduction, the easier 3D recognition for the user, but since it also bring a time-interval of skipping by one (1) time to be large; therefore, there is a probability of deteriorating an accuracy of finding out a scene desired.

In a display example 2 is shown a case of achieving the high-speed search of 2×speeds by executing the skip after displaying the still picture for "1" second. The skip can be made with using the clip information mentioned above. Herein, although the time-period is determined at "1" second for displaying the still picture, by one (1) piece thereof, but it does not matter if it be executed for a period of an arbitrary number(s) of second(s). For example, with determining the time-period for displaying the still picture at "2" seconds, processing is made, such as, displaying the "I" picture, which is contained in GOP, "2" seconds later, . . . , and thereby can be achieved the high-speed search of 2×speeds.

With such processing as was given in the above, for the user, it is possible to execute the search of the 3D video while recognizing it in 3D.

On the other hand, when executing the high-speed search, not executing the display by the 3D video, but it may executed by displaying the 2D video. Since the user can recognize the picture easily, then the time-interval for one (1) time of skipping can be shorten, so as to increase a number of pieces of the pictures to be displayed; therefore, it is possible to improve or increase the accuracy of finding out the scene desired, and thereby improving or increasing the usability thereof.

The plural numbers of processing shown in the above may be made selectable for the user from a setup menu, etc. It may be achieved by selecting the format of the display example 1 or the format of the display example 2, as the method for displaying on the scene of 3D video, or by designating the time, such as, how much second(s), for one (1) time of the normal reproduction, when applying the format of the display example 1.

Or, the display may be made selectable, between the display of 2D picture or the display of 3D video, in the high-speed search of the video data including the 3D video therein.

In this manner, bringing them to be selectable enables to make the display suitable to viewing/listening characteristics or ability of the user, individually, or to change the displaying method suitable to the characteristics of the picture to be displayed, etc., i.e., improving or increasing the usability.

However, with such high-speed reproduction, as 1.3× speeds or 1.5×speeds, for example, the video output is controlled in such a manner that the picture data, accompanying the "B" picture or the "P" picture therewith, to be decoded will not be outputted, appropriately, depending on the speed. Since the video can be seen continuous, then the audio data is also controlled, not to be outputted, partially, at an interval depending on the speed, for example, and thereby outputting the audio fitting to the video. With this, for the user, since it is possible to view/listen the scene to be continuous, then it is enough, not executing such processing as was mentioned above.

<Processing in Apparatus>

Figure 78:
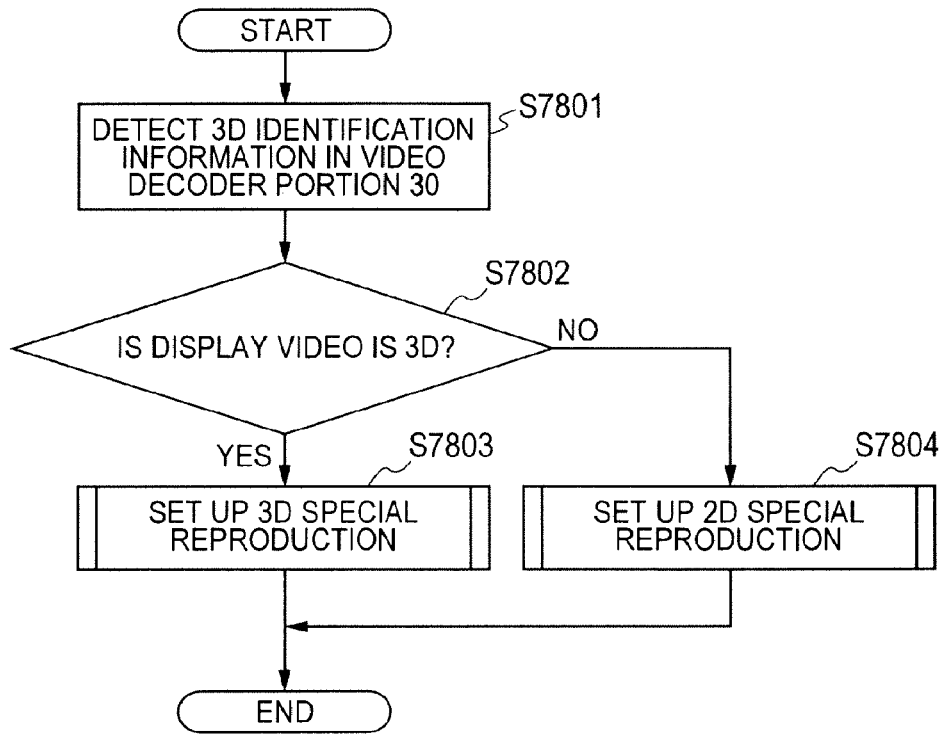
FIG. 78 is a view for showing an example of a flowchart for determining a method for controlling a special reproduction.

An example is shown in FIG. 78, of the processing for executing the high-speed search on the content, including an adequate 3D scene therein, by treading different process thereon depending on whether the scene to be reproduced is 2D or 3D, in the apparatus. Hereinafter, explanation will be given on the example of the receiving apparatus shown in FIG. 25.

When the high-speed search is designated through operation of the remote controller, etc., from the user, in S7801, detection is made on the encoded 3D program details descriptor, which is stored user data area and/or the additional information area, and the process advances into S7802. However, this detection may be executed within the multiplex/demultiplex portion 29 or the program information analyze portion 54, and the data to be detected may be the program characteristics, which are included in the content descriptor shown in FIG. 54.

In S7802, from the information obtained in S7801 within the system control portion 51, it is determined if the scene, on which the decoding is executed at present, is 2D or 3D. If the result determined is 3D, the process advances into S7803, on the contrary if 2D, it advances into S7804. Determination if it is 2D or 3D may be made by other method(s) than that.

In S7803, the system control portion 51 instructs a processing block(s) relating thereto, to set up the special reproduction depending on the 3D display, and each processing block executes necessary processed, and thereby completing the processing. In S7804, the system control portion 51 instructs a processing block(s) relating thereto, to set up the special reproduction depending on the 2D display, and each processing block executes necessary processed, and thereby completing the processing.

Figure 79:
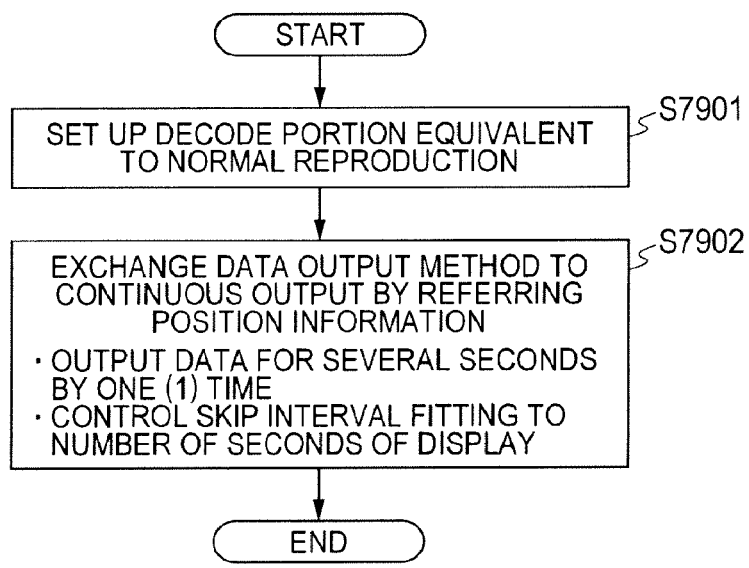
FIG. 79 is a view for showing an example of a flowchart when starting a special reproduction of 3D video.

The process to be executed in S7803 differs depending on determination of the display format. FIG. 79 is a sequence block diagram for showing an example of setting up the special reproduction, to be executed in S7803, when displaying moving pictures continuing for a time-period of several seconds, in the format thereof, as is shown by the display example 1 in FIG. 77.

In S7901, while the system control portion 51 keeping the decoding method in the video decode portion 30 to the setup for executing the decoding process, which is same to that for the normal reproduction, as it is, the process advances into S7902. In S7902, the system control portion 51 instructs the recording/reproducing control portion 58, to readout/change the transmission method of the recorded program data, and output data including the continuous video data for a time period of several seconds (for example, for 1 second), by one (1) time.

In more details, the recording/reproducing control portion 58 is able to determine the readout position of the desired data for a time-period of several seconds, by referring to the GOP information shown in FIG. 76. The process is completed with provision that a setup is made to repeat the processing, such as, determining the next coming readout position depending on the double-speed, after reading out the necessary data sequentially, and outputting it to the video decode portion 30.

A number of seconds of the continuous data by one (1) time is arbitrary. Timing for transmitting each data may be achieved by, for example, while managing it by the recording/reproducing control portion 58, by referring to an operation clock not shown in the figure, executing the sequential decoding processes of the input data within the video decode portion 30, or may be a process, in which the recording/reproducing control portion 58 transmits data at high speed when a vacancy is generated, depending on the data remaining volume in the video decoder portion 30 before being decoded (being also called "flow control"), while managing the display timing by the video decoder portion 30. In case of the present sequence, since the moving picture is displayed even during the high-speed search, the audio output may be executed together with.

Figure 80:
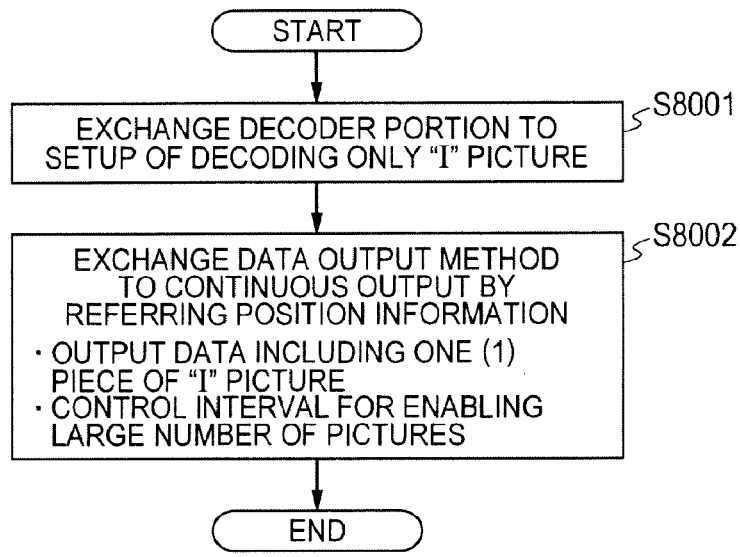
FIG. 80 is a view for showing an example of a flowchart for starting the method for controlling the special reproduction.

FIG. 80 is a sequence block diagram for showing an example of setting up the special reproduction to be executed in S7803 when displaying one (1) piece of still picture for a time-period of several seconds, as is shown by the display example 2 in FIG. 77. In S8001, the system control portion 51 changes the decoding process method in the video decoder portion 30 to decode only the "I" picture, and advance the process into S8002.

In S8002, the system control portion 51 instructs the recording/reproducing control portion 58 to change the readout/transmission method of the recorded program data, so that one (1) piece of the "I" picture data is outputted at one (1) time. However, since the video decoder portion is set to process only the "I" picture data in S8001, transmission of data other than that "I" picture data does not matter with the operation thereof.

Processing only the "I" picture data enables to reduce a processing load. The recording/reproducing control portion 58 can determine the starting position and the ending position of reading out of the "I" picture desired by referring to the position information shown in FIG. 78. The process is completed with provision that a setup is made to repeat the processing, such as, determine the next coming readout position depending on the double-speed and the time-period of displaying one (1) piece of the "I" picture, after reading out the "I" picture and transmitting it to the video decoder portion 30. The time interval for displaying one (1) piece of the "I" picture is arbitrary.

Also, when changing the display format of the 3D scene under the special reproduction, the sequence set up for the special reproduction to be executed in S7803 differs in the content of the process depending in the video format recorded. When the recorded video is a program of the 2-viewpoint separate ES transmission method, it is enough to execute the process similar to that shown in FIG. 80; however, in S8002, the recording/reproducing control portion 58 selects only a main 1 ES to output it, and completes the process after make a setup to provide the "I" pictured data at a necessary time interval.

In this case, if processing the display time interval of the "I" picture at a fine display interval, similar to that when reproducing the 2D, such as, 100 milliseconds, etc., for example, there can be obtained an advantage that the user can grasp the reproduction position much more detailed, easily.

Figure 81:
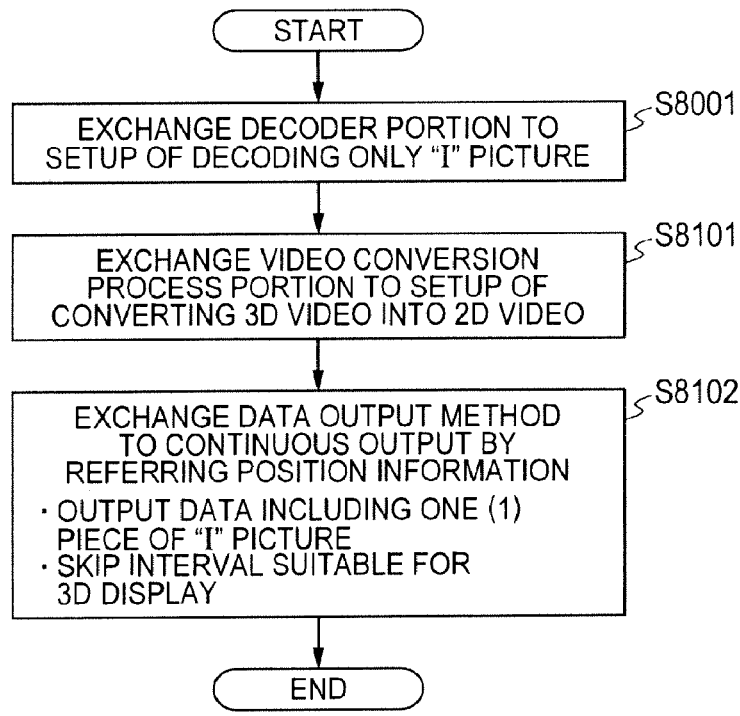
FIG. 81 is a view for showing an example of a flowchart when starting a special reproduction of 3D video.

An example of a processing sequence when the recording video is the 2-viewpoints same ES transmission method is shown in FIG. 81. After conducting the process similar to S8001, in S8101 is made a setup in the video conversion process portion 32, to convert the video into that for 1-viewpoint display if it is the video for 2-viewpoints, for example, the "Side-by-Side" method, etc., and the process advances into S8102.

In S8102 is made a setup similar to S8002, and the process is completed. However, the processing may be executed in such a manner that the interval for displaying the "I" picture comes to a fine display interval similar to that when reproducing the 2D, such as, 100 milliseconds, etc., for example. Or, incase of either format, a control is executed; i.e., stopping the 3D viewing/listening function of the 3D view/listen assisting device 3502, or showing the same picture for the right-side eye and the left-side eye (e.g., displaying "M" picture, again, at the timing for displaying "S" picture shown in FIG. 37A, and displaying "L" picture, again, at the timing for displaying "R" picture shown in FIG. 39A) while keeping the 3D viewing/listening function of the 3D view/listen assisting device 3502 as it is.

With the processing mentioned above, there is obtained an effect of achieving the high-speed search, which the user can view/listen easily on the 3D video scene, when reproducing the program including the 3D video data therein, receiving from the recording medium of the receiving apparatus 4 having such structure as shown in FIG. 25.

<Process When Connecting Plural Numbers of Apparatuses>

Figure 82:
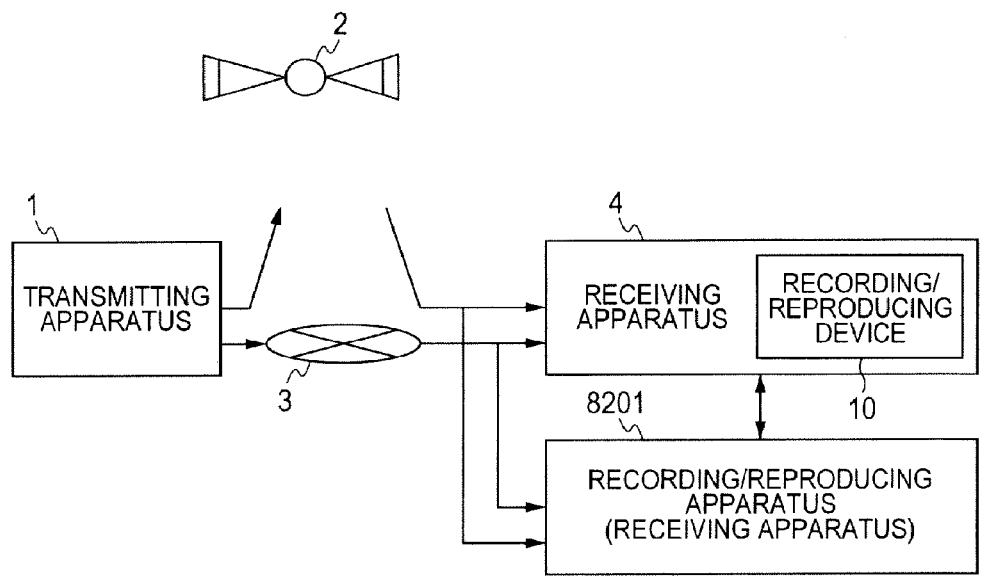
FIG. 82 is a block diagram for showing an example of the structure of a system.

The receiving apparatus 4 shown in FIG. 25 can cooperate with the recording/reproducing apparatus including the recording medium and having the recording function and/or the reproducing apparatus having the production function, via the high-speed digital I/F 46, or a digital I/F not shown in the figure, for example. A block diagram of an example of the structure thereof is shown in FIG. 82.

A recording/reproducing apparatus 8201 is connectable with the receiving apparatus, and has the recording function by itself. Accordingly, there can be considered a case where the program recorded by the recording/reproducing apparatus 8201 is outputted in the digital form, and it is inputted to the receiving apparatus to be viewed/listened. (Hereinafter, although explanation will be made on an example of connection with the recording/reproducing apparatus 8201, but even with the reproducing apparatus, it is possible to obtain an equivalent effect through the processing equivalent thereto.

Also, with the digital I/F, such as, HDMI (being a trademark registered; an abbreviation of High-Definition Multimedia Interface) connection, for example, since transmitting/receiving of command can be made, it is the receiving apparatus 4 that receives an instruction from the user, and it is possible to control the recording/reproducing apparatus 8201 by transmitting a control command from the receiving apparatus 4 to the recording/reproducing apparatus 8201.

In case of the present configuration, since the video data is outputted

In the present configuration, explanation will be given on an example of a process for executing the high-speed search on the content including the 3D scene therein. The processing sequences follow those shown in FIGS. 78 to 81. When designation is made on the high-speed search, through an operation on the remote controller from the user, etc., the system control portion 51 produces a control signal, and transmits it to the recording/reproducing apparatus 8201 from the digital I/F not shown in the figure. The content of each of the processes, which will be given hereinafter, since it is equal to that of the embodiments mentioned above, and since it is executed in a place, not within the receiving apparatus 4, but within the recording/reproducing apparatus 8201; therefore, the explanation thereof will be omitted here.

With the processing mentioned above, there is obtained an effect of achieving the high-speed search, which the user can view/listen easily on the 3D video scene, when reproducing the program including the 3D video data therein, upon receipt of the signal, which is outputted from the recording/reproducing apparatus 8201 or the reproducing apparatus, within the receiving apparatus 4 having such structure or configuration as shown in FIG. 82.

<Process in Reproduction Via Network>

The receiving apparatus 4 shown in FIG. 25 can cooperate with different receiving apparatus, the recording/reproducing apparatus, and the reproducing apparatus, etc., via the network I/F 25, like the example of the configuration shown in FIG. 71 (for example, viewing/listening of content via the network, which is regulated by DLNA (being a trademark registered; an abbreviation of Digital Living Network Alliance) guideline and/or viewing/listening of content on VOD (e.g., an abbreviation of Video On Demand)). With connection between the recording/reproducing apparatus 7103 and the broadcast receiving apparatus 4 via the connection control device 7101 with using a network cable, the program data recorded in the recording/reproducing apparatus 7103 can be displayed and viewed/listened on the broadcast receiving apparatus 4, by transmitting it.

Explanation will be given on a sequence for executing the high-speed search on the content, including the 3D scene therein, within the present configuration. (The explanation, which will be given hereafter, is made on an example of a data output from the recording/reproducing apparatus 7103; however an equivalent effect can be obtained with the equivalent process if applying it into the reproducing apparatus 7102 in the place thereof.)

In case of the present configuration, the control of an output of data is executed within the recording/reproducing apparatus 7103, while decoding/video conversion process within the receiving apparatus 4. Fundamental steps of processing follow a series of controls, which are described in FIGS. 78 to 81.

If the high-speed search is designated through an operation on the remote controller from the user, for example, during the normal reproduction, then the process moves into S7801. Also, fitting to this, a communication command is transmitted to the recording/reproducing apparatus 7103 via the network. In S7801, the video decoder portion 30 detects the encoded 3D program details descriptor, which is stored in the user data area or the additional information area, and the process advances into S7802. However, this detection may be executed in the multiplex/demultiplex portion 29 or the program information analyze portion 54, and the data to be detected may be the program characteristics included within the content descriptor shown in FIG. 54.

In S7802, it is determined if the scene, being decoded at present, is the 2D or the 3D, from the information obtained in S7801 within the system control portion 51. If the result of the determination is the 3D, the process advances into S7803, while if it is 2D, the process advances into S7804. However, the determination if being the 2D or the 3D may be conducted by the methods other than that.

In S7803, the system control portion 51 instructs the setup of the special reproduction depending on the 3D display to the processing blocks relating thereto, while each processing block executes the necessary processing therein, and the sequence is completed. In S7804, the system control portion 51 instructs the setup of the special reproduction depending on the 2D display to the processing blocks relating thereto, while each processing block executes the necessary processing therein, and the sequence is completed.

When displaying moving pictures continuing for a time-period of several seconds, as is shown by the display example 1 in FIG. 77, in S7901, the video decoder portion 30 is keeps the setup of executing the process equivalent to that for the normal reproduction, and the process advances into S7902. In S7902, the readout/transmission method for the recorded program data is changed within the recording/reproducing apparatus 7103, so as to output the data including the video data, for a continuous time-period of a number of second(s), by one (1) time. However, the number of the second(s) of the continuous data to be read out is arbitrary.

Within the recording/reproducing apparatus 7103, if the position information is recorded in the format shown in FIGS. 75 and 76, since it is also possible to determine the readout position of the data continuing for a time-period of several seconds desired, by referring to that data, therefore the process is completed with provision that a setup is made to repeat the processing, such as, determining the next coming readout position depending on the double-speed.

In the receiving apparatus 4, a series of processes is executed, in an equivalent manner when receiving the broadcasting, such as, from division of the data received on the network I/F 25 into the video/audio, etc., sequentially, within the multiplex/demultiplex portion 29, up to deciding process within the video decoder portion 30, the video conversion process within the video conversion process portion 32, and displaying on the display 47.

As the display format thereof, when displaying one (1) piece of still picture for a time-period of several seconds, as shown by the display example 2 in FIG. 77, in S8001 the system control portion 51 changes the decoding process method of the video decoder portion 30 to decode only the "I" picture, and the process advances into S8002.

In S8002, the recording/reproducing apparatus 7103 changes the readout/transmission method for the recorded program data, and thereby outputs the "I" picture data for one (1) piece by one (1) time. However, since the video decoder portion is set up to process the "I" picture only in S8001, it does not matter with, in the operation thereof, if transmitting data other than the "I" picture. Processing only the "I" picture data enables reduction of the processing load. If the recording/reproducing apparatus 7103 records the position information when recording, as was shown in FIGS. 75 and 76, then by referring to this, it is possible to determine starting position and the ending portion for reading out the "I" picture.

After reading out the "I" picture and outputting it to the network, the process is completed with provision of a setup of repeating a process to determine the next coming readout position depending on the double-speed and the time-period for displaying one (1) piece of the "I" picture.

Also, when changing the display format of the 3D scene under the special reproduction into the 2D, a sequence set up for the special reproduction to be executed in S7803 differs from in the content of processing depending on the video format recorded. If the recorded video is the program of the 2-viewpoints separate ES transmission method, it is enough to execute the processes similar to those shown in FIG. 80, however in S8002, the recording/reproducing apparatus 58 selects only the main 1 ES, so as to output it, and after making a setup to provide the "I" picture at a necessary time-interval, completes the process. If processing in such a manner, in this instance, that the interval for displaying the "I" picture comes to be a fine display interval equivalent to that when reproducing the 2D, such as, 100 milliseconds, etc., there is obtained an effect that the user can grasp the more detailed reproduction position easily.

An example of a processing sequence when the recorded video is the 2-viewpoints same ES transmission method is shown in FIG. 81. After conduction the process similar to that in S8001, in S8101 is made a setup to convert the video, if being for two (2) viewpoints, such as, the "Side-by-Side" method, etc., for example, into that for displaying one (1) viewpoint for use of the 2D view/listen, within the video conversion process portion 32, and the process advances into S8102. In S8102 is made a setup similar to that in S8002, and thereafter is completed the process.

However, the processing may be done, so that the interval for displaying the "I" picture comes to be a fine display interval equivalent to that when reproducing the 2D, such as, 100 milliseconds, etc. Or, in case of either format, a control is executed; i.e., stopping the 3D viewing/listening function of the 3D view/listen assisting device 3502, or showing the same picture for the right-side eye and the left-side eye (e.g., displaying "M" picture, again, at the timing for displaying "S" picture shown in FIG. 37A, and displaying "L" picture, again, at the timing for displaying "R" picture shown in FIG. 39A) while keeping the 3D viewing/listening function of the 3D view/listen assisting device 3502 as it is.

For the purpose of supporting the receiving apparatus 4 and the recording/reproducing apparatus 7103 to operate mutually without discrepancy therebetween, it is important to control the processing on the transmitting side and processing on the receiving side independently, respectively, in accordance with a predetermined method, and it can be achieved. Or, there may be provided a scheme of instructing an output controlling method from the receiving apparatus 4 to the recording/reproducing apparatus 7103 by executing transmitting/receiving of a command on the network when exchanging the operation, or a scheme of noticing a control method before actual data is transmitted from the recording/reproducing apparatus 7103.

With the processing mentioned above, within the receiving apparatus 4 having such structure as shown in FIG. 71, there is obtained an effect of achieving the high-speed search, which the user can view/listen easily on the 3D video scene, when receiving and reproducing the program including the 3D video data therein, which is outputted from the recording/reproducing apparatus 7103 or the reproducing apparatus 7102.

<Exchange Process when 2D Video and 3D Video are Mixed Up within Program>

In the above, although the explanation was given on the process by means of the 3D program details descriptor; however, explanation will be given on a control for improving usability of the user when reproducing/displaying a program mixing up the 2D video data and the 3D video data therein, in particular, if it has such 3D/2D identification information as was shown in FIG. 64A.

Figure 83:
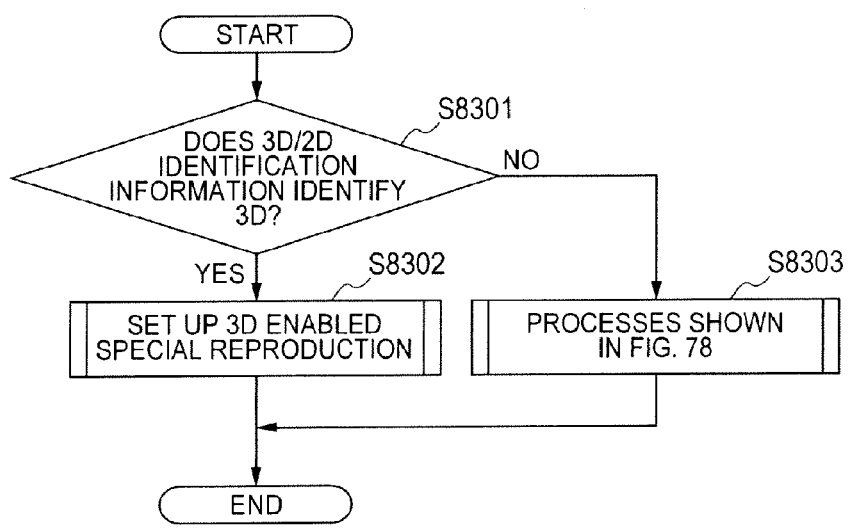
FIG. 83 is a view for showing an example of a flowchart for determining a method for controlling a special reproduction.

In FIG. 83 is shown an example of a sequence of the processing. In S8301, if it indicates to have the 3D video data by referring to the 3D identification information of the corresponding reproduction content, the process advances into S8302, on the contrary if not have the 3D video data into S8303. Regarding the method for refereeing to the identification information, rather than accessing to the file every time, if making an access to the file only one (1) time before starting the reproduction, so as to record it as a local variable, herein after the value of the 3D/2D identification information can be determined by referring to the corresponding variable when determining; there is an advantage of lightening the processing load.

In S8302, a setup is made to execute the process for the 3D video data, which was explained in FIGS. 79 to 81 mentioned above, irrespective of that the reproduction display position is the 3D video data or the 2D video data, and then the process is completed. However, about the process mentioned in S8101, the process is executed for converting the input video into the 2D video, if it is the 3D video of, such as, the "Side-by-Side" method or the "Top-and-Bottom" method, as was explained in FIG. 40, for example, in the video conversion process portion 32, but no conversion process is done if the input video is 2D video.

In S8303 is conducted such process as was shown in FIG. 78, so as to make a setup of executing the process depending on if the video data at the reproduction position is the 3D video data or the 2D video data, and the process is completed. However, regarding a sequence set up for the special reproduction to be executed in S7803, the process is executed for converting the input video into the 2D video, if it is the 3D video of, such as, the "Side-by-Side" method or the "Top-and-Bottom" method, as was explained in FIG. 40, for example, in the video conversion process portion 32, but no conversion process is done if the input video is 2D video.

By referring to the 3D/2D identification information through the processing mentioned above, it is possible to uniform appearances of the videos, in common between the 2D video scene and the 3D video scene, under the high-speed search, within the contents mixing up the 2D video data and the 3D video data therein, and also to reduce a funny feeling upon exchanging the scene 2D/3D; there is obtained an advantage that the user can view/listen the 3D video under the high-speed reproduction, easily.

In the place of the determination of the 3D/2D identification information to be executed in S8301, the determination may be made if the program name (or may be called a "program title"), which is included in the program-common information, is a title or not, having a meaning to include the 3D video. With this, it is possible to determine if there is included the 3D video scene or not, even in case where there is no 3D/2D identification information, and thereby enabling to improve the usability, much more. Also, the determination of if including the 3D video scene or not may be made with methods other than that.

<Process when there is No Flag of ES Level>

In case where the reproduction content of the 2-viewpoints same ES transmission method does not hold the 3D program details descriptor in the user data area or the addition information area thereof, for the receiving apparatus 4, sometimes, it is difficult to determine of 2D/3D of the reproduction scene. Then, a possibility can be considered that the 2D video is displayed in the 3D format, in particular, when such exchange generates between the 2D video and the 3D video, during the high-speed search.

For preventing from this, if it is difficult to make the determination of 2D/3D on the reproduction scene, for example, the user exchanges to the special reproduction, the display format during the special reproduction may be treated as the 2D. With doing this, a possibility of showing an uncomfortable video to the user upon an erroneous display format, and there is obtained an effect of achieving the special reproduction view/listenable easily.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A reproducing apparatus, comprising:
a reproducing portion, which is configured to reproduce a video content from a recording medium,
a decoder, which is configured to decode a video content reproduced by the reproducing portion, and
an on screen display (OSD) producing portion, which is configured to produce an OSD, wherein
the reproducing apparatus is capable of high-speed reproducing a 3D video content to be displayed in 3D from the recording medium by a plurality of reproducing methods at one reproducing speed,
the OSD producing portion is capable of producing a set up menu OSD that allows the plurality of reproducing methods to be selectable by a user,
the decoder is capable of changing a decoding process for a 3D video content to be displayed in 3D at the one reproducing speed according to a reproducing method selected via the set up menu OSD.

2. The reproducing apparatus described in the claim 1, wherein the plurality of reproducing methods includes a method in which a 3D video content displayed as intermittently skipped moving pictures.

3. The reproducing apparatus described in the claim 2, wherein the plurality of reproducing methods includes a method in which a 3D video content displayed as intermittently displayed still pictures.

4. The reproducing apparatus described in the claim 1, wherein the plurality of reproducing methods includes both a method in which a 3D video content displayed as intermittently skipped moving pictures and a method in which a 3D video content displayed as intermittently displayed still pictures.

5. The reproducing apparatus described in the claim 1, wherein
the 3D video content reproduced from the recording medium is a 3D video content in which both video data for left eye viewpoint and video data for right eye viewpoint are included in one elementary stream.

6. The reproducing apparatus described in the claim 1, wherein
the 3D video content reproduced from the recording medium is a 3D video content in which video data for right eye viewpoint is included in a different elementary stream from an elementary stream including video data for left eye viewpoint.

7. The reproducing apparatus described in the claim 1, further comprising:
a video conversion process portion which is capable of switching 2D/3D status of a video content decoded by the decoder, wherein:
the reproducing apparatus is also capable of high-speed reproducing a 3D video content to be displayed in 2D from the recording medium at said one reproducing speed, and
the OSD producing portion is capable of producing a set up menu OSD that allows the plurality of reproducing methods in 3D and a reproducing method in 2D to be selectable by a user.

8. The reproducing apparatus described in the claim 7, wherein the plurality of reproducing methods includes a method in which a 3D video content displayed as intermittently skipped moving pictures.

9. The reproducing apparatus described in the claim 8, wherein the plurality of reproducing methods includes a method in which a 3D video content displayed as intermittently displayed still pictures.

10. The reproducing apparatus described in the claim 7, wherein the plurality of reproducing methods includes both a method in which a 3D video content displayed as intermittently skipped moving pictures and a method in which a 3D video content displayed as intermittently displayed still pictures.

11. The reproducing apparatus described in the claim 7, wherein
the 3D video content reproduced from the recording medium is a 3D video content in which both video data for left eye viewpoint and video data for right eye viewpoint are included in one elementary stream.

12. The reproducing apparatus described in the claim 7, wherein
the 3D video content reproduced from the recording medium is a 3D video content in which video data for right eye viewpoint is included in a different elementary stream from an elementary stream including video data for left eye viewpoint.

* * * * *